(12) United States Patent
Das et al.

(10) Patent No.: US 12,282,500 B1
(45) Date of Patent: *Apr. 22, 2025

(54) PROVIDING COMPLETION RECOMMENDATION VARIATIONS FOR A PARTIAL NATURAL LANGUAGE REQUEST

(71) Applicant: SPLUNK INC., San Francisco, CA (US)

(72) Inventors: Dipock Das, Sunnyvale, CA (US); Dayanand Pochugari, Santa Clara, CA (US); Aungon Nag Radon, Toronto (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/964,808

(22) Filed: Oct. 12, 2022

Related U.S. Application Data

(63) Continuation of application No. 16/147,428, filed on Sep. 28, 2018, now Pat. No. 11,475,053.

(51) Int. Cl.
*G06F 16/332* (2025.01)
*G06F 3/0482* (2013.01)
(Continued)

(52) U.S. Cl.
CPC ...... *G06F 16/3322* (2019.01); *G06F 16/3344* (2019.01); *G06F 40/205* (2020.01);
(Continued)

(58) Field of Classification Search
CPC ............. G06F 16/3322; G06F 16/3344; G06F 40/205; G06F 40/274; G06F 3/0482; G06N 20/00
See application file for complete search history.

(56) References Cited

U.S. PATENT DOCUMENTS 7,937,344 B2  5/2011  Baum et al.
8,112,425 B2  2/2012  Baum et al.
(Continued)

FOREIGN PATENT DOCUMENTS

GB         2365150 A  *  2/2002  ........... G06F 17/243

OTHER PUBLICATIONS

Splunk Enterprise 8.0.0 Overview, available online, retrieved on May 20, 2020 from docs.splunk.com, 17 pages.
(Continued)

*Primary Examiner* — Etienne P Leroux
*Assistant Examiner* — Farhad Agharahimi
(74) *Attorney, Agent, or Firm* — Rutan & Tucker, LLP

(57) ABSTRACT

In various embodiments, a natural language (NL) application receives a first incomplete natural language (NL) request, and generates one or more request completion recommendations based on at least the first incomplete NL request and a first recommendation model, where the first recommendation model is generated via a machine learning algorithm applied to a first data dependency model and a first request completion model. The NL application receives a selection of a first request completion recommendation included in the one or more request completion recommendations, generates a complete request based on the first incomplete NL request and the first request completion recommendation, and causes the complete request to be applied to the data storage system.

17 Claims, 55 Drawing Sheets

(51) Int. Cl.
*G06F 16/33* (2025.01)
*G06F 16/334* (2025.01)
*G06F 40/205* (2020.01)
*G06F 40/274* (2020.01)
*G06N 20/00* (2019.01)

(52) U.S. Cl.
CPC ........... *G06F 40/274* (2020.01); *G06N 20/00* (2019.01); *G06F 3/0482* (2013.01)

(56) References Cited

U.S. PATENT DOCUMENTS

| | | | |
|---|---|---|---|
| 8,412,696 B2 | 4/2013 | Zhang et al. | |
| 8,577,913 B1* | 11/2013 | Hansson | G06F 16/9535 707/767 |
| 8,589,375 B2 | 11/2013 | Zhang et al. | |
| 8,589,403 B2 | 11/2013 | Marquardt et al. | |
| 8,589,432 B2 | 11/2013 | Zhang et al. | |
| 8,738,587 B1 | 5/2014 | Bitincka et al. | |
| 8,738,629 B1 | 5/2014 | Bitincka et al. | |
| 8,751,529 B2 | 6/2014 | Zhang et al. | |
| 8,775,459 B2 | 7/2014 | Houck et al. | |
| 8,788,525 B2 | 7/2014 | Neels et al. | |
| 8,788,526 B2 | 7/2014 | Neels et al. | |
| 8,826,434 B2 | 9/2014 | Merza | |
| 8,862,925 B2 | 10/2014 | Demarco | |
| 8,983,994 B2 | 3/2015 | Neels et al. | |
| 9,128,980 B2 | 9/2015 | Neels et al. | |
| 9,128,985 B2 | 9/2015 | Marquardt et al. | |
| 9,130,971 B2 | 9/2015 | Vasan et al. | |
| 9,173,801 B2 | 11/2015 | Merza | |
| 9,185,007 B2 | 11/2015 | Fletcher et al. | |
| 9,215,240 B2 | 12/2015 | Merza et al. | |
| 9,248,068 B2 | 2/2016 | Merza | |
| 9,286,413 B1 | 3/2016 | Coates et al. | |
| 9,426,045 B2 | 8/2016 | Fletcher et al. | |
| 9,426,172 B2 | 8/2016 | Merza | |
| 9,432,396 B2 | 8/2016 | Merza | |
| 9,514,189 B2 | 12/2016 | Bitincka et al. | |
| 9,589,012 B2 | 3/2017 | Neels et al. | |
| 9,838,292 B2 | 12/2017 | Polychronis | |
| 9,928,466 B1 | 3/2018 | Sarmento et al. | |
| 10,049,160 B2 | 8/2018 | Bitincka et al. | |
| 10,127,258 B2 | 11/2018 | Lamas et al. | |
| 11,017,764 B1 | 5/2021 | Das et al. | |
| 2003/0041058 A1* | 2/2003 | Ibuki | G06F 16/24522 |
| 2007/0050351 A1 | 3/2007 | Kasperski et al. | |
| 2008/0065617 A1* | 3/2008 | Burke | G06F 16/951 707/999.005 |
| 2011/0191316 A1* | 8/2011 | Lai | G06F 16/9535 707/706 |
| 2011/0321071 A1* | 12/2011 | McRae | H04N 21/47815 725/100 |
| 2012/0158685 A1 | 6/2012 | White et al. | |
| 2012/0254143 A1* | 10/2012 | Varma | G06F 40/30 707/706 |
| 2013/0318236 A1 | 11/2013 | Coates et al. | |
| 2014/0012567 A1* | 1/2014 | Caskey | G06F 40/274 704/9 |
| 2014/0236890 A1 | 8/2014 | Vasan et al. | |
| 2014/0280092 A1* | 9/2014 | Marantz | G06F 16/17 707/723 |
| 2014/0324862 A1 | 10/2014 | Bingham et al. | |
| 2015/0019537 A1 | 1/2015 | Neels et al. | |
| 2015/0186474 A1 | 7/2015 | Angel et al. | |
| 2015/0221304 A1* | 8/2015 | Stewart | G10L 15/26 704/235 |
| 2015/0317318 A1 | 11/2015 | Hadzhiyski et al. | |
| 2016/0004750 A1 | 1/2016 | Marquardt et al. | |
| 2016/0224540 A1* | 8/2016 | Stewart | G06F 40/232 |
| 2017/0063887 A1 | 3/2017 | Muddu et al. | |
| 2017/0140067 A1* | 5/2017 | Beha | G05B 19/0423 |
| 2018/0060421 A1 | 3/2018 | Castelli et al. | |
| 2018/0089332 A1* | 3/2018 | DeLuca | G06F 40/274 |
| 2018/0173808 A1 | 6/2018 | Sharma et al. | |
| 2018/0276561 A1 | 9/2018 | Pasternack et al. | |
| 2018/0330011 A1 | 11/2018 | Deluca et al. | |
| 2019/0098106 A1 | 3/2019 | Mungel et al. | |
| 2019/0130006 A1 | 5/2019 | Raviv et al. | |
| 2019/0130285 A1 | 5/2019 | Snyder et al. | |
| 2020/0012718 A1* | 1/2020 | Kung | G06N 20/00 |
| 2020/0019643 A1* | 1/2020 | Roy | G06F 40/30 |

OTHER PUBLICATIONS

Splunk Cloud 8.0.2004 User Manual, available online, retrieved on May 20, 2020 from docs.splunk.com, 66 pages.

Splunk Quick Reference Guide, updated 2019, available online at https://www.splunk.com/pdfs/solution-guides/splunk-quick-reference-guide.pdf, retrieved on May 20, 2020, 6 pages.

Carraso, David, "Exploring Splunk," published by CITO Research, New York, NY, Apr. 2012, 156 pages.

Bitincka et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, 9 pages.

Jaech et al., "Personalized Language Model for Query Auto-Completion", Proceedings of the 56th Annual Meeting of the Association for Computational Linguistics (Short Papers), https://www.aclweb.org/anthology/P18-2111/, Jul. 2018, pp. 700-705.

Park et al., "A Neural Language Model for Query Auto-Completion", SIGIR'17, https://dl.acm.org/citation.cfm?d=3080758, Aug. 7-11, 2017, pp. 1189-1192.

Sutskever et al., "Sequence to Sequence Learning with Neural Networks", https://papers.nips.cc/paper/5346-sequence-to-sequence-learning-with-neural-networks, 2014, 9 pages.

Notice of Allowance received for U.S. Appl. No. 17/328,887 dated Feb. 1, 2023, 8 pages.

Non Final Office Action received for U.S. Appl. No. 16/147,426 dated Mar. 5, 2020, 11 pages.

Non Final Office Action received for U.S. Appl. No. 16/147,428, dated May 6, 2020, 46 pages.

Final Office Action received for U.S. Appl. No. 16/147,426 dated Aug. 25, 2020, 25 pages.

Notice of Allowance received for U.S. Appl. No. 16/147,426 dated Jan. 15, 2021, 9 pages.

Non Final Office Action received for U.S. Appl. No. 16/147,428 dated Apr. 2, 2021, 37 pages.

Final Office Action received for U.S. Appl. No. 16/147,428, dated Nov. 2, 2020, 32 pages.

Final Office Action received for U.S. Appl. No. 16/147,428, dated Jul. 27, 2021, 37 pages.

Advisory Action received for U.S. Appl. No. 16/147,426 dated Nov. 3, 2020, 2 pages.

Advisory Action received for U.S. Appl. No. 16/147,428, dated Jan. 12, 2021, 3 pages.

Advisory Action received for U.S. Appl. No. 16/147,428, dated Oct. 18, 2021, 3 pages.

Notice of Allowance received for U.S. Appl. No. 16/147,428, dated Apr. 6, 2022, 10 pages.

Notice of Allowance received for U.S. Appl. No. 16/147,428, dated Jun. 9, 2022, 14 pages.

Non Final Office Action received for U.S. Appl. No. 17/328,887 dated Dec. 7, 2022, 40 pages.

\* cited by examiner

| Time 535 | Host 536 | Source 537 | Source Type 538 | Event 539 |
|---|---|---|---|---|
| 10/10/2000 1:55 p.m. | www1 | access.log | access_combined | 127.0.0.1 - frank [10/Oct/2000:13:55:36 -0700] "GET /apache.gif HTTP/1.0" 200 2326 0.0947 |
| 10/10/2000 1:56 p.m. | www2 | access.log | access_combined | 127.0.0.1 - bob [10/Oct/2010:13:56:36 -0700] "GET /mickey_mouse.gif HTTP/1.0" 200 2980 0.0899 |
| 10/10/2000 1:57 p.m. | www2 | access.log | access_combined | 127.0.0.1 - carlos [10/Oct/2010:13:57:36 -0700] "GET /donald_duck.gif HTTP/1.0" 200 2900 0.0857 |
| 10/10/2000 1:58 p.m. | www2 | error.log | apache_error | [Sunday Oct 10 1:59:33 2010] [error] [client 127.10.1.1.015] File does not exist: /home/reba/public_html/images/daffy_duck.gif |

| Data Summary | | | |
|---|---|---|---|
| Hosts (5) | Sources (8) | Sourcetypes (3) | |
| filter | | | |
| Host ◊ | | Count ◊ | Last Update ◊ |
| mailsv | ⅈⅼ ⌵ | 9,829 | 4/29/14 1:32:47.000 PM |
| vendor_sales | ⅈⅼ ⌵ | 30,244 | 4/29/14 1:32:46.000 PM |
| www1 | ⅈⅼ ⌵ | 24,221 | 4/29/14 1:32:44.000 PM |
| www2 | ⅈⅼ ⌵ | 22,595 | 4/29/14 1:32:47.000 PM |
| www3 | ⅈⅼ ⌵ | 22,975 | 4/29/14 1:32:45.000 PM |

New Pivot 1,966 events (before 9/22/13 5:19:02.000 PM)

Filters: Highest 10 product name by price / All time / Highest 10 produ...

Split Rows: product name — 1201

Split Columns: + — 1202

Column Values: Count of Success... / Sum of price — 1203

Complete — Successful_purchases

| product name | price | Count of Successful purchases | Sum of price |
|---|---|---|---|
| Dream Crusher | 39.99 | 227 | 9077.73 |
| Manganiello Bros. | 39.99 | 199 | 7958.01 |
| Orvil the Wolverine | 39.99 | 169 | 6758.31 |
| World of Cheese | 24.99 | 267 | 6672.33 |
| Mediocre Kingdoms | 24.99 | 250 | 6247.50 |
| SIM Cubicle | 19.99 | 233 | 4657.67 |
| Final Sequel | 24.99 | 181 | 4523.19 |
| Benign Space Debris | 24.99 | 135 | 3373.65 |
| Curling 2014 | 19.99 | 126 | 2518.74 |
| Holy Blade of Gouda | 5.99 | 179 | 1072.21 |

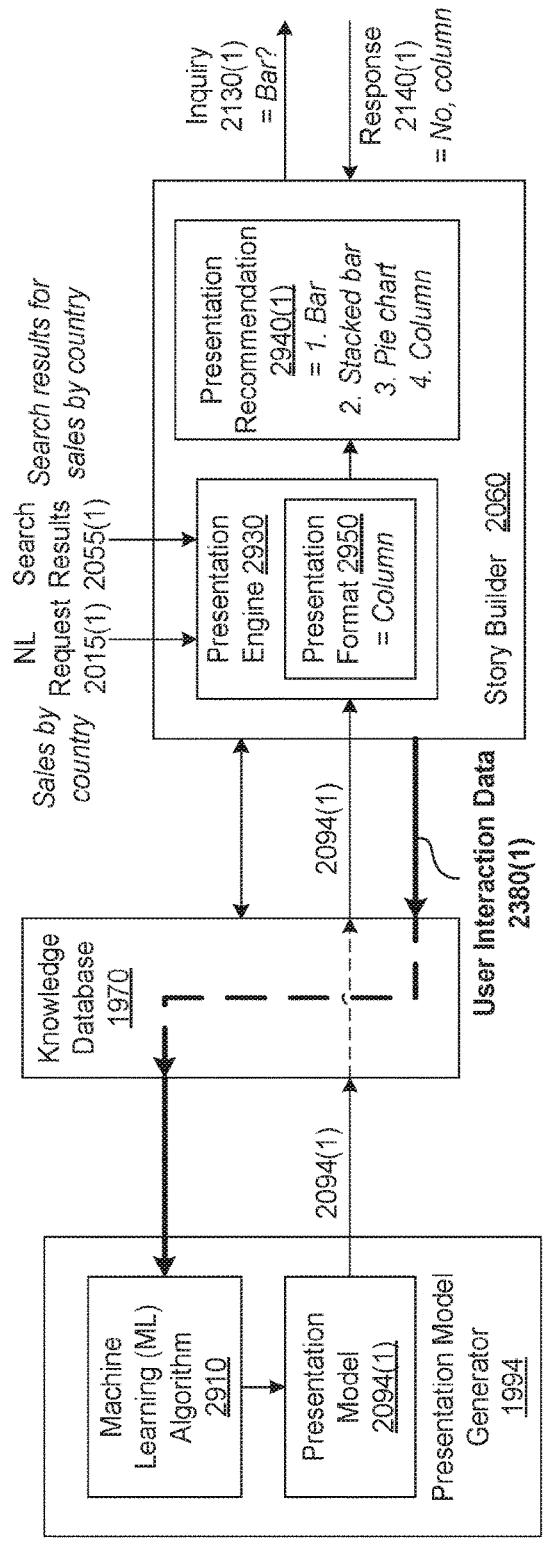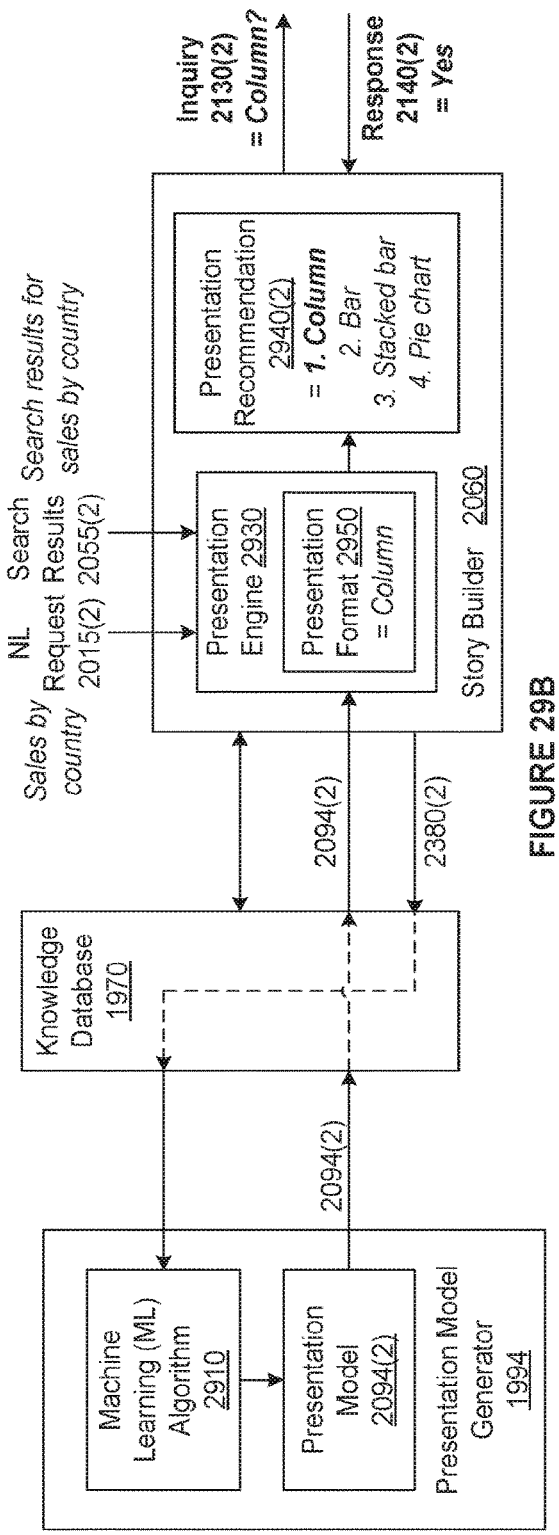
FIGURE 29A
FIGURE 29B

PROVIDING COMPLETION RECOMMENDATION VARIATIONS FOR A PARTIAL NATURAL LANGUAGE REQUEST

CROSS-REFERENCE TO RELATED APPLICATIONS

This application is a continuation of the co-pending U.S. patent application titled, "PROVIDING COMPLETION RECOMMENDATIONS FOR A PARTIAL NATURAL LANGUAGE REQUEST RECEIVED BY A NATURAL LANGUAGE PROCESSING SYSTEM," filed on Sep. 28, 2018 and having Ser. No. 16/147,428. The subject matter of this related application is hereby incorporated herein by reference.

BACKGROUND OF THE INVENTION

Field of the Invention

Embodiments of the present invention relate generally to computer and data science and, more specifically, to adaptable techniques for interfacing with data sources via natural language.

Description of the Related Art

Many information technology (IT) environments enable the access of massive quantities of diverse data stored across multiple data sources. For example, an IT environment could enable users to access text documents, user-generated data stored in a variety of relational database management systems, and machine-generated data stored in systems, such as SPLUNK® ENTERPRISE systems. While the availability of massive quantities of diverse data provides opportunities to derive new insights that increase the usefulness and value of IT systems, a common problem associated with IT environments is that curating, searching, and analyzing the data is technically challenging.

In particular, different data sources may be associated with different domain-specific languages (DSLs), and a user that is unfamiliar with a given DSL may have difficulty retrieving and analyzing some of the available data. For example, suppose that a user is proficient in SQL (Structured Query Language), but is unfamiliar with SPL (SPLUNK® search processing language). The user could retrieve and analyze data from a MySQL (My Structured Query Language) database using SQL, but the user would have difficulty retrieving and analyzing data from a Splunk data source.

In an effort to enable users to access and analyze data from a wide variety of data sources without expertise in the corresponding DSL(s), natural language (NL) data applications have been developed. In operation, a NL data application extracts and curates metadata associated with the different data sources, translates a given NL request to an appropriate DSL request, applies the DSL request to the corresponding domain-specific data source to retrieve the data relevant to the original NL request, performs various operations on the retrieved data, and displays the results. One limitation of NL data applications is that oftentimes an NL request is incomplete or includes partial information, and determining the intent of the user usually involves waiting for the user to provide additional information in order to complete the request, or subjecting the user to a time-consuming, interactive, and oftentimes repetitive interrogation process. These waiting or interrogation processes are inefficient and degrade the user experience of the overall system.

For example, suppose that a user requests "daily sales last week in New York" to obtain the sales per day in New York in the previous week, and the NL data application provides the requested data. The user then requests "what is selling well there." A typical NL data application would consider the second request to be an incomplete request and would proceed to request a variety of information for more context (e.g., what is the "what" and where is the "there") from the user to complete the request, such as the associated geographical region and time period. The NL data application would be unable to process the request until the user provides the information to complete the request.

As another example, suppose that a user begins to enter the request "daily s". A typical NL data application would consider the request to be an incomplete request, and would wait until the user enters more information related to the request. The NL data application would be unable to process the request until the user completes entry of the request.

As the foregoing illustrates, what is needed in the art are more effective techniques for interfacing with various underlying data sources via natural language applications.

SUMMARY OF THE INVENTION

One embodiment of the present invention sets forth a method for generating and executing request completion recommendations. The method includes receiving a first incomplete natural language (NL) request and a first context associated with the first incomplete NL request; generating one or more request completion recommendations based on the first incomplete NL request, the first context, and a first recommendation model, where the first recommendation model is generated via a machine learning algorithm applied to a first data dependency model and a first request completion model; receiving a selection of a first request completion recommendation included in the one or more request completion recommendations; generating a complete request based on the first incomplete NL request and the first request completion recommendation; and causing the complete request to be applied to the data storage system.

Further embodiments provide, among other things, one or more computer-readable media and a system configured to implement the method set forth above.

An advantage and technological improvement of the disclosed techniques is that one or more models for recommending request completions and for predicting next natural language requests are generated for a NL system, enabling the NL system to recommend request completions and follow-on requests. Another advantage and technological improvement of the disclosed techniques is that the models are generated automatically based on historical request data and historical intent data, and data dependency data.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 5C provides a visual representation of the manner in which a pipelined search language or query operates, in accordance with example embodiments;

FIG. 8A is an interface diagram of an example user interface for a search screen, in accordance with example embodiments;

FIG. 8B is an interface diagram of an example user interface for a data summary dialog that enables a user to select various data sources, in accordance with example embodiments;

FIGS. 9-15 are interface diagrams of example report generation user interfaces, in accordance with example embodiments;

FIGS. 29A and 29B illustrate examples of how the story builder of FIG. 20 determines a presentation format for search results and then presents the search results at two different points in time, in accordance with example embodiments;

DETAILED DESCRIPTION

Figure 1:
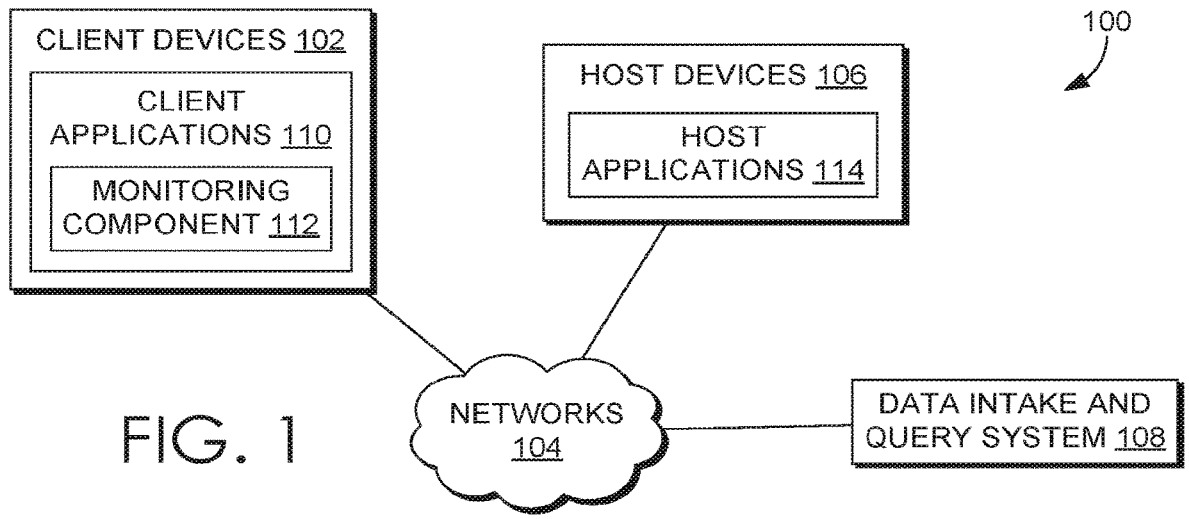
FIG. 1 is a block diagram of an example networked computer environment, in accordance with example embodiments.

In the following description, numerous specific details are set forth to provide a more thorough understanding of the various embodiments. However, it will be apparent to one of skilled in the art that the inventive concepts may be practiced without one or more of these specific details.

Embodiments are described herein according to the following outline:

1. General Overview
2. Operating Environment
   2.1. Host Devices
   2.2. Client Devices
   2.3. Client Device Applications
   2.4. Data Server System
   2.5. Cloud-Based System Overview
   2.6. Searching Externally-Archived Data
      2.6.1. ERP Process Features
   2.7. Data Ingestion
      2.7.1. Input
      2.7.2. Parsing
      2.7.3. Indexing
   2.8. Query Processing
   2.9. Pipelined Search Language
   2.10. Field Extraction
   2.11. Example Search Screen
   2.12. Data Models
   2.13. Acceleration Technique
      2.13.1. Aggregation Technique
      2.13.2. Keyword Index
      2.13.3. High Performance Analytics Store
      2.13.4. Extracting Event Data Using Posting Values
      2.13.5. Accelerating Report Generation
   2.14. Data Center Monitoring
   2.15. Cloud-Based Architecture
3. Extended Reality Overlays In An Industrial Environment
   3.1. Optical Data Marker-Based Extended Reality Techniques

1. General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters form a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources (further discussed with respect to FIG. 7A).

2. Operating Environment

FIG. 1 is a block diagram of an example networked computer environment 100, in accordance with example embodiments. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1 Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (, one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2 Client Devices

Client devices 102 of FIG. 1 represent any computing device capable of interacting with one or more host devices 106 via a network 104. Examples of client devices 102 may include, without limitation, smartphones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3 Client Device Applications

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some embodiments, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In some embodiments, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In some embodiments, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In some embodiments, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some embodiments, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In some embodiments, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in FIG. 1) in which a value is stored. This field indicates a network latency measurement associated with one or more network requests. The data record may include a "state" field to store a value indicating a state of a network connection, and so forth for any number of aspects of collected performance data.

2.4 Data Server System

Figure 2:
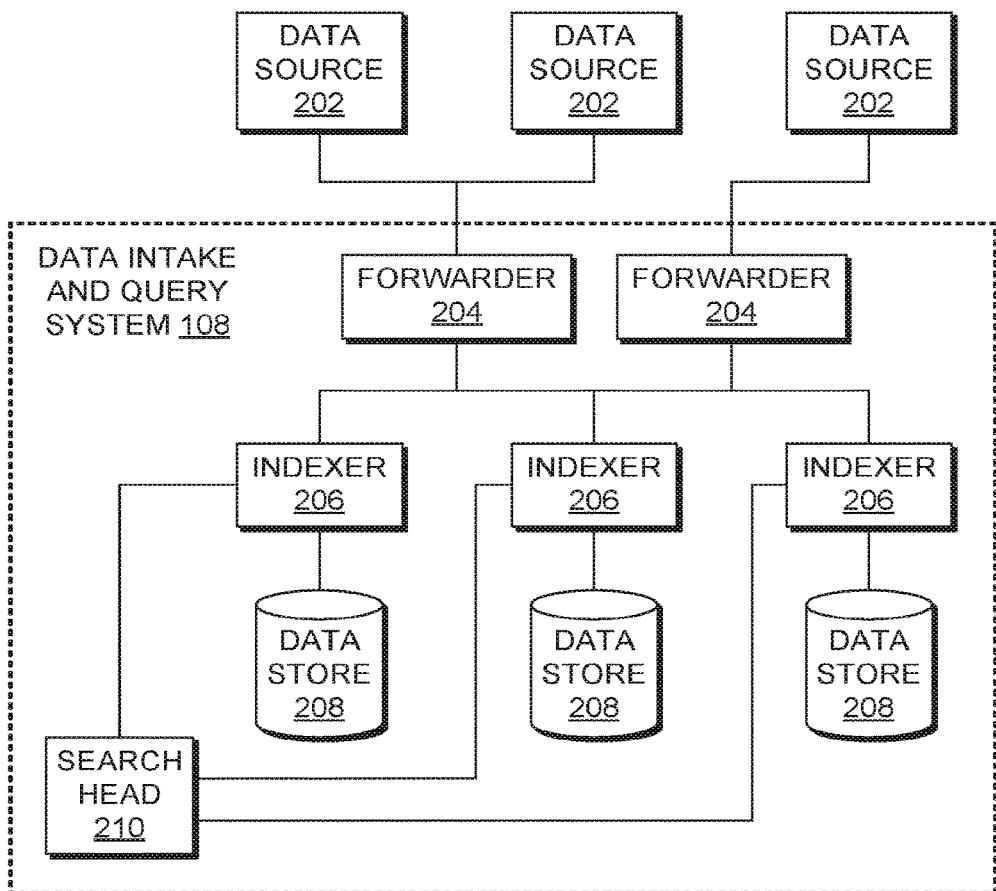
FIG. 2 is a block diagram of an example data intake and query system, in accordance with example embodiments.

FIG. 2 is a block diagram of an example data intake and query system 108, in accordance with example embodiments. System 108 includes one or more forwarders 204 that receive data from a variety of input data sources 202, and one or more indexers 206 that process and store the data in one or more data stores 208. These forwarders 204 and indexers 208 can comprise separate computer systems, or may alternatively comprise separate processes executing on one or more computer systems.

Each data source 202 broadly represents a distinct source of data that can be consumed by system 108. Examples of data sources 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In some embodiments, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers 206. Data store 208 may contain events derived from machine data from a variety of sources all pertaining to the same component in an IT environment, and this data may be produced by the machine in question or by other components in the IT environment.

2.5 Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 3:
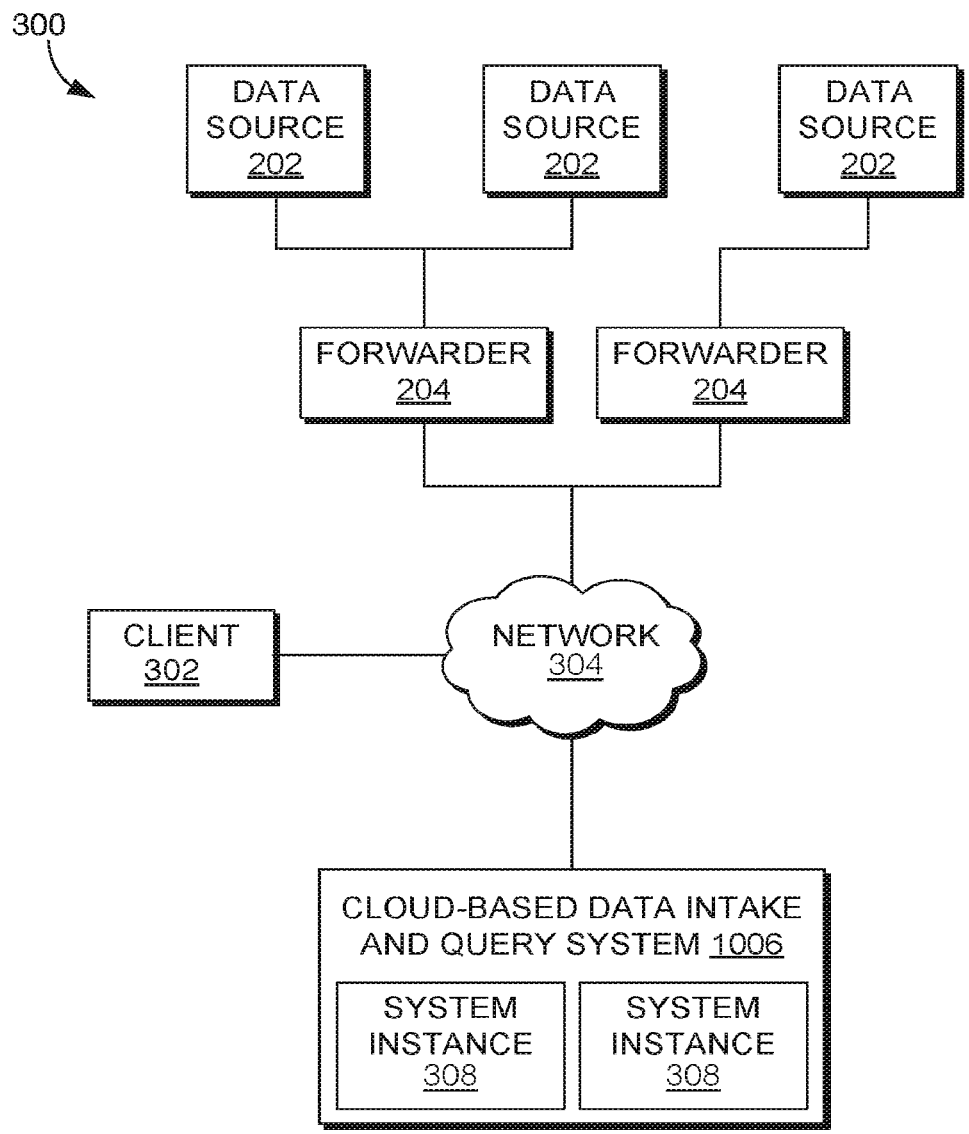
FIG. 3 is a block diagram of an example cloud-based data intake and query system, in accordance with example embodiments.

FIG. 3 illustrates a block diagram of an example cloud-based data intake and query system. Similar to the system of FIG. 2, the networked computer system 300 includes input data sources 202 and forwarders 204. These input data sources and forwarders may be in a subscriber's private computing environment. Alternatively, they might be directly managed by the service provider as part of the cloud service. In the example system 300, one or more forwarders 204 and client devices 302 are coupled to a cloud-based data intake and query system 306 via one or more networks 304. Network 304 broadly represents one or more LANs, WANs, cellular networks, intranetworks, internetworks, etc., using any of wired, wireless, terrestrial microwave, satellite links, etc., and may include the public Internet, and is used by client devices 302 and forwarders 204 to access the system 306. Similar to the system of 38, each of the forwarders 204 may be configured to receive data from an input source and to forward the data to other components of the system 306 for further processing.

In some embodiments, a cloud-based data intake and query system 306 may comprise a plurality of system instances 308. In general, each system instance 308 may include one or more computing resources managed by a provider of the cloud-based system 306 made available to a particular subscriber. The computing resources comprising a system instance 308 may, for example, include one or more servers or other devices configured to implement one or more forwarders, indexers, search heads, and other components of a data intake and query system, similar to system 108. As indicated above, a subscriber may use a web browser or other application of a client device 302 to access a web portal or other interface that enables the subscriber to configure an instance 308.

Providing a data intake and query system as described in reference to system 108 as a cloud-based service presents a number of challenges. Each of the components of a system 108 (e.g., forwarders, indexers, and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 308) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (, a hybrid system where both an on-premises environment, such as SPLUNK® ENTERPRISE, and a cloud-based environment, such as SPLUNK CLOUD☐, are centrally visible).

2.6 Searching Externally-Archived Data

Figure 4:
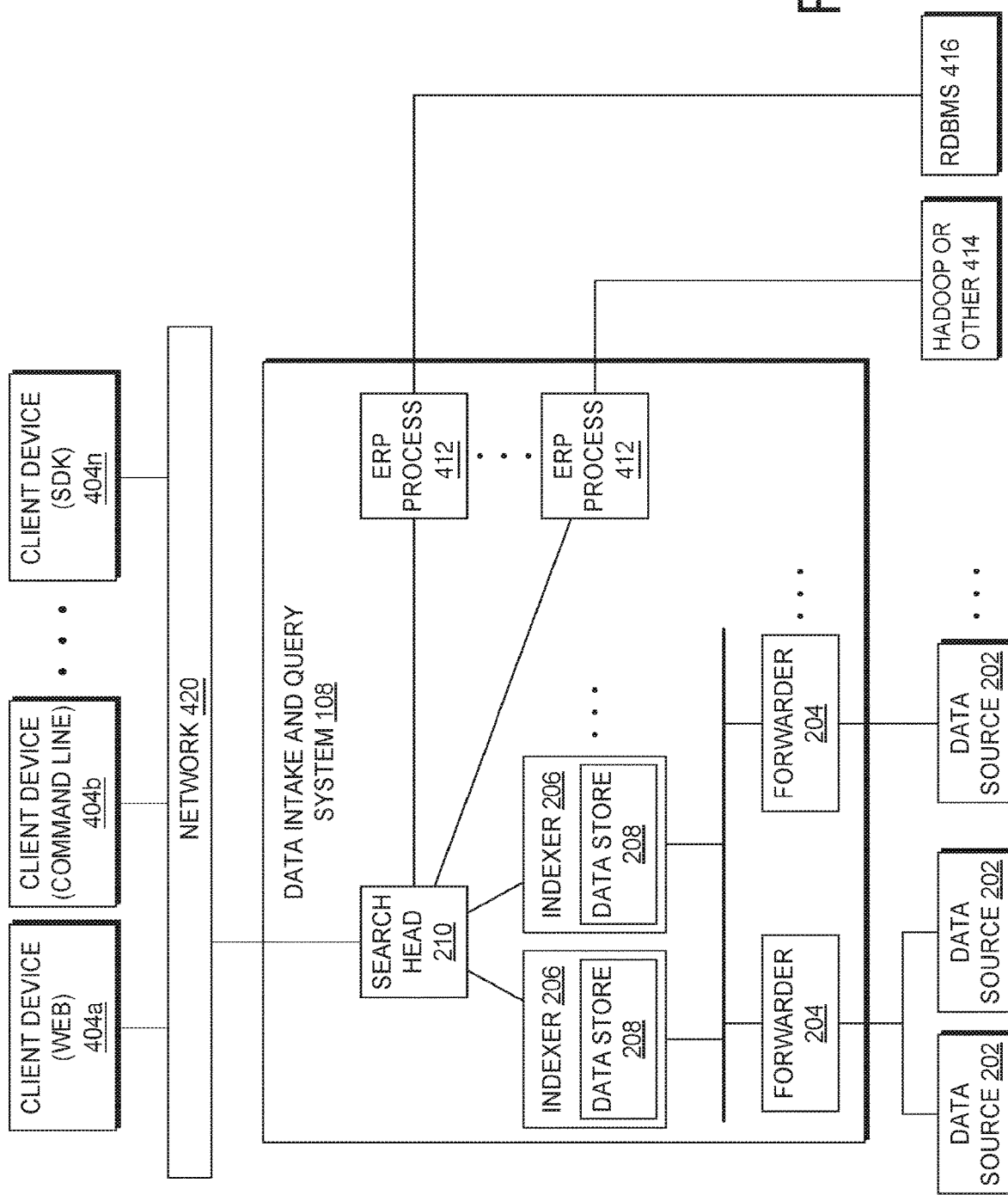
FIG. 4 is a block diagram of an example data intake and query system that performs searches across external data systems, in accordance with example embodiments.

FIG. 4 shows a block diagram of an example of a data intake and query system 108 that provides transparent search facilities for data systems that are external to the data intake and query system. Such facilities are available in the Splunk® Analytics for Hadoop® system provided by Splunk Inc. of San Francisco, California. Splunk® Analytics for Hadoop® represents an analytics platform that enables business and IT teams to rapidly explore, analyze, and visualize data in Hadoop® and NoSQL data stores.

The search head 210 of the data intake and query system receives search requests from one or more client devices 404 over network connections 420. As discussed above, the data intake and query system 108 may reside in an enterprise location, in the cloud, etc. FIG. 4 illustrates that multiple client devices 404a, 404b, . . . , 404n may communicate with the data intake and query system 108. The client devices 404 may communicate with the data intake and query system using a variety of connections. For example, one client device in FIG. 4 is illustrated as communicating over an Internet (Web) protocol, another client device is illustrated as communicating via a command line interface, and another client device is illustrated as communicating via a software developer kit (SDK).

The search head 210 analyzes the received search request to identify request parameters. If a search request received from one of the client devices 404 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 410. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 410, 412. FIG. 4 shows two ERP processes 410, 412 that connect to respective remote (external) virtual indices, which are indicated as a Hadoop or another system 414 (e.g., Amazon S3, Amazon EMR, other Hadoop® Compatible File Systems (HCFS), etc.) and a relational database management system (RDBMS) 416. Other virtual indices may include other file organizations and protocols, such as Structured Query Language (SQL) and the like. The ellipses between the ERP processes 410, 412 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 410, 412 receive a search request from the search head 210. The search head may optimize the received search request for execution at the respective external virtual index. Alternatively, the ERP process may receive a search request as a result of analysis performed by the search head or by a different system process. The ERP processes 410, 412 can communicate with the search head 210 via conventional input/output routines (e.g., standard in/standard out, etc.). In this way, the ERP process receives the search request from a client device such that the search request may be efficiently executed at the corresponding external virtual index.

The ERP processes 410, 412 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 410, 412 generate appropriate search requests in the protocol and syntax of the respective virtual indices 414, 416, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 404 may communicate with the data intake and query system 108 through a network interface 420, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "External Result Provided Process For Retrieving Data Stored Using A Different Configuration Or Protocol", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. Pat. No. 9,514,189, entitled "PROCESSING A SYSTEM SEARCH REQUEST INCLUDING EXTERNAL DATA SOURCES", issued on 6 Dec. 2016, each of which is hereby incorporated by reference in its entirety for all purposes.

2.6.1 ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the machine data obtained from the external data source) are provided to the search head, which can then process the results data (e.g., break the machine data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the machined data or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of machine data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the machine data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e, native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e, performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return machine data to the search head. As noted, the ERP process could be configured to operate in streaming mode alone and return just the machine data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all machine data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.7 Data Ingestion

Figure 5A:
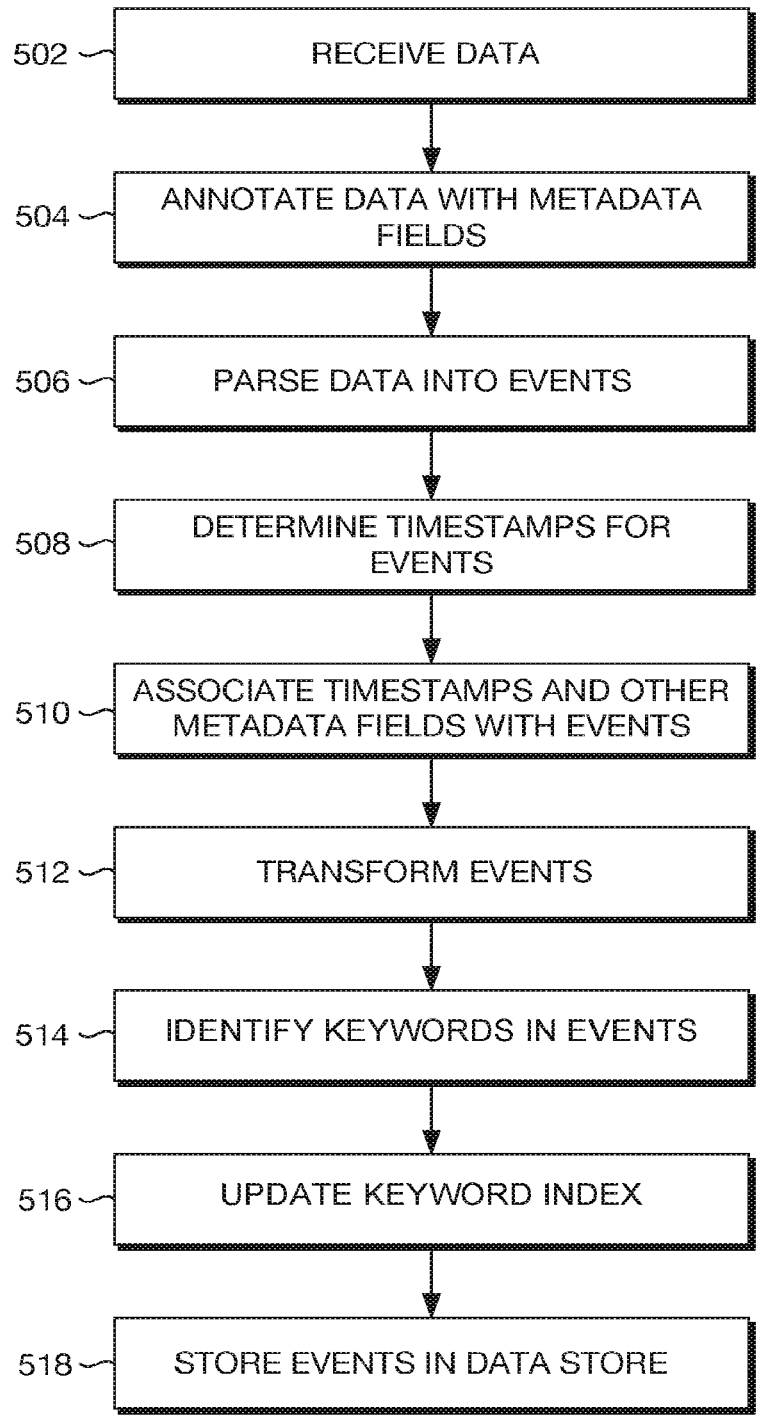
FIG. 5A is a flowchart of an example method that illustrates how indexers process, index, and store data received from forwarders, in accordance with example embodiments.

FIG. 5A is a flow chart of an example method that illustrates how indexers process, index, and store data received from forwarders, in accordance with example embodiments. The data flow illustrated in FIG. 5A is provided for illustrative purposes only; those skilled in the art would understand that one or more of the steps of the processes illustrated in FIG. 5A may be removed or that the ordering of the steps may be changed. Furthermore, for the purposes of illustrating a clear example, one or more particular system components are described in the context of performing various operations during each of the data flow stages. For example, a forwarder is described as receiving and processing machine data during an input phase; an indexer is described as parsing and indexing machine data during parsing and indexing phases; and a search head is described as performing a search query during a search phase. However, other system arrangements and distributions of the processing steps across system components may be used.

2.7.1 Input

At block 502, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In some embodiments, a forwarder receives the raw data and may segment the data stream into "blocks", possibly of a uniform data size, to facilitate subsequent processing steps.

At block 504, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In some embodiments, a forwarder forwards the annotated data blocks to another system component (typically an indexer) for further processing.

The data intake and query system allows forwarding of data from one data intake and query instance to another, or even to a third-party system. The data intake and query system can employ different types of forwarders in a configuration.

In some embodiments, a forwarder may contain the essential components needed to forward data. A forwarder can gather data from a variety of inputs and forward the data to an indexer for indexing and searching. A forwarder can also tag metadata (g., source, source type, host, etc.).

In some embodiments, a forwarder has the capabilities of the aforementioned forwarder as well as additional capabilities. The forwarder can parse data before forwarding the data (e.g., can associate a time stamp with a portion of data and create an event, etc.) and can route data based on criteria such as source or type of event. The forwarder can also index data locally while forwarding the data to another indexer.

2.7.2 Parsing

At block 506, an indexer receives data blocks from a forwarder and parses the data to organize the data into events. In some embodiments, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 508, the indexer determines a timestamp for each event. Similar to the process for parsing machine data, an indexer may again refer to a source type definition associated with the data to locate one or more properties that indicate instructions for determining a timestamp for each event. The properties may, for example, instruct an indexer to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 510, the indexer associates with each event one or more metadata fields including a field containing the timestamp determined for the event. In some embodiments, a timestamp may be included in the metadata fields. These metadata fields may include any number of "default fields" that are associated with all events, and may also include one more custom fields as defined by a user. Similar to the metadata fields associated with the data blocks at block 504, the default metadata fields associated with each event may include a host, source, and source type field including or in addition to a field storing the timestamp.

At block 512, an indexer may optionally apply one or more transformations to data included in the events created at block 506. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

FIG. 5C illustrates an illustrative example of machine data can be stored in a data store in accordance with various disclosed embodiments. In other embodiments, machine data can be stored in a flat file in a corresponding bucket with an associated index file, such as a time series index or "TSIDX." As such, the depiction of machine data and associated metadata as rows and columns in the table of FIG. 5C is merely illustrative and is not intended to limit the data format in which the machine data and metadata is stored in various embodiments described herein. In one particular embodiment, machine data can be stored in a compressed or encrypted formatted. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

As mentioned above, certain metadata, e.g., host 536, source 537, source type 538 and timestamps 535 can be generated for each event, and associated with a corresponding portion of machine data 539 when storing the event data in a data store, e.g., data store 208. Any of the metadata can be extracted from the corresponding machine data, or supplied or defined by an entity, such as a user or computer system. The metadata fields can become part of or stored with the event. Note that while the time-stamp metadata field can be extracted from the raw data of each event, the values for the other metadata fields may be determined by the indexer based on information it receives pertaining to the source of the data separate from the machine data.

While certain default or user-defined metadata fields can be extracted from the machine data for indexing purposes, all the machine data within an event can be maintained in its original condition. As such, in embodiments in which the portion of machine data included in an event is unprocessed or otherwise unaltered, it is referred to herein as a portion of raw machine data. In other embodiments, the port of machine data in an event can be processed or otherwise altered. As such, unless certain information needs to be removed for some reasons (e.g., extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various default fields.

In FIG. 5C, the first three rows of the table represent events 531, 532, and 533 and are related to a server access log that records requests from multiple clients processed by a server, as indicated by entry of "access.log" in the source column 536.

In the example shown in FIG. 5C, each of the events 531-534 is associated with a discrete request made from a client device. The raw machine data generated by the server and extracted from a server access log can include the IP address of the client 540, the user id of the person requesting the document 541, the time the server finished processing the request 542, the request line from the client 543, the status code returned by the server to the client 545, the size of the object returned to the client (in this case, the gif file requested by the client) 546 and the time spent to serve the request in microseconds 544. As seen in FIG. 5C, all the raw machine data retrieved from the server access log is retained and stored as part of the corresponding events, 1221, 1222, and 1223 in the data store.

Event 534 is associated with an entry in a server error log, as indicated by "error.log" in the source column 537, that records errors that the server encountered when processing a client request. Similar to the events related to the server access log, all the raw machine data in the error log file pertaining to event 534 can be preserved and stored as part of the event 534.

Saving minimally processed or unprocessed machine data in a data store associated with metadata fields in the manner similar to that shown in FIG. 5C is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

2.7.3 Indexing

At blocks 514 and 516, an indexer can optionally generate a keyword index to facilitate fast keyword searching for events. To build a keyword index, at block 514, the indexer identifies a set of keywords in each event. At block 516, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for field name-value pairs found in events, where a field name-value pair can include a pair of keywords connected by a symbol, such as an equals sign or colon. This way, events containing these field name-value pairs can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2".

At block 518, the indexer stores the events with an associated timestamp in a data store 208. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize the data retrieval process by searching buckets corresponding to time ranges that are relevant to a query.

In some embodiments, each indexer has a home directory and a cold directory. The home directory of an indexer stores hot buckets and warm buckets, and the cold directory of an indexer stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexer may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexer may store old, archived data in a frozen bucket that is not capable of being searched at search time. In some embodiments, a frozen bucket may be stored in slower and/or larger memory, such as a hard disk, and may be stored in offline and/or remote storage.

Moreover, events and buckets can also be replicated across different indexers and data stores to facilitate high availability and disaster recovery as described in U.S. Pat. No. 9,130,971, entitled "Site-Based Search Affinity", issued on 8 Sep. 2015, and in U.S. patent Ser. No. 14/266,817, entitled "Multi-Site Clustering", issued on 1 Sep. 2015, each of which is hereby incorporated by reference in its entirety for all purposes.

Figure 5B:
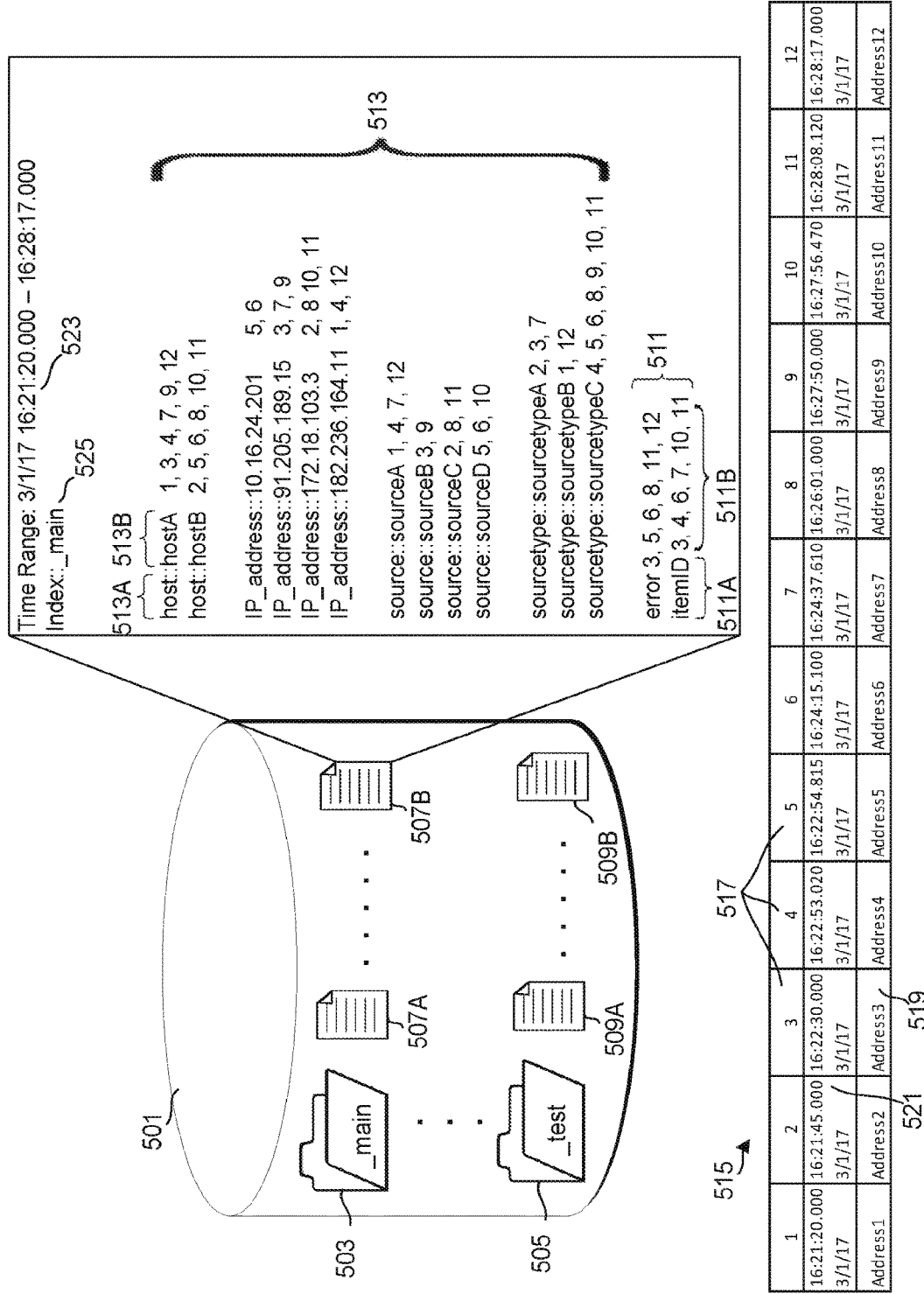
FIG. 5B is a block diagram of a data structure in which time-stamped event data can be stored in a data store, in accordance with example embodiments.

FIG. 5B is a block diagram of an example data store 501 that includes a directory for each index (or partition) that contains a portion of data managed by an indexer. FIG. 5B further illustrates details of an embodiment of an inverted index 507B and an event reference array 515 associated with inverted index 507B.

The data store 501 can correspond to a data store 208 that stores events managed by an indexer 206 or can correspond to a different data store associated with an indexer 206. In the illustrated embodiment, the data store 501 includes a _main directory 503 associated with a _main index and a _test directory 505 associated with a _test index. However, the data store 501 can include fewer or more directories. In some embodiments, multiple indexes can share a single directory or all indexes can share a common directory. Additionally, although illustrated as a single data store 501, it will be understood that the data store 501 can be implemented as multiple data stores storing different portions of the information shown in FIG. 5B. For example, a single index or partition can span multiple directories or multiple data stores, and can be indexed or searched by multiple corresponding indexers.

In the illustrated embodiment of FIG. 5B, the index-specific directories 503 and 505 include inverted indexes 507A, 507B and 509A, 509B, respectively. The inverted indexes 507A . . . 507B, and 509A . . . 509B can be keyword indexes or field-value pair indexes described herein and can include less or more information that depicted in FIG. 5B.

In some embodiments, the inverted index 507A . . . 507B, and 509A . . . 509B can correspond to a distinct time-series bucket that is managed by the indexer 206 and that contains events corresponding to the relevant index (e.g., _main index, _test index). As such, each inverted index can correspond to a particular range of time for an index. Additional files, such as high performance indexes for each time-series bucket of an index, can also be stored in the same directory as the inverted indexes 507A . . . 507B, and 509A . . . 509B. In some embodiments inverted index 507A . . . 507B, and 509A . . . 509B can correspond to multiple time-series buckets or inverted indexes 507A . . . 507B, and 509A . . . 509B can correspond to a single time-series bucket.

Each inverted index 507A . . . 507B, and 509A . . . 509B can include one or more entries, such as keyword (or token) entries or field-value pair entries. Furthermore, in certain embodiments, the inverted indexes 507A . . . 507B, and 509A . . . 509B can include additional information, such as a time range 523 associated with the inverted index or an index identifier 525 identifying the index associated with the inverted index 507A . . . 507B, and 509A . . . 509B. However, each inverted index 507A . . . 507B, and 509A . . . 509B can include less or more information than depicted.

Token entries, such as token entries 511 illustrated in inverted index 507B, can include a token 511A (e.g., "error," "itemID," etc.) and event references 511B indicative of events that include the token. For example, for the token "error," the corresponding token entry includes the token "error" and an event reference, or unique identifier, for each event stored in the corresponding time-series bucket that includes the token "error." In the illustrated embodiment of FIG. 5B, the error token entry includes the identifiers 3, 5, 6, 8, 11, and 12 corresponding to events managed by the indexer 206 and associated with the index _main 503 that are located in the time-series bucket associated with the inverted index 507B.

In some cases, some token entries can be default entries, automatically determined entries, or user specified entries. In some embodiments, the indexer 206 can identify each word or string in an event as a distinct token and generate a token entry for it. In some cases, the indexer 206 can identify the beginning and ending of tokens based on punctuation, spaces, as described in greater detail herein. In certain cases, the indexer 206 can rely on user input or a configuration file to identify tokens for token entries 511, etc. It will be understood that any combination of token entries can be included as a default, automatically determined, a or included based on user-specified criteria.

Similarly, field-value pair entries, such as field-value pair entries 513 shown in inverted index 507B, can include a field-value pair 513A and event references 513B indicative of events that include a field value that corresponds to the field-value pair. For example, for a field-value pair sourcetype::sendmail, a field-value pair entry would include the field-value pair sourcetype::sendmail and a unique identifier, or event reference, for each event stored in the corresponding time-series bucket that includes a sendmail sourcetype.

In some cases, the field-value pair entries 513 can be default entries, automatically determined entries, or user specified entries. As a non-limiting example, the field-value pair entries for the fields host, source, sourcetype can be included in the inverted indexes 507A . . . 507B, and 509A . . . 509B as a default. As such, all of the inverted indexes 507A . . . 507B, and 509A . . . 509B can include field-value pair entries for the fields host, source, sourcetype. As yet another non-limiting example, the field-value pair entries for the IP_address field can be user specified and may only appear in the inverted index 507B based on user-specified criteria. As another non-limiting example, as the indexer indexes the events, it can automatically identify field-value pairs and create field-value pair entries. For example, based on the indexers review of events, it can identify IP_address as a field in each event and add the IP_address field-value pair entries to the inverted index 507B. It will be understood that any combination of field-value pair entries can be included as a default, automatically determined, or included based on user-specified criteria.

Each unique identifier 517, or event reference, can correspond to a unique event located in the time series bucket. However, the same event reference can be located in multiple entries. For example if an event has a sourcetype splunkd, host www1 and token "warning," then the unique identifier for the event will appear in the field-value pair entries sourcetype::splunkd and host::www1, as well as the token entry "warning." With reference to the illustrated embodiment of FIG. 5B and the event that corresponds to the event reference 3, the event reference 3 is found in the field-value pair entries 513 host::hostA, source::sourceB, sourcetype::sourcetypeA, and IP_address::91.205.189.15 indicating that the event corresponding to the event references is from hostA, sourceB, of sourcetypeA, and includes 91.205.189.15 in the event data.

For some fields, the unique identifier is located in only one field-value pair entry for a particular field. For example, the inverted index may include four sourcetype field-value pair entries corresponding to four different sourcetypes of the events stored in a bucket (e.g., sourcetypes: sendmail, splunkd, web access, and web_service). Within those four sourcetype field-value pair entries, an identifier for a particular event may appear in only one of the field-value pair entries. With continued reference to the example illustrated embodiment of FIG. 5B, since the event reference 7 appears in the field-value pair entry sourcetype::sourcetypeA, then it does not appear in the other field-value pair entries for the sourcetype field, including sourcetype::sourcetypeB, sourcetype::sourcetypeC, and sourcetype::sourcetypeD.

The event references 517 can be used to locate the events in the corresponding bucket. For example, the inverted index can include, or be associated with, an event reference array 515. The event reference array 515 can include an array entry 517 for each event reference in the inverted index 507B. Each array entry 517 can include location information 519 of the event corresponding to the unique identifier (non-limiting example: seek address of the event), a timestamp 521 associated with the event, or additional information regarding the event associated with the event reference, etc.

For each token entry 511 or field-value pair entry 513, the event reference 501B or unique identifiers can be listed in chronological order or the value of the event reference can be assigned based on chronological data, such as a timestamp associated with the event referenced by the event reference. For example, the event reference 1 in the illustrated embodiment of FIG. 5B can correspond to the first-in-time event for the bucket, and the event reference 12 can correspond to the last-in-time event for the bucket. However, the event references can be listed in any order, such as reverse chronological order, ascending order, descending order, or some other order, etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 5B, the entries are sorted first by entry type and then alphabetically.

As a non-limiting example of how the inverted indexes 507A . . . 507B, and 509A . . . 509B can be used during a data categorization request command, the indexers can receive filter criteria indicating data that is to be categorized and categorization criteria indicating how the data is to be categorized. Example filter criteria can include, but is not limited to, indexes (or partitions), hosts, sources, sourcetypes, time ranges, field identifier, keywords, etc.

Using the filter criteria, the indexer identifies relevant inverted indexes to be searched. For example, if the filter criteria includes a set of partitions, the indexer can identify the inverted indexes stored in the directory corresponding to the particular partition as relevant inverted indexes. Other means can be used to identify inverted indexes associated with a partition of interest. For example, in some embodiments, the indexer can review an entry in the inverted indexes, such as an index-value pair entry 513 to determine if a particular inverted index is relevant. If the filter criteria does not identify any partition, then the indexer can identify all inverted indexes managed by the indexer as relevant inverted indexes.

Similarly, if the filter criteria includes a time range, the indexer can identify inverted indexes corresponding to buckets that satisfy at least a portion of the time range as relevant inverted indexes. For example, if the time range is last hour then the indexer can identify all inverted indexes that correspond to buckets storing events associated with timestamps within the last hour as relevant inverted indexes.

When used in combination, an index filter criterion specifying one or more partitions and a time range filter criterion specifying a particular time range can be used to identify a subset of inverted indexes within a particular directory (or otherwise associated with a particular partition) as relevant inverted indexes. As such, the indexer can focus the processing to only a subset of the total number of inverted indexes that the indexer manages.

Once the relevant inverted indexes are identified, the indexer can review them using any additional filter criteria to identify events that satisfy the filter criteria. In some cases, using the known location of the directory in which the relevant inverted indexes are located, the indexer can determine that any events identified using the relevant inverted indexes satisfy an index filter criterion. For example, if the filter criteria includes a partition main, then the indexer can determine that any events identified using inverted indexes within the partition main directory (or otherwise associated with the partition main) satisfy the index filter criterion.

Furthermore, based on the time range associated with each inverted index, the indexer can determine that that any events identified using a particular inverted index satisfies a time range filter criterion. For example, if a time range filter criterion is for the last hour and a particular inverted index corresponds to events within a time range of 50 minutes ago to 35 minutes ago, the indexer can determine that any events identified using the particular inverted index satisfy the time range filter criterion. Conversely, if the particular inverted index corresponds to events within a time range of 59 minutes ago to 62 minutes ago, the indexer can determine that some events identified using the particular inverted index may not satisfy the time range filter criterion.

Using the inverted indexes, the indexer can identify event references (and therefore events) that satisfy the filter criteria. For example, if the token "error" is a filter criterion, the indexer can track all event references within the token entry "error." Similarly, the indexer can identify other event references located in other token entries or field-value pair entries that match the filter criteria. The system can identify event references located in all of the entries identified by the filter criteria. For example, if the filter criteria include the token "error" and field-value pair sourcetype::web_ui, the indexer can track the event references found in both the token entry "error" and the field-value pair entry sourcetype::web_ui. As mentioned previously, in some cases, such as when multiple values are identified for a particular filter criterion (g., multiple sources for a source filter criterion), the system can identify event references located in at least one of the entries corresponding to the multiple values and in all other entries identified by the filter criteria. The indexer can determine that the events associated with the identified event references satisfy the filter criteria.

In some cases, the indexer can further consult a timestamp associated with the event reference to determine whether an event satisfies the filter criteria. For example, if an inverted index corresponds to a time range that is partially outside of a time range filter criterion, then the indexer can consult a timestamp associated with the event reference to determine whether the corresponding event satisfies the time range criterion. In some embodiments, to identify events that satisfy a time range, the indexer can review an array, such as the event reference array 1614 that identifies the time associated with the events. Furthermore, as mentioned above using the known location of the directory in which the relevant inverted indexes are located (or other index identifier), the indexer can determine that any events identified using the relevant inverted indexes satisfy the index filter criterion.

In some cases, based on the filter criteria, the indexer reviews an extraction rule. In certain embodiments, if the filter criteria include a field name that does not correspond to a field-value pair entry in an inverted index, the indexer can review an extraction rule, which may be located in a configuration file, to identify a field that corresponds to a field-value pair entry in the inverted index.

For example, the filter criteria includes a field name "sessionID" and the indexer determines that at least one relevant inverted index does not include a field-value pair entry corresponding to the field name sessionID, the indexer can review an extraction rule that identifies how the sessionID field is to be extracted from a particular host, source, or sourcetype (implicitly identifying the particular host, source, or sourcetype that includes a sessionID field). The indexer can replace the field name "sessionID" in the filter criteria with the identified host, source, or sourcetype. In some cases, the field name "sessionID" may be associated with multiples hosts, sources, or sourcetypes, in which case, all identified hosts, sources, and sourcetypes can be added as filter criteria. In some cases, the identified host, source, or sourcetype can replace or be appended to a filter criterion, or be excluded. For example, if the filter criteria includes a criterion for source S1 and the "sessionID" field is found in source S2, the source S2 can replace S1 in the filter criteria, be appended such that the filter criteria includes source S1 and source S2, or be excluded based on the presence of the filter criterion source S1. If the identified host, source, or sourcetype is included in the filter criteria, the indexer can then identify a field-value pair entry in the inverted index that includes a field value corresponding to the identity of the particular host, source, or sourcetype identified using the extraction rule.

Once the events that satisfy the filter criteria are identified, the system, such as the indexer 206 can categorize the results based on the categorization criteria. The categorization criteria can include categories for grouping the results, such as any combination of partition, source, sourcetype, or host, or other categories or fields as desired.

The indexer can use the categorization criteria to identify categorization criteria-value pairs or categorization criteria values by which to categorize or group the results. The categorization criteria-value pairs can correspond to one or more field-value pair entries stored in a relevant inverted index, one or more index-value pairs based on a directory in which the inverted index is located or an entry in the inverted index (or other means by which an inverted index can be associated with a partition), or other criteria-value pair that identifies a general category and a particular value for that category. The categorization criteria values can correspond to the value portion of the categorization criteria-value pair.

As mentioned, in some cases, the categorization criteria-value pairs can correspond to one or more field-value pair entries stored in the relevant inverted indexes. For example, the categorization criteria-value pairs can correspond to field-value pair entries of host, source, and sourcetype (or other field-value pair entry as desired). For instance, if there are ten different hosts, four different sources, and five different sourcetypes for an inverted index, then the inverted index can include ten host field-value pair entries, four source field-value pair entries, and five sourcetype field-value pair entries. The indexer can use the nineteen distinct field-value pair entries as categorization criteria-value pairs to group the results.

Specifically, the indexer can identify the location of the event references associated with the events that satisfy the filter criteria within the field-value pairs, and group the event references based on their location. As such, the indexer can identify the particular field value associated with the event corresponding to the event reference. For example, if the categorization criteria include host and sourcetype, the host field-value pair entries and sourcetype field-value pair entries can be used as categorization criteria-value pairs to identify the specific host and sourcetype associated with the events that satisfy the filter criteria.

In addition, as mentioned, categorization criteria-value pairs can correspond to data other than the field-value pair entries in the relevant inverted indexes. For example, if partition or index is used as a categorization criterion, the inverted indexes may not include partition field-value pair entries. Rather, the indexer can identify the categorization criteria-value pair associated with the partition based on the directory in which an inverted index is located, information in the inverted index, or other information that associates the inverted index with the partition, etc. As such a variety of methods can be used to identify the categorization criteria-value pairs from the categorization criteria.

Accordingly based on the categorization criteria (and categorization criteria-value pairs), the indexer can generate groupings based on the events that satisfy the filter criteria. As a non-limiting example, if the categorization criteria includes a partition and sourcetype, then the groupings can correspond to events that are associated with each unique combination of partition and sourcetype. For instance, if there are three different partitions and two different sourcetypes associated with the identified events, then the six different groups can be formed, each with a unique partition value-sourcetype value combination. Similarly, if the categorization criteria includes partition, sourcetype, and host and there are two different partitions, three sourcetypes, and five hosts associated with the identified events, then the indexer can generate up to thirty groups for the results that satisfy the filter criteria. Each group can be associated with a unique combination of categorization criteria-value pairs (e.g., unique combinations of partition value sourcetype value, and host value).

In addition, the indexer can count the number of events associated with each group based on the number of events that meet the unique combination of categorization criteria for a particular group (or match the categorization criteria-value pairs for the particular group). With continued reference to the example above, the indexer can count the number of events that meet the unique combination of partition, sourcetype, and host for a particular group.

Each indexer communicates the groupings to the search head. The search head can aggregate the groupings from the indexers and provide the groupings for display. In some cases, the groups are displayed based on at least one of the host, source, sourcetype, or partition associated with the groupings. In some embodiments, the search head can further display the groups based on display criteria, such as a display order or a sort order as described in greater detail above.

As a non-limiting example and with reference to FIG. 5B, consider a request received by an indexer 206 that includes the following filter criteria: keyword=error, partition=main, time range=3/1/17 16:22.00.000-16:28.00.000, sourcetype=sourcetypeC, host=hostB, and the following categorization criteria: source.

Based on the above criteria, the indexer 206 identifies main directory 503 and can ignore test directory 505 and any other partition-specific directories. The indexer determines that inverted partition 507B is a relevant partition based on its location within the _main directory 503 and the time range associated with it. For sake of simplicity in this example, the indexer 206 determines that no other inverted indexes in the main directory 503, such as inverted index 507A satisfy the time range criterion.

Having identified the relevant inverted index 507B, the indexer reviews the token entries 511 and the field-value pair entries 513 to identify event references, or events, that satisfy all of the filter criteria.

With respect to the token entries 511, the indexer can review the error token entry and identify event references 3, 5, 6, 8, 11, 12, indicating that the term "error" is found in the corresponding events. Similarly, the indexer can identify event references 4, 5, 6, 8, 9, 10, 11 in the field-value pair entry sourcetype::sourcetypeC and event references 2, 5, 6, 8, 10, 11 in the field-value pair entry host::hostB. As the filter criteria did not include a source or an IP_address field-value pair, the indexer can ignore those field-value pair entries.

In addition to identifying event references found in at least one token entry or field-value pair entry (e.g., event references 3, 4, 5, 6, 8, 9, 10, 11, 12), the indexer can identify events (and corresponding event references) that satisfy the time range criterion using the event reference array 1614 (e.g., event references 2, 3, 4, 5, 6, 7, 8, 9, 10). Using the information obtained from the inverted index 507B (including the event reference array 515), the indexer 206 can identify the event references that satisfy all of the filter criteria (e.g., event references 5, 6, 8).

Having identified the events (and event references) that satisfy all of the filter criteria, the indexer 206 can group the event references using the received categorization criteria (source). In doing so, the indexer can determine that event references 5 and 6 are located in the field-value pair entry source::sourceD (or have matching categorization criteria-value pairs) and event reference 8 is located in the field-value pair entry source::sourceC. Accordingly, the indexer can generate a sourceC group having a count of one corresponding to reference 8 and a sourceD group having a count of two corresponding to references 5 and 6. This information can be communicated to the search head. In turn the search head can aggregate the results from the various indexers and display the groupings. As mentioned above, in some embodiments, the groupings can be displayed based at least in part on the categorization criteria, including at least one of host, source, sourcetype, or partition.

It will be understood that a change to any of the filter criteria or categorization criteria can result in different groupings. As a one non-limiting example, a request received by an indexer 206 that includes the following filter criteria: partition=_main, time range=3/1/17 3/1/17 16:21:20.000-16:28:17.000, and the following categorization criteria: host, source, sourcetype would result in the indexer identifying event references 1-12 as satisfying the filter criteria. The indexer would then generate up to 24 groupings corresponding to the 24 different combinations of the categorization criteria-value pairs, including host (hostA, hostB), source (sourceA, sourceB, sourceC, sourceD), and sourcetype (sourcetypeA, sourcetypeB, sourcetypeC). However, as there are only twelve events identifiers in the illustrated embodiment and some fall into the same grouping, the indexer generates eight groups and counts as follows:

- Group 1 (hostA, sourceA, sourcetypeA): 1 (event reference 7)
- Group 2 (hostA, sourceA, sourcetypeB): 2 (event references 1, 12)
- Group 3 (hostA, sourceA, sourcetypeC): 1 (event reference 4)
- Group 4 (hostA, sourceB, sourcetypeA): 1 (event reference 3)
- Group 5 (hostA, sourceB, sourcetypeC): 1 (event reference 9)
- Group 6 (hostB, sourceC, sourcetypeA): 1 (event reference 2)
- Group 7 (hostB, sourceC, sourcetypeC): 2 (event references 8, 11)
- Group 8 (hostB, sourceD, sourcetypeC): 3 (event references 5, 6, 10)

As noted, each group has a unique combination of categorization criteria-value pairs or categorization criteria values. The indexer communicates the groups to the search head for aggregation with results received from other indexers. In communicating the groups to the search head, the indexer can include the categorization criteria-value pairs for each group and the count. In some embodiments, the indexer can include more or less information. For example, the indexer can include the event references associated with each group and other identifying information, such as the indexer or inverted index used to identify the groups.

As another non-limiting examples, a request received by an indexer 206 that includes the following filter criteria: partition=_main, time range=3/1/17 3/1/17 16:21:20.000-16:28:17.000, source=sourceA, sourceD, and keyword=itemID and the following categorization criteria: host, source, sourcetype would result in the indexer identifying event references 4, 7, and 10 as satisfying the filter criteria, and generate the following groups:

- Group 1 (hostA, sourceA, sourcetypeC): 1 (event reference 4)
- Group 2 (hostA, sourceA, sourcetypeA): 1 (event reference 7)
- Group 3 (hostB, sourceD, sourcetypeC): 1 (event references 10)

The indexer communicates the groups to the search head for aggregation with results received from other indexers. As will be understand there are myriad ways for filtering and categorizing the events and event references. For example, the indexer can review multiple inverted indexes associated with an partition or review the inverted indexes of multiple partitions, and categorize the data using any one or any combination of partition, host, source, sourcetype, or other category, as desired.

Further, if a user interacts with a particular group, the indexer can provide additional information regarding the group. For example, the indexer can perform a targeted search or sampling of the events that satisfy the filter criteria and the categorization criteria for the selected group, also referred to as the filter criteria corresponding to the group or filter criteria associated with the group.

In some cases, to provide the additional information, the indexer relies on the inverted index. For example, the indexer can identify the event references associated with the events that satisfy the filter criteria and the categorization criteria for the selected group and then use the event reference array 515 to access some or all of the identified events. In some cases, the categorization criteria values or categorization criteria-value pairs associated with the group become part of the filter criteria for the review.

With reference to FIG. 5B for instance, suppose a group is displayed with a count of six corresponding to event references 4, 5, 6, 8, 10, 11 (i.e., event references 4, 5, 6, 8, 10, 11 satisfy the filter criteria and are associated with matching categorization criteria values or categorization criteria-value pairs) and a user interacts with the group (e.g., selecting the group, clicking on the group, etc.). In response, the search head communicates with the indexer to provide additional information regarding the group.

In some embodiments, the indexer identifies the event references associated with the group using the filter criteria and the categorization criteria for the group (e.g., categorization criteria values or categorization criteria-value pairs unique to the group). Together, the filter criteria and the categorization criteria for the group can be referred to as the filter criteria associated with the group. Using the filter criteria associated with the group, the indexer identifies event references 4, 5, 6, 8, 10, 11.

Based on a sampling criteria, discussed in greater detail above, the indexer can determine that it will analyze a sample of the events associated with the event references 4, 5, 6, 8, 10, 11. For example, the sample can include analyzing event data associated with the event references 5, 8, 10. In some embodiments, the indexer can use the event reference array 1616 to access the event data associated with the event references 5, 8, 10. Once accessed, the indexer can compile the relevant information and provide it to the search head for aggregation with results from other indexers. By identifying events and sampling event data using the inverted indexes, the indexer can reduce the amount of actual data this is analyzed and the number of events that are accessed in order to generate the summary of the group and provide a response in less time.

2.8 Query Processing

Figure 6A:
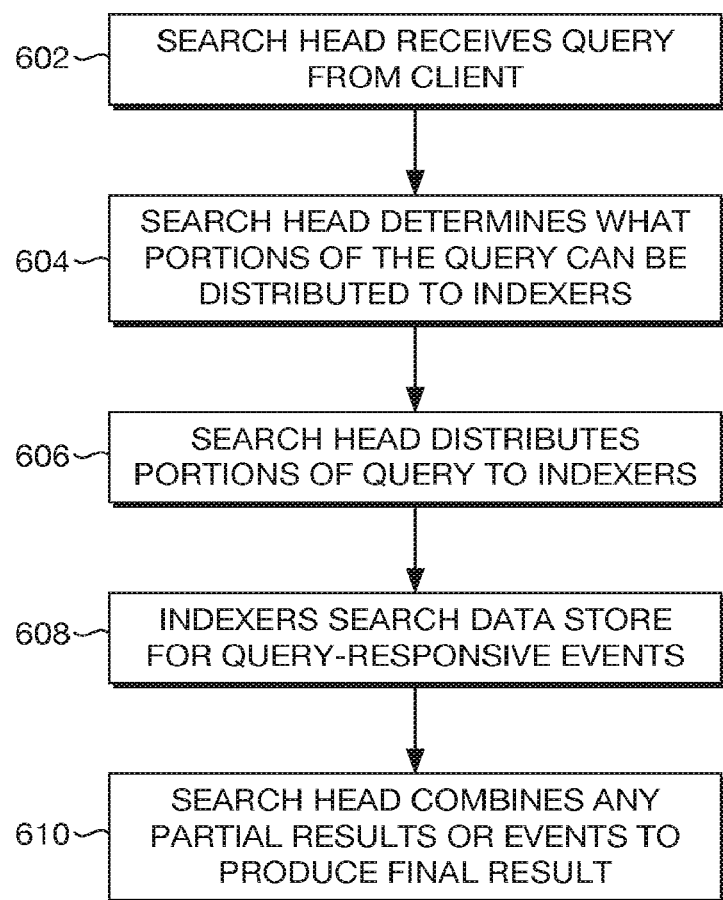
FIG. 6A is a flow diagram of an example method that illustrates how a search head and indexers perform a search query, in accordance with example embodiments.

FIG. 6A is a flow diagram of an example method that illustrates how a search head and indexers perform a search query, in accordance with example embodiments. At block 602, a search head receives a search query from a client. At block 604, the search head analyzes the search query to determine what portion(s) of the query can be delegated to indexers and what portions of the query can be executed locally by the search head. At block 606, the search head distributes the determined portions of the query to the appropriate indexers. In some embodiments, a search head cluster may take the place of an independent search head where each search head in the search head cluster coordinates with peer search heads in the search head cluster to schedule jobs, replicate search results, update configurations, fulfill search requests, etc. In some embodiments, the search head (or each search head) communicates with a master node (also known as a cluster master, not shown in FIG. 2) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 608, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 608 may use the late-binding schema to extract values for specified fields from events at the time the query is processed. In some embodiments, one or more rules for extracting field values may be specified as part of a source type definition in a configuration file. The indexers may then either send the relevant events back to the search head, or use the events to determine a partial result, and send the partial result back to the search head.

At block 610, the search head combines the partial results and/or events received from the indexers to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries, which may be particularly helpful for queries that are performed on a periodic basis.

2.9 Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|". In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g., calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

Figure 6B:
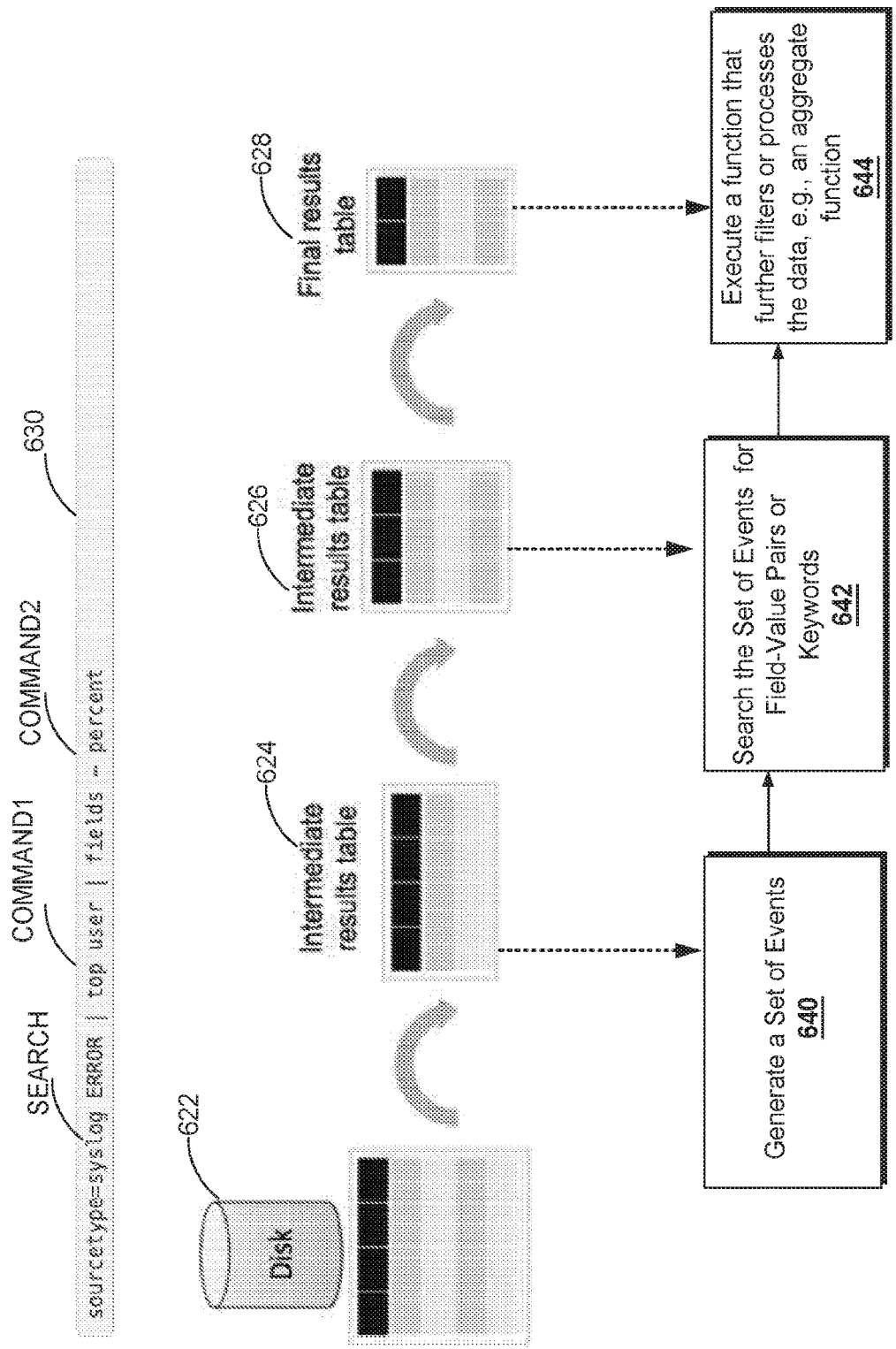
FIG. 6B provides a visual representation of an example manner in which a pipelined command language or query operates, in accordance with example embodiments.

FIG. 6B provides a visual representation of the manner in which a pipelined command language or query operates in accordance with the disclosed embodiments. The query 630 can be inputted by the user into a search. The query comprises a search, the results of which are piped to two commands (namely, command 1 and command 2) that follow the search step.

Disk 622 represents the event data in the raw record data store.

When a user query is processed, a search step will precede other queries in the pipeline in order to generate a set of events at block 640. For example, the query can comprise search terms "sourcetype=syslog ERROR" at the front of the pipeline as shown in FIG. 6B. Intermediate results table 624 shows fewer rows because it represents the subset of events retrieved from the index that matched the search terms "sourcetype=syslog ERROR" from search command 630. By way of further example, instead of a search step, the set of events at the head of the pipeline may be generating by a call to a pre-existing inverted index (as will be explained later).

At block 642, the set of events generated in the first part of the query may be piped to a query that searches the set of events for field-value pairs or for keywords. For example, the second intermediate results table 626 shows fewer columns, representing the result of the top command, "top user" which may summarize the events into a list of the top 10 users and may display the user, count, and percentage.

Finally, at block 644, the results of the prior stage can be pipelined to another stage where further filtering or processing of the data can be performed, e.g., preparing the data for display purposes, filtering the data based on a condition, performing a mathematical calculation with the data, etc. As shown in FIG. 6B, the "fields—percent" part of command 630 removes the column that shows the percentage, thereby, leaving a final results table 628 without a percentage column. In different embodiments, other query languages, such as the Structured Query Language ("SQL"), can be used to create a query.

2.10 Field Extraction

The search head 210 allows users to search and visualize events generated from machine data received from homogenous data sources. The search head 210 also allows users to search and visualize events generated from machine data received from heterogeneous data sources. The search head 210 includes various mechanisms, which may additionally reside in an indexer 206, for processing a query. A query language may be used to create a query, such as any suitable pipelined query language. For example, Splunk Processing Language (SPL) can be utilized to make a query. SPL is a pipelined search language in which a set of inputs is operated on by a first command in a command line, and then a subsequent command following the pipe symbol "I" operates on the results produced by the first command, and so on for additional commands. Other query languages, such as the Structured Query Language ("SQL"), can be used to create a query.

In response to receiving the search query, search head 210 uses extraction rules to extract values for fields in the events being searched. The search head 210 obtains extraction rules that specify how to extract a value for fields from an event. Extraction rules can comprise regex rules that specify how to extract values for the fields corresponding to the extraction rules. In addition to specifying how to extract field values, the extraction rules may also include instructions for deriving a field value by performing a function on a character string or value retrieved by the extraction rule. For example, an extraction rule may truncate a character string or convert the character string into a different data format. In some cases, the query itself can specify one or more extraction rules.

The search head 210 can apply the extraction rules to events that it receives from indexers 206. Indexers 206 may apply the extraction rules to events in an associated data store 208. Extraction rules can be applied to all the events in a data store or to a subset of the events that have been filtered based on some criteria (e.g., event time stamp values, etc.). Extraction rules can be used to extract one or more values for a field from events by parsing the portions of machine data in the events and examining the data for one or more patterns of characters, numbers, delimiters, etc., that indicate where the field begins and, optionally, ends.

Figure 7A:
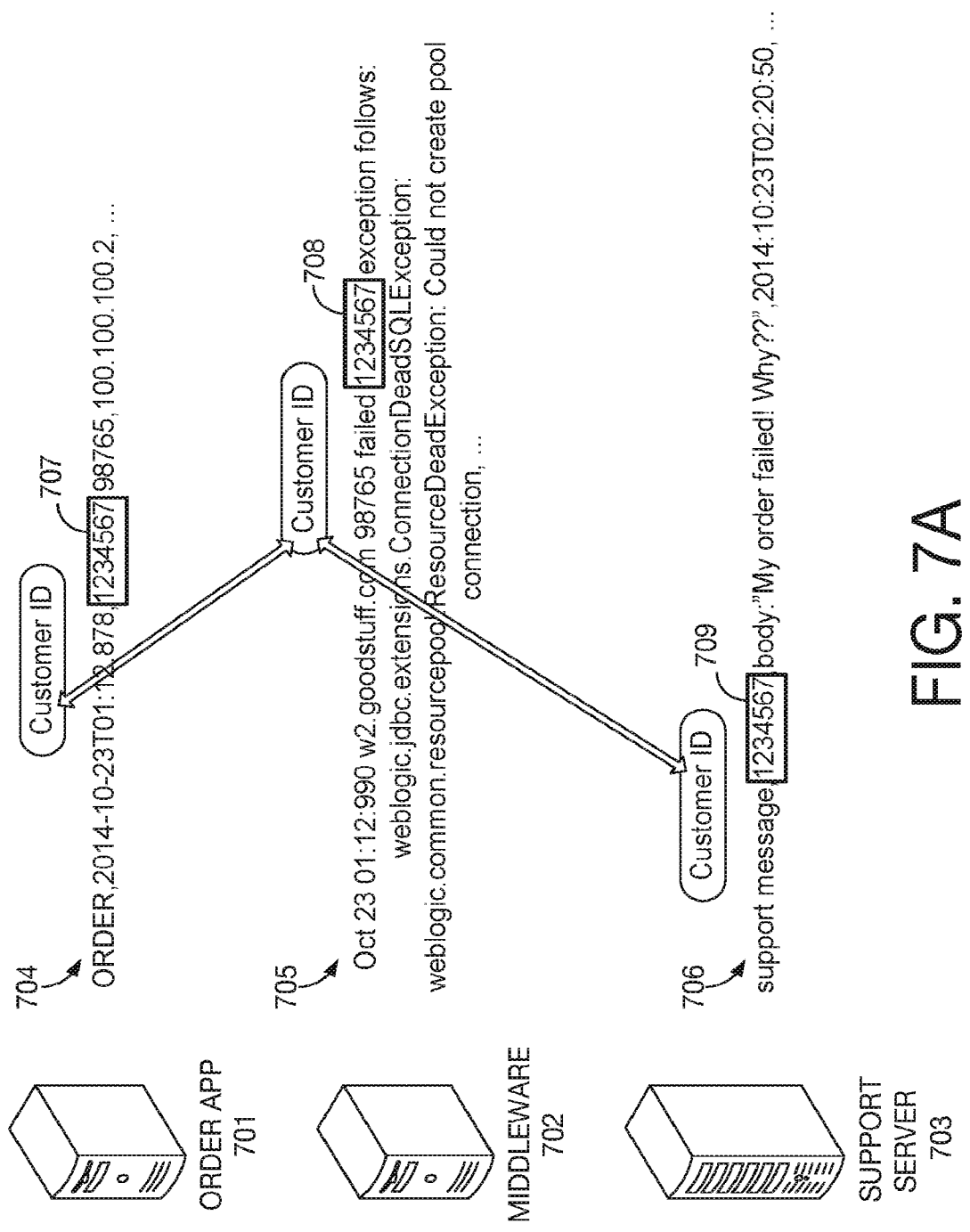
FIG. 7A is a diagram of an example scenario where a common customer identifier is found among log data received from three disparate data sources, in accordance with example embodiments.

FIG. 7A is a diagram of an example scenario where a common customer identifier is found among log data received from three disparate data sources, in accordance with example embodiments. In this example, a user submits an order for merchandise using a vendor's shopping application program 701 running on the user's system. In this example, the order was not delivered to the vendor's server due to a resource exception at the destination server that is detected by the middleware code 702. The user then sends a message to the customer support server 703 to complain about the order failing to complete. The three systems 701, 702, and 703 are disparate systems that do not have a common logging format. The order application 701 sends log data 704 to the data intake and query system in one format, the middleware code 702 sends error log data 705 in a second format, and the support server 703 sends log data 706 in a third format.

Using the log data received at one or more indexers 206 from the three systems, the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems. There is a semantic relationship between the customer ID field values generated by the three systems. The search head 210 requests events from the one or more indexers 206 to gather relevant events from the three systems. The search head 210 then applies extraction rules to the events in order to extract field values that it can correlate. The search head may apply a different extraction rule to each set of events from each system when the event format differs among systems. In this example, the user interface can display to the administrator the events corresponding to the common customer ID field values 707, 708, and 709, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, a visualization (e.g., a graph or chart) generated from the values, and the like.

Figure 7B:
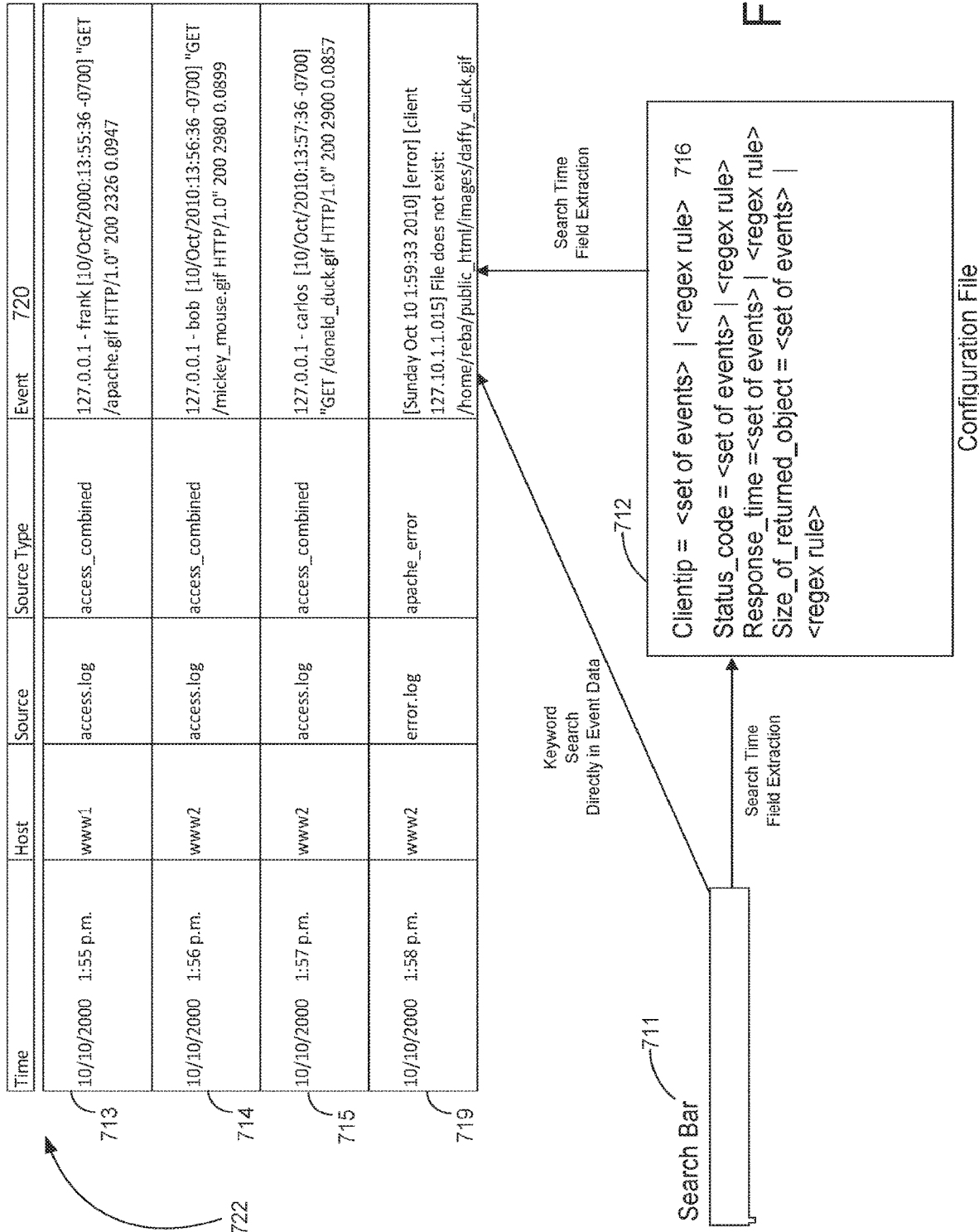
FIG. 7B illustrates an example of processing keyword searches and field searches, in accordance with disclosed embodiments.

The search system enables users to run queries against the stored data to retrieve events that meet criteria specified in a query, such as containing certain keywords or having specific values in defined fields. FIG. 7B illustrates the manner in which keyword searches and field searches are processed in accordance with disclosed embodiments.

If a user inputs a search query into search bar 1401 that includes only keywords (also known as "tokens"), e.g., the keyword "error" or "warning", the query search engine of the data intake and query system searches for those keywords directly in the event data 722 stored in the raw record data store. Note that while FIG. 7B only illustrates four events, the raw record data store (corresponding to data store 208 in FIG. 2) may contain records for millions of events.

As disclosed above, an indexer can optionally generate a keyword index to facilitate fast keyword searching for event data. The indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword. For example, if the keyword "HTTP" was indexed by the indexer at index time, and the user searches for the keyword "HTTP", events 713 to 715 will be identified based on the results returned from the keyword index. As noted above, the index contains reference pointers to the events containing the keyword, which allows for efficient retrieval of the relevant events from the raw record data store.

If a user searches for a keyword that has not been indexed by the indexer, the data intake and query system would nevertheless be able to retrieve the events by searching the event data for the keyword in the raw record data store directly as shown in FIG. 7B. For example, if a user searches for the keyword "frank", and the name "frank" has not been indexed at index time, the DATA INTAKE AND QUERY system will search the event data directly and return the first event 713. Note that whether the keyword has been indexed at index time or not, in both cases the raw data with the events 712 is accessed from the raw data record store to service the keyword search. In the case where the keyword has been indexed, the index will contain a reference pointer that will allow for a more efficient retrieval of the event data from the data store. If the keyword has not been indexed, the search engine will need to search through all the records in the data store to service the search.

In most cases, however, in addition to keywords, a user's search will also include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the search, "status=404". This search query finds events with "status" fields that have a value of "404." When the search is run, the search engine does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 johnmedlock."

The data intake and query system advantageously allows for search time field extraction. In other words, fields can be extracted from the event data at search time using late-binding schema as opposed to at data ingestion time, which was a major limitation of the prior art systems.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

FIG. 7B illustrates the manner in which configuration files may be used to configure custom fields at search time in accordance with the disclosed embodiments. In response to receiving a search query, the data intake and query system determines if the query references a "field." For example, a query may request a list of events where the "clientip" field equals "127.0.0.1." If the query itself does not specify an extraction rule and if the field is not a metadata field, e.g., time, host, source, source type, etc., then in order to determine an extraction rule, the search engine may, in one or more embodiments, need to locate configuration file 712 during the execution of the search as shown in FIG. 7B.

Configuration file 712 may contain extraction rules for all the various fields that are not metadata fields, e.g., the "clientip" field. The extraction rules may be inserted into the configuration file in a variety of ways. In some embodiments, the extraction rules can comprise regular expression rules that are manually entered in by the user. Regular expressions match patterns of characters in text and are used for extracting custom fields in text.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system would then generate a regular expression that extracts those fields from similar events and store the regular expression as an extraction rule for the associated field in the configuration file 712.

In some embodiments, the indexers may automatically discover certain custom fields at index time and the regular expressions for those fields will be automatically generated at index time and stored as part of extraction rules in configuration file 712. For example, fields that appear in the event data as "key=value" pairs may be automatically extracted as part of an automatic field discovery process. Note that there may be several other ways of adding field definitions to configuration files in addition to the methods discussed herein.

The search head 210 can apply the extraction rules derived from configuration file 1402 to event data that it receives from indexers 206. Indexers 206 may apply the extraction rules from the configuration file to events in an associated data store 208. Extraction rules can be applied to all the events in a data store, or to a subset of the events that have been filtered based on some criteria (e, event time stamp values, etc.). Extraction rules can be used to extract one or more values for a field from events by parsing the event data and examining the event data for one or more patterns of characters, numbers, delimiters, etc., that indicate where the field begins and, optionally, ends.

In one more embodiments, the extraction rule in configuration file 712 will also need to define the type or set of events that the rule applies to. Because the raw record data store will contain events from multiple heterogeneous sources, multiple events may contain the same fields in different locations because of discrepancies in the format of the data generated by the various sources. Furthermore, certain events may not contain a particular field at all. For example, event 719 also contains "clientip" field, however, the "clientip" field is in a different format from events 713-715. To address the discrepancies in the format and content of the different types of events, the configuration file will also need to specify the set of events that an extraction rule applies to, e.g., extraction rule 716 specifies a rule for filtering by the type of event and contains a regular expression for parsing out the field value. Accordingly, each extraction rule will pertain to only a particular type of event. If a particular field, e.g., "clientip" occurs in multiple events, each of those types of events would need its own corresponding extraction rule in the configuration file 712 and each of the extraction rules would comprise a different regular expression to parse out the associated field value.

The most common way to categorize events is by source type because events generated by a particular source can have the same format.

The field extraction rules stored in configuration file 712 perform search-time field extractions. For example, for a query that requests a list of events with source type "access_combined" where the "clientip" field equals "127.0.0.1," the query search engine would first locate the configuration file 712 to retrieve extraction rule 716 that would allow it to extract values associated with the "clientip" field from the event data 720 "where the source type is "access_combined. After the "clientip" field has been extracted from all the events comprising the "clientip" field where the source type is "access_combined," the query search engine can then execute the field criteria by performing the compare operation to filter out the events where the "clientip" field equals "127.0.0.1." In the example shown in FIG. 7B, events 713-715 would be returned in response to the user query. In this manner, the search engine can service queries containing field criteria in addition to queries containing keyword criteria (as explained above).

The configuration file can be created during indexing. It may either be manually created by the user or automatically generated with certain predetermined field extraction rules. As discussed above, the events may be distributed across several indexers, wherein each indexer may be responsible for storing and searching a subset of the events contained in a corresponding data store. In a distributed indexer system, each indexer would need to maintain a local copy of the configuration file that is synchronized periodically across the various indexers.

The ability to add schema to the configuration file at search time results in increased efficiency. A user can create new fields at search time and simply add field definitions to the configuration file. As a user learns more about the data in the events, the user can continue to refine the late-binding schema by adding new fields, deleting fields, or modifying the field extraction rules in the configuration file for use the next time the schema is used by the system. Because the data intake and query system maintains the underlying raw data and uses late-binding schema for searching the raw data, it enables a user to continue investigating and learn valuable insights about the raw data long after data ingestion time.

The ability to add multiple field definitions to the configuration file at search time also results in increased flexibility. For example, multiple field definitions can be added to the configuration file to capture the same field across events generated by different source types. This allows the data intake and query system to search and correlate data across heterogeneous sources flexibly and efficiently.

Further, by providing the field definitions for the queried fields at search time, the configuration file 712 allows the record data store 712 to be field searchable. In other words, the raw record data store 712 can be searched using keywords as well as fields, wherein the fields are searchable name/value pairings that distinguish one event from another and can be defined in configuration file 1402 using extraction rules. In comparison to a search containing field names, a keyword search does not need the configuration file and can search the event data directly as shown in FIG. 7B.

It should also be noted that any events filtered out by performing a search-time field extraction using a configuration file can be further processed by directing the results of the filtering step to a processing step using a pipelined search language. Using the prior example, a user could pipeline the results of the compare step to an aggregate function by asking the query search engine to count the number of events where the "clientip" field equals "127.0.0.1."

2.11 Example Search Screen

Figure 8A:
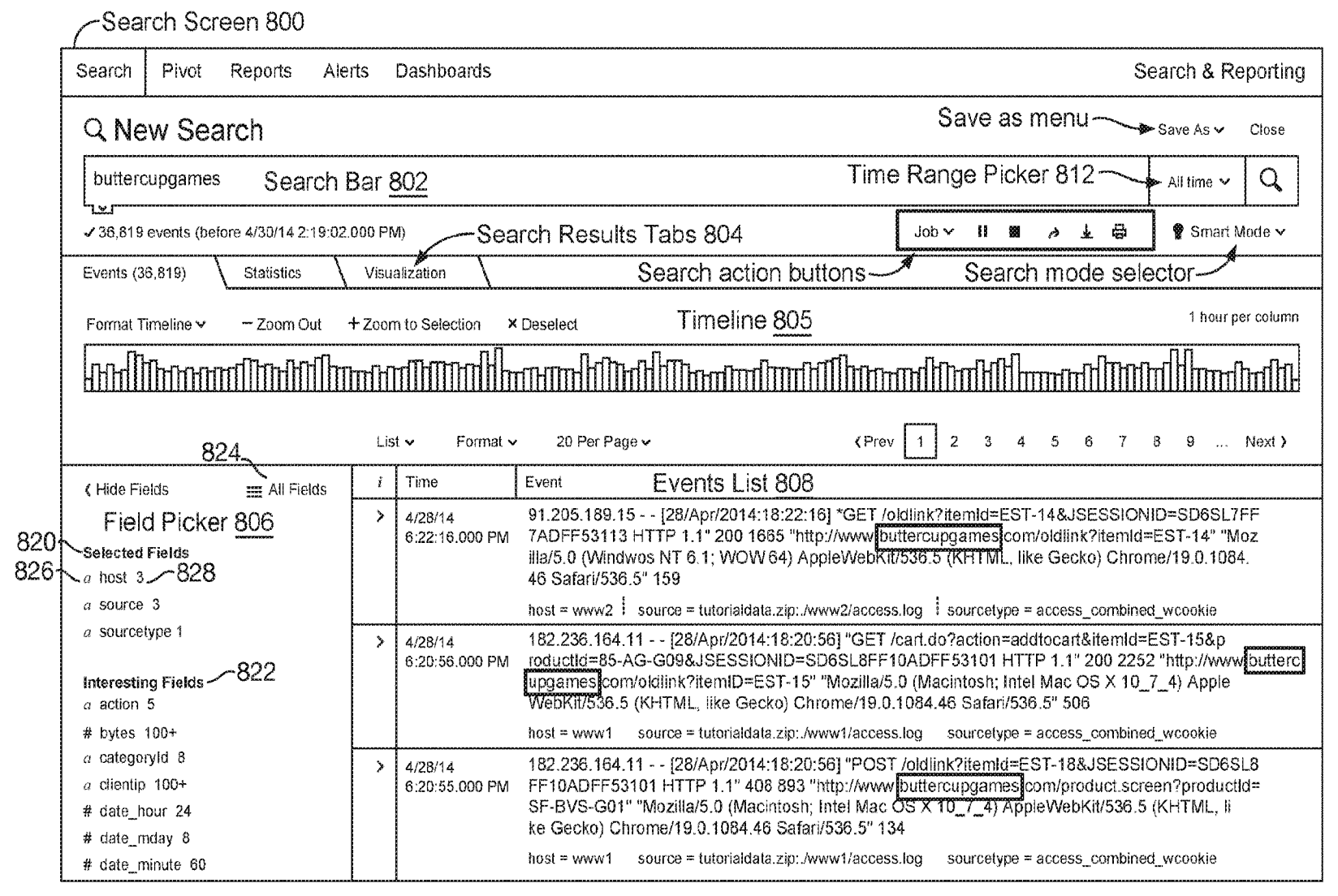

FIG. 8A is an interface diagram of an example user interface for a search screen 800, in accordance with example embodiments. Search screen 800 includes a search bar 802 that accepts user input in the form of a search string. It also includes a time range picker 812 that enables the user to specify a time range for the search. For historical searches (e.g., searches based on a particular historical time range), the user can select a specific time range, or alternatively a relative time range, such as "today," "yesterday" or "last week." For real-time searches (e.g., searches whose results are based on data received in real-time), the user can select the size of a preceding time window to search for real-time events. Search screen 800 also initially may display a "data summary" dialog as is illustrated in FIG. 8B that enables the user to select different sources for the events, such as by selecting specific hosts and log files.

After the search is executed, the search screen 800 in FIG. 8A can display the results through search results tabs 804, wherein search results tabs 804 includes: an "events tab" that may display various information about events returned by the search; a "statistics tab" that may display statistics about the search results; and a "visualization tab" that may display various visualizations of the search results. The events tab illustrated in FIG. 8A may display a timeline graph 805 that graphically illustrates the number of events that occurred in one-hour intervals over the selected time range. The events tab also may display an events list 808 that enables a user to view the machine data in each of the returned events.

The events tab additionally may display a sidebar that is an interactive field picker 806. The field picker 806 may be displayed to a user in response to the search being executed and allows the user to further analyze the search results based on the fields in the events of the search results. The field picker 806 includes field names that reference fields present in the events in the search results. The field picker may display any Selected Fields 820 that a user has pre-selected for display (e.g., host, source, sourcetype) and may also display any Interesting Fields 822 that the system determines may be interesting to the user based on pre-specified criteria (e.g., action, bytes, categoryid, clientip, date_hour, date_mday, date_minute, etc.). The field picker also provides an option to display field names for all the fields present in the events of the search results using the All Fields control 824.

Each field name in the field picker 806 has a value type identifier to the left of the field name, such as value type identifier 826. A value type identifier identifies the type of value for the respective field, such as an "a" for fields that include literal values or a "#" for fields that include numerical values.

Each field name in the field picker also has a unique value count to the right of the field name, such as unique value count 828. The unique value count indicates the number of unique values for the respective field in the events of the search results.

Each field name is selectable to view the events in the search results that have the field referenced by that field name. For example, a user can select the "host" field name, and the events shown in the events list 808 will be updated with events in the search results that have the field that is reference by the field name "host."

2.12 Data Models

A data model is a hierarchically structured search-time mapping of semantic knowledge about one or more datasets. It encodes the domain knowledge used to build a variety of specialized searches of those datasets. Those searches, in turn, can be used to generate reports.

A data model is composed of one or more "objects" (or "data model objects") that define or otherwise correspond to a specific set of data. An object is defined by constraints and attributes. An object's constraints are search criteria that define the set of events to be operated on by running a search having that search criteria at the time the data model is selected. An object's attributes are the set of fields to be exposed for operating on that set of events generated by the search criteria.

Objects in data models can be arranged hierarchically in parent/child relationships. Each child object represents a subset of the dataset covered by its parent object. The top-level objects in data models are collectively referred to as "root objects."

Child objects have inheritance. Child objects inherit constraints and attributes from their parent objects and may have additional constraints and attributes of their own. Child objects provide a way of filtering events from parent objects. Because a child object may provide an additional constraint in addition to the constraints it has inherited from its parent object, the dataset it represents may be a subset of the dataset that its parent represents. For example, a first data model object may define a broad set of data pertaining to e-mail activity generally, and another data model object may define specific datasets within the broad dataset, such as a subset of the e-mail data pertaining specifically to e-mails sent. For example, a user can simply select an "e-mail activity" data model object to access a dataset relating to e-mails generally (e.g., sent or received), or select an "e-mails sent" data model object (or data sub-model object) to access a dataset relating to e-mails sent.

Because a data model object is defined by its constraints (e.g., a set of search criteria) and attributes (e.g., a set of fields), a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. A user iteratively applies a model development tool (not shown in FIG. 8A) to prepare a query that defines a subset of events and assigns an object name to that subset. A child subset is created by further limiting a query that generated a parent subset.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 March, 2015, U.S. Pat. No. 9,128,980, entitled "GENERATION OF A DATA MODEL APPLIED TO QUERIES", issued on 8 Sep. 2015, and U.S. Pat. No. 9,589,012, entitled "GENERATION OF A DATA MODEL APPLIED TO OBJECT QUERIES", issued on 7 Mar. 2017, each of which is hereby incorporated by reference in its entirety for all purposes.

A data model can also include reports. One or more report formats can be associated with a particular data model and be made available to run against the data model. A user can use child objects to design reports with object datasets that already have extraneous data pre-filtered out. In some embodiments, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes. Data visualizations also can be generated in a variety of formats, by reference to the data model. Reports, data visualizations, and data model objects can be saved and associated with the data model for future use. The data model object may be used to perform searches of other data.

FIGS. 9-15 are interface diagrams of example report generation user interfaces, in accordance with example embodiments. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 9:
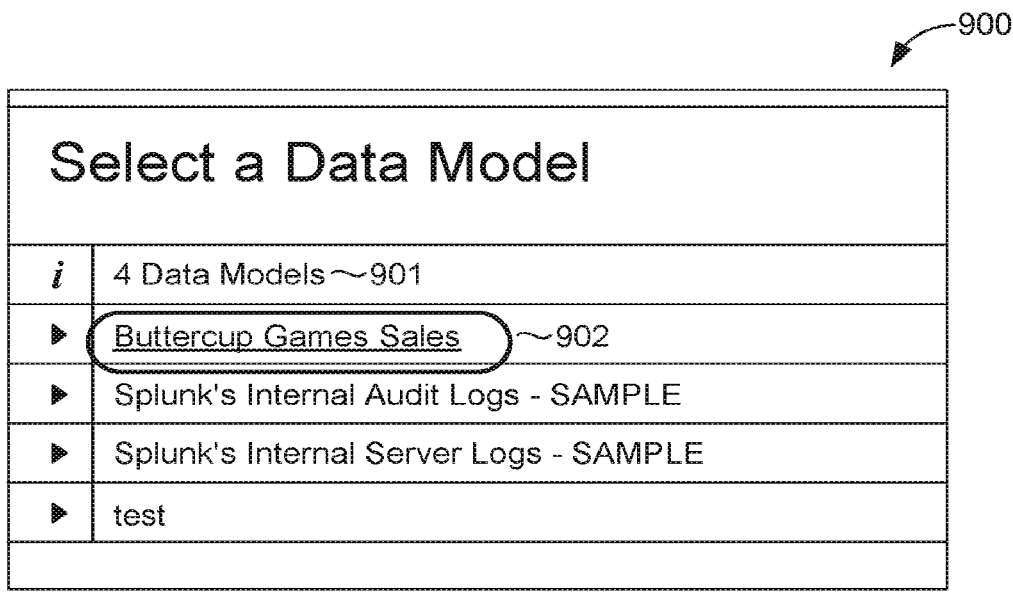

The selection of a data model object for use in driving a report generation may be facilitated by a data model object selection interface. FIG. 9 illustrates an example interactive data model selection graphical user interface 900 of a report editor that may display a listing of available data models 901. The user may select one of the data models 902.

Figure 10:
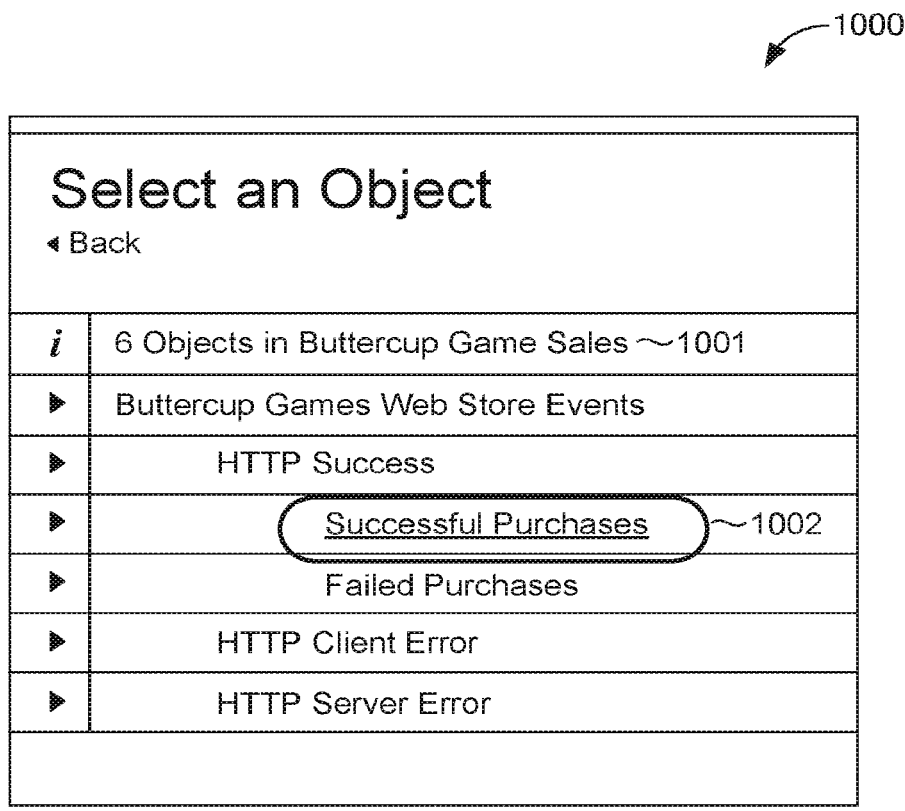

FIG. 10 illustrates an example data model object selection graphical user interface 1000 that may display available data objects 1001 for the selected data object model 902. The user may select one of the displayed data model objects 1002 for use in driving the report generation process.

Figure 11A:
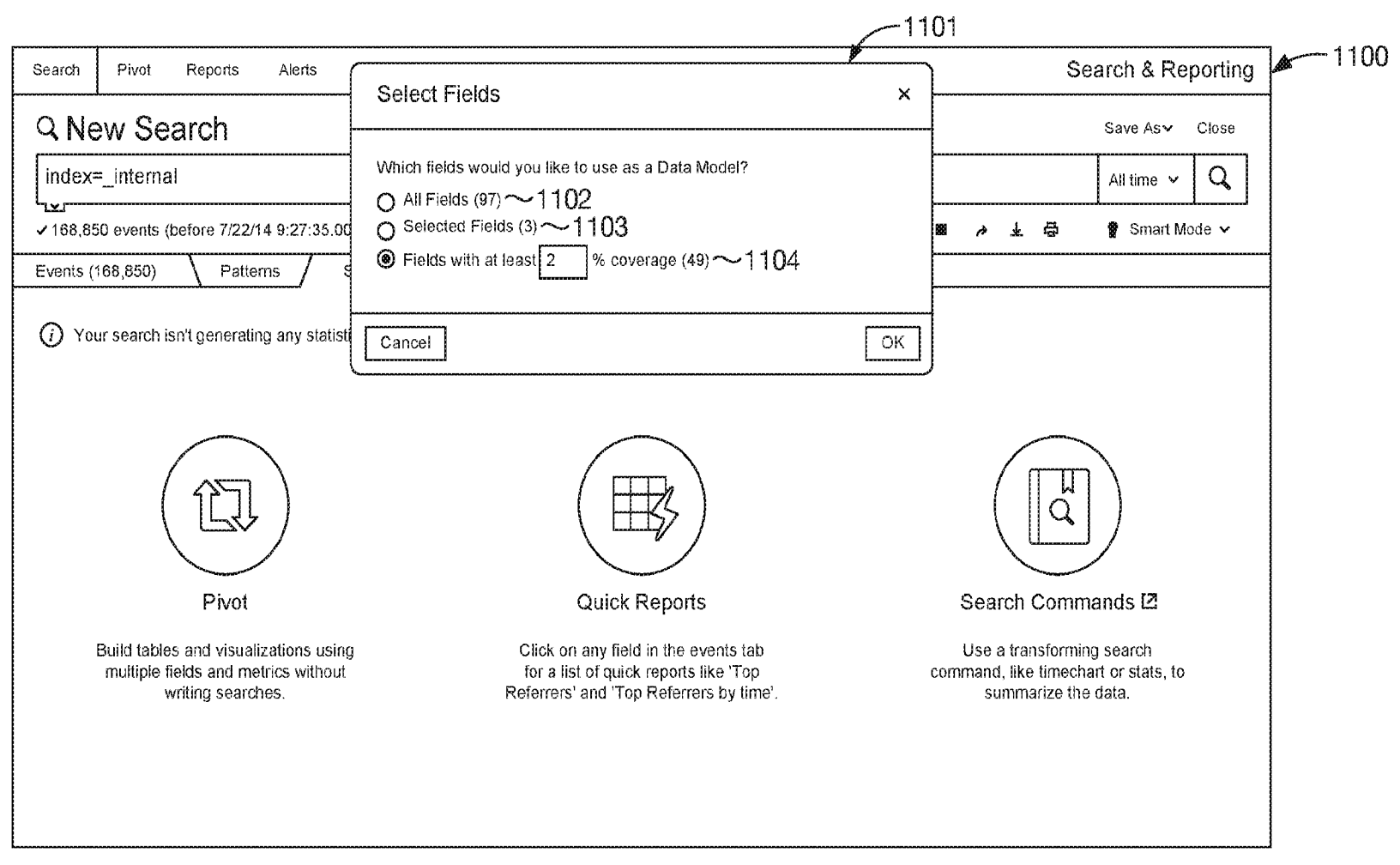

Once a data model object is selected by the user, a user interface screen 1100 shown in FIG. 11A may display an interactive listing of automatic field identification options 1101 based on the selected data model object. For example, a user may select one of the three illustrated options (e.g., the "All Fields" option 1102, the "Selected Fields" option 1103, or the "Coverage" option (, fields with at least a specified % of coverage) 1104). If the user selects the "All Fields" option 1102, all of the fields identified from the events that were returned in response to an initial search query may be selected. That is, for example, all of the fields of the identified data model object fields may be selected. If the user selects the "Selected Fields" option 1103, only the fields from the fields of the identified data model object fields that are selected by the user may be used. If the user selects the "Coverage" option 1104, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 1102 indicates that 97 fields will be selected if the "All Fields" option is selected. The "3" displayed next to the "Selected Fields" option 1103 indicates that 3 of the 97 fields will be selected if the "Selected Fields" option is selected. The "49" displayed next to the "Coverage" option 1104 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 11B:
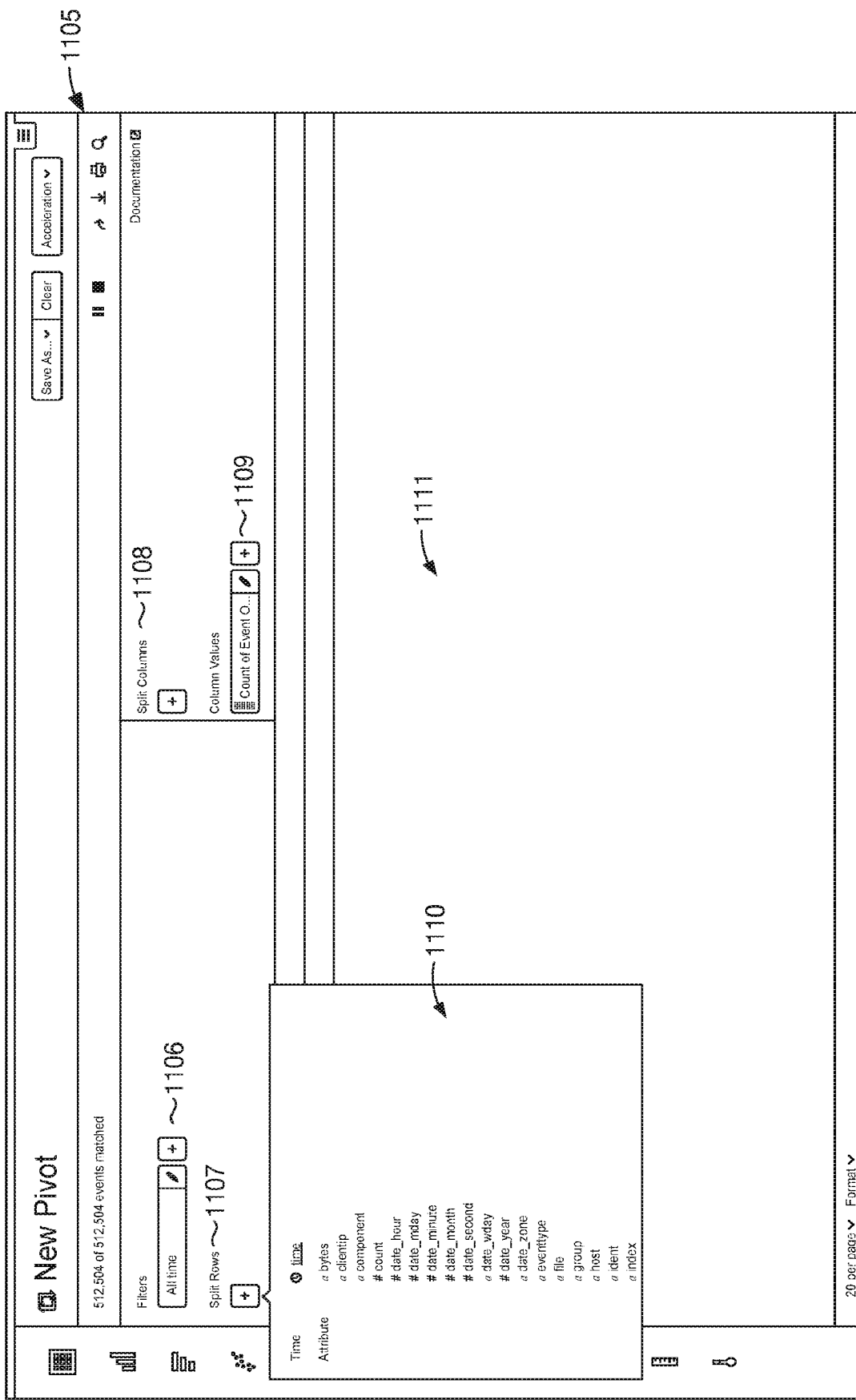
Figure 11C:
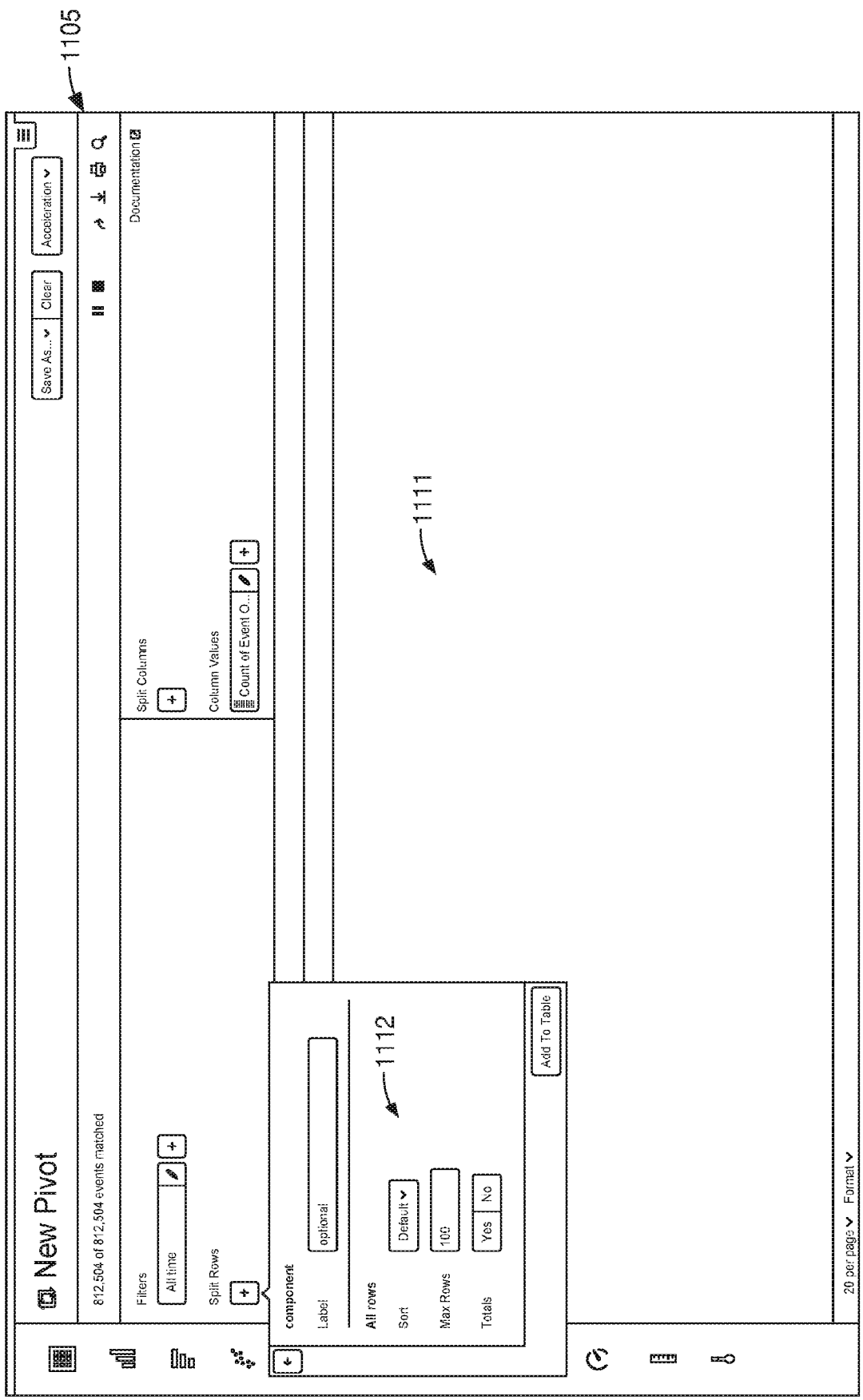

FIG. 11B illustrates an example graphical user interface screen 1105 displaying the reporting application's "Report Editor" page. The screen may display interactive elements for defining various elements of a report. For example, the page includes a "Filters" element 1106, a "Split Rows" element 1107, a "Split Columns" element 1108, and a "Column Values" element 1109. The page may include a list of search results 1111. In this example, the Split Rows element 1107 is expanded, revealing a listing of fields 1110 that can be used to define additional criteria (e.g., reporting criteria). The listing of fields 1110 may correspond to the selected fields. That is, the listing of fields 1110 may list only the fields previously selected, either automatically and/or manually by a user. FIG. 11C illustrates a formatting dialogue 1112 that may be displayed upon selecting a field from the listing of fields 1110. The dialogue can be used to format the display of the results of the selection (e.g., label the column for the selected field to be displayed as "component").

Figure 11D:
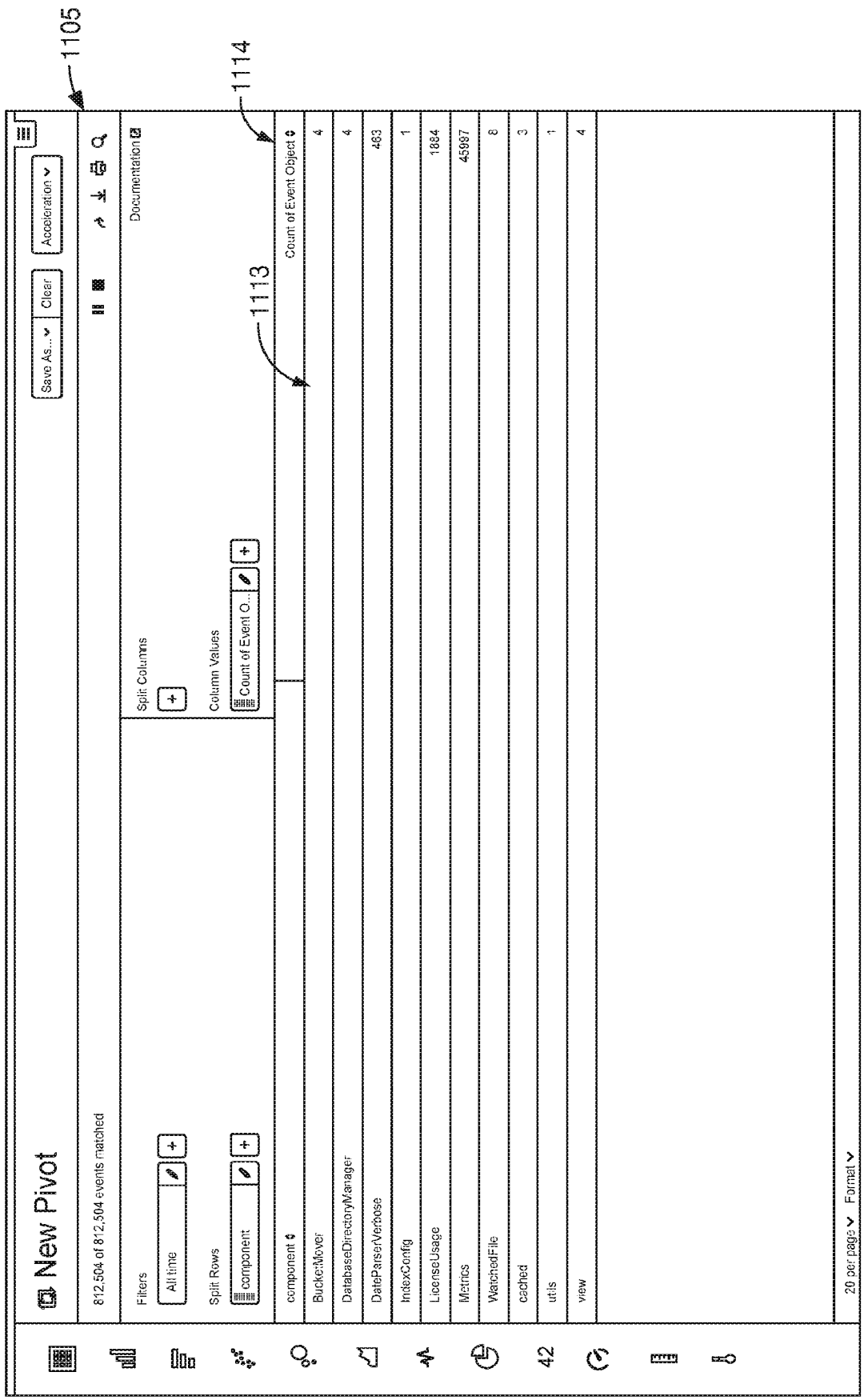

FIG. 11D illustrates an example graphical user interface screen 1105 including a table of results 1113 based on the selected criteria including splitting the rows by the "component" field. A column 1114 having an associated count for each component listed in the table may be displayed that indicates an aggregate count of the number of times that the particular field-value pair (e.g., the value in a row for a particular field, such as the value "BucketMover" for the field "component") occurs in the set of events responsive to the initial search query.

FIG. 12 illustrates an example graphical user interface screen 1200 that allows the user to filter search results and to perform statistical analysis on values extracted from specific fields in the set of events. In this example, the top ten product names ranked by price are selected as a filter 1201 that causes the display of the ten most popular products sorted by price. Each row is displayed by product name and price 1202. This results in each product displayed in a column labeled "product name" along with an associated price in a column labeled "price" 1206. Statistical analysis of other fields in the events associated with the ten most popular products have been specified as column values 1203. A count of the number of successful purchases for each product is displayed in column 1204. These statistics may be produced by filtering the search results by the product name, finding all occurrences of a successful purchase in a field within the events and generating a total of the number of occurrences. A sum of the total sales is displayed in column 1205, which is a result of the multiplication of the price and the number of successful purchases for each product.

Figure 13:
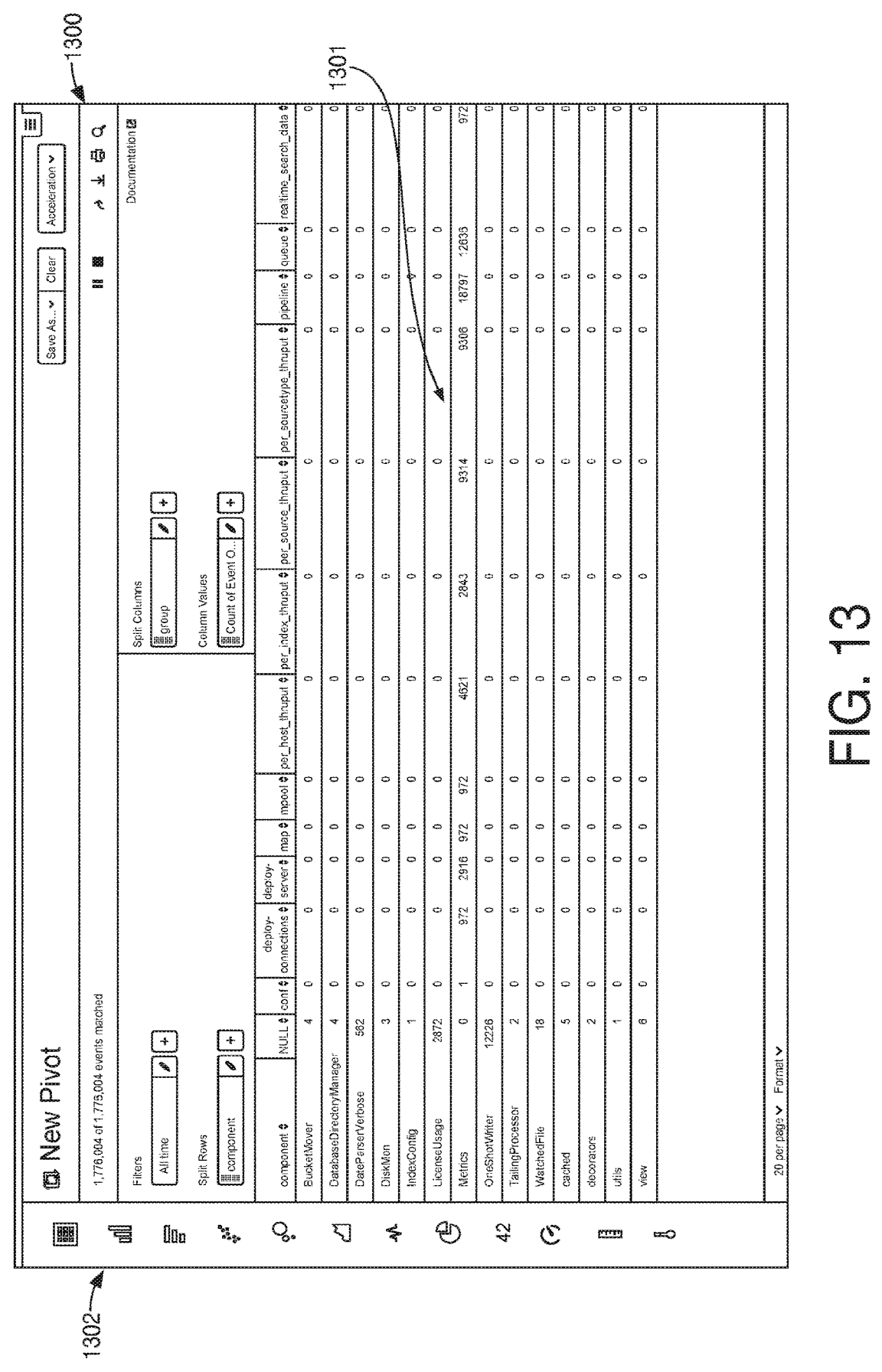
Figure 14:
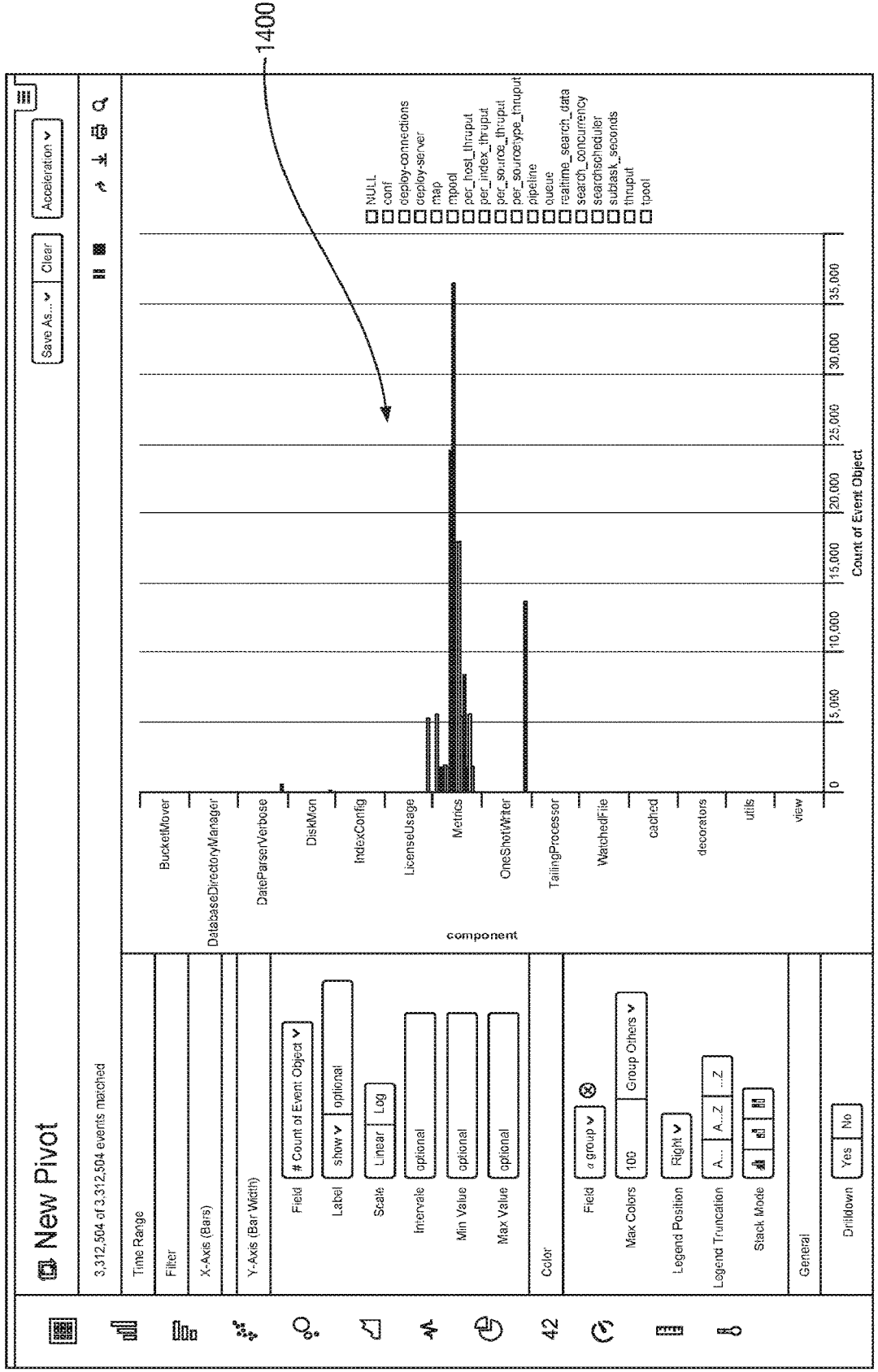
Figure 15:
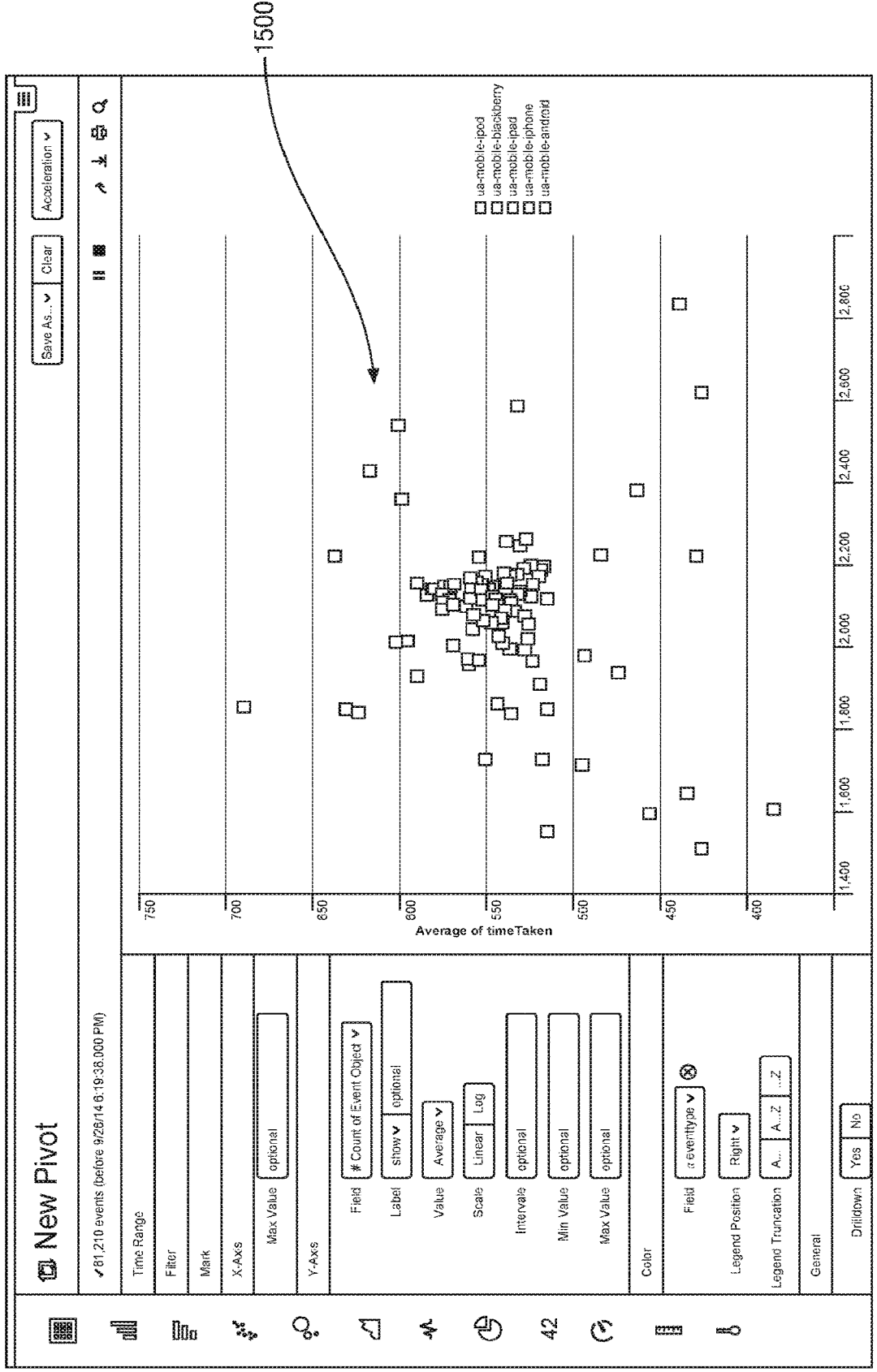

The reporting application allows the user to create graphical visualizations of the statistics generated for a report. For example, FIG. 13 illustrates an example graphical user interface 1300 that may display a set of components and associated statistics 1301. The reporting application allows the user to select a visualization of the statistics in a graph (e.g., bar chart, scatter plot, area chart, line chart, pie chart, radial gauge, marker gauge, filler gauge, etc.), where the format of the graph may be selected using the user interface controls 1302 along the left panel of the user interface 1300. FIG. 14 illustrates an example of a bar chart visualization 1400 of an aspect of the statistical data 1301. FIG. 15 illustrates a scatter plot visualization 1500 of an aspect of the statistical data 1301.

2.13 Acceleration Technique

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, the data intake and query system also employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.13.1 Aggregation Technique

Figure 16:
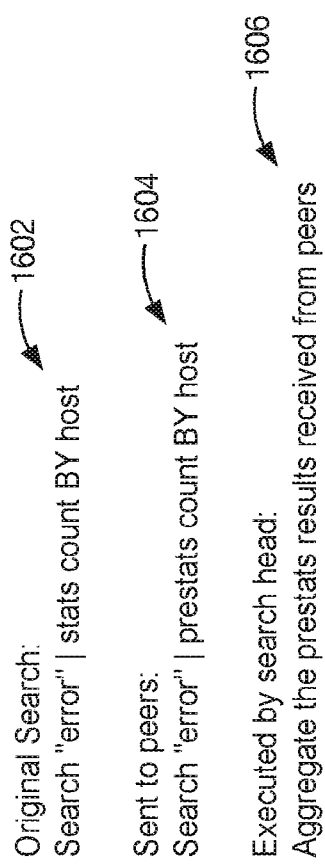
FIG. 16 is an example search query received from a client and executed by search peers, in accordance with example embodiments.

To facilitate faster query processing, a query can be structured such that multiple indexers perform the query in parallel, while aggregation of search results from the multiple indexers is performed locally at the search head. For example, FIG. 16 is an example search query received from a client and executed by search peers, in accordance with example embodiments. FIG. 16 illustrates how a search query 1602 received from a client at a search head 210 can split into two phases, including: (1) subtasks 1604 (e.g., data retrieval or simple filtering) that may be performed in parallel by indexers 206 for execution, and (2) a search results aggregation operation 1606 to be executed by the search head when the results are ultimately collected from the indexers.

During operation, upon receiving search query 1602, a search head 210 determines that a portion of the operations involved with the search query may be performed locally by the search head. The search head modifies search query 1602 by substituting "stats" (create aggregate statistics over results sets received from the indexers at the search head) with "prestats" (create statistics by the indexer from local results set) to produce search query 1604, and then distributes search query 1604 to distributed indexers, which are also referred to as "search peers" or "peer indexers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 6A, or may alternatively distribute a modified version (e.g., a more restricted version) of the search query to the search peers. In this example, the indexers are responsible for producing the results and sending them to the search head. After the indexers return the results to the search head, the search head aggregates the received results 1606 to form a single search result set. By executing the query in this manner, the system effectively distributes the computational operations across the indexers while minimizing data transfers.

2.13.2 Keyword Index

As described above with reference to the flow charts in FIG. 5A and FIG. 6A, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.13.3 High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the events and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", issued on 8 Sep. 2015, and U.S. patent application Ser. No. 14/815,973, entitled "GENERATING AND STORING SUMMARIZATION TABLES FOR SETS OF SEARCHABLE EVENTS", filed on 1 Aug. 2015, each of which is hereby incorporated by reference in its entirety for all purposes.

To speed up certain types of queries, e.g., frequently encountered queries or computationally intensive queries, some embodiments of system 108 create a high performance analytics store, which is referred to as a "summarization table," (also referred to as a "lexicon" or "inverted index") that contains entries for specific field-value pairs. Each of these entries keeps track of instances of a specific value in a specific field in the event data and includes references to events containing the specific value in the specific field. For example, an example entry in an inverted index can keep track of occurrences of the value "94107" in a "ZIP code" field of a set of events and the entry includes references to all of the events that contain the value "94107" in the ZIP code field. Creating the inverted index data structure avoids needing to incur the computational overhead each time a statistical query needs to be run on a frequently encountered field-value pair. In order to expedite queries, in most embodiments, the search engine will employ the inverted index separate from the raw record data store to generate responses to the received queries.

Note that the term "summarization table" or "inverted index" as used herein is a data structure that may be generated by an indexer that includes at least field names and field values that have been extracted and/or indexed from event records. An inverted index may also include reference values that point to the location(s) in the field searchable data store where the event records that include the field may be found. Also, an inverted index may be stored using well-known compression techniques to reduce its storage size.

Further, note that the term "reference value" (also referred to as a "posting value") as used herein is a value that references the location of a source record in the field searchable data store. In some embodiments, the reference value may include additional information about each record, such as timestamps, record size, meta-data, or the like. Each reference value may be a unique identifier which may be used to access the event data directly in the field searchable data store. In some embodiments, the reference values may be ordered based on each event record's timestamp. For example, if numbers are used as identifiers, they may be sorted so event records having a later timestamp always have a lower valued identifier than event records with an earlier timestamp, or vice-versa. Reference values are often included in inverted indexes for retrieving and/or identifying event records.

In one or more embodiments, an inverted index is generated in response to a user-initiated collection query. The term "collection query" as used herein refers to queries that include commands that generate summarization information and inverted indexes (or summarization tables) from event records stored in the field searchable data store.

Note that a collection query is a special type of query that can be user-generated and is used to create an inverted index. A collection query is not the same as a query that is used to call up or invoke a pre-existing inverted index. In one or more embodiment, a query can comprise an initial step that calls up a pre-generated inverted index on which further filtering and processing can be performed. For example, referring back to FIG. 13, a set of events generated at block 1320 by either using a "collection" query to create a new inverted index or by calling up a pre-generated inverted index. A query with several pipelined steps will start with a pre-generated index to accelerate the query.

Figure 7C:
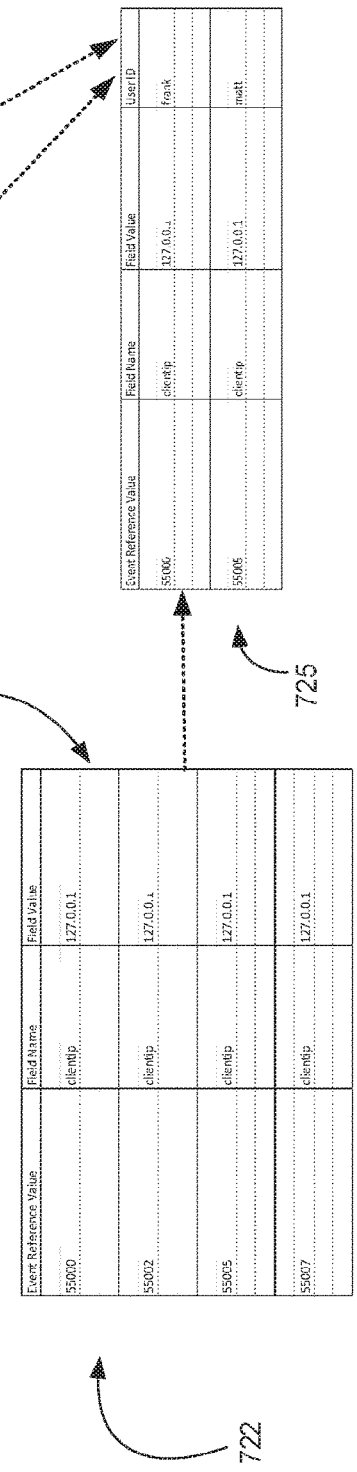
FIG. 7C illustrates an example of creating and using an inverted index, in accordance with example embodiments.

FIG. 7C illustrates the manner in which an inverted index is created and used in accordance with the disclosed embodiments. As shown in FIG. 7C, an inverted index 722 can be created in response to a user-initiated collection query using the event data 723 stored in the raw record data store. For example, a non-limiting example of a collection query may include "collect clientip=127.0.0.1" which may result in an inverted index 722 being generated from the event data 723 as shown in FIG. 7C. Each entry in inverted index 722 includes an event reference value that references the location of a source record in the field searchable data store. The reference value may be used to access the original event record directly from the field searchable data store.

In one or more embodiments, if one or more of the queries is a collection query, the responsive indexers may generate summarization information based on the fields of the event records located in the field searchable data store. In at least one of the various embodiments, one or more of the fields used in the summarization information may be listed in the collection query and/or they may be determined based on terms included in the collection query. For example, a collection query may include an explicit list of fields to summarize. Or, in at least one of the various embodiments, a collection query may include terms or expressions that explicitly define the fields, g, using regex rules. In FIG. 7C, prior to running the collection query that generates the inverted index 722, the field name "clientip" may need to be defined in a configuration file by specifying the "access_combined" source type and a regular expression rule to parse out the client IP address. Alternatively, the collection query may contain an explicit definition for the field name "clientip" which may obviate the need to reference the configuration file at search time.

In one or more embodiments, collection queries may be saved and scheduled to run periodically. These scheduled collection queries may periodically update the summarization information corresponding to the query. For example, if the collection query that generates inverted index 722 is scheduled to run periodically, one or more indexers would periodically search through the relevant buckets to update inverted index 722 with event data for any new events with the "clientip" value of "127.0.0.1."

In some embodiments, the inverted indexes that include fields, values, and reference value (e.g., inverted index 722) for event records may be included in the summarization information provided to the user. In other embodiments, a user may not be interested in specific fields and values contained in the inverted index, but may need to perform a statistical query on the data in the inverted index. For example, referencing the example of FIG. 7C rather than viewing the fields within summarization table 722, a user may want to generate a count of all client requests from IP address "127.0.0.1." In this case, the search engine would simply return a result of "4" rather than including details about the inverted index 722 in the information provided to the user.

The pipelined search language, e.g., SPL of the SPLUNK® ENTERPRISE system can be used to pipe the contents of an inverted index to a statistical query using the "stats" command for example. A "stats" query refers to queries that generate result sets that may produce aggregate and statistical results from event records, e.g., average, mean, max, min, rms, etc. Where sufficient information is available in an inverted index, a "stats" query may generate their result sets rapidly from the summarization information available in the inverted index rather than directly scanning event records. For example, the contents of inverted index 722 can be pipelined to a stats query, e.g., a "count" function that counts the number of entries in the inverted index and returns a value of "4." In this way, inverted indexes may enable various stats queries to be performed absent scanning or search the event records. Accordingly, this optimization technique enables the system to quickly process queries that seek to determine how many events have a particular value for a particular field. To this end, the system can examine the entry in the inverted index to count instances of the specific value in the field without having to go through the individual events or perform data extractions at search time.

In some embodiments, the system maintains a separate inverted index for each of the above-described time-specific buckets that stores events for a specific time range. A bucket-specific inverted index includes entries for specific field-value combinations that occur in events in the specific bucket. Alternatively, the system can maintain a separate inverted index for each indexer. The indexer-specific inverted index includes entries for the events in a data store that are managed by the specific indexer. Indexer-specific inverted indexes may also be bucket-specific. In at least one or more embodiments, if one or more of the queries is a stats query, each indexer may generate a partial result set from previously generated summarization information. The partial result sets may be returned to the search head that received the query and combined into a single result set for the query As mentioned above, the inverted index can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination. In some embodiments, if summarization information is absent from an indexer that includes responsive event records, further actions may be taken, such as, the summarization information may generated on the fly, warnings may be provided the user, the collection query operation may be halted, the absence of summarization information may be ignored, or the like, or combination thereof.

In one or more embodiments, an inverted index may be set up to update continually. For example, the query may ask for the inverted index to update its result periodically, e.g., every hour. In such instances, the inverted index may be a dynamic data structure that is regularly updated to include information regarding incoming events.

In some cases, e.g., where a query is executed before an inverted index updates, when the inverted index may not cover all of the events that are relevant to a query, the system can use the inverted index to obtain partial results for the events that are covered by inverted index, but may also have to search through other events that are not covered by the inverted index to produce additional results on the fly. In other words, an indexer would need to search through event data on the data store to supplement the partial results. These additional results can then be combined with the partial results to produce a final set of results for the query. Note that in typical instances where an inverted index is not completely up to date, the number of events that an indexer would need to search through to supplement the results from the inverted index would be relatively small. In other words, the search to get the most recent results can be quick and efficient because only a small number of event records will be searched through to supplement the information from the inverted index. The inverted index and associated techniques are described in more detail in U.S. Pat. No. 8,682, 925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.13.4 Extracting Event Data Using Posting Values

In one or more embodiments, if the system needs to process all events that have a specific field-value combination, the system can use the references in the inverted index entry to directly access the events to extract further information without having to search all of the events to find the specific field-value combination at search time. In other words, the system can use the reference values to locate the associated event data in the field searchable data store and extract further information from those events, e.g., extract further field values from the events for purposes of filtering or processing or both.

The information extracted from the event data using the reference values can be directed for further filtering or processing in a query using the pipeline search language. The pipelined search language will, in one embodiment, include syntax that can direct the initial filtering step in a query to an inverted index. In one embodiment, a user would include syntax in the query that explicitly directs the initial searching or filtering step to the inverted index.

Referencing the example in FIG. 15, if the user determines that she needs the user id fields associated with the client requests from IP address "127.0.0.1," instead of incurring the computational overhead of performing a brand new search or re-generating the inverted index with an additional field, the user can generate a query that explicitly directs or pipes the contents of the already generated inverted index 1502 to another filtering step requesting the user ids for the entries in inverted index 1502 where the server response time is greater than "0.0900" microseconds. The search engine would use the reference values stored in inverted index 722 to retrieve the event data from the field searchable data store, filter the results based on the "response time" field values and, further, extract the user id field from the resulting event data to return to the user. In the present instance, the user ids "frank" and "carlos" would be returned to the user from the generated results table 722.

In one embodiment, the same methodology can be used to pipe the contents of the inverted index to a processing step. In other words, the user is able to use the inverted index to efficiently and quickly perform aggregate functions on field values that were not part of the initially generated inverted index. For example, a user may want to determine an average object size (size of the requested gif) requested by clients from IP address "127.0.0.1." In this case, the search engine would again use the reference values stored in inverted index 722 to retrieve the event data from the field searchable data store and, further, extract the object size field values from the associated events 731, 732, 733 and 734. Once, the corresponding object sizes have been extracted (i.e. 2326, 2900, 2920, and 5000), the average can be computed and returned to the user.

In one embodiment, instead of explicitly invoking the inverted index in a user-generated query, e.g., by the use of special commands or syntax, the SPLUNK® ENTERPRISE system can be configured to automatically determine if any prior-generated inverted index can be used to expedite a user query. For example, the user's query may request the average object size (size of the requested gif) requested by clients from IP address "127.0.0.1." without any reference to or use of inverted index 722. The search engine, in this case, would automatically determine that an inverted index 722 already exists in the system that could expedite this query. In one embodiment, prior to running any search comprising a field-value pair, for example, a search engine may search though all the existing inverted indexes to determine if a pre-generated inverted index could be used to expedite the search comprising the field-value pair. Accordingly, the search engine would automatically use the pre-generated inverted index, e.g., index 722 to generate the results without any user-involvement that directs the use of the index.

Using the reference values in an inverted index to be able to directly access the event data in the field searchable data store and extract further information from the associated event data for further filtering and processing is highly advantageous because it avoids incurring the computation overhead of regenerating the inverted index with additional fields or performing a new search.

The data intake and query system includes one or more forwarders that receive raw machine data from a variety of input data sources, and one or more indexers that process and store the data in one or more data stores. By distributing events among the indexers and data stores, the indexers can analyze events for a query in parallel. In one or more embodiments, a multiple indexer implementation of the search system would maintain a separate and respective inverted index for each of the above-described time-specific buckets that stores events for a specific time range. A bucket-specific inverted index includes entries for specific field-value combinations that occur in events in the specific bucket. As explained above, a search head would be able to correlate and synthesize data from across the various buckets and indexers.

This feature advantageously expedites searches because instead of performing a computationally intensive search in a centrally located inverted index that catalogues all the relevant events, an indexer is able to directly search an inverted index stored in a bucket associated with the time-range specified in the query. This allows the search to be performed in parallel across the various indexers. Further, if the query requests further filtering or processing to be conducted on the event data referenced by the locally stored bucket-specific inverted index, the indexer is able to simply access the event records stored in the associated bucket for further filtering and processing instead of needing to access a central repository of event records, which would dramatically add to the computational overhead.

In one embodiment, there may be multiple buckets associated with the time-range specified in a query. If the query is directed to an inverted index, or if the search engine automatically determines that using an inverted index would expedite the processing of the query, the indexers will search through each of the inverted indexes associated with the buckets for the specified time-range. This feature allows the High Performance Analytics Store to be scaled easily.

In certain instances, where a query is executed before a bucket-specific inverted index updates, when the bucket-specific inverted index may not cover all of the events that are relevant to a query, the system can use the bucket-specific inverted index to obtain partial results for the events that are covered by bucket-specific inverted index, but may also have to search through the event data in the bucket associated with the bucket-specific inverted index to produce additional results on the fly. In other words, an indexer would need to search through event data stored in the bucket (that was not yet processed by the indexer for the corresponding inverted index) to supplement the partial results from the bucket-specific inverted index.

Figure 7D:
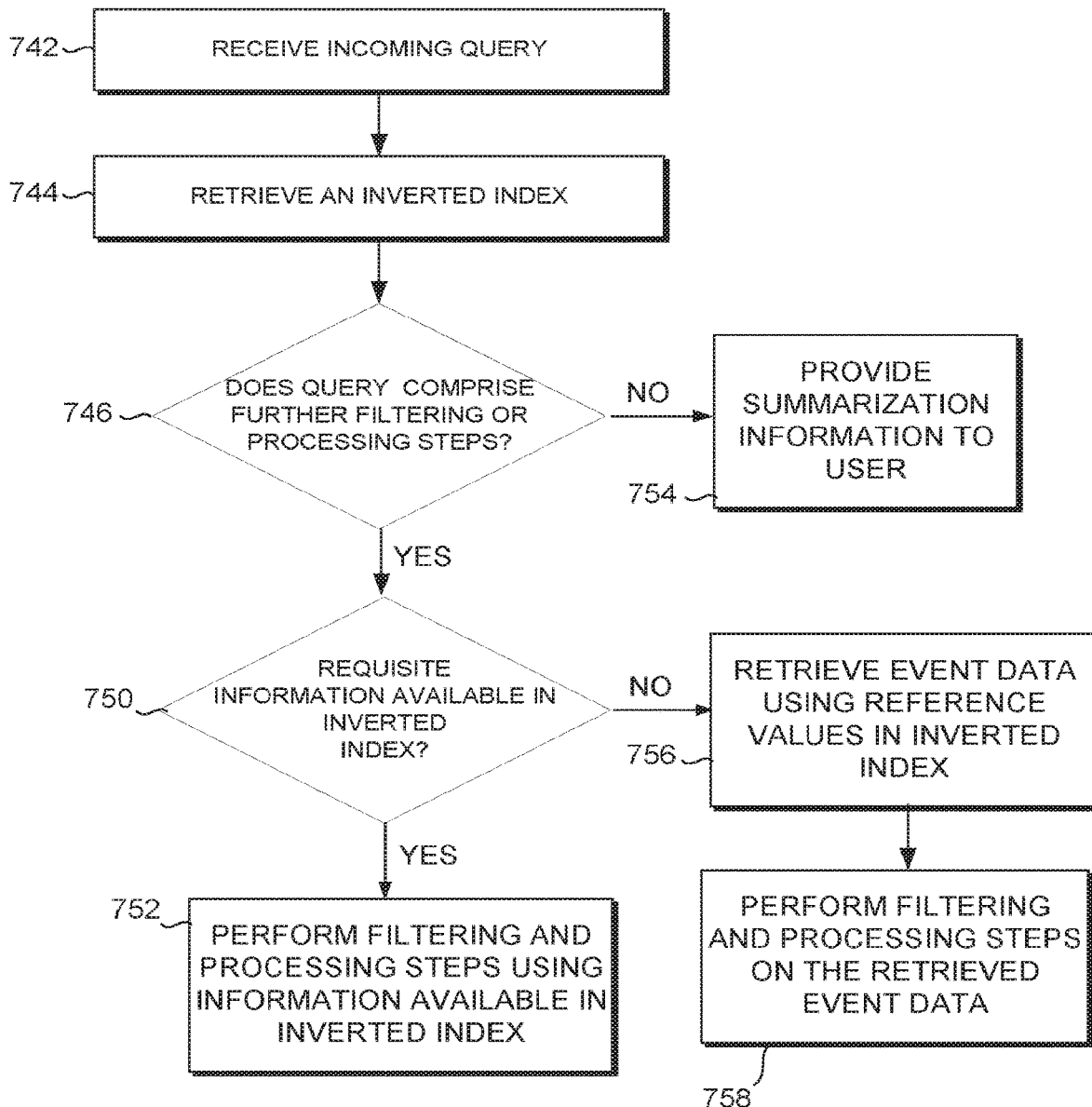
FIG. 7D depicts a flowchart of example use of an inverted index in a pipelined search query, in accordance with example embodiments.

FIG. 7D presents a flowchart illustrating how an inverted index in a pipelined search query can be used to determine a set of event data that can be further limited by filtering or processing in accordance with the disclosed embodiments.

At block 742, a query is received by a data intake and query system. In some embodiments, the query can be received as a user generated query entered into a search bar of a graphical user search interface. The search interface also includes a time range control element that enables specification of a time range for the query.

At block 744, an inverted index is retrieved. Note, that the inverted index can be retrieved in response to an explicit user search command inputted as part of the user generated query. Alternatively, the search engine can be configured to automatically use an inverted index if it determines that using the inverted index would expedite the servicing of the user generated query. Each of the entries in an inverted index keeps track of instances of a specific value in a specific field in the event data and includes references to events containing the specific value in the specific field. In order to expedite queries, in most embodiments, the search engine will employ the inverted index separate from the raw record data store to generate responses to the received queries.

At block 746, the query engine determines if the query contains further filtering and processing steps. If the query contains no further commands, then, in one embodiment, summarization information can be provided to the user at block 754.

If, however, the query does contain further filtering and processing commands, then at block 750, the query engine determines if the commands relate to further filtering or processing of the data extracted as part of the inverted index or whether the commands are directed to using the inverted index as an initial filtering step to further filter and process event data referenced by the entries in the inverted index. If the query can be completed using data already in the generated inverted index, then the further filtering or processing steps, e.g., a "count" number of records function, "average" number of records per hour etc. are performed and the results are provided to the user at block 752.

If, however, the query references fields that are not extracted in the inverted index, then the indexers will access event data pointed to by the reference values in the inverted index to retrieve any further information required at block 756. Subsequently, any further filtering or processing steps are performed on the fields extracted directly from the event data and the results are provided to the user at step 758.

2.13.5 Accelerating Report Generation

In some embodiments, a data server system such as the data intake and query system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on these additional events. Then, the results returned by this query on the additional events, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer events needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety for all purposes.

The data intake and query system provides various schemas, dashboards, and visualizations that simplify developers' tasks to create applications with additional capabilities. One such application is the an enterprise security application, such as SPLUNK® ENTERPRISE SECURITY, which performs monitoring and alerting operations and includes analytics to facilitate identifying both known and unknown security threats based on large volumes of data stored by the data intake and query system. The enterprise security application provides the security practitioner with visibility into security-relevant threats found in the enterprise infrastructure by capturing, monitoring, and reporting on data from enterprise security devices, systems, and applications. Through the use of the data intake and query system searching and reporting capabilities, the enterprise security application provides a top-down and bottom-up view of an organization's security posture.

The enterprise security application leverages the data intake and query system search-time normalization techniques, saved searches, and correlation searches to provide visibility into security-relevant threats and activity and generate notable events for tracking. The enterprise security application enables the security practitioner to investigate and explore the data to find new or unknown threats that do not follow signature-based patterns.

Conventional Security Information and Event Management (SIEM) systems lack the infrastructure to effectively store and analyze large volumes of security-related data. Traditional SIEM systems typically use fixed schemas to extract data from pre-defined security-related fields at data ingestion time and store the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the enterprise security application system stores large volumes of minimally-processed security-related data at ingestion time for later retrieval and analysis at search time when a live security threat is being investigated. To facilitate this data retrieval process, the enterprise security application provides pre-specified schemas for extracting relevant values from the different types of security-related events and enables a user to define such schemas.

The enterprise security application can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. Pat. No. 9,215,240, entitled "INVESTIGATIVE AND DYNAMIC DETECTION OF POTENTIAL SECURITY-THREAT INDICATORS FROM EVENTS IN BIG DATA", issued on 15 Dec. 2015, U.S. Pat. No. 9,173,801, entitled "GRAPHIC DISPLAY OF SECURITY THREATS BASED ON INDICATIONS OF ACCESS TO NEWLY REGISTERED DOMAINS", issued on 3 Nov. 2015, U.S. Pat. No. 9,248,068, entitled "SECURITY THREAT DETECTION OF NEWLY REGISTERED DOMAINS", issued on 2 Feb. 2016, U.S. Pat. No. 9,426,172, entitled "SECURITY THREAT DETECTION USING DOMAIN NAME ACCESSES", issued on 23 Aug. 2016, and U.S. Pat. No. 9,432,396, entitled "SECURITY THREAT DETECTION USING DOMAIN NAME REGISTRATIONS", issued on 30 Aug. 2016, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the enterprise security application facilitates detecting "notable events" that are likely to indicate a security threat. A notable event represents one or more anomalous incidents, the occurrence of which can be identified based on one or more events (e.g., time stamped portions of raw machine data) fulfilling pre-specified and/or dynamically-determined (e.g., based on machine-learning) criteria defined for that notable event. Examples of notable events include the repeated occurrence of an abnormal spike in network usage over a period of time, a single occurrence of unauthorized access to system, a host communicating with a server on a known threat list, and the like. These notable events can be detected in a number of ways, such as: (1) a user can notice a correlation in events and can manually identify that a corresponding group of one or more events amounts to a notable event; or (2) a user can define a "correlation search" specifying criteria for a notable event, and every time one or more events satisfy the criteria, the application can indicate that the one or more events correspond to a notable event; and the like. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 17A:
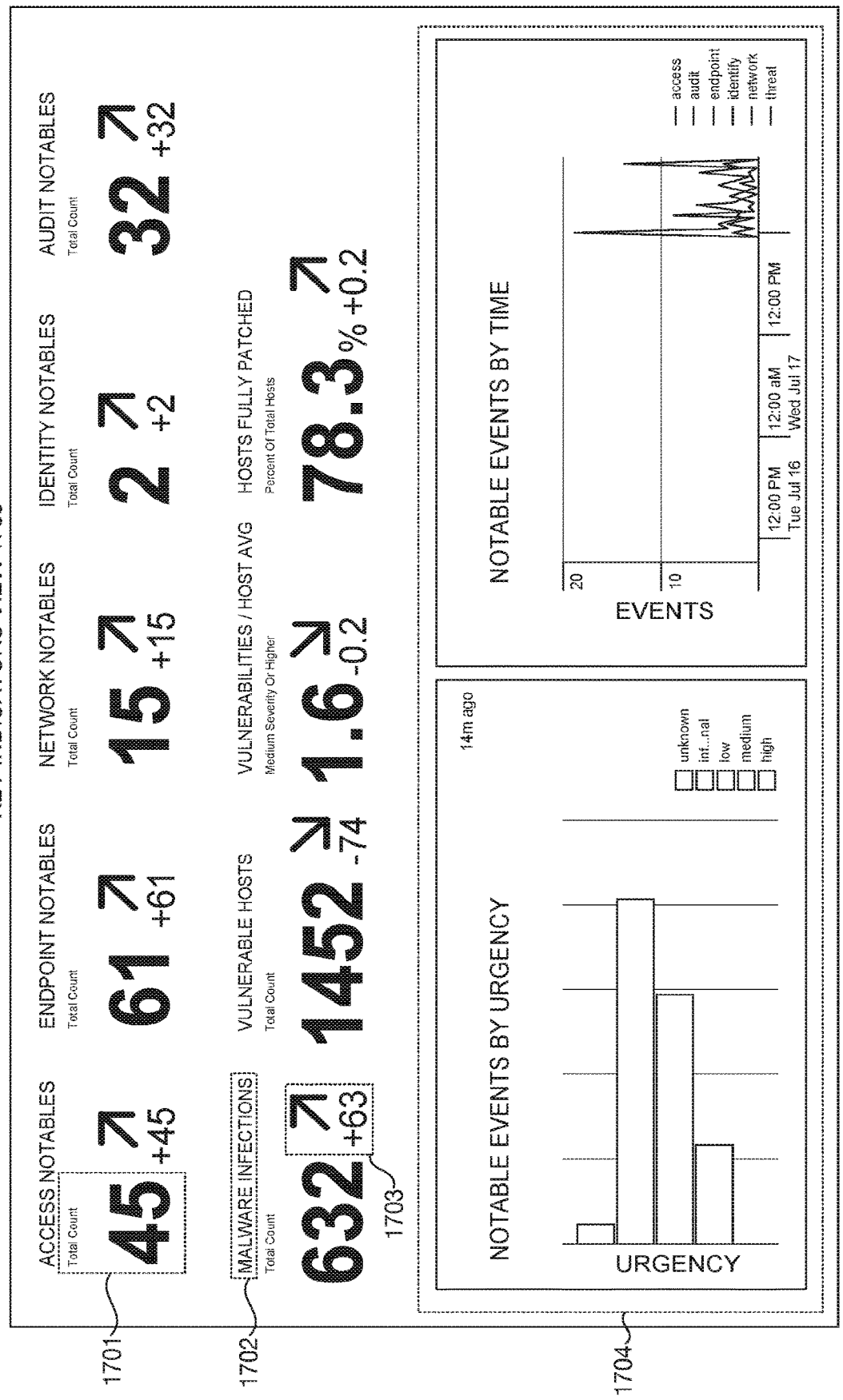
FIG. 17A is an interface diagram of an example user interface of a key indicators view, in accordance with example embodiments.

The enterprise security application provides various visualizations to aid in discovering security threats, such as a "key indicators view" that enables a user to view security metrics, such as counts of different types of notable events. For example, FIG. 17A illustrates an example key indicators view 1700 that comprises a dashboard, which can display a value 1701, for various security-related metrics, such as malware infections 1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 17B:
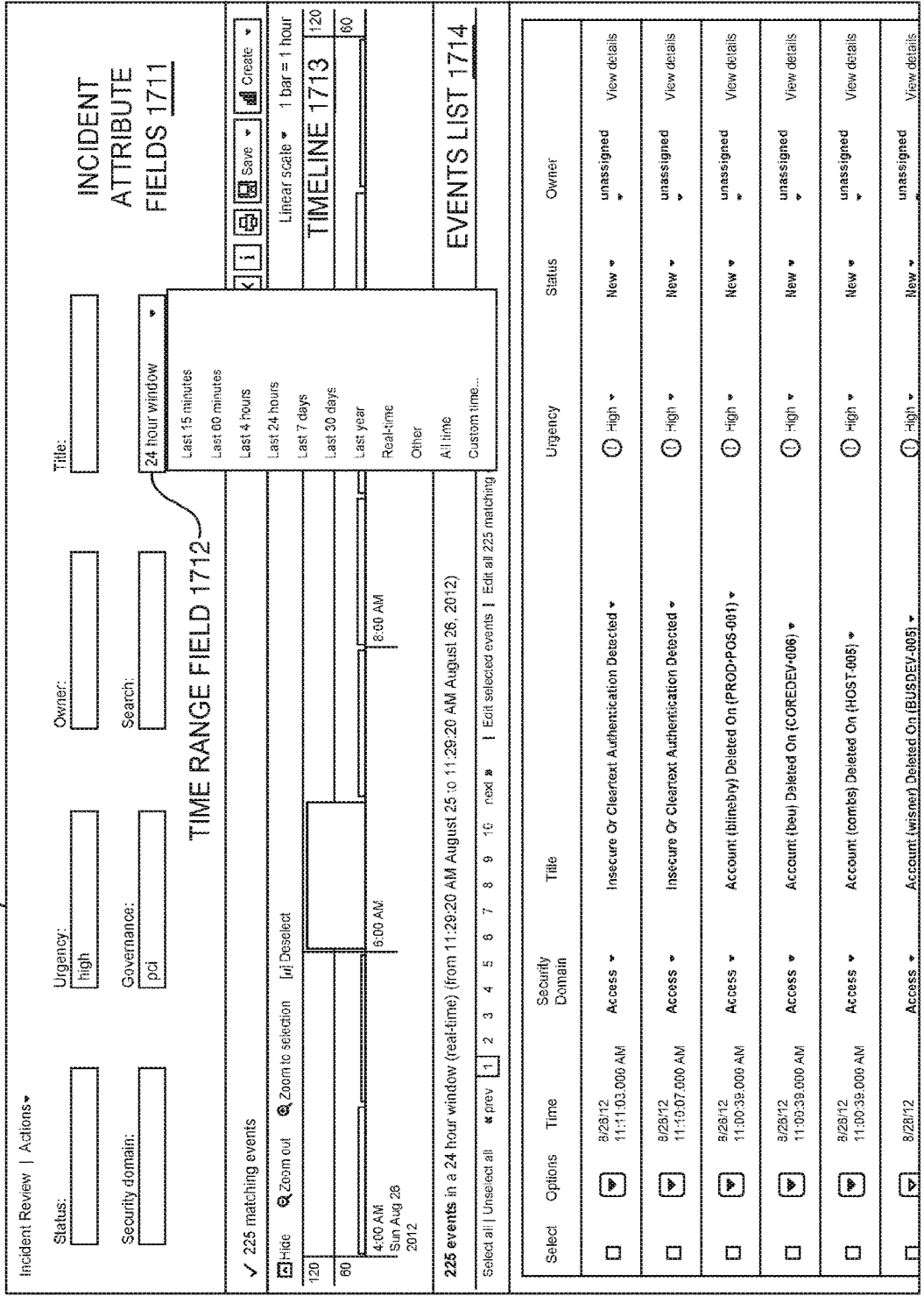
FIG. 17B is an interface diagram of an example user interface of an incident review dashboard, in accordance with example embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 17B illustrates an example incident review dashboard 1710 that includes a set of incident attribute fields 1711 that, for example, enables a user to specify a time range field 1712 for the displayed events. It also includes a timeline 1713 that graphically illustrates the number of incidents that occurred in time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.14 Data Center Monitoring

As mentioned above, the data intake and query platform provides various features that simplify the developers' task to create various applications. One such application is a virtual machine monitoring application, such as SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the virtual machine monitoring application stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, California. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the virtual machine monitoring application provides pre-specified schemas for extracting relevant values from different types of performance-related events, and also enables a user to define such schemas.

Figure 17C:
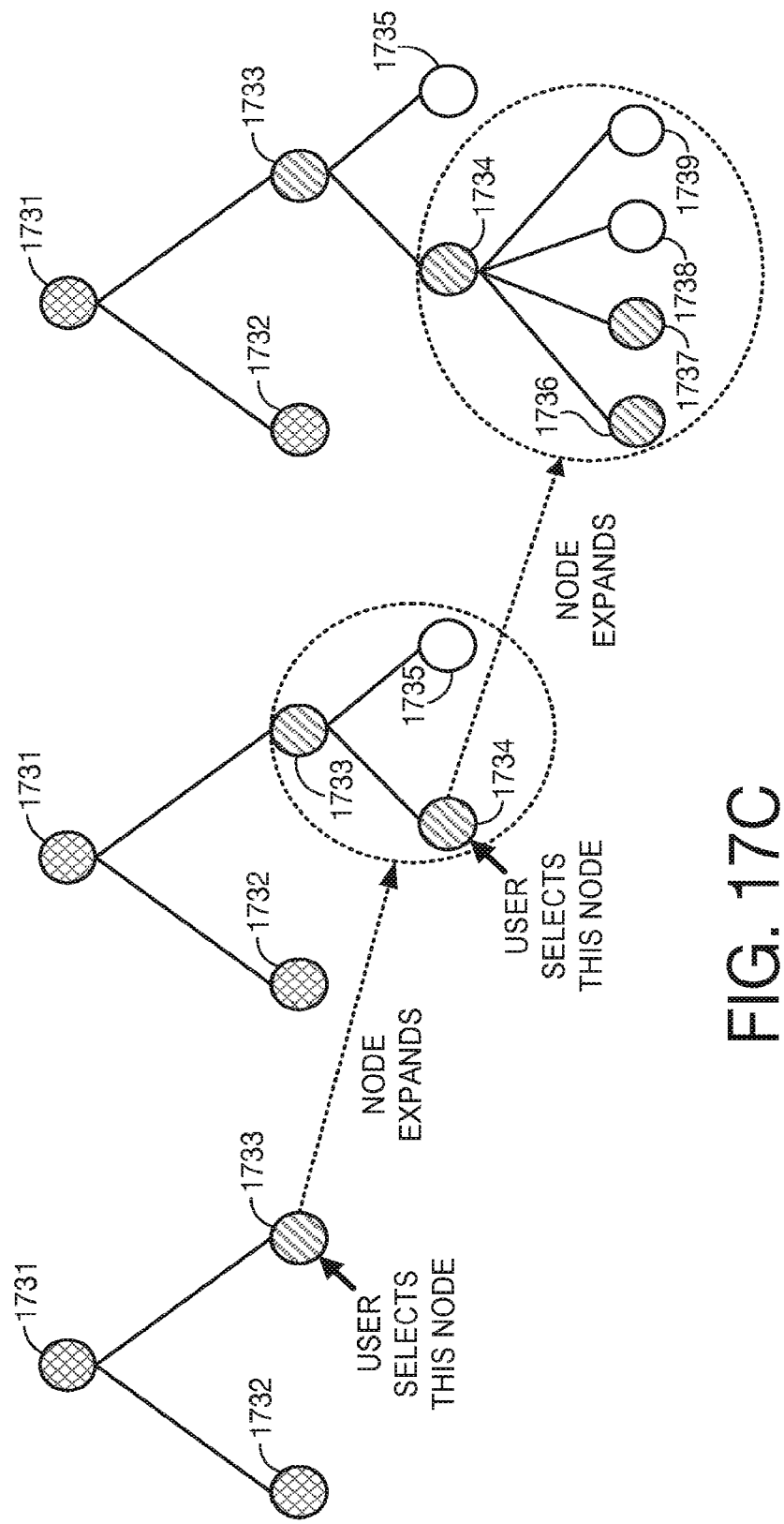
FIG. 17C is a tree diagram of an example a proactive monitoring tree, in accordance with example embodiments.

The virtual machine monitoring application additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 17C, wherein nodes 1733 and 1734 are selectively expanded. Note that nodes 1731-1739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. Pat. No. 9,185,007, entitled "PROACTIVE MONITORING TREE WITH SEVERITY STATE SORTING", issued on 10 Nov. 2015, and U.S. Pat. No. 9,426,045, also entitled "PROACTIVE MONITORING TREE WITH SEVERITY STATE SORTING", issued on 23 Aug. 2016, each of which is hereby incorporated by reference in its entirety for all purposes.

Figure 17D:
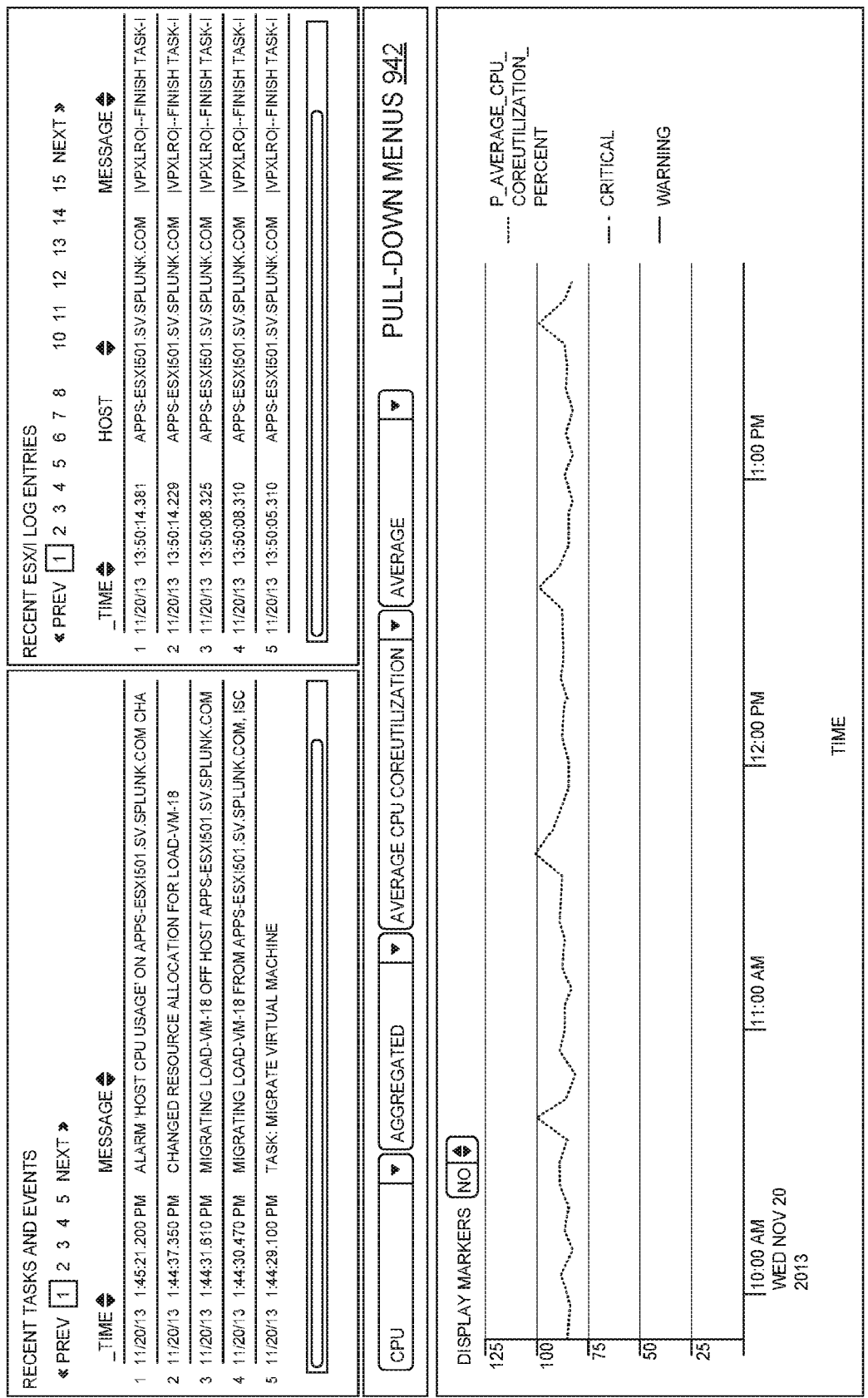
FIG. 17D is an interface diagram of an example a user interface displaying both log data and performance data, in accordance with example embodiments.

The virtual machine monitoring application also provides a user interface that enables a user to select a specific time range and then view heterogeneous data comprising events, log data, and associated performance metrics for the selected time range. For example, the screen illustrated in FIG. 17D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.15 Cloud-Based Architecture

As shown in the previous figures, various embodiments may refer to a data intake and query system 108 that includes one or more of a search head 210, an indexer 206, and a forwarder 204. In other implementations, data intake and query system 108 may have a different architecture, but may carry out indexing and searching in a way that is indistinguishable or functionally equivalent from the perspective of the end user. For example, data intake and query system 108 may be re-architected to run in a stateless, containerized environment. In some of these embodiments, data intake and query system 108 may be run in a computing cloud provided by a third party, or provided by the operator of the data intake and query system 108. This type of cloud-based data intake and query system may have several benefits, including, but not limited to, lossless data ingestion, more robust disaster recovery, and faster or more efficient processing, searching, and indexing. A cloud-based data intake and query system as described in this section may provide separately scalable storage resources and compute resources, or separately scalable search and index resources. Additionally, the cloud-based data intake and query system may allow for applications to be developed on top of the data intake and query system, to extend or enhance functionality, through a gateway layer or one or more Application Programming Interfaces (APIs), which may provide customizable access control or targeted exposure to the workings of data intake and query system 108.

In some embodiments, a cloud-based data intake and query system may include an intake system. Such an intake system can include, but is not limited to an intake buffer, such as Apache Kafka (R) or Amazon Kinesis (R), or an extensible compute layer, such as Apache Spark (TM) or Apache Flink (R). In some embodiments, the search function and the index function may be separated or containerized, so that search functions and index functions may run or scale independently. In some embodiments, data that is indexed may be stored in buckets, which may be stored in a persistent storage once certain bucket requirements have been met, and retrieved as needed for searching. In some embodiments, the search functions and index functions run in stateless containers, which may be coordinated by an orchestration platform. These containerized search and index functions may retrieve data needed to carry out searching and indexing from the buckets or various other services that may also run in containers, or within other components of the orchestration platform. In this manner, loss of a single container, or even multiple containers, does not result in data loss, because the data can be quickly recovered from the various services or components or the buckets in which the data is persisted.

In some embodiments, the cloud-based data intake and query system may implement tenant-based and user-based access control. In some embodiments, the cloud-based data intake and query system may implement an abstraction layer, through a gateway portal, an API, or some combination thereof, to control or limit access to the functionality of the cloud-based data intake and query system.

3. Extended Reality Overlays In An Industrial Environment

As described above, one problem with the conventional approaches for monitoring and/or servicing machines in a particular operating environment is that a user may have difficulty locating a physical machine for which information is sought. Additionally, once a user has located a particular machine, the user may not be able to determine a status of that machine.

Accordingly, in various embodiments disclosed herein, optical data markers may be implemented to enable machines to be quickly and reliably identified. Further, data stored in association with an optical data marker may be used to overlay relevant information onto the machine. Alternatively, if an optical data marker is unavailable for a particular machine, a geofence in which the machine is located may be determined. The machine may then be identified based on a listing of known machines included in the geofence as well as based on visual and/or auditory data that is acquired from the machine. These techniques are described below in further detail in conjunction with FIGS. 18A-18B.

3.1 Optical Data Marker-Based Extended Reality Techniques

Figure 18A:
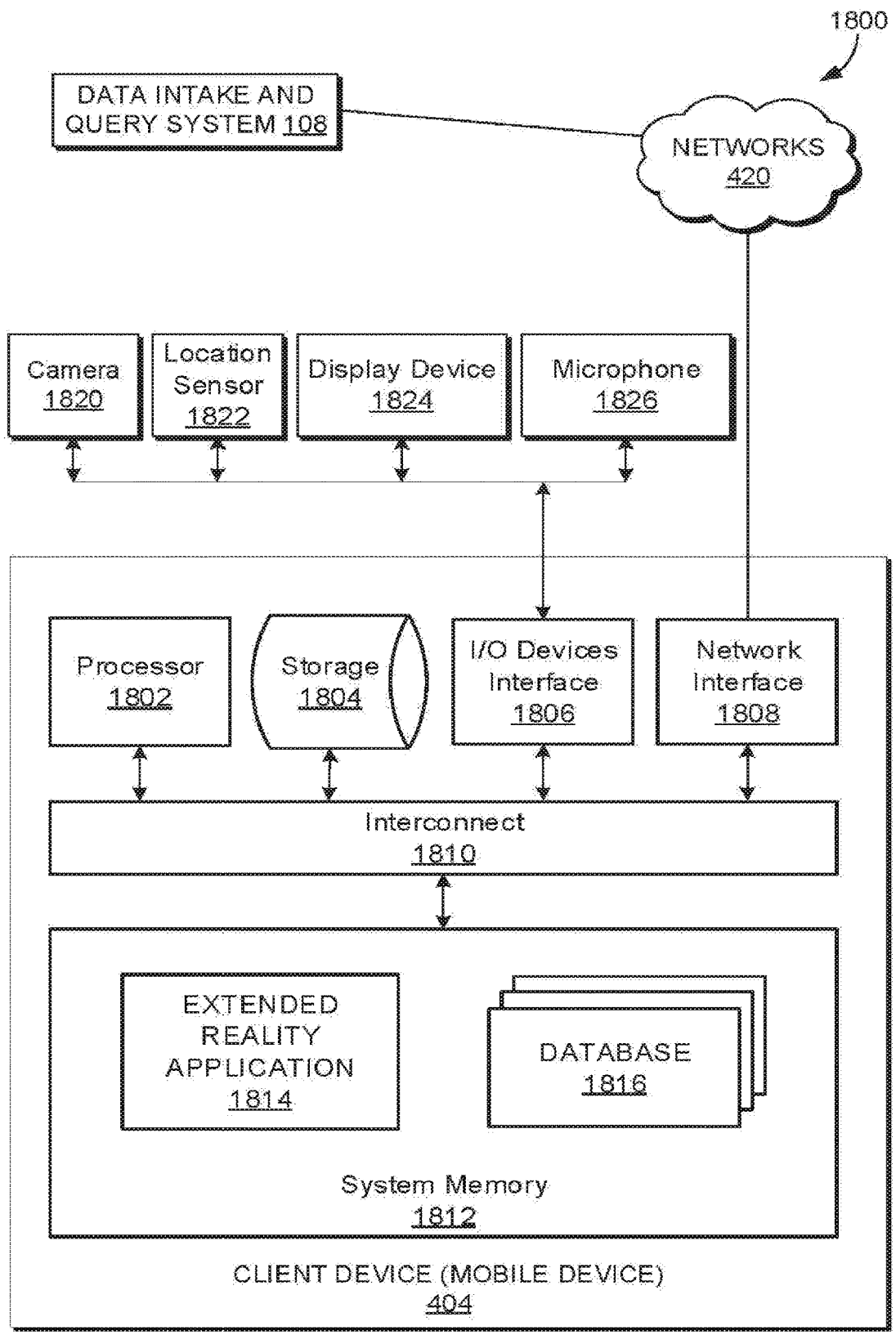
FIG. 18A illustrates a more detailed view of the example system of FIG. 4, in accordance with example embodiments.

FIG. 18A illustrates a more detailed view of the example networked computer environment 100 of FIG. 1, in accordance with example embodiments. As shown, the networked computer environment 1800 may include, without limitation, a data intake and query system 108, and a client device 404 (also referred to herein as a mobile device) communicating with one another over one or more networks 420. The data intake and query system 108 and client device 404 function substantially the same as described in conjunction with FIGS. 1 and 4, except as further described herein. Examples of client devices 404 may include, without limitation, smartphones, tablet computers, handheld computers, wearable devices, laptop computers, desktop computers, servers, portable media players, gaming devices, and so forth. The client device 404 may include, without limitation, a processor 1802, storage 1804, an input/output (I/O) device interface 1806, a network interface 1808, an interconnect 1810, and a system memory 1812.

In general, processor 1802 may retrieve and execute programming instructions stored in system memory 1812. Processor 1802 may be any technically feasible form of processing device configured to process data and execute program code. Processor 1802 could be, for example, a central processing unit (CPU), a graphics processing unit (GPU), an application-specific integrated circuit (ASIC), a field-programmable gate array (FPGA), and so forth. Processor 1802 stores and retrieves application data residing in the system memory 1812. Processor 1802 is included to be representative of a single CPU, multiple CPUs, a single CPU having multiple processing cores, and the like. In operation, processor 1802 is the master processor of the client device 404, controlling and coordinating operations of other system components. System memory 1812 stores software application programs and data for use by processor 1802. Processor 1802 executes software application programs stored within system memory 1812 and optionally an operating system. In particular, processor 1802 executes software and then performs one or more of the functions and operations set forth in the present application.

The storage 1804 may be a disk drive storage device. Although shown as a single unit, the storage 1804 may be a combination of fixed and/or removable storage devices, such as fixed disc drives, floppy disc drives, tape drives, removable memory cards, or optical storage, network attached storage (NAS), or a storage area-network (SAN). Processor 1802 communicates to other computing devices and systems via network interface 1808, where network interface 1808 is configured to transmit and receive data via one or more communications networks 420.

The interconnect 1810 facilitates transmission, such as of programming instructions and application data, between the processor 1802, input/output (I/O) devices interface 1806, storage 1804, network interface 1808, and system memory 1812. The I/O devices interface 1806 is configured to receive input data from user I/O devices. These I/O devices include, without limitation, camera(s) 1820, location sensor(s) 1822, a display device 1824, and microphone(s) 1826. Display device 1824 generally represents any technically feasible means for generating an image for display. For example, the display device may be a liquid crystal display (LCD) display, organic light emitting diode (OLED) display, or DLP display. Camera 1820 acquires images via a lens and converts the images into digital form. The images acquired by the camera 1820 may be stored in storage 1804 and/or system memory 1812. An acquired image may be displayed on the display device 1824, either alone or in conjunction with one or more other acquired images, graphical overlays, and/or other data.

Location sensor 1822 enables client device 404 to determine the physical location and orientation of client device 404. In some embodiments, location sensor 1822 may include a network-based sensor that communicates with data intake and query system 108 via one or more network(s) 420, which may be part of a production monitoring network. In some embodiments, location sensor 1822 may include a network-based sensor that communicates with one or more data intake and query systems via a local area network and/or a wide area network. In various embodiments, the production monitoring environment may include multiple machines and/or multiples client devices 404, each of which may communicate with a data intake and query system and each of which is capable of identifying one or more machines based on optical data markers, geofences, and/or any other machine identification technique disclosed herein. Microphone 1826 acquires audio signals for storage and analysis. Additional examples of user I/O devices (not explicitly shown) may include one or more buttons, a keyboard, and a mouse or other pointing device. The I/O devices interface 1806 may also include an audio output unit configured to generate an electrical audio output signal, and the additional user I/O devices may further include a speaker configured to generate an acoustic output in response to the electrical audio output signal.

The system memory 1812 may include, without limitation, an extended reality application 1814 and a database 1816. Processor 1802 executes the extended reality application 1814, to perform one or more of the techniques disclosed herein and to store data in and retrieve data from database 1816.

Figure 18B:
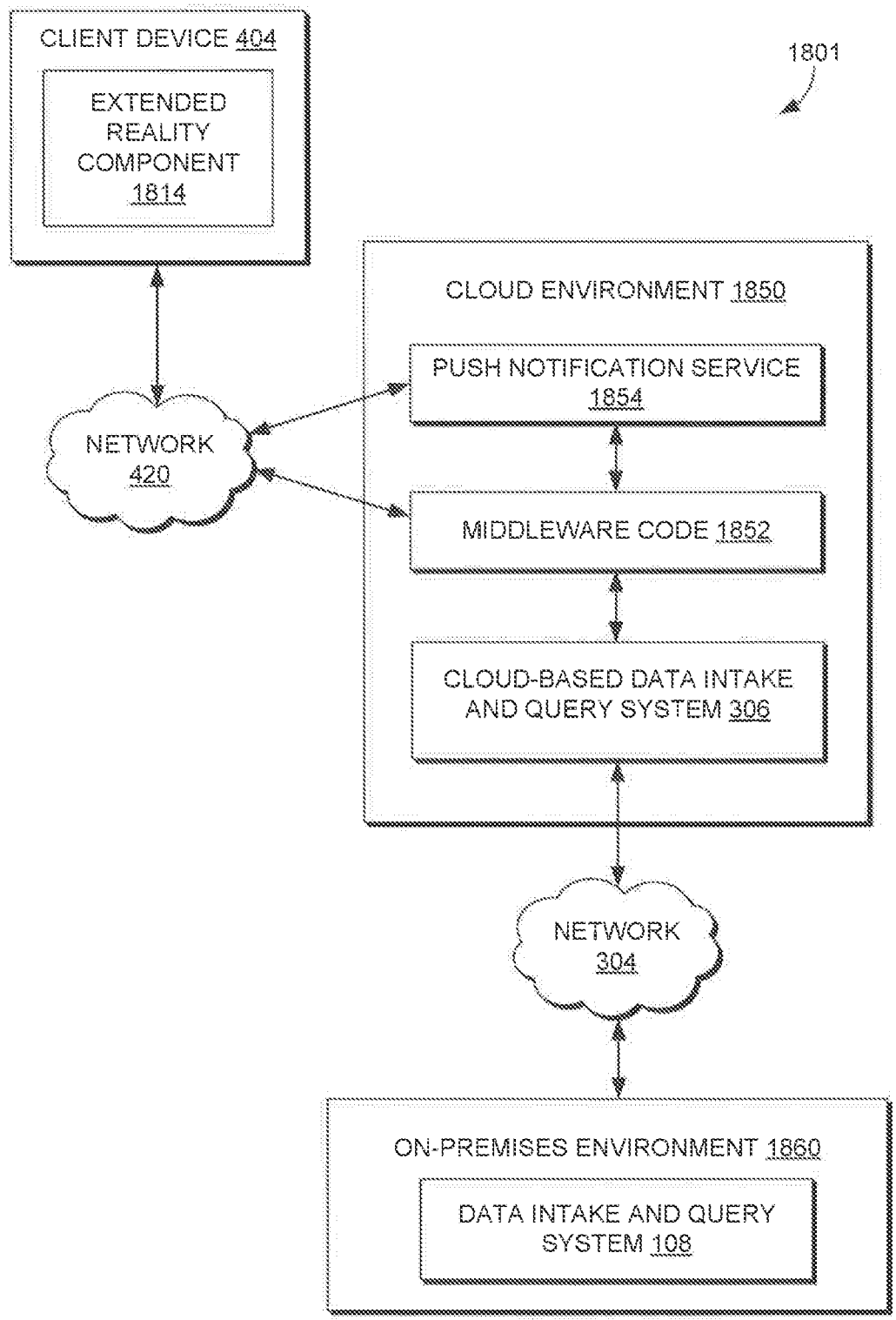
FIG. 18B illustrates a network architecture that enables secure communications between extended reality application and an on-premises environment for data intake and query system, in accordance with example embodiments.

FIG. 18B illustrates a network architecture 1801 that enables secure communications between extended reality application 1814 and an on-premises environment 1860 for data intake and query system 108, in accordance with example embodiments. As described above, a user may install and configure, on computing devices owned and operated by the user, one or more software applications that implement some or all of the data intake and query system 108. For example, a user may install a software application on server computers owned by the user and configure each server to operate as one or more of a forwarder, an indexer, a search head, etc. This arrangement generally may be referred to as an "on-premises" solution. An on-premises solution may provide a greater level of control over the configuration of certain aspects of the system (e.g., security, privacy, standards, controls, etc.).

Implementing data intake and query system 108 in an on-premises environment 1860 may present various challenges. For example, enabling instances of extended reality application 1814 executing on client devices 404 to securely communicate with data intake and query system 108 may require the on-premises environment 1860 to allow mobile applications to bypass a firewall, which may create security concerns. Accordingly, in various embodiments, cloud-based data intake and query system 306 executing in cloud environment 1850 may serve as a secure bridge between extended reality application 1814 and an on-premises environment 1860. In other implementations, the on-premises environment 1860 may be omitted and the entire computational process may be carried out in one or more aspects or components of cloud environment 1850.

As shown in FIG. 18B, cloud environment 1850 may include cloud-based data intake and query system 306, which communicates with data intake and query system 108 via network 304. Cloud environment 1850 may further include middleware code 1852 and/or push notification service 1854, which communicate with extended reality application 1814 via network 420. In various embodiments, network 304 and network 420 may be the same network or may include one or more shared network components that communicate with both network 304 and network 420.

In operation, extended reality application 1814 executing on client device 404 may establish secure, bidirectional communications with data intake and query system 108. For example, in some embodiments, a persistent, always-open, asynchronous socket for bidirectional communications (e.g., a WebSocket connection) through a firewall of on-premises environment 1860 could be established between data intake and query system 108 and cloud-based data intake and query system 306. Cloud-based data intake and query system 306 may then communicate with extended reality application 1814 via middleware code 1852 executing in cloud environment 1850. Additionally, in some embodiments, cloud-based data intake and query system 306 and/or middleware code 1852 may communicate with extended reality application 1814 via a push notification service 1854, such as Apple Push Notification service (APNs) or Google Cloud Messaging (GCM). For example, data intake and query system 108 could output, to one or more client devices 404, various schemas, dashboards, playbooks, runbooks, cards, and/or visualizations that include real-time data associated with a particular machine. The schemas, dashboards, cards, and/or visualizations may then be overlaid with the real-world component by extended reality application 1814 in conjunction with an optional mobile template, as discussed below in further detail. Additionally or alternatively, playbooks and/or runbooks that include set of commands and/or simple logic trees (e.g., if-then-else) associated with an object and possible actions (e.g., "if the operating temperature is above 100 degrees celsius, then show options for activating fans) may be implemented and/or displayed to the user.

In some embodiments, in order to authenticate an instance of extended reality application 1814 associated with a particular user and/or client device 404, extended reality application 1814 may cause a unique identifier associated with the user and/or client device 404 to be displayed on a display device (e.g., on a display of client device 404). The user may then register the unique identifier with cloud-based data intake and query system 306 and/or data intake and query system 108, such as by entering the unique identifier into a user interface (e.g., a web portal) associated with cloud-based data intake and query system 306 or data intake and query system 108. In response, the extended reality application 1814 may receive credentials that can be used to access real-time data outputted by data intake and query system 108. Additional queries transmitted by client device 404 to data intake and query system 108 may then implement the credentials associated with the unique identifier. In this manner, secure, bidirectional communications may be established between client device 404 and data intake and query system 108.

Once the communications connection is established, a technician points a camera 1820 of client device 404 towards one or more machines that include optical data markers, such as quick response (QR) codes and bar codes. Extended reality application 1814 receives a digital image acquired via a camera 1820 associated with client device 404. Extended reality application 1814 then detects optical data markers present in the digital image. For example, extended reality application 1814 could detect a single optical data marker or could concurrently detect multiple optical data markers present in the digital image. Extended reality application 1814 then decodes the detected optical data markers and identifies the machines that are associated with the decoded optical data markers. More specifically, extended reality application 1814 decodes the detected optical data markers and retrieves a unique identifier (UID) from each optical data marker. In some embodiments, the unique identifier may identify a corresponding machine or other object. In some embodiments, the unique identifier may not specifically identify a corresponding machine or other object. In these embodiments, extended reality application 1814 and/or data intake and query system 108 may associate the unique identifier retrieved from the optical data marker with the machine or other object.

Further, extended reality application 1814 may determine the size, three-dimensional position, and/or orientation of the optical data marker. The size of the optical data marker may be a fixed size known to extended reality application 1814. Additionally or alternatively, the size of the optical data marker may be encoded into the data of the optical data marker. Further, extended reality application 1814 may detect the plane in which the optical data marker resides. As further described herein, extended reality application 1814 could then apply the size, position, orientation, and/or plane detection information to correctly scale, position, and orient the AR overlay associated with the optical data marker.

Next, extended reality application 1814 transmits queries to data intake and query system 108 requesting values for metrics associated with the identified machines. In response, data intake and query system 108 may retrieve events associated with the identified machines and use extraction rules to extract values for fields in the events being searched, where the extracted values include the requested metric values. Then, data intake and query system 108 transmits the field values associated with the identified machines to extended reality application 1814. Data intake and query system 108 may transmit the raw data retrieved from the field values included in the event data. Alternatively, data intake and query system 108 may filter, aggregate, or otherwise process the raw data prior to transmitting the field values.

The field values transmitted by data intake and query system 108 may be in any technically feasible format. In one example, the field values could include an augmented reality (AR) overlay. The AR overlay could be a full graphics overlay or a partial overlay. The AR overlay could include text data, numerical data, and/or color information. The AR overlay could further include icon data, such as a skull and crossbones symbol for a machine that has failed. The AR overlay could include a highlighted portion, signifying information of particular interest to the technician. Further, the field values could include only the underlying textual and/or numerical information, where extended reality application 1814 generates the AR overlay locally based on the underlying textual and/or numerical information. The AR overlay can be static or dynamically updated. In some implementations, the AR overlay can include interactive hooks to allow an operator of the system to interact with the AR overlay.

Although various embodiments disclosed herein are described in conjunction with augmented reality (AR) techniques (e.g., generating AR overlays), each augmented reality technique also may be implemented in a virtual reality (VR) environment. Likewise, each virtual reality (VR) technique disclosed herein also may be implemented in an augmented reality (AR) environment. For example, for clarity of explanation, various embodiments disclosed herein are described in conjunction with AR overlays. However, each of these embodiments could also be implemented by generating such overlays (e.g., field values, images, dashboards, cards, etc.) in a virtual reality (VR) environment. Accordingly, the term extended reality (XR) is sometimes used to refer to techniques that can be performed in an augmented reality (AR) reality environment, a virtual reality (VR) environment, and/or any combination thereof.

Extended reality application 1814 then receives the field values from data intake and query system 108, where the field values represent the values of one or more metrics associated with the identified machines. In an implementation, the field values are extracted from fields that are defined post-ingestion, e.g., at search time, as has been previously described, e.g., with a late-binding schema. Extended reality application 1814 generates an AR overlay, where the overlay is a visualization of the field values.

In various embodiments, extended reality application 1814 superimposes the AR overlay onto the image(s) acquired via the camera 1820. For example, the AR overlay could be overlaid at a position relative to the corresponding optical data marker, such as on top of the optical data marker and/or next to the optical data marker. Extended reality application 1814 then causes the images superimposed with the AR overlay to be displayed on the display device 1824. In some embodiments, extended reality application 1814 may cause the AR overlay to be displayed on the display device 1824, without displaying the acquired image. In general, extended reality application 1814 superimposes the AR overlay based on any one or more of one or more determined dimensions and/or positions of the machine or other object, the known size of the optical data marker, the three-dimensional location and/or orientation of the optical data marker, and the detected plane of the optical data marker.

In some embodiments, extended reality application 1814 may receive additional information from data intake and query system 108 and may display the additional information on the display device 1824. This additional information may be in any technically feasible format. For example, data intake and query system 108 could transmit various schemas, dashboards, cards, playbooks, runbooks, and/or visualizations that include data, including real-time data (e.g., near real-time data) associated with a particular machine. The schemas, dashboards, cards, playbooks, runbooks, and/or visualizations may then be overlaid with the real-world component by extended reality application 1814 in conjunction with an optional mobile template, as discussed below in further detail.

After superimposing the AR overlay, along with any appropriate schemas, dashboards, cards, playbooks, runbooks, and/or other visualizations, onto the image(s) acquired via the camera 1820, extended reality application 1814 may store the enhanced image in an enhanced image data store and/or in a memory associated with a processor (e.g., a memory of a central processing unit, graphics processing unit, etc.). In some embodiments, the enhanced image data store may be stored within database 1816. In some embodiments, extended reality application 1814 superimposes the AR overlay, along with any appropriate schemas, dashboards, cards, playbooks, runbooks, and/or other visualizations onto a virtual reality scene rather than onto an image acquired from the camera 1820. In such embodiments, the images stored in the enhanced image data store represent virtual reality (VR) images augmented with AR overlays, rather than acquired images augmented with AR overlays.

In some embodiments, extended reality application 1814 may generate a bounding box associated with the optical data marker and/or the associated machine or other object. Extended reality application 1814 may generate such a bounding box based on any of the data described above, such as size, position, orientation, and plane information of the optical data marker and/or the associated machine or other object. In such embodiments, extended reality application 1814 may employ the bounding box to scale (e.g., based on a scaling factor) the 2D or 3D model of the machine when generating the AR overlay. The boundary box information may be stored in the data of the optical data marker. Additionally or alternatively, extended reality application 1814 may generate the bounding box locally. Further, extended reality application 1814 may paint-fill one or more boundaries of the bounding box. Such a paint-filled bounding box may be employed as a rough 2D or 3D model of the machine in lieu of a more detailed 2D or 3D model.

In general, extended reality application 1814 acquires images, decodes optical data markers, receives field values extracted from events, generates schemas, dashboards, cards, and/or visualizations, generates AR overlays based on the field values, and causes the schemas, dashboards, cards, playbooks, runbooks, visualizations, and/or AR overlays to be displayed in a continuous manner as the camera 1820 is pointed at different machines in the industrial environment. In this manner, a technician may walk through an industrial environment and visually determine the status of the machines in that environment. For example, the technician may be able to quickly identify any machines that need attention, repair, or replacement. In one example, the AR overlay could display the operating temperature, CPU utilization, and/or memory utilization for a particular machine. By pointing the camera 1820 at the machine, the technician would then see the AR overlay, enabling the technician to visually determine whether the machine is operating at an excessive temperature or outside of a normal range of CPU or memory utilization. In another example, the AR overlay could display the revolutions per minute (RPM) of each of three fans included in a particular machine. The technician could then identify and locate a particular fan that has failed. Similarly, the AR overlay could display an operating temperature of each of two CPUs for a particular machine. The technician could then identify and locate a particular CPU that is operating at an excessive temperature.

In some embodiments, extended reality application 1814 further receives a two-dimensional (2D) or three-dimensional (3D) model of the machines identified via the optical data markers. The 2D or 3D model may be a simple outline, such as a border around a front panel or bezel of the machine. Alternatively, the 2D or 3D model may be a complex shape representing the housing of the machine. In some embodiments, extended reality application 1814 may receive the 2D or 3D model from data intake and query system 108. Additionally or alternatively, the 2D or 3D model may be encoded in the optical data marker. In the latter case, extended reality application 1814 decodes the optical data marker and retrieves the 2D or 3D model from the decoded data.

Once a 2D or 3D model is acquired, extended reality application 1814 calculates the size and/or the plane of the optical data marker in the acquired image. This can be done through a variety of plane detection techniques, some of which may leverage an arrangement of the optical data marker, e.g., a positioning or arrangements of certain portions of a QR code. In other implementations, e.g., when the optical data marker is attached to a fixed object, this information may be coded into the optical data marker. Extended reality application 1814 them compares the size and/or the plane of the optical data marker in the acquired image with the actual size of the optical data marker. Extended reality application 1814 may then scale and orient the model based on the comparison. When generating the AR overlay for a particular machine, extended reality application 1814 includes the scaled and oriented model in the AR overlay.

In some embodiments, extended reality application 1814 may be configured to generate a boundary or outline from measurements taken of a machine or other object of interest and store a 3D model of the machine based on the boundary or outline. In operation, a technician or may point the camera 1820 of the client device 404 at a machine or other physical object of interest. Extended reality application 1814 may display an image of the machine along with an AR measuring tape or other measurement tool. In various implementations, extended reality application 1814 may leverage other sensors of the client device 404, in addition to camera 1820, to assist in measurements of the object of interest, e.g., an accelerometer, a gyroscope, and a compass. The technician may manipulate the AR measuring tape along the outside of the machine to measure key dimensions of the machine. Extended reality application 1814 may also aid the technician in locating key coordinates of the machine, such as the location of the corners of an enclosure or housing associated with the machine.

Once the technician completes the scan, extended reality application 1814 may generate a rough outline of the machine based on the key dimensions and key coordinates of the machine. This rough outline may be used as a general or inexact 3D model that approximates a graphical bounding box surrounding the enclosure or housing of the machine. Extended reality application 1814 may further generate plane data that defines the planar surfaces of the enclosure or housing. In various implementations, extended reality application 1814 may offload some of the intermediate processing steps of generating the 3D model to server or cloud-based resources. The 3D model may be in any technically feasible format, including, without limitation, a scalable vector graphics (SVG) model or a polygonal mesh model. Extended reality application 1814 may store the 3D model and the plane data in the database 1816. Further, extended reality application 1814 may transmit the 3D model and plane data to data intake and query system 108 for storage. Additionally or alternatively, extended reality application 1814 may store the 3D model in the optical data marker associated with the machine. In another implementation, extended reality application 1814 may generate a new or additional optical data marker that includes the 3D model or a reference (e.g., a pointer, link, address, etc.) to a location of the 3D model.

Later, when a technician points the camera 1820 at the optical data marker, extended reality application 1814 retrieves the 3D model encoded into the optical data marker. Alternatively, extended reality application 1814 retrieves the unique identifier encoded into the optical data marker. Extended reality application 1814 then retrieves the 3D model associated with the unique identifier from either database 1816 or from data intake and query system 108. Further, the rough outline 3D model and/or the plane data for a given machine can be associated, either through best-fit matching, a machine learning algorithm, human intervention, or some combination thereof, with a higher-resolution, more complex 3D model, such as a 3D model of the machine generated by a computer aided design (CAD) application program. When generating the AR overlay for the machine associated with the optical data marker, extended reality application 1814 includes either the rough outline 3D model or the complex 3D model as part of the AR overlay. In other implementations, various techniques may be applied to the 3D model to increase or decrease the amount of space and/or resources required to store and/or render the 3D model as part of the overlay in the extended reality environment.

In addition, when a technician points the camera 1820 at a new machine that includes an optical data marker, extended reality application 1814 may detect plane data of the new machine. Extended reality application 1814 may then implement the plane data in order to determine how a 2D or 3D model of the machine will be positioned, oriented, scaled, etc.

In some embodiments, extended reality application 1814 may be configured to scan the boundary or outline of a machine or other object of interest and store a 3D model of the machine based on the boundary or outline. In operation, a technician or operator may point the camera 1820 of the client device 404 at a machine or other physical object of interest. Extended reality application 1814 may display an image of the machine. Extended reality application 1814 may detect an optical data marker associated with the machine and may determine that the corresponding machine has no corresponding 2D or 3D model. Extended reality application 1814 may then analyze images acquired via the camera 1820 to scan the machine and to perform an edge detection process. Based on the scan and edge detection, extended reality application 1814 may generate a boundary of a portion of the machine. In an implementation, this boundary may be highlighted or emphasized to the technician or other operator through various techniques, including using a paint-fill process, which will be described in more detail herein. Other techniques for drawing boundaries and allowing users to select them may be implemented instead of the paint-fill process. Thus, extended reality application 1814 may perform a paint-fill on the boundary to fill the boundary or outline with a color. Extended reality application 1814 may repeat the edge detection and paint-fill processes to generate a set of concentric or overlapping paint-filled boundaries. Extended reality application 1814 may further generate plane data that defines a planar surface of the paint-filled boundaries.

Once a set of paint-filled boundaries is generated, extended reality application 1814 may receive a selection of one of the boundaries. Typically, extended reality application 1814 displays the set of paint-filled boundaries, and the technician selects a boundary that most closely matches a contour of the machine, however other techniques could be implemented for narrowing down the set of paint-filled boundaries, including application of training data for similar sets. Extended reality application 1814 may optionally thicken the border of the selected boundary. The technician may repeat the process set forth above at different view angles, and extended reality application 1814 may generate a series of boundaries and corresponding plane data of the machine at different view angles. Extended reality application 1814 may then generate a 3D model, such as a 3D texture bitmask, based on the series of boundaries and corresponding plane data. Additionally or alternatively, extended reality application 1814 may generate an SVG model or polygon mesh model of the machine. Extended reality application 1814 may then store the 3D model in database 1814 and/or transmit the 3D model to data intake and query system 108.

Later, when a technician points the camera 1820 at the optical data marker, extended reality application 1814 retrieves the 3D model and displays the 3D model as part of the AR overlay, in the manner described above. In addition, when a technician points the camera 1820 at a new machine that includes an optical data marker, extended reality application 1814 may detect plane data of the new machine and retrieve an existing 3D model with matching plane data, as described above.

It will be appreciated that the system shown herein is illustrative and that variations and modifications are possible. In one example, the optical data markers described herein are in the form of QR codes. Each QR code may store up to approximately four kilobytes of data. However, any form of marker or code that includes a unique identifier for each machine in an industrial environment is within the scope of the present disclosure.

Natural Language (NL) System Overview

Figure 19:
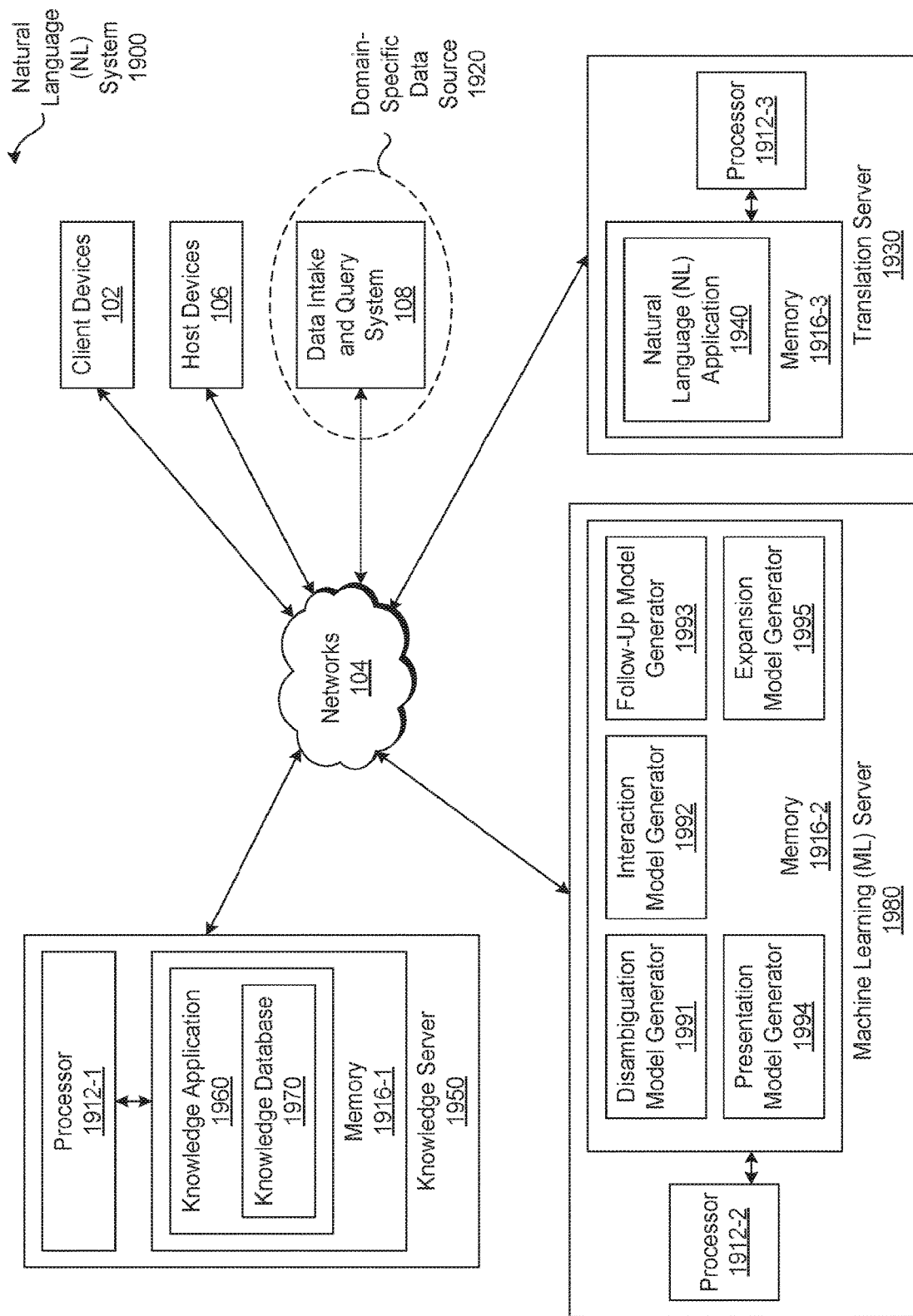
FIG. 19 illustrates a natural language (NL) system, in accordance with example embodiments.

FIG. 19 illustrates a natural language (NL) system 1900, in accordance with example embodiments. As shown, the NL system 1900 includes, without limitation, the data intake and query system 108, any number of the client devices 102, any number of the host devices 106, a translation server 1930, a knowledge server 1950, and a machine-learning (MIL) server 1980. For explanatory purposes, multiple instances of like objects are denoted with reference numbers identifying the object and parenthetical numbers identifying the instance, where needed.

The data intake and query system 108 is associated with the client devices 102 and the host devices 106 and comprises a domain-specific data source 1920 through which users can retrieve and analyze data collected from the data sources 202 as described above. In alternate embodiments, the NL system 100 may include any number of domain-specific data sources 1920. For example, the NL system 1900 could include any number of relational database management systems, such as MySQL (My Structured Query Language) systems, and any number of NoSQL (non SQL) systems, such as MongoDB. Domain-specific data sources 1920 are also referred to herein as data storage systems.

Each of the domain-specific data sources 1920 is associated with a different domain-specific language (DSL) that enables users that are proficient in the DSL to perform operations on entities (i.e., logical groupings of data) associated with the domain-specific data source 1920. For instance, entities associated with the data intake and query system 108 can be accessed using requests written in SPL (SPLUNK® search processing language). As referred to herein, a request may comprise any command involving the entities. For example, a request could include any number of search commands, alert commands, and presentation (e.g., display, verbalization, etc.) commands, to name a few.

As shown, each of the translation server 1930, the knowledge server 1950, and the machine-learning (ML) server 1980 includes, without limitation, a memory 1916 and a processor 1912. The servers, 1930, 1950, 1980, the memories 1916-1, 1916-2, 1916-3, and the processors 1912-1, 1912-2, 1912-3, may be implemented in any technically feasible fashion based on any number and type of resources included in the NL system 1900. For example, the translation server 1930 could be implemented in a cloud computing environment, a distributed computing environment, an on-premises server, a laptop, and so forth.

The processor 1912 may be any instruction execution system, apparatus, or device capable of executing instructions. For example, the processor 1912 could comprise a central processing unit (CPU), a graphics processing unit (GPU), a controller, a microcontroller, a state machine, or any combination thereof. The memory 1916 stores content, such as software applications and data, for use by the processor 1912. The memory 1916 may be one or more of a readily available memory, such as random access memory (RAM), read only memory (ROM), hard disk, or any other form of digital storage, local or remote.

In some embodiments, storage (not shown) may supplement or replace the memory 1916. The storage may include any number and type of external memories that are accessible to the processor 1912. For example, and without limitation, the storage may include a Secure Digital Card, an external Flash memory, a portable compact disc read-only memory (CD-ROM), an optical storage device, a magnetic storage device, cloud storage, other tangible storage media, or any suitable combination of the foregoing. Any number of software applications may be provided as an application program (or programs) stored on computer readable media such as a CD-ROM, DVD-ROM, flash memory module, or other tangible storage media.

In an effort to enable users to access and analyze data from a wide variety of data sources without expertise in the associated DSL(s), conventional natural language (NL) data applications have been developed. In operation, a conventional NL data application extracts and curates metadata associated with the different data sources, translates a given NL request to an appropriate DSL request, applies the DSL request to the corresponding domain-specific data source to retrieve the data relevant to the original NL request, performs various operations on the retrieved data, and displays the results. Applying a request to an associated domain-specific data source is also referred to herein as "executing the request." One limitation of conventional NL data applications is that oftentimes an NL request is ambiguous, and determining the intent of the user usually involves subjecting the user to a time-consuming, interactive, and oftentimes repetitive interrogation process. These interrogation processes are inefficient and can be annoying to users.

For example, suppose that a user requests "sales by price" to obtain unit sales by price in Colorado for the previous week. A conventional NL data application would typically request a variety of disambiguating information from the user, such as type of sales, geographical region, and time period. And suppose that each subsequent week, the user issues a request to obtain unit sales in Colorado for the previous week. If the user were to accidentally request "sales by price" instead of "unit sales by price in Colorado for the previous week," the NL data application would repeat the requests for disambiguating information noted above.

Efficiently Interacting with Data Sources Using NL Requests

To reduce the amount time and user effort associated with processing NL requests and to increase the overall accuracy of NL application implementations, the translation server 1930, the knowledge server 1950, and the ML server 1980 work together to provide readily adaptable data interfacing services. Examples of data interfacing services include translation, analysis, and presentation operations, to name a few. To use the data interfacing services, users interact with the domain-specific data sources 1920 using a natural language (NL) application 1940.

The NL application 1940 executes on the processor 1912-3 of the translation server 1930 and is stored in the memory 1916-3 of the translation server 1930. The NL application 1940 performs data interfacing operations based on information stored in a knowledge database 1970. The knowledge database 1970 is included in the knowledge server 1950 and managed by a knowledge application 1960. Examples of information stored in the knowledge database 1970 include DSL-specific templates, an interaction history database, and a variety of machine-learning (ML) models, to name a few.

In general, each of the ML models evolves and improves over time based on interactions with users. More specifically, as users interact with the domain-specific data sources 1920 through the NL application 1940, the NL application 1940 stores relevant information in the knowledge database 1970. Relevant information may include NL requests, DSL requests, clickstreams, and the like. Periodically, any number of ML model generators train corresponding ML models based on the knowledge database 1970 and then store the trained ML models in the knowledge database 1970.

In this fashion, the behavior of each of the ML models adapts over time to reflect the preferences of the users. For instance, in some embodiments, if the knowledge database 1970 indicates that a John has repeatedly clarified that "sales by price" means "unit sales by price in Colorado," then an interaction ML model (not shown in FIG. 1) may automatically disambiguate "sales by price" for John without performing an interrogation. Further, as the behavior of the ML models improves, so does the uptake and use of the ML models, thereby creating a virtuous circle of learning.

Each of the ML model generators is stored in the memory 1916-2 of the ML server 1980 and executes on the processor 1912-2 of the ML server 1980. As shown, the ML model generators include, without limitation, a disambiguation model generator 1991, an interaction model generator 1992, a follow-up model generator 1993, a presentation model generator 1994, and an expansion model generator 1995. In alternate embodiments, the NL system 1900 may include any number and type of ML model generators, and the ML model generators may be included in any number and type of compute devices. Further, in some embodiments, the machine learning may be distributed throughout any number of compute devices included in the NL system 1900—such that the natural language processing can be determined at the edge—rather than a central server.

In alternate embodiments, the memories 1916 may not include any number of the NL application 1940, the ML models, the knowledge application 1960, and the knowledge database 1970. Instead, any number and portions of the NL application 1940, the ML models, the knowledge application 1960, and the knowledge database 1970 may be stored on and/or executed from computer readable media such as a flash drive, CD-ROM, DVD-ROM, flash memory module, or other tangible storage media.

It will be appreciated that the NL system 1900 shown herein is illustrative and that variations and modifications are possible. The number of domain-specific data sources 1920, the number of servers, the number of model generators, the number and locations of applications, and the connection topology between the various units in the NL system 1900 may be modified as desired. Further, the functionality included in any of the applications may be divided across any number of applications that are stored and execute via any number of devices that are located in any number of physical locations.

Figure 20:
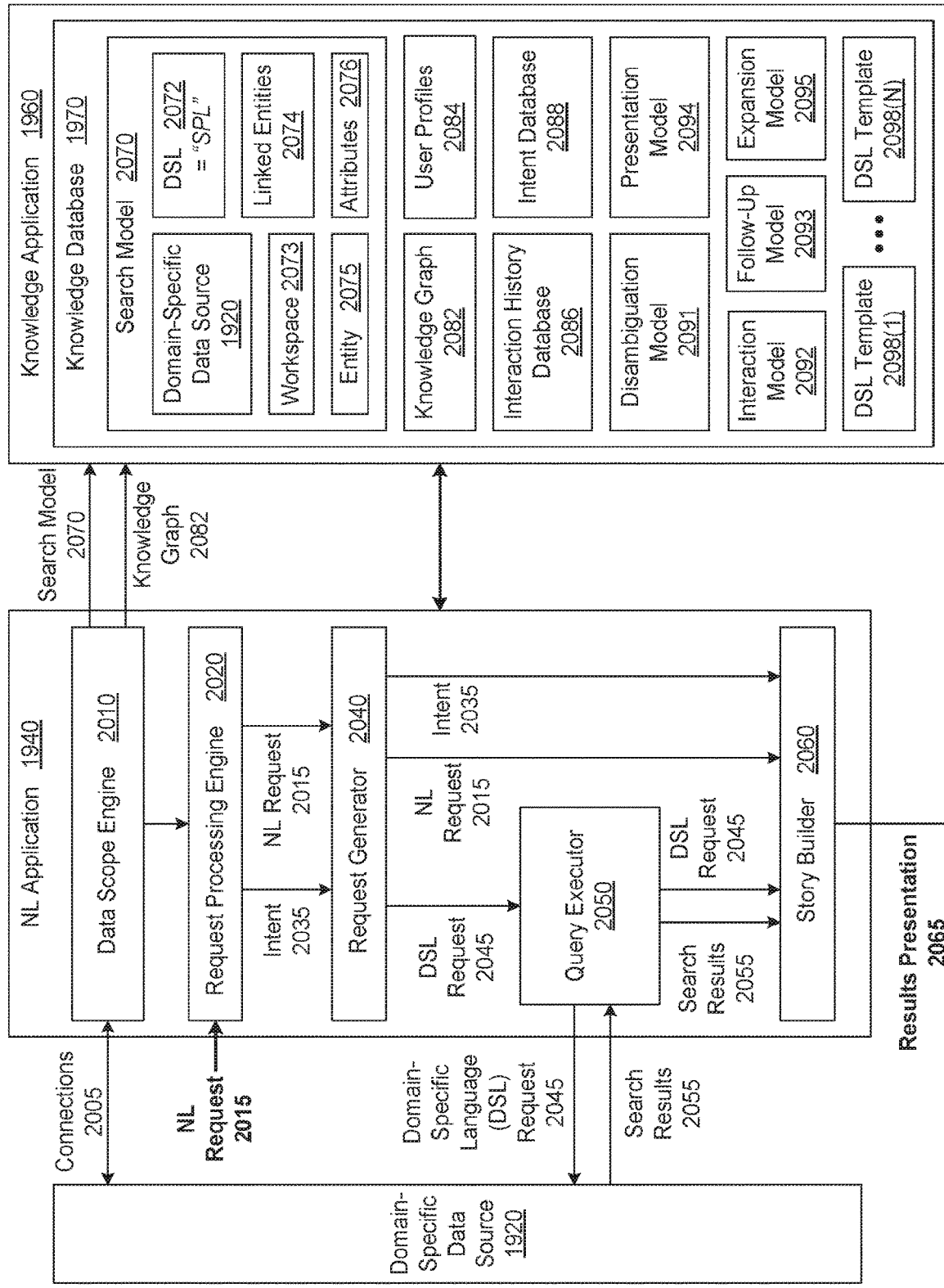
FIG. 20 is a more detailed illustration of the knowledge database and the NL application of FIG. 19, in accordance with example embodiments.

FIG. 20 is a more detailed illustration of the knowledge database 1970 and the NL application 1940 of FIG. 19, in accordance with example embodiments. As shown, the knowledge database 1970 includes, without limitation, a search model 2070, a knowledge graph 2082, any number of user profiles 2084, an interaction history database 2086, an intent database 2088, any number of DSL templates 2098, a disambiguation model 2091, an interaction model 2092, a follow-up model 2093, an expansion model 2095, and a presentation model 2094. In alternate embodiments, the knowledge database 1970 may include any number of search models 2070, any number of knowledge graphs 2082, and any number and type of ML models.

The search model 2070 specifies, without limitation, the domain-specific data source 1920, the DSL 2072, a workspace 2073, entities 2075, attributes 2076, and linked entities 2074. The search model 2070 governs the way in which the NL application 1940 performs a variety of processing operations involving NL requests 2015. Among other things, the search model 2070 facilitates the validation of the NL requests 2015, the analysis of each word included in the NL requests 2015, and the mapping of each word to the corresponding domain-specific data source 1920 to obtain accurate search results.

The domain-specific data source 1920 represents the database for which the search model 970 is created. Examples of domain-specific data sources 1920 include the data intake and query system 108, "Oracle/sales" which refers to an Oracle database table name "sales," and a REST (Representational State Transfer) endpoint "salesforce/sales" which refers to a Salesforce object named "sales." The workspace 2073 is a collection of multiple domain-specific data sources 1920. The entity 2075 represents a logical collection of data that is associated with a domain-specific data source 1920. For example, the entity 2075 could be "sales representatives," "sales," or "store."

The attributes 2076 are defined with respect to the entities 2075. For example, if the entity 2075 is "sales representatives," then the attributes 2076 could include, without limitation, full name, phone number, commission rate, and city. The linked entities 2074 specify relationships or links between multiple entities 2075 across the domain-specific data sources 1920 or the workspaces 2073. For example, the entity 2075(1) "sales representative" can be linked to the entity 2075(2) "product" to establish a relationship between the sales representatives and the products that the sales representatives handle.

In general, the knowledge database 1970 includes a separate search model 2070 for each of the domain-specific data sources 1920 and each of the workspaces 2073. The entities 2075 and the attributes 2076 associated with a particular domain-specific data source 1920 and within the scope of a DSL request operation, are included in the search model 2070. For each of the entities 2075, the attributes 2076 related to the entity 2075 are specified. Each of the attributes 2076 is defined based on different parameters such as data type (e.g., string, number, or text), variety (e.g., finite, infinite, or random), roles allowed, and whether the data is searchable or aggregatable. The possible synonyms of the attributes 2076 are also included in the search model 2070. For example, the attribute 2076 "product" may have synonyms such as "commodity", "merchandise", "goods", or "cargo." Including the synonyms in the search model 2070 facilitates comprehensive analysis of the domain-specific data source 1920.

The knowledge graph 2082 specifies semantics of the data as well as the concepts used to resolve ambiguities to improve comprehension. In various embodiments, the knowledge database 1970 may not include the knowledge graph 2082. The user profiles 2084 specify any number of characteristics associated with the users of the NL system 1900. The interaction history database 2086 includes any amount and type of information associated with the interactions of the users with the components of the NL system 1900. For example, for each user, the interaction history database 2086 could include information extracted from clickstreams, NL requests 2015 issued by the user, intents of the NL requests 2015 issued by the user, and DSL requests 2045 associated with the user.

The intent database 2088 includes any number of predefined intents 2035, where each intent 2035 is semantically similar to any number of NL requests 2015 and, consequently, correlates to the meanings of the NL requests 2015. Importantly, the predefined intents 2035 are agnostic with respect to the DSLs 2072. Each of the DSL templates 2098 is associated with one or more intents 2035 and a particular DSL 2072. Although not shown in FIG. 20, in some embodiments and for each supported DSL, the knowledge database 1970 may include an intent mapping list that maps each of the predefined intents 2035 to a corresponding DSL template 2098 written in the DSL. The intent database 2088 and the DSL templates 2098 are described in greater detail in conjunction with FIGS. 21 and 22.

The disambiguation model 2091, the interaction model 2092, the follow-up model 2093, the presentation model 2094, and the expansion model 2095 are machine-learning models that increase the efficiency of the NL application 1940. The disambiguation model 2091 is described greater detail in conjunction with FIGS. 23 and 24. The interaction model 2092 is described greater detail in conjunction with FIGS. 25 and 26. The follow-up model 2093 is described greater detail in conjunction with FIGS. 27 and 28. The presentation model 2094 is described greater detail in conjunction with FIGS. 29 and 30. The expansion model 2095 is described greater detail in conjunction with FIGS. 31 and 32.

As shown, the NL application 1940 includes, without limitation, a data scope engine 2010, a request processing engine 2020, a request generator 2040, a query executor 2050, and a story builder 2060. The data scope engine 2010 connects to the domain-specific data sources 1920 via connections 2005, determines the associated DSLs 2072, and generates the search models 2070 that expedite crawling of data included in the domain-specific data sources 1920. In some embodiments, the data scope engine 2010 also generates the knowledge graphs 2082.

The request processing engine 2020 receives the NL request 2015 and performs intent inference operations to map the NL request 2015 to one of the predefined intents 2035 stored in the intent database 2088. As part of mapping the NL request 2015, if the request processing engine 2020 determines that the NL request 2015 is ambiguous, then the request processing engine 2020 may generate a disambiguated NL request 2015 based on the disambiguation model 2091 and/or the interaction model 2092. Both the disambiguation model 2091 and the interaction model 2092 facilitate disambiguation operations.

The disambiguation model 2091 facilitates disambiguation based on a disambiguation recommendation associated with the NL request 2015. By contrast, the interaction model 2092 facilitates disambiguation based on an interaction recommendation associated with both the NL request 2015 and the user that issued the NL request 2015. In some embodiments, the request processing engine 2020 may perform disambiguation operations based on both the disambiguation model 2091 and the interaction model 2092.

The request generator 2040 selects one of the DSL templates 2098 based on the intent 2035 and the DSL 2072. The request generator 2040 then generates a DSL request 2045 based on the intent 2035, the DSL 2072, the knowledge database 970, and any number of interactions (including zero) with the user. The query executor 2050 applies the DSL request 2045 to the associated domain-specific data source 1920 to generate search results 2055. In alternate embodiments, the functionality associated with translating the NL request 2015 to the DSL request 2045 may be distributed in any fashion across any applications. For example, in some embodiments, the request processing engine 2020 could directly generate the DSL request 2045.

Subsequently, the story builder 2060 processes the search results 2055. More specifically, the story builder 2060 presents the search results 2055 as a results presentation 2065 based on a presentation format (e.g., a bar chart, a total number, a pie chart, etc.). The story builder 2060 determines the presentation format based on the NL request 2015, the search results 2055, the presentation model 2094, and any amount (including none) of user input. The results presentation 2065 may be expressed via any medium. For example, the results presentation 2065 could be expressed textually, graphically, or verbally.

Further, the story builder 2060 may facilitate any number of user interactions with the results presentation 2065. In particular, in response to a selection of a hierarchical component displayed via the results presentation 2065 for a "drill down" operation, the story builder 2060 determines an expansion method based on the NL request 2015, the selected hierarchical component, the expansion model 2095, and any amount (including none) of user input. For example, if a user selects a sector of a pie chart associated with "sales," then the story builder 2060 could determine an expansion method of "product." The story builder 2060 would then expand the data includes in the selected sector based on products.

Note that the techniques described herein are illustrative rather than restrictive, and may be altered without departing from the broader spirit and scope of the invention. Many modifications and variations on the functionality provided by the NL application 1940, the ML model generators, the knowledge application 1960, and the data intake and query system 108 will be apparent to those of ordinary skill in the art without departing from the scope and spirit of the described embodiments. For instance, in some embodiments, the story builder 2060 could perform one or more operations based on the interaction model 2092.

For explanatory purposes only, the NL application 1940 is described herein in terms of operating on a single NL request 2015 to generate a single intent 2035 and a single DSL request 2045. However, one or more of the techniques described herein may be used to operate on a single NL request 2015 to generate multiple intents 2035 and/or multiple DSL requests 2045. Examples of situations in which one or more of the techniques could operate on a single NL request 2015 to generate multiple DSL requests 2045 include when the intent 2035 is not expressible as a single DSL request 2045, such as if the NL request 2015 involves displaying two bar charts side-by-side. Other examples of situations in which one or more of the techniques could operate on a single NL request 2015 to generate multiple DSL requests 2045 include when the intent 2035 involves executing multiple requests to compare properties of the executions, such as runtime. Yes other examples of situations in which one or more of the techniques could operate on a single NL request 2015 to generate multiple DSL requests 2045 include when the intent 2035 may be optimally served by showing the results of executing multiple DSL requests 2045 that show data from multiple angles. For example, in some embodiments, if the NL request 2015 is "how are sales doing this quarter," then the NL application 1940 may display a time-chart of sales across the entire organization over time and a multi-bar chart of the sales of each department within the organization for the current and previous quarters.

In general, any number of the techniques may be implemented while other techniques may be omitted in any technically feasible fashion that enables the NL application 1940 to provide readily-adaptable data interfacing services. For example, in some embodiments, the NL system 1900 does not include the follow-up model generator 1993, or the knowledge application 1960. Further, in some embodiments, the NL application 1940 may implement additional functionality. For example, in some embodiments, the NL application 1940 may include data intake and query functionality, and may operate independently of the data intake and query system 108.

In alternate embodiments, any number of the components included in the system 1900 may interact with any number of the other components included in the system 1900 in any technically feasible fashion. For example, in some embodiments, the data intake and query system 108 may optimize presentation operations based on the presentation model 2094 and/or the knowledge database 1970.

As a general matter, any of the units included in the system 1900 may receive input in any technically feasible fashion via any type of device. For instance, in some embodiments, the request processing engine 2020 may receive an audible NL request 2015 via an audio device. Similarly, any of the units included in the system 1900 may transmit output in any technically feasible fashion via any type of device.

Translating NL Requests to DSL Requests

Figure 21:
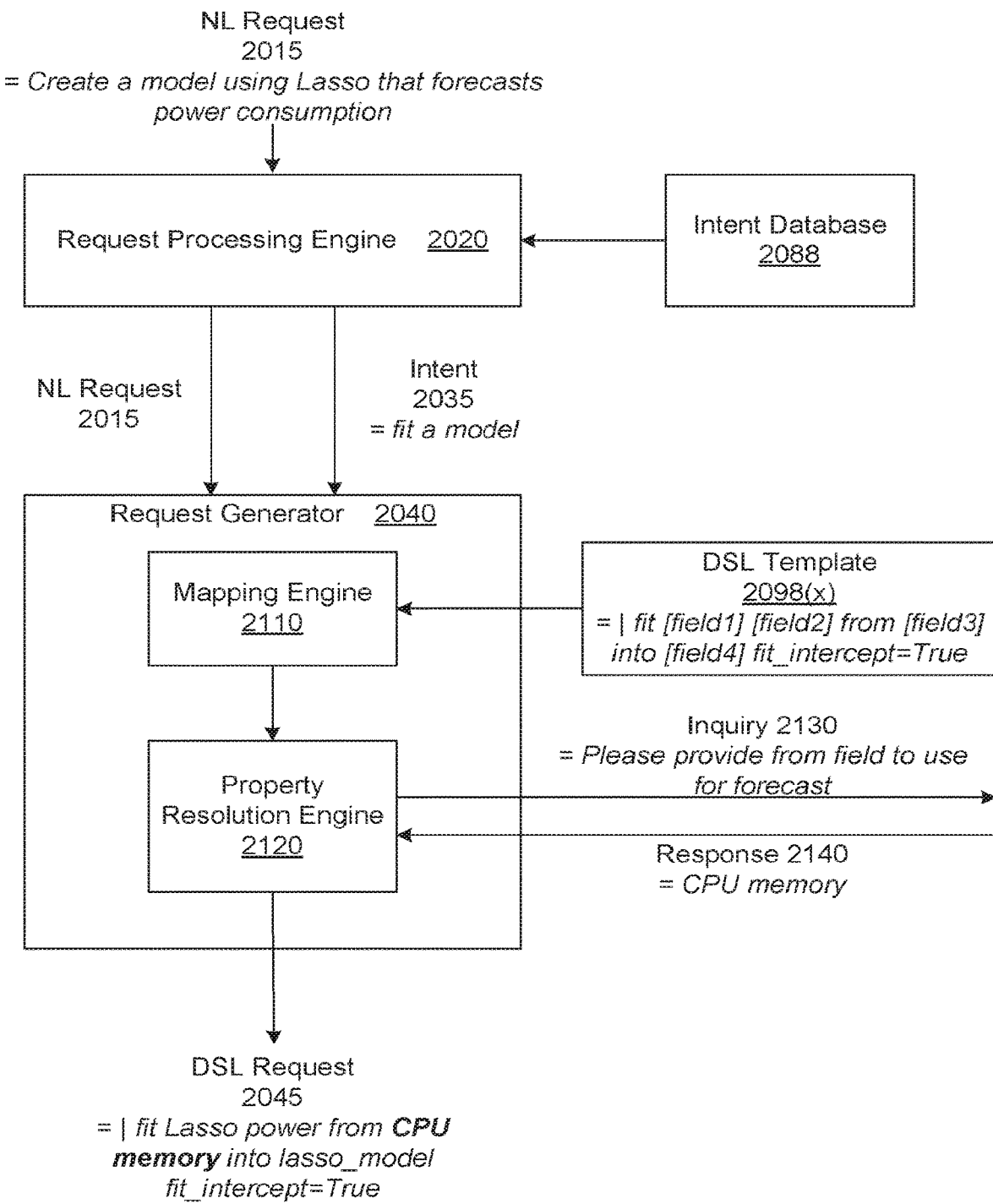
FIG. 21 illustrates how the request processing engine and the request generator of FIG. 20 translate an NL request to a domain-specific language (DSL) request and execute the DSL request, in accordance with example embodiments.

FIG. 21 illustrates how the request processing engine 2020 and the request generator 2040 of FIG. 20 translate the NL request 2015 to the domain-specific language (DSL) request 2045 and execute the DSL request 2045, in accordance with example embodiments. More precisely, and for explanatory purposes only, FIG. 21 depicts how the request processing engine 2020 and the request generator 2040 translate the NL request 2015 "create a model using Lasso that forecasts power consumption" to an disambiguated DSL request 2045 written in SPL.

Upon receiving the NL request 2015, the request processing engine 2020 performs an intent inference process to map the NL request 2015 to one of any number of predefined intents 2035 included in the intent database 2088. Importantly, the predefined intents 2035 are agnostic with respect to DSL. As shown for explanatory purposes, the request processing engine 2020 translates the NL request 2015 "create a model using Lasso that forecasts power consumption" to the intent 2035 "fit a model."

In general, the request processing engine 2020 may perform any number and type of intent inference operations as part of the intent inference process. For instance, in some embodiments, the request processing engine 2020 may perform semantic similarity operations as part of the intent inference process. In addition to intent inference operations, in some embodiments, the request processing engine 2020 may perform any number and type of disambiguation operations on the NL request 2015 prior to mapping the NL request 2015 to the intent 2035.

The request generator 2040 includes, without limitation, a mapping engine 2110 and a property resolution engine 2120. In operation, the mapping engine 2110 selects one of the DSL templates 2098 included in the knowledge database 1970 based on the intent 2035 and the DSL 2072. In general, the mapping engine 2110 may select the DSL template 2098 in any technically feasible fashion. For instance, in some embodiments, for each supported DSL, the knowledge database 1970 includes an intent mapping list (not shown). For each of the predefined intents 2035 included in the intent database 2088, the intent mapping list for the DSL 2072 specifies a corresponding DSL template 2098 written in the DSL 2072. As shown for explanatory purposes, the mapping engine 2110 selects the DSL template 2098 "|fit[field1][field2] from [field3] into [field4] fit_intercept=True" that is written in the DSL 2072 "SPL."

Each of the DSL templates 2098 may include any number of property fields that require values. Upon receiving the DSL template 2098, the property resolution engine 2120 identifies any "unknown" property fields for which the property resolution engine 2120 is unable to determine values based on available data. Available data includes, without limitation, the NL request 2015 and data included in the knowledge database 1970. Subsequently, the property resolution engine 2120 interacts with the user to determine the desired values for the unknown properties fields.

For explanatory purposes, the property resolution engine 2120 identifies the property field "field 3" following "for," as an unknown property field. Accordingly, the property resolution engine 2120 generates an inquiry 2130 "please provide from field to use for forecast," and presents the inquiry 2130 to the user. The property resolution engine 2120 may present the inquiry 2130 to the user in any technically feasible fashion that is consistent with the communication techniques associated with the user. For example, if the request processing engine 2020 received the NL request 2015 verbally, then the property resolution engine 2120 could verbalize the inquiry 2130. As shown, the property resolution engine 2120 receives a response 2140 from the user. The response 2140 specifies the value "CPU memory."

The property resolution engine 2120 then generates the DSL request 2045 based on the DSL template 2098, the response 2140, and any other available data. As shown for explanatory purposes, the property resolution engine 2120 generate the DSL request 2045 "=|fit Lasso power from CPU memory into lasso_model fit_intercept=True." Subsequently, the NL application 1940 applies the DSL request 2045 to the associated domain-specific data source 1920.

In this fashion, the request processing engine 2020 and the request generator 2040 establish a flexible framework that maps the NL requests 2015 to the user intents 2035 and, subsequently, to the DSL requests 2045 for any number of the DSLs 2072. Advantageously, the flexible framework enables administrators to improve the effectiveness of the NL application 1940 and/or extend the functionality of the NL application 1940 without releasing a new version of the NL application 1940. For example, administrators could modify any number and combination of the DSL templates 2098 and the template intent mapping lists included in the knowledge database 1970 asynchronously to a release cycle associated with the NL application 1940.

Figure 22:
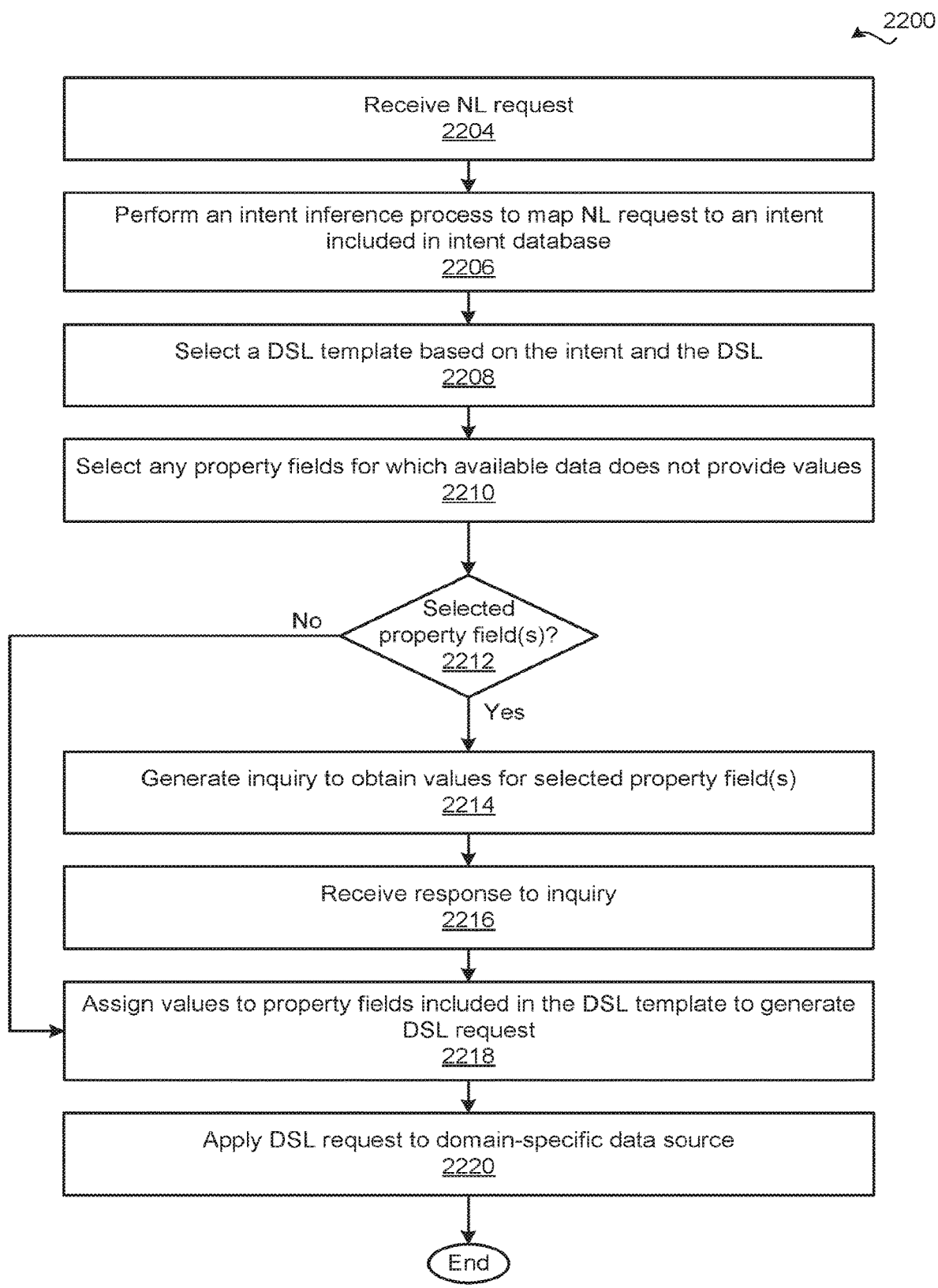
FIG. 22 is a flow diagram of method steps for applying an NL request to a domain-specific data source, in accordance with example embodiments.

FIG. 22 is a flow diagram of method steps for applying a NL request to a domain-specific data source, in accordance with example embodiments. Although the method steps are described with reference to the systems of FIGS. 19-21, persons skilled in the art will understand that any system configured to implement the method steps, in any order, falls within the scope of the present invention.

As shown, a method 2200 begins at step 2204, where the request processing engine 2020 receives the NL request 2015 from a user. At step 2206, the mapping engine 2110 performs an intent inference process to map the NL request 2015 to one of the predefined intents 2035 included in the intent database 2088. At step 2208, the property resolution engine 2120 selects one of the DSL templates 2098 included in the knowledge database 1970 based on the intent 2035 and the DSL 2072.

At step 2210, the property resolution engine 2120 selects any property field for which the property resolution engine 1202 is unable to determine values based on available data. Available data includes, without limitation, the NL request 2015 and data included in the knowledge database 1970. At step 2212, the property resolution engine 2120 determines whether there are any selected property fields. If, at step 2212, the property resolution engine 2120 determines that there are one or more selected property fields, then the method 2200 proceeds to step 2214.

At step 2214, the property resolution engine 2120 generates the inquiry 2130 that requests value(s) for the selected field(s) and presents the inquiry 2130 to the user. The property resolution engine 2120 may present the inquiry 2130 to the user in any technically feasible fashion that is consistent with the communication techniques associated with the user. For example, if the request processing engine 2020 received the NL request 2015 verbally, then the property resolution engine 2120 could verbalize the inquiry 2130. At step 2216, the property resolution engine 2120 receives the response 2140 from the user. The response 2140 specifies the values for the selected property fields.

If, however, at step 2212, the property resolution engine 2120 determines that there are no selected properties fields, then the method 2200 proceeds directly to step 2218. At step 2218, the property resolution engine 2120 generates the DSL request 2045 based on the DSL template 2098 and any amount and type of available data and/or the response 2140. At step 2220, the NL application 1940 applies the DSL request 2045 to the associated domain-specific data source 1920. More specifically, the request generator 2040 causes other components in the NL application 1940 to apply the DSL request 2045 to the associated domain-specific data source 1920.

Disambiguating NL Requests

Figure 23A:
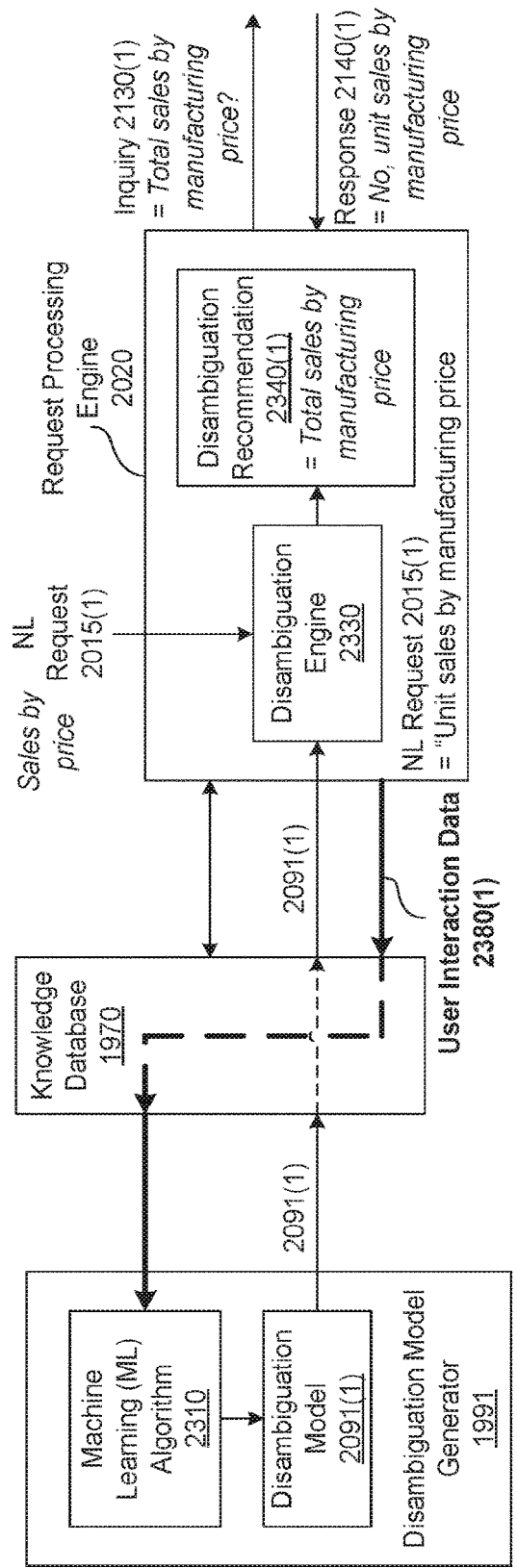
FIGS. 23A and 23B illustrate examples of how the request processing engine of FIG. 20 disambiguates and executes an NL request at two different points in time, in accordance with example embodiments.
Figure 23B:
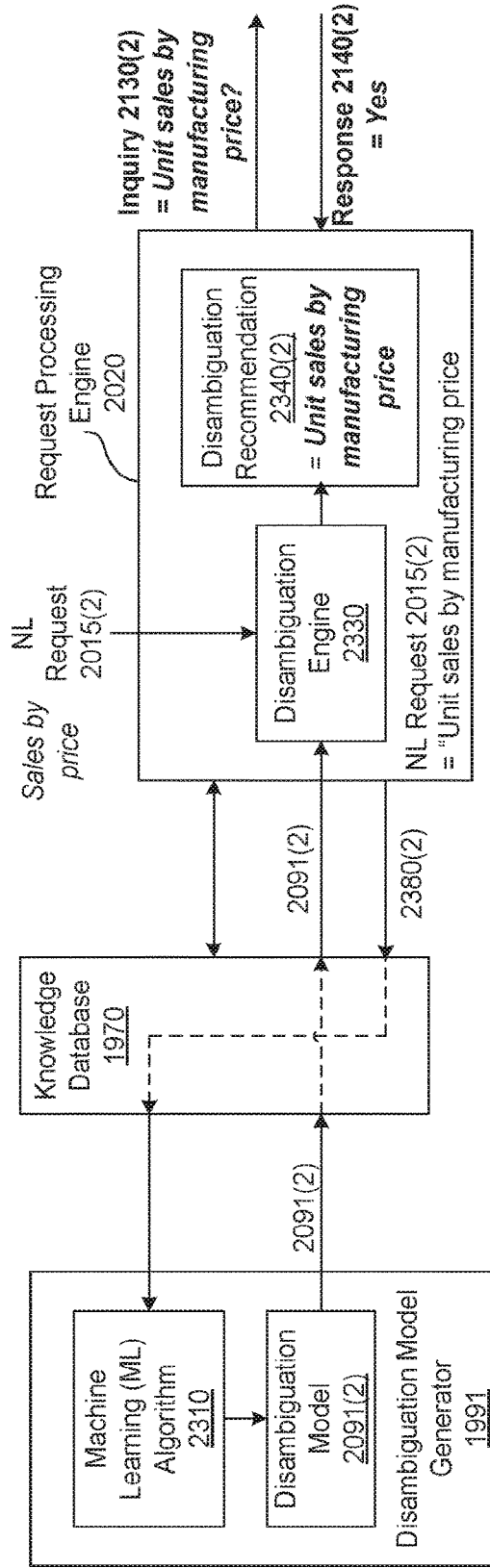

FIGS. 23A and 23B illustrate examples of how the request processing engine 2020 of FIG. 20 disambiguates and executes the NL request 2015 at two different points in times, in accordance with example embodiments. As shown in both FIGS. 23A and 23B, the request processing engine 2020 includes, without limitation a disambiguation engine 2330.

To disambiguate the NL request 2015, the disambiguation engine 2330 retrieves a most recent version of the disambiguation model 2091 from the knowledge database 1970. The disambiguation engine 2330 then generates a disambiguation recommendation 2340 based on the NL request 2015 and the disambiguation model 2091. The disambiguation engine 2330 generates the inquiry 2130 that presents the disambiguation recommendation 2340 to the user and requests feedback. Upon receiving the response 2140 to the inquiry 2130, the disambiguation engine 2330 disambiguates the NL request 2015 based on the response 2140. The NL application 1940 then applies the disambiguated NL request 2015 to the associated domain-specific data source 1920

Finally, the request processing engine 2020 transmits user interaction data 2380 to the knowledge application 1960 for storage as part of the interaction history database 2086. The user interaction data 2380 may include any amount of information associated with presenting and/or receiving data from the user. For example, the user interaction data 2380 could include the NL request 2015, the disambiguation recommendation 2340, and a clickstream. In this fashion, the information in the interaction history database 2086 reflects the effectiveness of the disambiguation recommendation 2340.

In general, the disambiguation model 2091 associates the NL request 2015 with the disambiguation recommendation 2340. In alternate embodiments, the disambiguation model 2091 may associate the NL request 2015 and any number of additional parameters with the disambiguation recommendation 2340. For instance, in some embodiments, the disambiguation model 2091 may associate the NL request 2015 and a geographical location of the user with the disambiguation recommendation 2340.

The disambiguation recommendation 2340 may include any amount and type of information that provides suggestions relevant to disambiguating an ambiguous NL request 2015. For instance, in some embodiments, the disambiguation recommendation 2340 may be a list of phrases that is ordered based on estimated probabilities of accurately disambiguating the actual meaning of the NL request 2015. In other embodiments, the disambiguation recommendation 2340 may be a single disambiguating phrase. In some embodiments, the disambiguation recommendation 2340 may include a sequence of phrases, where each phrase disambiguates a different aspect of the NL request 2015. For example, the disambiguation recommendation 2340 could include disambiguation for time and geographical regions.

The disambiguation engine 2330 may include any portion (including all) of the disambiguation recommendation 2340 in the inquiry 2130. Further, the disambiguation engine 2330 may present the inquiry 2130 to the user in any technically feasible fashion that is consistent with the communication techniques associated with the user. For example, if the disambiguation engine 2330 receives the NL request 2015 verbally, then the disambiguation engine 2330 could verbalize the disambiguation recommendation 2340. The disambiguation engine 2330 may cause the user interaction data 2380 to be incorporated into the interaction history database 2086 in any technically feasible fashion. For example, the request processing engine 2020 could transmit the NL request 2015, the disambiguation recommendation 2340, and a clickstream to the knowledge application 1960.

As shown in both FIGS. 23A and 23B, the disambiguation model generator 1991 generates the disambiguation model 2091 and stores the disambiguation model 2091 in the knowledge database 1970. The disambiguation model generator 1991 includes, without limitation, a machine learning (ML) algorithm 2310. The ML algorithm 2310 trains the disambiguation model 2091 to associate the NL request 2015 with the disambiguation recommendation 2340 based on information included in the knowledge database 1970.

The ML algorithm 2310 may include any number and type of technically feasible ML operations, and the disambiguation model 2091 may comprise any type of machine learning model. For instance, in some embodiments, the ML algorithm 2310 includes multidimensional scaling (MS) operations. In the same or other embodiments, the ML algorithm 2310 includes support vector machine (SVM) training operations. In various embodiments, the disambiguation model 2091 comprises a neural network model. In some embodiments, the disambiguation model 2091 comprises a deep learning model. Further the ML algorithm 2310 may train the disambiguation model 2091 based on any amount and type of information included in the knowledge database 1970. In particular, the ML algorithm 2310 trains the disambiguation model 2091 based on the interaction history database 2086 that reflects the effectiveness of any previous disambiguation recommendations 1240.

Because the knowledge database 1970 evolves over time, the disambiguation model generator 1991 periodically generates a new version of the disambiguation model 2091 and stores the new version of the disambiguation model 2091 in the knowledge database 1970. In this fashion, the effectiveness of the disambiguation recommendations 1240 generated by the disambiguation model 2091 increase over time.

To illustrate the evolution of the disambiguation recommendations 1240 over time, and for explanatory purposes only, FIGS. 23A and 23B depict how the request processing engine 2020 disambiguates the NL request 2015 "sales by price" at two different times. FIG. 23A depicts how the request processing engine 2020 disambiguates the NL request 2015(1) "sales by price" at a time when the interaction history database 2086 includes a relatively small amount of information relevant to disambiguating the NL request 2015.

Upon receiving the NL request 2015(1) "sales by price," the disambiguation engine 2330 retrieves a most recent version of the disambiguation model 2091(1) from the knowledge database 1970. The disambiguation engine 2330 then generates the disambiguation recommendation 2340(1) "total sales by manufacturing prices" based on the NL request 2015(1) and the disambiguation model 2091(1). Accordingly, the disambiguation engine 2330 generates the inquiry 2130(1) "total sales by manufacturing price?" and presents the inquiry 2130(1) to the user.

Upon receiving the response 2140(1) "no, unit sales by manufacturing price," the disambiguation engine 2330 modifies the NL request 2015(1) to "unit sales by manufacturing price." The NL application 1940 then applies the NL request 2015(1) to the associated domain-specific data source 1920. Finally, the disambiguation engine 2330 transmits the user interaction data 2380(1) to the knowledge application 1960 for storage as part of the interaction history database 2086. As a result, the information in the interaction history database 2086 is updated to reflect the rejection of the disambiguation recommendation 2340(1) in favor of the disambiguation "unit sales by manufacturing price."

By contrast, FIG. 23B depicts how the request processing engine 2020 disambiguates the NL request 2015(2) "sales by price" at a subsequent time when the interaction history database 2086 includes a relatively large amount of information relevant to disambiguating the NL request 2015(2). Notably, the interaction history database 2086 includes information indicating that the user rejected the disambiguation recommendation 2340(1) of "total sales by manufacturing prices," and provided the disambiguation "unit sales by manufacturing price."

Upon receiving the NL request 2015(2) "sales by price," the disambiguation engine 2330 retrieves a most recent version of the disambiguation model 2091(2) from the knowledge database 1970. The disambiguation engine 2330 then generates the disambiguation recommendation 2340(2) "unit sales by manufacturing price" based on the NL request 2015(2) and the disambiguation model 2091(2). Accordingly, the disambiguation engine 2330 generates the inquiry 2130(2) "unit sales by manufacturing price?" and presents the inquiry 2130(2) to the user.

Upon receiving the response 2140(2) "yes," the disambiguation engine 2330 modifies the NL request 2015(2) to "unit sales by manufacturing price." The NL application 1940 then applies the NL request 2015(2) to the associated domain-specific data source 1920. Finally, the disambiguation engine 2330 transmits the user interaction data 2380(2) to the knowledge application 1960 for storage as part of the interaction history database 2086. As a result, the information in the interaction history database 2086 is updated to reflect the success of the disambiguation recommendation 2340(2) "unit sales by manufacturing price."

Figure 24:
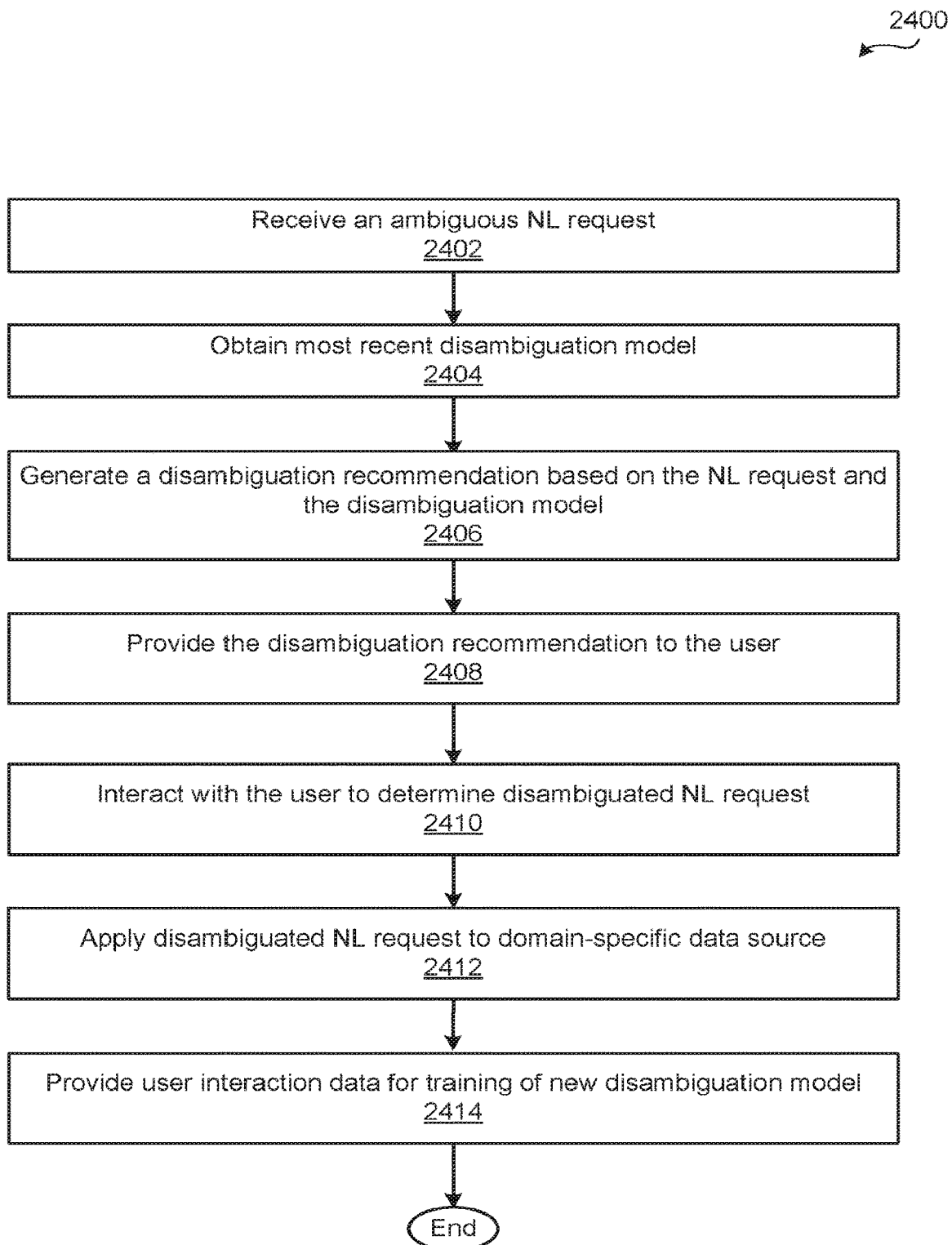
FIG. 24 is a flow diagram of method steps for disambiguating and executing an NL request, in accordance with example embodiments.

FIG. 24 is a flow diagram of method steps for disambiguating and executing an NL request, in accordance with example embodiments. Although the method steps are described with reference to the systems of FIGS. 19, 20, 23A, and 23B, persons skilled in the art will understand that any system configured to implement the method steps, in any order, falls within the scope of the present invention.

As shown, a method 2400 begins at step 2402, where the request processing engine 2020 receives an ambiguous NL request 2015 from a user. At step 2404, the disambiguation engine 2330 retrieves a most recent version of the disambiguation model 2091 from the knowledge database 1970. At step 2406, the disambiguation engine 2330 generates the disambiguation recommendation 2340 based on the NL request 2015 and the disambiguation model 2091.

At step 2408, the disambiguation engine 2330 provides the disambiguation recommendation 2340 to the user. At step 2410, the disambiguation engine 2330 interacts with the user to determine optimal disambiguation(s) for the NL request 2015. The disambiguation engine 2330 may interact with the user in any technically feasible fashion. For example, the disambiguation engine 2330 could receive a confirmation from the user that a single disambiguating phrase included in the disambiguation recommendation 2340 is acceptable. In another example, the disambiguation engine 2330 could receive a single disambiguating phrase from the user, where the single disambiguating phrase is not included in the disambiguation recommendation 2340.

At step 2412, the NL application 1940 applies the disambiguated NL request 2015 to the associated domain-specific data source 1920. At step 2414, the disambiguation engine 2330 provides the user interaction data 2380 associated with the disambiguation operations to the knowledge application 1960 for inclusion in the knowledge database 1970, and the method 1300 terminates. The request processing engine 2020 may transmit the user interaction data 2380 in any technically feasible fashion.

For example, the request processing engine 2020 could transmit the NL request 2015, the disambiguation recommendation 2340, and a clickstream to the knowledge application 1960. Subsequently, the disambiguation model generator 1991 generates a new disambiguation model 2091 based on the knowledge database 1970. As a result, the new disambiguation model 2091 reflects the user interaction data 2380.

Figures 25A, 25B:
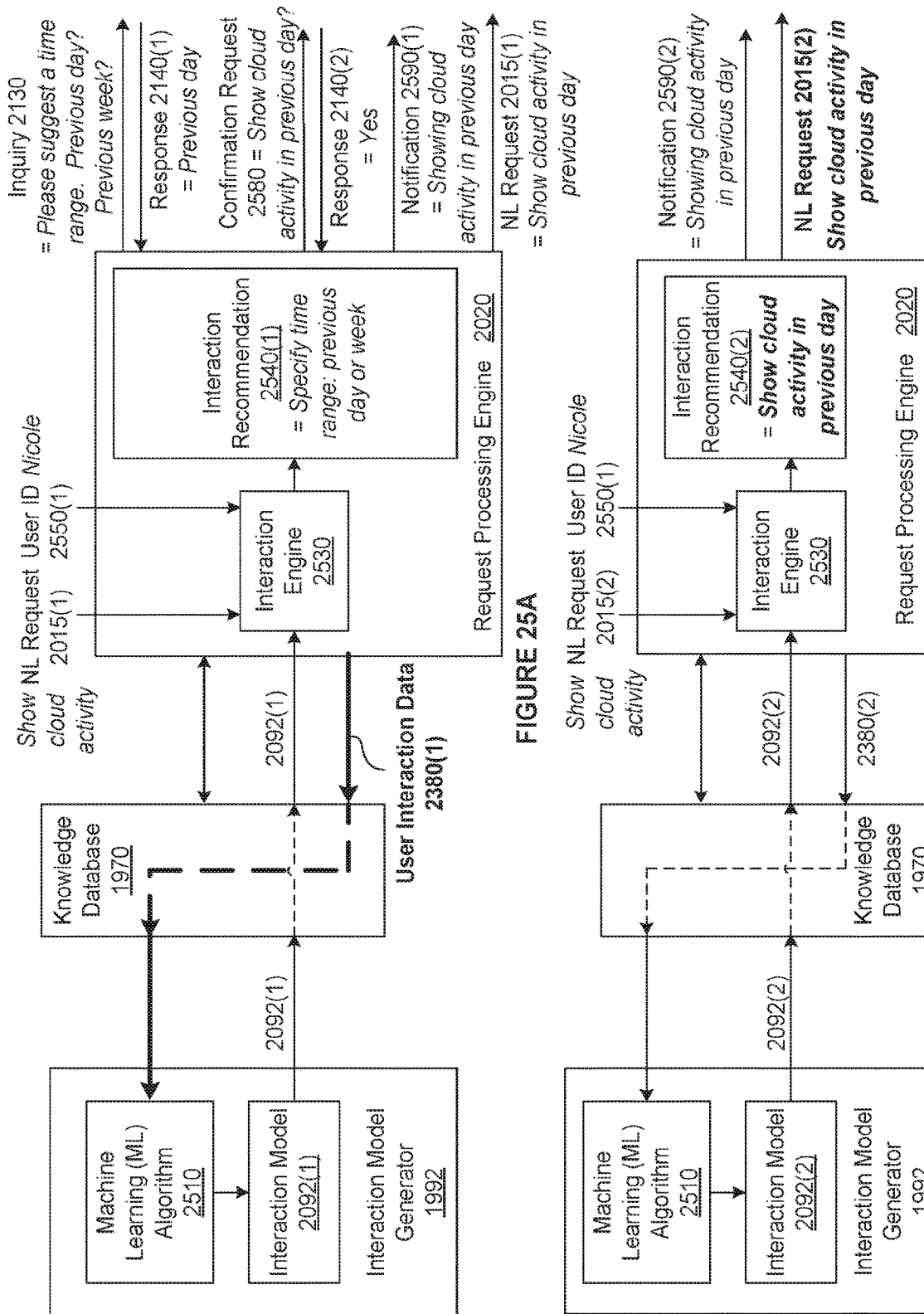
FIGS. 25A and 25B illustrate examples of how the request processing engine of FIG. 20 disambiguates and executes an NL request based on a user identification at two different points in time, in accordance with example embodiments.

FIGS. 25A and 25B illustrate examples of how the request processing engine 2020 of FIG. 20 disambiguates and executes the NL request 2015 based on a user identification (ID) 2550 at two different points in time, in accordance with example embodiments. The user identification (ID) 2550 identifies the user that issued the NL request 2015. As shown in both FIGS. 25A and 25B, the request processing engine 2020 includes, without limitation an interaction engine 2530.

To disambiguate the NL request 2015, the interaction engine 2530 retrieves a most recent version of the interaction model 2092 from the knowledge database 1970. The interaction engine 2530 then generates an interaction recommendation 2540 based on the NL request 2015, the user ID 2550, and the interaction model 2092. Subsequently, the interaction engine 2530 interacts with the user based on the interaction recommendation 2540. As part of interacting with the user, the interaction engine 2530 disambiguates the ambiguous NL request 2015. The NL application 1940 then applies the resulting disambiguated NL request 2015 to the corresponding domain-specific data source 1920.

Finally, the interaction engine 2530 transmits the user interaction data 2380 to the knowledge application 1960 for storage as part of the interaction history database 2086. The user interaction data 2380 may include any amount of information associated with presenting and/or receiving data from the user. For example, the user interaction data 2380 could include the ambiguous NL request 2015, the disambiguated NL request 2015, the user ID 2550, the interaction recommendation 2540, and a clickstream. In this fashion, the information in the interaction history database 2086 reflects the effectiveness of the interaction recommendation 2540.

In general, the interaction model 2092 associates the NL request 2015 and the user ID 2550 with the interaction recommendation 2540. In alternate embodiments, the interaction model 2092 may associate the NL request 2015, the user ID 2550, and any number of additional parameters with the interaction recommendation 2540. For instance, in some embodiments, the interaction model 2092 may associate the NL request 2015, the user ID 2550, and a time with the interaction recommendation 2540.

The interaction recommendation 2540 may include any amount and type of information in any technically feasible format. For instance, in some embodiments, the interaction recommendation 2540 may specify to act on a disambiguated NL request 2015, confirm a disambiguated request 2015, or question the user to determine a disambiguated NL request 2015 based on a list of disambiguating phrases. The interaction engine 2530 determines an interaction strategy based on the interaction recommendation 2540. The interaction strategy is one of act, confirm, or question. In alternate embodiments, the interaction strategy may be one of any number of different strategies, where each strategy guides the interaction engine 2530 to perform any number and type of operations. The interaction engine 2530 then interacts with the user based on the interaction strategy.

If the interaction strategy is to act, then the interaction engine 2530 disambiguates the ambiguous NL request 2015 based on the interaction recommendation 2540, generates a notification 2690 that specifies the disambiguated NL request 2015, and presents the notification 2690 to the user. If, however, the interaction strategy is to confirm, then the interaction engine 2530 disambiguates the NL request 2015 based on the interaction recommendation 2540 and generates a confirmation request 2580 that specifies the disambiguated NL request 2015. After presenting the confirmation request 2580 and receiving the response 2140(2), the interaction engine 2530 generates a notification 2690 that specifies the disambiguated NL request 2015 and presents the notification 2690 to the user.

If the interaction strategy is to question the user, then the interaction engine 2530 generates the inquiry 2130 based on the interaction recommendation 2540. After transmitting the inquiry 2130 and receiving the response 2140, the interaction engine 2530 disambiguate the NL request 2015 based on the response 2140 and generates a confirmation request 2580 that specifies the disambiguated NL request 2015. After transmitting the confirmation request 2580 and receiving the response 2140(2), the interaction engine 2530 generates a notification 2690 that specifies the disambiguated NL request 2015.

In general, as part questioning, confirming, and notifying, the interaction engine 2530 may interact with the user in any technically feasible fashion that is consistent with the communication techniques associated with the user. For example, if the request processing engine 2020 receives the NL request 2015 as a text message, then the interaction engine 2530 could interact with the user via text messages.

As shown in both FIGS. 25A and 25B, the interaction model generator 1992 generates the interaction model 2092 and stores the interaction model 2092 in the knowledge database 1970. The interaction model generator 1992, includes, without limitation, a machine learning (MIL) algorithm 2510. The ML algorithm 2510 trains the interaction model 2092 to associate the NL request 2015 and the user ID 2550 with the interaction recommendation 2540 based on information included in the knowledge database 1970.

The ML algorithm 2510 may include any number and type of technically feasible ML operations, and the interaction model 2092 may comprise any type of machine learning model. For instance, in some embodiments, the ML algorithm 2510 includes multidimensional scaling (MS) operations. In the same or other embodiments, the ML algorithm 2510 includes support vector machine (SVM) training operations. In various embodiments, the interaction model 2092 comprises a neural network model. In some embodiments, the interaction model 2092 comprises a deep learning model. Further the ML algorithm 2510 may train the interaction model 2092 based on any amount and type of information included in the knowledge database 1970. In particular, the ML algorithm 2510 trains the interaction model 2092 based on the interaction history database 2086 that reflects the effectiveness of any previous interaction recommendations 2540.

Because the knowledge database 1970 evolves over time, the interaction model generator 1992 periodically generates a new version of the interaction model 2092 and stores the new version of the interaction model 2092 in the knowledge database 1970. In this fashion, the effectiveness of the interaction recommendations 2540 generated by the interaction model generator 1992 increase over time. Advantageously, as a particular user interacts with NL application 1940, the interaction model 2092 "learns" the preferences of the user. Consequently, the interaction recommendations 2540 generated by the interaction model 2092 corresponding to the user ID 2550 of the user are less likely to specify to a questioning strategy, and the efficiency of the NL application 1940 increases.

To illustrate the evolution of the interaction recommendations 2540 over time, and for explanatory purposes only, FIG. 25A and FIG. 25B depict how the request processing engine 2020 disambiguates the NL request 2015 "show cloud activity" associated with the user ID 2550 "Mary" at two different times. FIG. 25A depicts how the request processing engine 2020 disambiguates the NL request 2015(1) "show cloud activity" received from Mary at a time when the interaction history database 2086 includes a relatively small amount of information relevant to disambiguating "show cloud activity" received from Mary.

Upon receiving the NL request 2015(1) "show cloud activity," the interaction engine 2530 retrieves a most recent version of the interaction model 2092(1) from the knowledge database 1970. The interaction engine 2530 then generates the interaction recommendation 2540(1) "specify time range: previous day or week" based on the NL request 2015(1), the user ID 2550, and the interaction model 2092(1). Accordingly, the interaction engine 2530 determines that the interaction strategy is to question Mary.

The interaction engine 2530 generates the inquiry 2130 "Please suggest a time range. Previous day? Previous week?" and presents the inquiry 2130 to Mary. Upon receiving the response 2140(1) "previous day," the interaction engine 2530 modifies the NL request 2015(1) to "show cloud activity in previous day." The interaction engine 2530 then generates the confirmation request 2580 "show cloud activity in previous day?" and presents the confirmation request 2580 to Mary. Upon receiving the response 2140(2) "yes," the interaction engine 2530 generates the notification 2690(1) "showing cloud activity in previous day" and presents the notification 2690(1) to Mary.

The NL application 1940 then applies the NL request 2015(1) "show cloud activity in previous day" to the associated domain-specific data source 1920. Finally, the interaction engine 2530 transmits the user interaction data 2380(1) to the knowledge application 1960 for storage as part of the interaction history database 2086. As a result, the information in the interaction history database 2086 is updated to reflect that Mary clarified the time range as the previous day for "show cloud activity."

By contrast, FIG. 25B depicts how the request processing engine 2020 disambiguates the NL request 2015(2) "show cloud activity" received from Mary at a time when the interaction history database 2086 includes a relatively large amount of information relevant to disambiguating "show cloud activity" received from Mary. Notably, the interaction history database 2086 includes information indicating that Mary clarified the time range as the previous day for "show cloud activity."

Upon receiving the NL request 2015(2) "show cloud activity," the interaction engine 2530 retrieves a most recent version of the interaction model 2092(2) from the knowledge database 1970. The interaction engine 2530 then generates the interaction recommendation 2540(2) "show cloud activity in the previous day" based on the NL request 2015(2), the user ID 2550, and the interaction model 2092(2). Accordingly, the interaction engine 2530 determines that the interaction strategy is to act. The NL application 1940 then applies the NL request 2015(2) "show cloud activity in previous day" to the associated domain-specific data source 1920. Finally, the interaction engine 2530 transmits the user interaction data 2380(2) to the knowledge application 1960 for storage as part of the interaction history database 2086.

Figure 26:
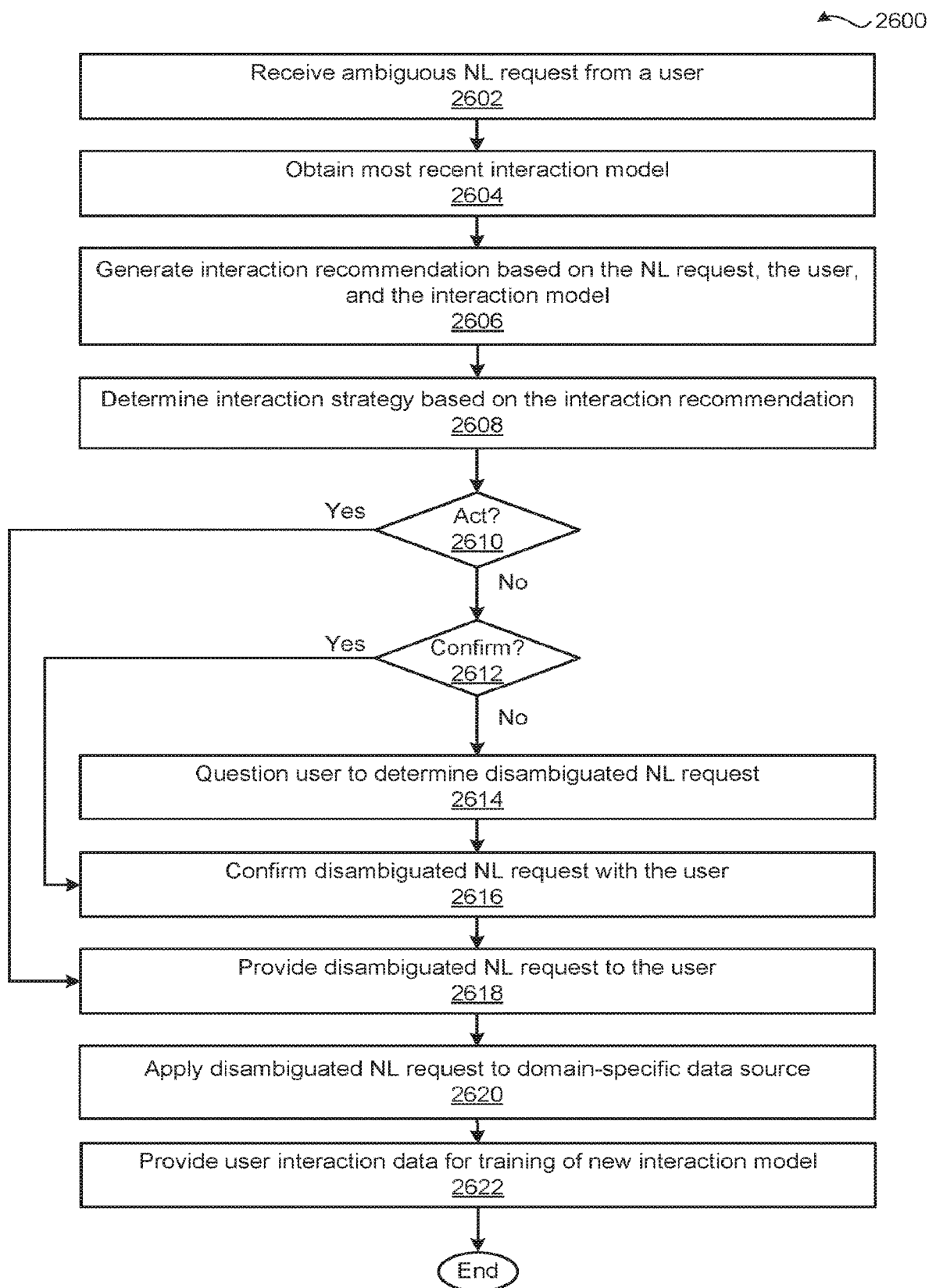
FIG. 26 is a flow diagram of method steps for disambiguating and executing an NL request based on a user identification, in accordance with example embodiments.

FIG. 26 is a flow diagram of method steps for disambiguating and executing an NL request based on a user identification, in accordance with example embodiments. Although the method steps are described with reference to the systems of FIGS. 19, 20, 25A, and 25B, persons skilled in the art will understand that any system configured to implement the method steps, in any order, falls within the scope of the present invention.

As shown, a method 2600 begins at step 2602, where the request processing engine 2020 receives an ambiguous NL request 2015 from a user. At step 2604, the interaction engine 2530 retrieves a most recent version of the interaction model 2092 from the knowledge database 1970. At step 2606, the interaction engine 2530 generates the interaction recommendation 2540 based on the NL request 2015, the user ID 2550 associated with the user, and the interaction model 2092.

At step 2608, the interaction engine 2530 determines an interaction strategy based on the interaction recommendation 2540. The interaction strategy is one of act, confirm, or question. In alternate embodiments, the interaction strategy may be one of any number of different strategies, where each strategy guides the request processing engine 2020 to perform any number and type of operations. At step 2610, the interaction engine 2530 determines whether the interaction strategy is to act on a disambiguated NL request 2015 included in the interaction recommendation 2540. If, at step 2610, the interaction engine 2530 determines that the interaction strategy is not to act, then the method 2600 proceeds to step 2612.

At step 2612, the interaction engine 2530 determines whether the interaction strategy is to confirm a disambiguated NL request 2015 included in the interaction recommendation 2540. If, at step 2612, the interaction engine 2530 determines that the interaction strategy is not to confirm, then the method 2600 proceeds to step 2614. At step 2614, the interaction engine 2530 interacts with the user to determine a disambiguated NL request 2015 that accurately represents the meaning of the ambiguous NL request 2015.

As part of step 2614, the interaction engine 2530 may perform any amount and type of disambiguation operations in any technically feasible fashion. For instance, in some embodiments, the interaction engine 2530 may suggest one or more disambiguating phrases based on the interaction recommendation 2540. In other embodiments, the interaction engine 2530 may execute the method 2400 described above in conjunction with FIG. 24 any number of times to determine a disambiguated NL request 2015.

If, however, at step 2612, the interaction engine 2530 determines that the interaction strategy is to confirm, then the method 2600 proceeds directly to step 2616. At step 2616, the interaction engine 2530 confirms the disambiguated NL request 2015 with the user. If, however, at step 2610, the interaction engine 2530 determines that the interaction strategy is to act, then the method 2600 proceeds directly to step 2618. At step 2618, the interaction engine 2530 presents the disambiguated NL request 2015 to the user.

At step 2620, the NL application 1940 applies the disambiguated NL request 2015 to the corresponding domain-specific data source 1920. More specifically, the request processing engine 2020 causes other components in the NL application 1940 to translate the disambiguated NL request 2015 to the DSL request 2045 and apply the DSL request 2045 to the corresponding domain-specific data source 1920. At step 2622, the interaction engine 2530 provides the user interaction data 2380 associated with the interaction recommendation 2540 to the knowledge application 1960 for incorporation into the knowledge database 1970, and the method 2600 terminates.

The request processing engine 2020 may transmit the user interaction data 2380 in any technically feasible fashion. For example, the request processing engine 2020 could transmit the NL request 2015, the interaction recommendation 2540, and a clickstream to the knowledge application 1960. Subsequently, the interaction model generator 1992 generates a new interaction model 2092 based on the knowledge database 1970. As a result, the new interaction model 2092 reflects the user interaction data 2380.

Generating Follow-Up NL Requests

Figure 27A:
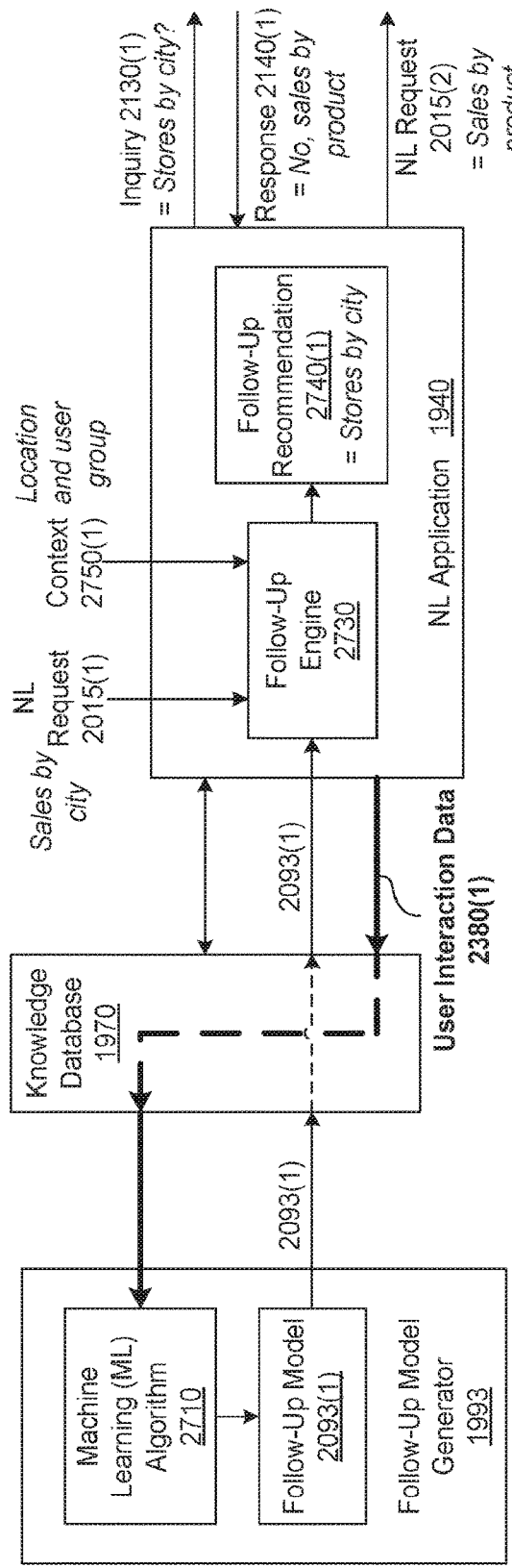
FIGS. 27A and 27B illustrate examples of how the NL application of FIG. 20 generates and executes a follow-up NL request based on an initial NL request at two different points in time, in accordance with example embodiments.
Figure 27B:
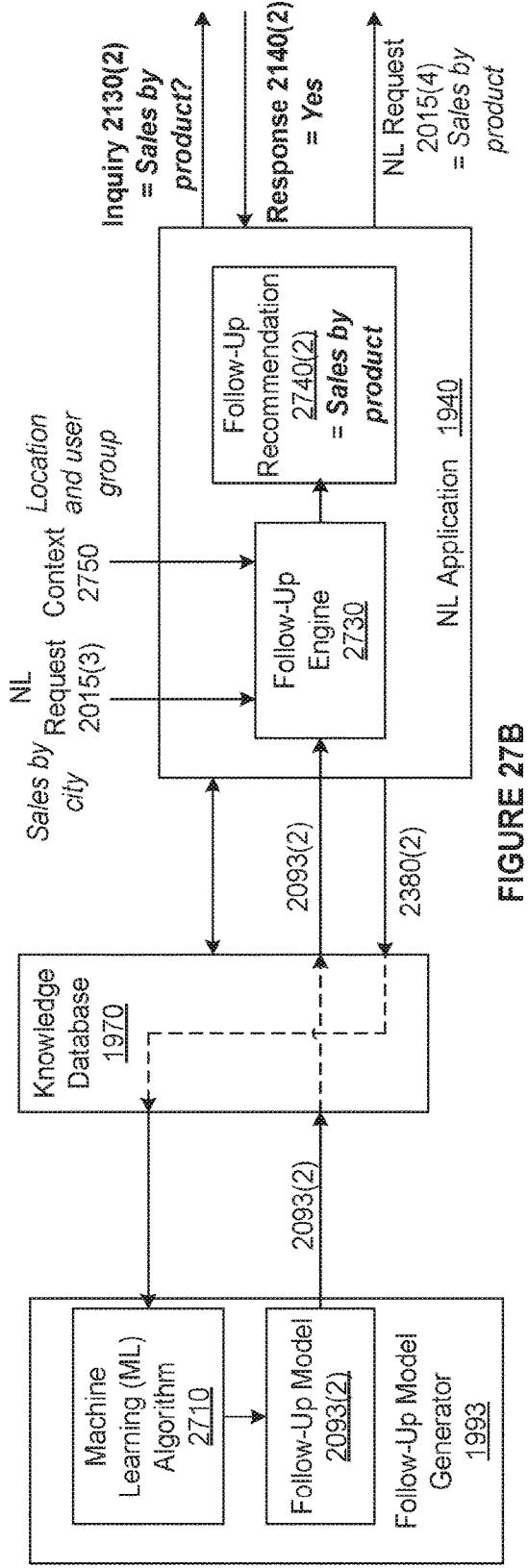

FIGS. 27A and 27B illustrate examples of how the NL application 1940 of FIG. 20 generates and executes a follow-up NL request 2015($x$+1) based on an initial NL request 2015($x$) at two different points in time, in accordance with example embodiments. As shown in both FIGS. 27A and 27B, the request NL application 1940 includes, without limitation a follow-up engine 2730.

To generate the follow-up NL request 951($x$+1), the follow-up engine 2730 retrieves a most recent version of the follow-up model 2093 from the knowledge database 1970. The follow-up engine 2730 then generates a follow-up recommendation 2740 based on the NL request 2015($x$), a context 2750, and the follow-up model 2093. The follow-up engine 2730 generates the inquiry 2130 based on the follow-up recommendation 2740 and presents the inquiry 2130 to the user.

Upon receiving the response 2140 to the inquiry 2130, the follow-up engine 2730 determines whether the response 2140 indicates that the follow-up engine 2730 is to generate a follow-up to the NL request 2015($x$). If the follow-up engine 2730 determines that the response 2140 does not indicate that the follow-up engine 2730 is to generate a follow-up to the NL request 2015($x$), then the follow-up engine 2730 does not generate the NL request 2015($x$+1). If, however, the follow-up engine 2730 determines that the response 2140 indicates that the follow-up engine 2730 is to generate a follow-up to the NL request 2015($x$), then the follow-up engine 2730 generates the NL request 2015($x$+1) based on the response 2140.

The NL application 1940 then applies the NL request 2015($x$+1) to the associated domain-specific data source 1920. Finally, the NL application 1940 transmits the user interaction data 2380 to the knowledge application 1960 for storage as part of the interaction history database 2086. As a result, the information in the interaction history database 2086 reflects the effectiveness of the follow-up recommendation 2740.

The context 2750 may include any amount and type of data associated with the NL request 2015 and/or the user that issued the NL request 2015. Notably, the context 2750 may include contextual data relating to situational awareness. As referred to herein, "situational awareness" is the perception of environmental elements and events with respect to contextual data, the comprehension of the meaning and significance of the situation, and the projection of future states and events. Examples of contextual data include, without limitation, a time associated with the NL request 2015, a device with which the user specified the NL request 2015, a job function of the user, a location of the user, the time of day, a user situation, a user context, and a user preference.

In general, the follow-up model 2093 associates the NL request 2015 and the context 2750 with the follow-up recommendation 2740. In alternate embodiments, the follow-up model 2093 may associate the NL request 2015 and any number (including zero) of additional parameters with the follow-up recommendation 2740. For instance, in some embodiments, the disambiguation model 2091 may associate the NL request 2015 with the follow-up recommendation 2740 irrespective of the context 2750.

The follow-up recommendation 2740 may include any amount and type of information that provides suggestions relevant to generating the follow-up request 2015($x$+1) based on the NL request 2015($x$). For instance, in some embodiments, the follow-up recommendation 2740 may be a list of search queries that is ordered based on estimated interest to the user. In other embodiments, the follow-up recommendation 2740 may be a single search query.

The follow-up engine 2730 may include any portion (including all) of the follow-up recommendation 2740 in the inquiry 2130. Further, the follow-up engine 2730 may present the inquiry 2130 to the user in any technically feasible fashion that is consistent with the communication techniques associated with the user. For example, if the follow-up engine 2730 receives the NL request 2015 verbally, then the follow-up engine 2730 could verbalize the follow-up recommendation 2740. The follow-up engine 2730 may cause the user interaction data 2380 to be incorporated into the interaction history database 2086 in any technically feasible fashion. For example, the request processing engine 2020 could transmit the NL request 2015, the context 2750, the follow-up recommendation 2740, and a clickstream to the knowledge application 1960.

As shown in both FIGS. 27A and 27B, the follow-up model generator 1993 generates the follow-up model 2093 and stores the follow-up model 2093 in the knowledge database 1970. The follow-up model generator 1993 includes, without limitation, a machine learning (ML) algorithm 2710. The ML algorithm 2710 trains the follow-up model 2093 to associate the NL request 2015 with the follow-up recommendation 2740 based on information included in the knowledge database 1970.

The ML algorithm 2710 may include any number and type of technically feasible ML operations, and the follow-up model 2093 may comprise any type of machine learning model. For instance, in some embodiments, the ML algorithm 2710 includes multidimensional scaling (MS) operations. In the same or other embodiments, the ML algorithm 2710 includes support vector machine (SVM) training operations. In various embodiments, the follow-up model 2093 comprises a neural network model. In some embodiments, the follow-up model 2093 comprises a deep learning model. Further the ML algorithm 2710 may train the follow-up model 2093 based on any amount and type of information included in the knowledge database 1970. In particular, the ML algorithm 2710 trains the follow-up model 2093 based on the interaction history database 2086 that reflects the effectiveness of any previous follow-up recommendations 2740.

Because the knowledge database 1970 evolves over time, the follow-up model generator 1993 periodically generates a new version of the follow-up model 2093 and stores the new version of the follow-up model 2093 in the knowledge database 1970. In this fashion, the effectiveness of the follow-up recommendations 2740 generated by the follow-up model 2093 increase over time.

To illustrate the evolution of the follow-up recommendations 2740 over time, and for explanatory purposes only, FIG. 27A and FIG. 27B depict how the NL application 1940 generates the follow-up NL request 2015($x$+1) based on the NL request 2015($x$) "sales by city" at two different times. FIG. 27A depicts how the NL application 1940 generates the NL request 2015(2) based on the NL request 2015(1) "sales by city" at a time when the interaction history database 2086 includes a relatively small amount of information relevant to generating the NL request 2015(2) based on the NL request 2015(1).

Upon receiving the NL request 2015(1) "sales by city," the follow-up engine 2730 retrieves a most recent version of the follow-up model 2093(1) from the knowledge database 1970. The follow-up engine 2730 then generates the follow-up recommendation 2740(1) "stores by city" based on the NL request 2015(1), the context 2750(1) "location and user group," and the follow-up model 2093(1). Accordingly, the follow-up engine 2730 generates the inquiry 2130(1) "stores by city?" and presents the inquiry 2130(1) to the user.

Upon receiving the response 2140(1) "no, sales by product," the follow-up engine 2730 generates the NL request 2015(2) "sales by product." The NL application 1940 then applies the NL request 2015(2) to be the associated domain-specific data source 1920. Finally, the NL application 1940 transmits the user interaction data 2380(1) to the knowledge application 1960 for storage as part of the interaction history database 2086. As a result, the information in the interaction history database 2086 is updated to reflect the rejection of the follow-up recommendation 2740(1) in favor of "sales by product."

By contrast, FIG. 27B depicts how the NL application 1940 generates the NL request 2015(4) based on the NL request 2015(3) "sales by city" at a time when the interaction history database 2086 includes a relatively large amount of information relevant to generating the NL request 2015(4) based on the NL request 2015(3). Notably, the interaction history database 2086 includes information indicating that the user rejected the follow-up recommendation 2740(1) of "stores by city" and requested "sales by product."

Upon receiving the NL request 2015(3) "sales by city," the follow-up engine 2730 retrieves a most recent version of the follow-up model 2093(2) from the knowledge database 1970. The follow-up engine 2730 then generates the follow-up recommendation 2740(2) "sales by product" based on the NL request 2015(3), the context 2750(2), and the follow-up model 2093(2). For explanatory purposes only, the context 2750(2) matches the context 2750(1). Accordingly, the follow-up engine 2730 generates the inquiry 2130(2) "sales by product?" and presents the inquiry 2130(2) to the user.

Upon receiving the response 2140(2) "yes," the follow-up engine 2730 generates the NL request 2015(4) "sales by product." The NL application 1940 then applies the NL request 2015(4) to the associated domain-specific data source 1920. Finally, the NL application 1940 transmits the user interaction data 2380(2) to the knowledge application 1960 for storage as part of the interaction history database 2086. As a result, the information in the interaction history database 2086 is updated to reflect the success of the follow-up recommendation 2740(2) "sales by product."

Figure 28:
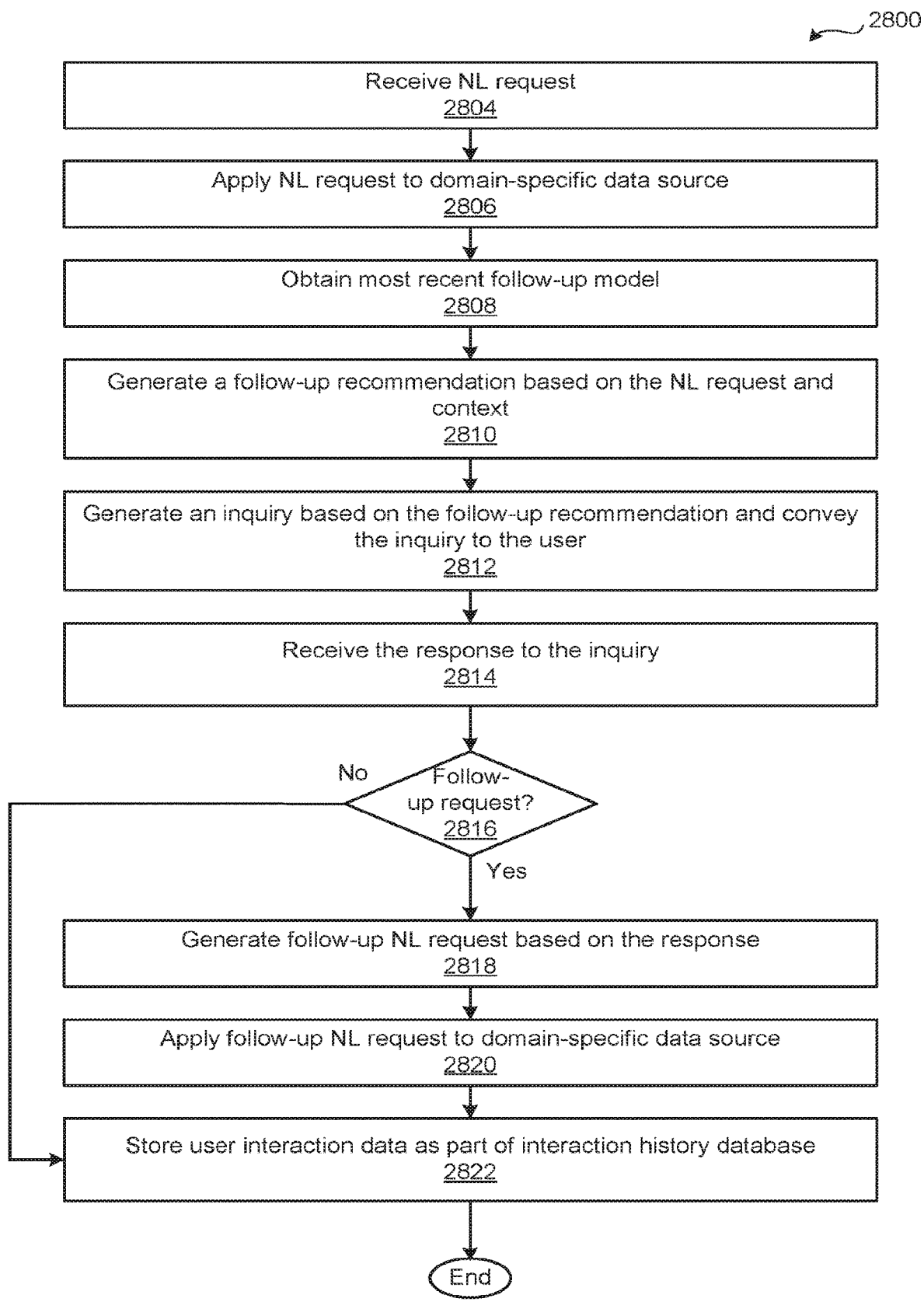
FIG. 28 is a flow diagram of method steps for generating and executing a follow-up NL request based on an initial NL request, in accordance with example embodiments.

FIG. 28 is a flow diagram of method steps for generating and executing a follow-up NL request based on an initial NL request, in accordance with example embodiments. Although the method steps are described with reference to the systems of FIGS. 19, 20, 27A, and 27B, persons skilled in the art will understand that any system configured to implement the method steps, in any order, falls within the scope of the present invention.

As shown, a method 2800 begins at step 2804, where the NL application 820 receives the NL request 2015($x$) from a user. At step 2806, the NL application 820 applies the NL request 2015($x$) to the associated domain-specific data source 1920. At step 2808, the follow-up engine 2730 retrieves a most recent version of the follow-up model 2093 from the knowledge database 1970. At step 2810, the follow-up engine 2730 generates the follow-up recommendation 2740 based on the NL request 2015($x$), the context 2750, and the follow-up model 2093. At step 2812, the follow-up engine 2730 generates the inquiry 2130 based on the follow-up recommendation 2740, and presents the inquiry 2130 to the user.

At step 2816, the follow-up engine 2730 determines whether the response 2140 indicates that the follow-up engine 2730 is to generate a follow-up to the NL request 2015($x$). If, at step 716, the follow-up engine 2730 determines that the response 2140 indicates that the follow-up engine 2730 is to generate a follow-up to the NL request 2015($x$), then the follow-up engine 2730 proceeds to step 718. At step 2818, the follow-up engine 2730 generates the NL request 2015($x$+1) based on the response 2140. At step 2820, the NL application 1940 applies the NL request 2015($x$+1) to the associated domain-specific data source 1920.

If, however, at step 2816, the follow-up engine 2730 determines that the response 2140 does not indicate that the follow-up engine 2730 is to generate a follow-up to the NL request 2015, then the method 2800 proceeds directly to step 2822. At step 2822, the NL application 1940 transmits the user interaction data 2380 to the knowledge application 1960 for storage as part of the interaction history database 2086. As a result, the information in the interaction history database 2086 reflects the effectiveness of the follow-up recommendation 2740. The method 2800 then terminates.

Presenting Search Results

FIGS. 29A and 29BB illustrate examples of how the story builder 2060 of FIG. 20 determines a presentation format 2950 for the search results 2055 and then presents the search results 2055 at two different points in time, in accordance with example embodiments. As shown in both FIGS. 29A and 29B, the story builder 2060 includes, without limitation a presentation engine 2930.

In operation, upon receiving the NL request 2015 and the corresponding search results 2055, the presentation engine 2930 retrieves a most recent version of the presentation model 2094 from the knowledge database 1970. The presentation engine 2930 then generates a presentation recommendation 2940 based on the NL request 2015, the search results 995, and the presentation model 2094. The presentation engine 2930 generates the inquiry 2130 that presents the presentation recommendation 2940 to the user and requests feedback. Upon receiving the response 2140 to the inquiry 2130, the presentation engine 2930 determines the presentation format 2950 based on the response 2140. The story builder 2060 then presents the search results 2055 based on the presentation format 2950.

Finally, the story builder 2060 transmits the user interaction data 2380 to the knowledge application 1960 for storage as part of the interaction history database 2086. The user interaction data 2380 may include any amount of information associated with presenting and/or receiving data from the user. For example, the user interaction data 2380 could include the NL request 2015, the search results 2055, the presentation recommendation 2940, and a clickstream. In this fashion, the information in the interaction history database 2086 reflects the effectiveness of the presentation recommendation 2940.

In general, the presentation model 2094 associates the NL request 2015 and the search results 2055 with the presentation recommendation 2940. In alternate embodiments, the presentation model 2094 may associate the NL request 2015, the search results 2055, and any number of additional parameters with the presentation recommendation 2940. For instance, in some embodiments, the presentation model 2094 may associate the NL request 2015, the search results 2055, and a device type (e.g., a mobile device or voice enabled assistant) with the presentation recommendation 2940.

The presentation recommendation 2940 may include any amount and type of information that provides suggestions relevant to presenting the search results 2055. For instance, in some embodiments, the presentation recommendation 2940 may be a list of plots that is ordered based on estimated desirability for displaying the search results 2055. In other embodiments, the presentation recommendation 2940 may be a single plot. In yet other embodiments, the presentation recommendation 2940 may be a single verbalization option or a list of verbalization options that is ordered based on estimated desirability.

The presentation engine 2930 may include any portion (including all) of the presentation recommendation 2940 in the inquiry 2130. Further, the presentation engine 2930 may present the inquiry 2130 to the user in any technically feasible fashion that is consistent with the communication techniques associated with the user. For example, if the presentation engine 2930 receives the NL request 2015 verbally, then the presentation engine 2930 could verbalize the presentation recommendation 2940. The presentation engine 2930 may cause the user interaction data 2380 to be incorporated into the interaction history database 2086 in any technically feasible fashion. For example, the request processing engine 2020 could transmit the NL request 2015, the search results 2055, the presentation recommendation 2940, and a clickstream to the knowledge application 1960.

As shown in both FIGS. 29A and 29B, the presentation model generator 1994 generates the presentation model 2094 and stores the presentation model 2094 in the knowledge database 1970. The presentation model generator 1994 includes, without limitation, a machine learning (ML) algorithm 2910. The ML algorithm 2910 trains the presentation model 2094 to associate the NL request 2015 and the search results 995 with the presentation recommendation 2940 based on information included in the knowledge database 1970.

The ML algorithm 2910 may include any number and type of technically feasible ML operations, and the presentation model 2094 may comprise any type of machine learning model. For instance, in some embodiments, the ML algorithm 2910 includes multidimensional scaling (MS) operations. In the same or other embodiments, the ML algorithm 2910 includes support vector machine (SVM) training operations. In various embodiments, the presentation model 2094 comprises a neural network model. In some embodiments, the presentation model 2094 comprises a deep learning model. Further the ML algorithm 2910 may train the presentation model 2094 based on any amount and type of information included in the knowledge database 1970. In particular, the ML algorithm 2910 trains the presentation model 2094 based on the interaction history database 2086 that reflects the effectiveness of any previous presentation recommendations 1940.

Because the knowledge database 1970 evolves over time, the presentation model generator 1994 periodically generates a new version of the presentation model 2094 and stores the new version of the presentation model 2094 in the knowledge database 1970. In this fashion, the effectiveness of the presentation recommendations 1940 generated by the presentation model 2094 increase over time.

To illustrate the evolution of the presentation recommendations 1940 over time, and for explanatory purposes only, FIG. 29A and FIG. 29B depict how the presentation engine 2930 determines the presentation format 2950 for the search results 2055 corresponding to "sales by country" at two different times. FIG. 29A depicts how the presentation engine 2930 determines the presentation format 2950 at a time when the interaction history database 2086 includes a relatively small amount of information relevant to optimizing the presentation format 2950.

Upon receiving the NL request 2015(1) "sales by country" and the corresponding search results 2055(1), the presentation engine 2930 retrieves a most recent version of the presentation model 2094(1) from the knowledge database 1970. The presentation engine 2930 then generates the presentation recommendation 2940(1) "1 bar, 2 stacked chart, 3 pie chart, 4 column" based on the NL request 2015(1), the search results 2055(1), and the presentation model 2094(1). Subsequently, the presentation engine 2930 generates the inquiry 2130(1) "bar?" and presents the inquiry 2130(1) to the user.

Upon receiving the response 2140(1) "no, column" from a user, the presentation engine 2930 sets the presentation format 2950 equal to column. The story builder 2060 then presents the search results 2055(1) based on the presentation format 2950. Finally, the presentation engine 2930 transmits the user interaction data 2380(1) to the knowledge application 1960 for storage as part of the interaction history database 2086. As a result, the information in the interaction history database 2086 is updated to reflect the rejection of the bar chart in favor of the column chart for the search results 2055(1) corresponding to the NL request 2015(1) "sales by country" for the user.

FIG. 29B depicts how the presentation engine 2930 determines the presentation format 2950 for the search results 2055(2) corresponding the NL request 2015(2) "sales by country." However, FIG. 29B depicts how the presentation engine 2930 determines the presentation format 2950 at a time when the interaction history database 2086 includes a relatively large amount of information relevant to optimizing the presentation format 2950. In particular, the interaction history database 2086 includes information indicating that a user rejected the bar chart in favor of the column chart for the search results 2055(1) corresponding to the NL request 2015(1) "sales by country."

Upon receiving the NL request 2015(2) "sales by country" and the corresponding search results 2055(2), the presentation engine 2930 retrieves a most recent version of the presentation model 2094(2) from the knowledge database 1970. The presentation engine 2930 then generates the presentation recommendation 2940(2) "1 column, 2 bar, 3 stacked chart, 4 pie chart" based on the NL request 2015(2), the search results 2055(2), and the presentation model 2094(2). Subsequently, the presentation engine 2930 generates the inquiry 2130(2) "column?" and presents the inquiry 2130(1) to the user.

Upon receiving the response 2140(1) "yes," the presentation engine 2930 sets the presentation format 2950 equal to column. The story builder 2060 then presents the search results 2055(2) based on the presentation format 2950. Finally, the presentation engine 2930 transmits the user interaction data 2380(2) to the knowledge application 1960 for storage as part of the interaction history database 2086. As a result, the information in the interaction history database 2086 is updated to reflect the success of the presentation recommendation 2940(2).

As a general matter, the techniques described herein are illustrative rather than restrictive, and may be altered without departing from the broader spirit and scope of the invention. Many modifications and variations on the functionality provided by any units included in the NL system 1900 will be apparent to those of ordinary skill in the art without departing from the scope and spirit of the described embodiments. For instance, in alternate embodiments, the presentation engine 2930 may receive the intent 2035 and/or the DSL request 2045 instead of or in addition to the NL request 2015. In such embodiments, the functionality of any number of the presentation model generator 1994, the presentation recommendation model 2094, and the presentation engine 2930 may be modified accordingly.

Figure 30:
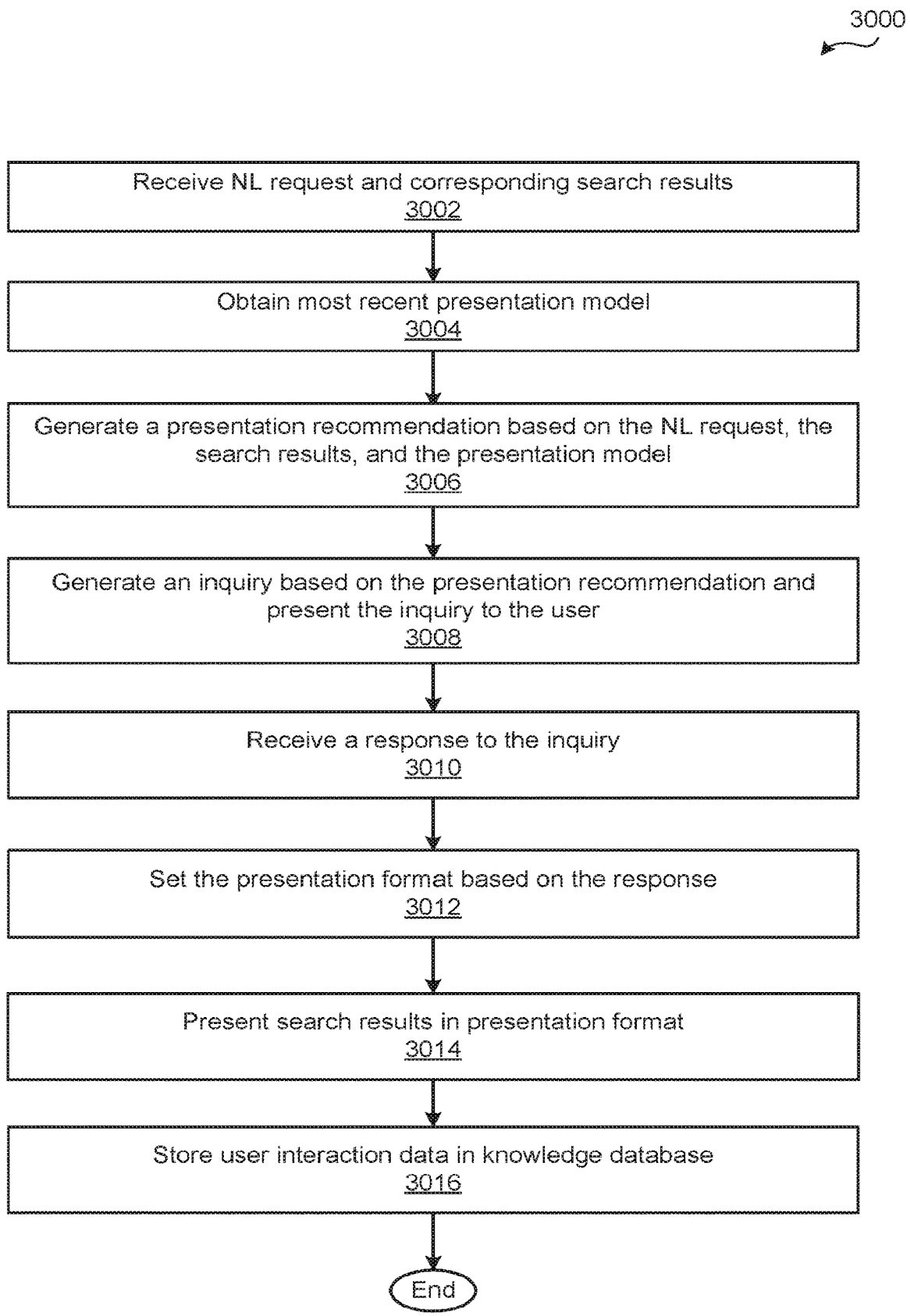
FIG. 30 is a flow diagram of method steps for presenting search results, in accordance with example embodiments.

FIG. 30 is a flow diagram of method steps for presenting search results, in accordance with example embodiments. Although the method steps are described with reference to the systems of FIGS. 19, 20, 29A, and 29B, persons skilled in the art will understand that any system configured to implement the method steps, in any order, falls within the scope of the present invention.

As shown, a method 3000 begins at step 3002, where the presentation engine 2930 receives the NL request 2015 and the corresponding search results 2055. At step 3004, the presentation engine 2930 retrieves a most recent version of the presentation model 2094 from the knowledge database 1970. At step 3006, the presentation engine 2930 generates the presentation recommendation 2940 based on the NL request 2015, the search results 2055, and the presentation model 2094.

At step 3008, the presentation engine 2930 generates the inquiry 2130 based on the presentation recommendation 2940 and presents the inquiry 2130 to the user. At step 3010, the presentation engine 2930 receives the response 2140 from the user. At step 3012, the presentation engine 2930 determines the presentation format 2950 based on the response 2140. At step 3014, the story builder 2060 presents the search results 2055 based on the presentation format 2950.

At step 3016, the presentation engine 2930 transmits the user interaction data 2380 to the knowledge application 1960 for storage as part of the interaction history database 2086. In this fashion, the information in the interaction history database 2086 reflects the effectiveness of the presentation recommendation 2940. The method 3000 then terminates.

Expanding a Set of Search Results

Figure 31A:
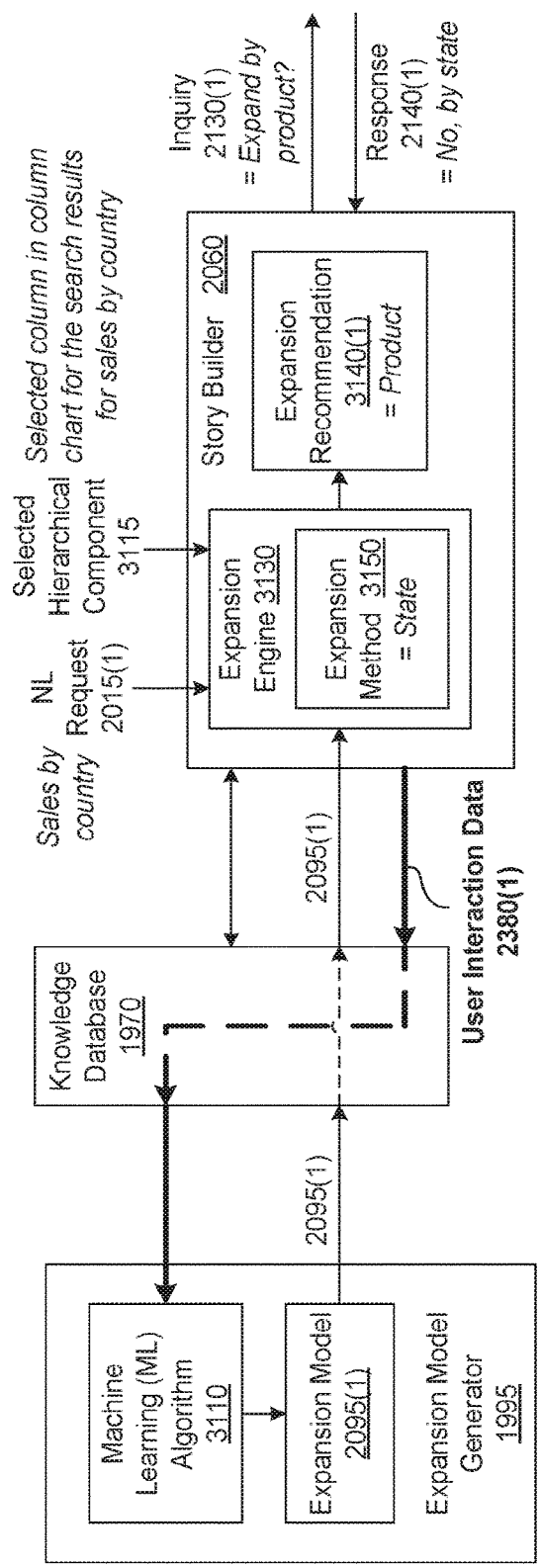
FIGS. 31A and 31B illustrate examples of how the story builder of FIG. 20 determines how to expand a set of search results and then expands the search results at two different points in time, in accordance with example embodiments.
Figure 31B:
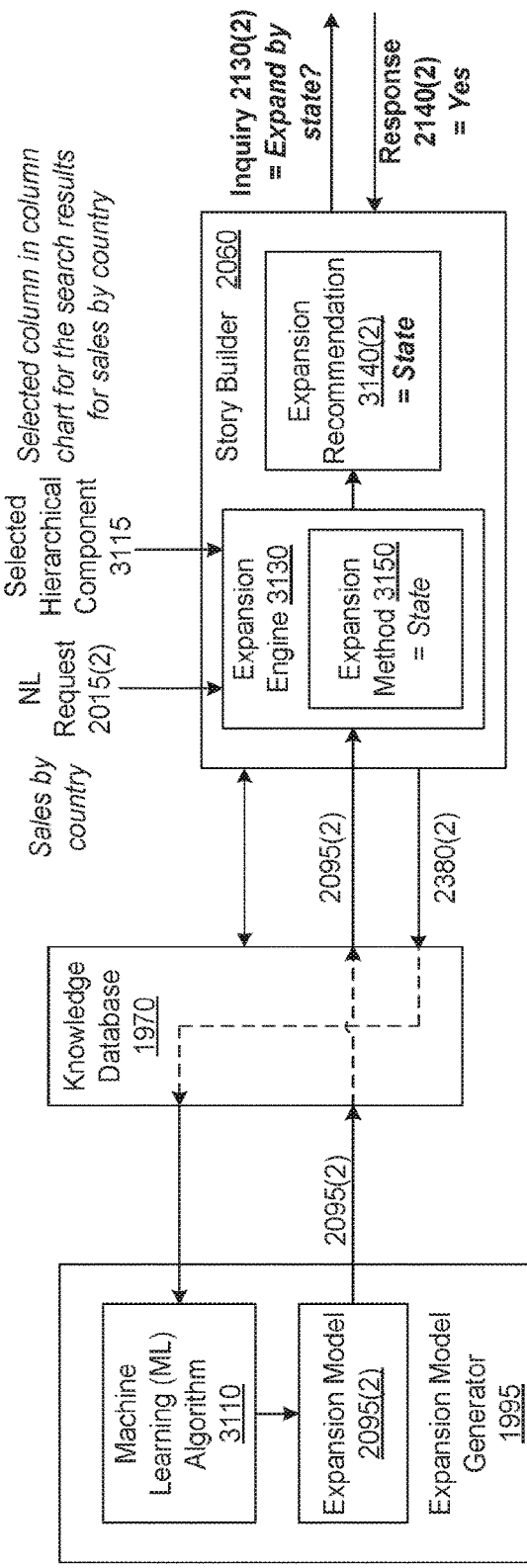

FIGS. 31A and 31B illustrate examples of how the story builder 2060 of FIG. 20 determines how to expand a set of search results 2055 and then expands the search results at two different points in time. The set of search results 2055 is defined by a selected hierarchical component 3115 (to drill down on a visual). The selected hierarchical component 3115 may be any type of component included in a presentation of the search results 2055. For example, the selected hierarchical component 3115 could be a bar included in a bar chart, a sector included in a pie chart, or a similar visual representation of information in graphical form. The expansion method 3150 specifies how the hierarchical component 3115 is to be expanded. For example, the user may select a bar corresponding to "California" and the expansion method 3150 "city" to expand California by city.

As shown in both FIGS. 31A and 31B, the story builder 2060 includes, without limitation an expansion engine 3130. In operation, upon receiving the NL request 2015 and the selected hierarchical component 3115, the expansion engine 3130 retrieves a most recent version of the expansion model 2095 from the knowledge database 1970. The expansion engine 3130 then generates an expansion recommendation 3140 based on the NL request 2015, the selected hierarchical component 3115, and the expansion model 2095. The expansion engine 3130 generates the inquiry 2130 that presents the expansion recommendation 3140 to the user and requests feedback. Upon receiving the response 2140 to the inquiry 2130, the expansion engine 3130 determines the expansion method 3150 based on the response 2140. The story builder 2060 then expands the search results 2055 associated with the selected hierarchical component 3115 based on the expansion method 3150.

Finally, the story builder 2060 transmits the user interaction data 2380 to the knowledge application 1960 for storage as part of the interaction history database 2086. The user interaction data 2380 may include any amount of information associated with presenting and/or receiving data from the user. For example, the user interaction data 2380 could include the NL request 2015, the selected hierarchical component 3115, the expansion recommendation 3140, and a clickstream. In this fashion, the information in the interaction history database 2086 reflects the effectiveness of the expansion recommendation 3140.

In general, the expansion model 2095 associates the NL request 2015 and the selected hierarchical component 3115 with the expansion recommendation 3140. In alternate embodiments, the expansion model 2095 may associate the NL request 2015, the selected hierarchical component 3115, and any number of additional parameters with the expansion recommendation 3140. For instance, in some embodiments, the expansion model 2095 may associate the NL request 2015, the search results 2055, the selected hierarchical component 3115, and a device type with the expansion recommendation 3140.

The expansion recommendation 3140 may include any amount and type of information that provides suggestions relevant to expanding the selected hierarchical component 3115. For instance, in some embodiments, the expansion recommendation 3140 may be a list of expansion strategies 2050. In other embodiments, the expansion recommendation 3140 may be a single expansion method 3150.

The expansion engine 3130 may include any portion (including all) of the expansion recommendation 3140 in the inquiry 2130. Further, the expansion engine 3130 may present the inquiry 2130 to the user in any technically feasible fashion that is consistent with the communication techniques associated with the user. For example, if the expansion engine 3130 receives the NL request 2015 verbally, then the expansion engine 3130 could verbalize the expansion recommendation 3140. The expansion engine 3130 may cause the user interaction data 2380 to be included in the interaction history database 2086 in any technically feasible fashion. For example, the request processing engine 2020 could transmit the NL request 2015, the search results 2055, the expansion recommendation 3140, and a clickstream to the knowledge application 1960.

As shown in both FIGS. 31A and 31B, the expansion model generator 1995 generates the expansion model 2095 and stores the expansion model 2095 in the knowledge database 1970. The expansion model generator 1995 includes, without limitation, a machine learning (ML) algorithm 3110. The ML algorithm 3110 trains the expansion model 2095 to associate the NL request 2015 and the selected hierarchical component 3115 with the expansion recommendation 3140 based on information included in the knowledge database 1970.

The ML algorithm 3110 may include any number and type of technically feasible ML operations, and the expansion model 2095 may comprise any type of machine learning model. For instance, in some embodiments, the ML algorithm 3110 includes multidimensional scaling (MS) operations. In the same or other embodiments, the ML algorithm 3110 includes support vector machine (SVM) training operations. In various embodiments, the expansion model 2095 comprises a neural network model. In some embodiments, the expansion model 2095 comprises a deep learning model. Further the ML algorithm 3110 may train the expansion model 2095 based on any amount and type of information included in the knowledge database 1970. In particular, the ML algorithm 3110 trains the expansion model 2095 based on the interaction history database 2086 that reflects the effectiveness of any previous expansion recommendations 3140.

Because the knowledge database 1970 evolves over time, the expansion model generator 1995 periodically generates a new version of the expansion model 2095 and stores the new version of the expansion model 2095 in the knowledge database 1970. In this fashion, the effectiveness of the expansion recommendations 3140 generated by the expansion model 2095 increase over time.

To illustrate the evolution of the expansion recommendations 3140 over time, and for explanatory purposes only, FIG. 31A and FIG. 31B depict how the expansion engine 3130 determines the expansion method 3150 for the same selected hierarchical component 3115 at two different times. The selected hierarchical component 3115 is a selected column in a column chart for the search results 2055 corresponding to the NL request 2015 "sales by country" at two different times. FIG. 31A depicts how the expansion engine 3130 determines the expansion method 3150 at a time when the interaction history database 2086 includes a relatively small amount of information relevant to determining the expansion method 3150.

Upon receiving a selection of the selected hierarchical component 3115, the expansion engine 3130 retrieves a most recent version of the expansion model 2095(1) from the knowledge database 1970. The expansion engine 3130 then generates the expansion recommendation 3140(1) "product" based on the NL request 2015(1), the selected hierarchical component 3115, and the expansion model 2095(1). Subsequently, the expansion engine 3130 generates the inquiry 2130(1) "expand by product?" and presents the inquiry 2130(1) to the user.

Upon receiving the response 2140(1) "no, by state," the expansion engine 3130 sets the expansion method 3150 equal to state. The story builder 2060 then expands the search results 2055 associated with the selected hierarchical component 3115 based on the expansion method 3150. Finally, the expansion engine 3130 transmits the user interaction data 2380(1) to the knowledge application 1960 for storage as part of the interaction history database 2086. As a result, the information in the interaction history database 2086 is updated to reflect the rejection of expanding by product in favor of expanding by state for the selected hierarchical component 3115.

FIG. 31B depicts how the expansion engine 3130 determines the expansion method 3150 for the selected hierarchical component 3115. However, FIG. 31B depicts how the expansion engine 3130 determines the expansion method 3150 at a time when the interaction history database 2086 includes a relatively large amount of information relevant to determining the expansion method 3150. In particular, the interaction history database 2086 includes information indicating that a user rejected expanding by product in favor of the expanding by state for the selected hierarchical component 3115.

Upon receiving a selection of the selected hierarchical component 3115, the expansion engine 3130 retrieves a most recent version of the expansion model 2095(2) from the knowledge database 1970. The expansion engine 3130 then generates the expansion recommendation 3140(2) "state" based on the NL request 2015(2), the selected hierarchical component 3115, and the expansion model 2095(2). Subsequently, the expansion engine 3130 generates the inquiry 2130(2) "expand by state?" and presents the inquiry 2130(2) to the user.

Upon receiving the response 2140(2) "yes," the expansion engine 3130 sets the expansion method 3150 equal to state. The story builder 2060 then expands the search results 2055 associated with the selected hierarchical component 3115 based on the expansion method 3150. Finally, the expansion engine 3130 transmits the user interaction data 2380(2) to the knowledge application 1960 for storage as part of the interaction history database 2086. As a result, the information in the interaction history database 2086 is updated to reflect the success of the expansion recommendation 3140 (2).

Figure 32:
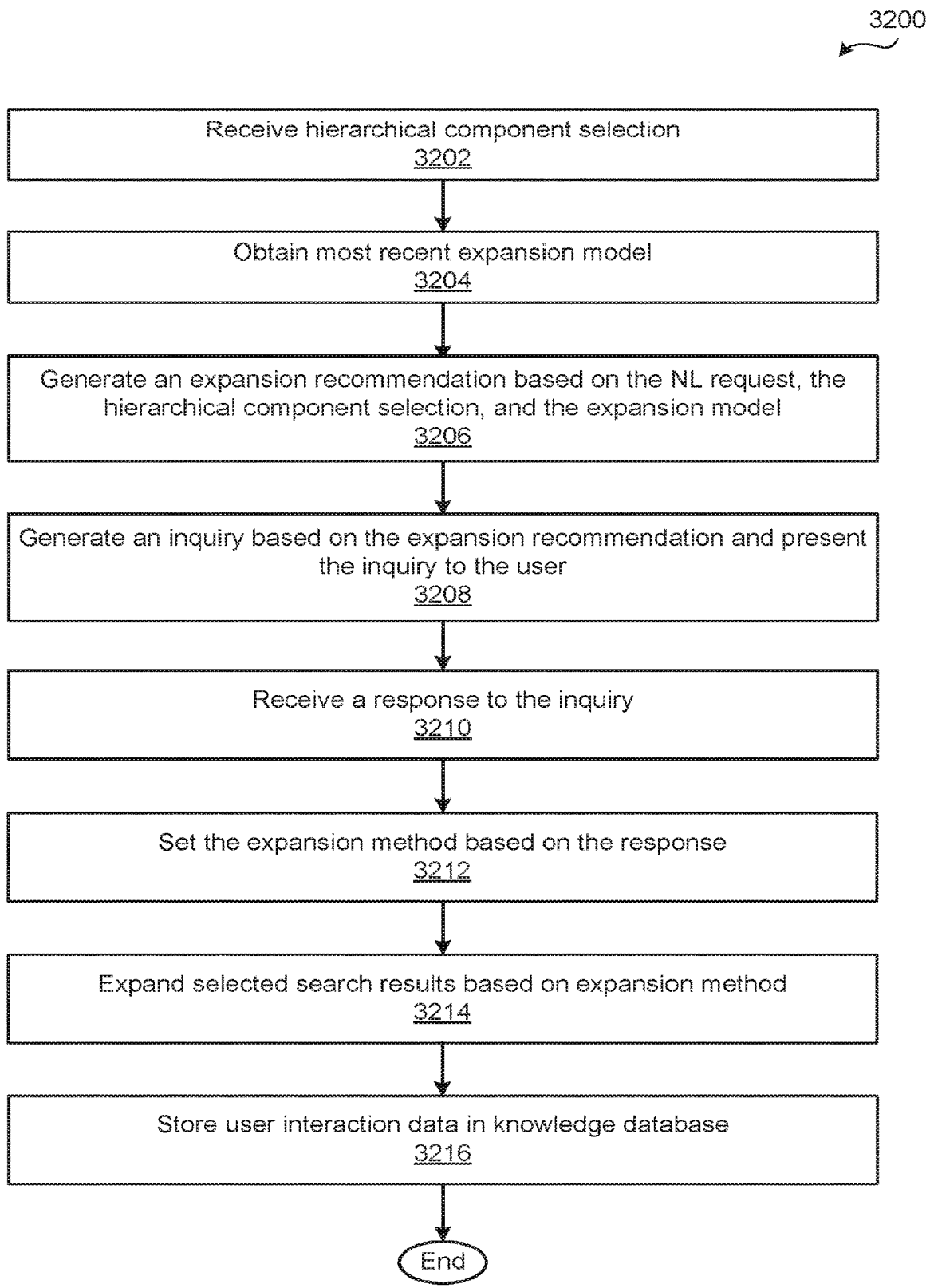
FIG. 32 is a flow diagram of method steps for expanding a set of search results, in accordance with example embodiments.

FIG. 32 is a flow diagram of method steps for expanding a set of search results, in accordance with example embodiments. Although the method steps are described with reference to the systems of FIGS. 19, 20, 31A, and 31B, persons skilled in the art will understand that any system configured to implement the method steps, in any order, falls within the scope of the present invention.

As shown, a method 3200 begins at step 3202, where the expansion engine 3130 receives the selected hierarchical component 3115 that defines the set of search results. At step 3204, the expansion engine 3130 retrieves a most recent version of the expansion model 2095 from the knowledge database 1970. At step 3206, the expansion engine 3130 generates the expansion recommendation 3140 based on the NL request 2015, the selected hierarchical component 3115, and the expansion model 2095.

At step 3208, the expansion engine 3130 generates the inquiry 3230 based on the expansion recommendation 3140 and presents the inquiry 3230 to the user. At step 3210, the expansion engine 3130 receives the response 3240 from the user. At step 3212, the expansion engine 3130 determines the expansion method 3150 based on the response 3240. At step 3214, the story builder 2060 expands the search results 2055 associated with the selected hierarchical component 3115 based on the expansion method 3150.

At step 3216, the expansion engine 3130 transmits the user interaction data 2380 to the knowledge application 1960 for storage as part of the interaction history database 2086. In this fashion, the information in the interaction history database 2086 reflects the effectiveness of the expansion recommendation 3140. The method 3200 then terminates.

Natural Language (NL) System—Further Embodiments Overview

Figure 33:
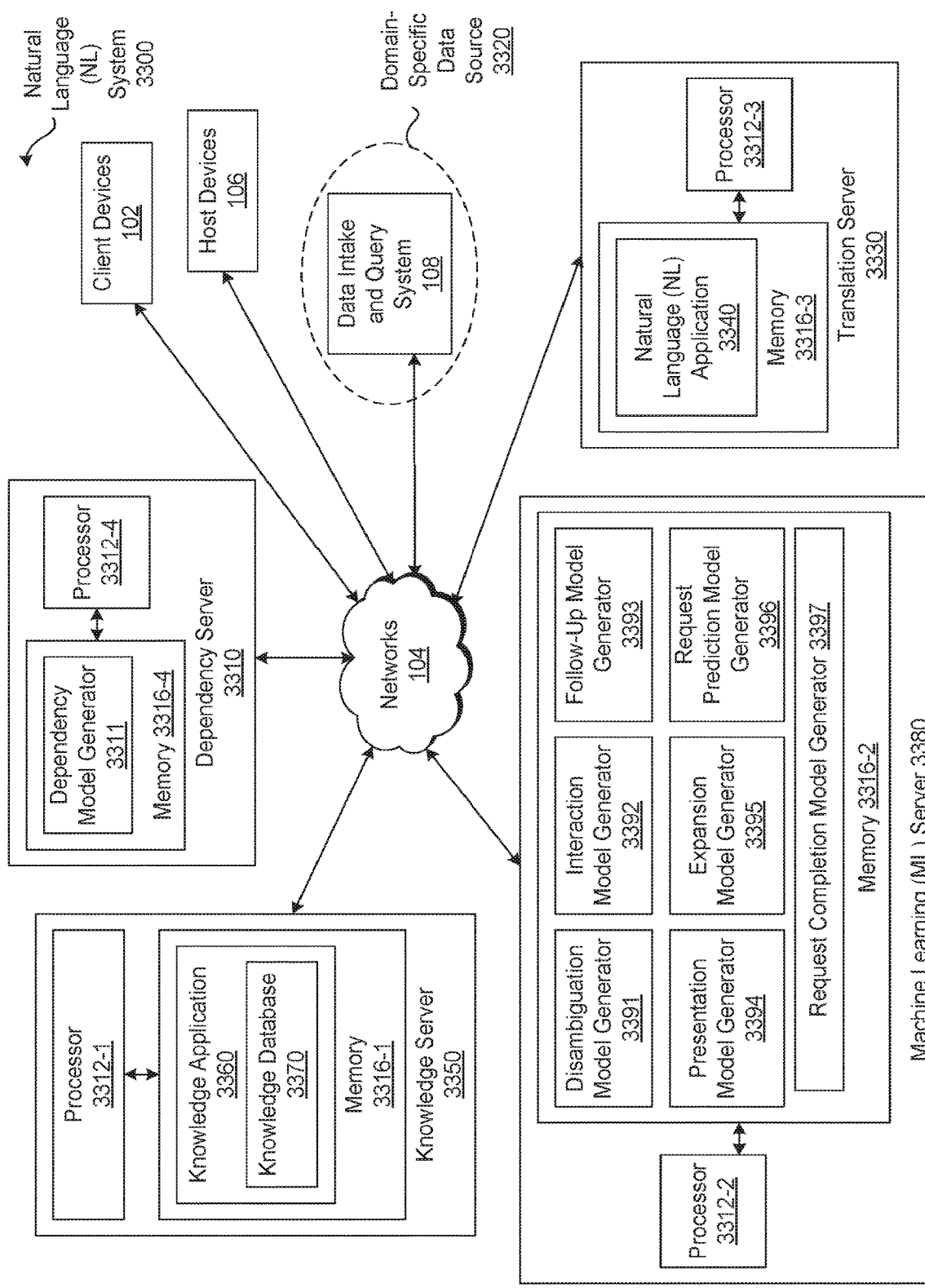
FIG. 33 illustrates a natural language (NL) system, in accordance with example embodiments.

FIG. 33 illustrates a natural language (NL) system 3300, in accordance with example embodiments. As shown, the NL system 3300 includes, without limitation, the data intake and query system 108, any number of the client devices 102, any number of the host devices 106, a translation server 3330, a knowledge server 3350, a machine-learning (ML) server 3380, and a dependency server 3310. For explanatory purposes, multiple instances of like objects are denoted with reference numbers identifying the object and parenthetical numbers identifying the instance, where needed.

The data intake and query system 108 is associated with the client devices 102 and the host devices 105 and comprises a domain-specific data source 3320 through which users can retrieve and analyze data collected from the data sources 202 as described above. In alternate embodiments, the NL system 3300 may include any number of domain-specific data sources 3320. For example, the NL system 3300 could include any number of relational database management systems, such as MySQL (My Structured Query Language) systems, and any number of NoSQL (non SQL) systems, such as MongoDB. Domain-specific data sources 3320 are also referred to herein as data storage systems.

Each of the domain-specific data sources 3320 is associated with a different domain-specific language (DSL) that enables users that are proficient in the DSL to perform operations on entities (i.e., logical groupings of data) associated with the domain-specific data source 3320. For instance, entities associated with the data intake and query system 108 can be accessed using requests written in SPL (SPLUNK® search processing language). As referred to herein, a request may comprise any command involving the entities. For example, a request could include any number of search commands, alert commands, and presentation (e.g., display, verbalization, etc.) commands, to name a few.

As shown, each of the translation server 3330, the knowledge server 3350, the machine-learning (ML) server 3380, and the dependency server 3310 includes, without limitation, a memory 3316 and a processor 3312. The servers, the memory 3316, and the processor 3312 may be implemented in any technically feasible fashion based on any number and type of resources included in the NL system 3300. For example, the translation server 3330 could be implemented in a cloud computing environment, a distributed computing environment, an on-premises server, a laptop, and so forth.

The processor 3312 may be any instruction execution system, apparatus, or device capable of executing instructions. For example, the processor 3312 could comprise one or more of a central processing unit (CPU), a graphics processing unit (GPU), a controller, a microcontroller, a state machine, or any combination thereof. The memory 3316 stores content, such as software applications and data, for use by the processor 3312. The memory 3312 may be one or more of a readily available memory, such as random access memory (RAM), read only memory (ROM), hard disk, or any other form of digital storage, local or remote.

In some embodiments, a storage (not shown) may supplement or replace the memory 3316. The storage may include any number and type of external memories that are accessible to the processor 3312. For example, and without limitation, the storage may include a Secure Digital Card, an external Flash memory, a portable compact disc read-only memory (CD-ROM), an optical storage device, a magnetic storage device, cloud storage, other tangible storage media, or any suitable combination of the foregoing. Any number of software applications may be provided as an application program (or programs) stored on computer readable media such as a CD-ROM, DVD-ROM, flash memory module, or other tangible storage media.

In an effort to enable users to access and analyze data from a wide variety of data sources without expertise in the associated DSL(s), conventional natural language (NL) data applications have been developed. In operation, a conventional NL data application extracts and curates metadata associated with the different data sources, translates a given NL request to an appropriate DSL request, applies the DSL request to the corresponding domain-specific data source to retrieve the data relevant to the original NL request, performs various operations on the retrieved data, and displays the results. Applying a request to an associated domain-specific data source is also referred to herein as "executing the request." One limitation of conventional NL data applications is that oftentimes an NL request is not able to be processed unless the NL request is complete. Further, when processing an NL request, determining the intent of the user usually involves waiting for the user to complete the request or subjecting the user to a time-consuming, interactive and, oftentimes, repetitive interrogation process. These interrogation processes are inefficient and can be annoying to users. These interrogation processes are also extremely time consuming and costly for administrators to support, or for application developers or solution providers to build.

For example, in one scenario, suppose that a user requests "daily sales last week" to obtain unit sales per day in the previous week, and then requests "in London," referencing the first request, to get the unit sales per day in the previous week in London. A conventional NL data application would process the first request ("daily sales last week") but would be unable to process the second request ("in London") without additional information because the request "in London" is incomplete and treated separately from the first request. The conventional NL data application typically would either result in an error, provide general information about London, or request that the user complete the request by, for example, re-submitting the request in complete form. Furthermore, the conventional NL data application would be unaware that the first request provides the context for the second request. In another scenario, suppose that the user types the string "daily s" for his request. A conventional NL data application would be unable to process the request because the request "daily s" is incomplete, and would typically wait for the user to complete typing of the request.

To reduce the amount of time and user effort associated with processing NL requests and to increase the overall accuracy of NL application implementations, the translation server 3330, the knowledge server 3360, the IL server 3380, and the dependency server 3310 work together to provide readily adaptable data interfacing services. Examples of data interfacing services include translation, analysis, and presentation operations, to name a few. To use the data interfacing services, users interact with the domain-specific data sources 3320 using a natural language (NL) application 3340.

The NL application 3340 executes on the processor 3312 of the translation server 3330 and is stored in the memory 3316 of the translation server 3330. The NL application 3340 performs data interfacing operations based on information stored in a knowledge database 3370. The knowledge database 3370 is included in the knowledge server 3350 and managed by a knowledge application 3360. Examples of information stored in the knowledge database 3370 include DSL-specific templates, an interaction history database, one or more data dependency models, and a variety of machine-learning (ML) models, to name a few.

In general, each of the ML models evolves and improves over time based on interactions with users. More specifically, as users interact with the domain-specific data sources 3320 through the NL application 3340, the NL application 3340 stores relevant information in the knowledge database 3370. Relevant information may include NL requests, DSL requests, clickstreams, and the like. Periodically, any number of ML model generators train corresponding ML models based on the knowledge database 3370 and then store the trained ML models in the knowledge database 3370.

In general, data dependency data (also referred to as "dependency data") is generated based on an analysis of the data stored in a domain-specific data source 3320. The analysis identifies relationships between features, subjects, metrics, entities, parameters, etc. (hereinafter collectively referred to as "artifacts") within the data in the domain-specific data source 3320. In particular, the analysis identifies the artifact(s) that affect another artifact. For example, if a domain-specific data source 3320 includes data for the artifact "daily sales," the analysis may identify artifacts that affect "daily sales," such as "website sales," "in-store sales," and "direct sales." For the artifact "in-store sales," the analysis may further identify artifacts that affect "in-store sales," such as "weather," "in-store promotion," "event," "traffic," and "holiday." At various points in time (e.g., periodically at subsecond or greater intervals), the dependency model generator 3311 analyzes the data stored in the domain-specific data sources 3320 to generate or update the data dependency data, and then generates or updates a data dependency model (also referred to as "dependency model") based on the data dependency data. The dependency model generator 3311 stores the generated/updated data dependency model in the knowledge database 3370. In some embodiments, the data dependency data and/or data dependency model is stored or included in the knowledge graph 3482.

In various embodiments, the data dependency data and/or model may be stored in and/or represented by a data dependency graph (also referred to as a "dependency graph" or "knowledge graph"), which in various embodiments is a directed graph structure. For example, continuing with the above data dependency example, the artifact "daily sales" may be a node in a dependency graph. The node "daily sales" has respective child nodes for "website sales," "in-store sales," and "direct sales," and edges indicate dependencies of the node "daily sales" on the nodes "website sales," "in-store sales," and "direct sales." The node "in-store sales" has its own respective child nodes for "weather," "in-store promotion," "event," "traffic," and "holiday," and edges dependencies of the node "in-store sales" on the nodes "weather," "in-store promotion," "event," "traffic," and "holiday." Further details regarding dependency graphs and associated dependency data and analysis are described in U.S. patent application Ser. No. 16/147,375, entitled "SYSTEM MONITORING DRIVEN BY AUTOMATICALLY DETERMINED OPERATIONAL PARAMETERS OF DEPENDENCY GRAPH MODEL WITH USER INTERFACE," filed on Sep. 28, 2018, and in U.S. patent application Ser. No. 16/147,337, entitled "REAL-TIME MEASUREMENT AND SYSTEM MONITORING BASED ON GENERATED DEPENDENCY GRAPH MODELS OF SYSTEM COMPONENTS," filed on Sep. 28, 2018, which are hereby incorporated by reference in their entirety for all purposes.

In this fashion, the behavior of each of the ML models adapts over time to reflect the preferences of the users and artifact dependencies within the data stored in the domain-specific data sources 3320. For instance, in some embodiments, if the knowledge database 3370 indicates that John has repeatedly followed-up the request "daily sales last week" with the request "daily sales last week in London," then a next request prediction ML model (not shown in FIG. 33) may automatically recognize the partial request "in London" from John, following a request "daily sales last week" from John, as the request "daily sales last week in London" for John without performing an interrogation. Further, as the behavior of the ML models improves, so does the uptake and use of the ML models, thereby creating a virtuous circle of learning.

Each of the ML model generators is stored in the memory 3316 of the ML server 3380 and executes on the processor 3312 of the ML server 3380. As shown, the ML model generators include, without limitation, a disambiguation model generator 3391, an interaction model generator 3392, a follow-up model generator 3393, a presentation model generator 3394, an expansion model generator 3395, a request prediction model generator 3396, and a request completion model generator 3397. In alternate embodiments, the NL system 3300 may include any number and type of ML model generators, and the ML model generators may be included in any number and type of computing devices. Further, in some embodiments, the machine learning may be distributed throughout any number of computing devices included in the NL system 3300—such that the natural language processing can be determined at the edge or at a client device 102—rather than a central server.

In various embodiments, the NL system 3300 further includes a dependency server 3310. The dependency server 3310 also includes a processor 3312 and memory 3316. A dependency model generator 3311 may be stored in the memory 3316 of dependency server 3310 and executes on the processor 3312 of the dependency server 3310. In some embodiments, the data dependency model generation and updating may be distributed throughout any number of computing devices included in the NL system 3300—such that the natural language processing can be determined at the edge or client device 102—rather than a central server. In alternative embodiments, instead of having a separate dependency server 3310, the dependency model generator 3311 may be stored, along with the ML model generators, in the memory 3316 of ML server 3380.

In alternate embodiments, the memories 3316 may not include any number of the NL application 3340, the ML models, the data dependency model, the knowledge application 3360, and the knowledge database 3370. Instead, any number and portions of the NL application 3340, the ML models, the data dependency model, the knowledge application 3360, and the knowledge database 3370 may be stored on and/or executed from computer readable media such as a flash drive, CD-ROM, DVD-ROM, flash memory module, or other tangible storage media.

It will be appreciated that the NL system 3300 shown herein is illustrative and that variations and modifications are possible. The number of domain-specific data sources 3320, the number of servers, the number of model generators, the number and locations of applications, and the connection topology between the various units in the NL system 3300 may be modified as desired. Further, the functionality included in any of the applications may be divided across any number of applications that are stored and execute via any number of devices that are located in any number of physical locations.

Figure 34A:
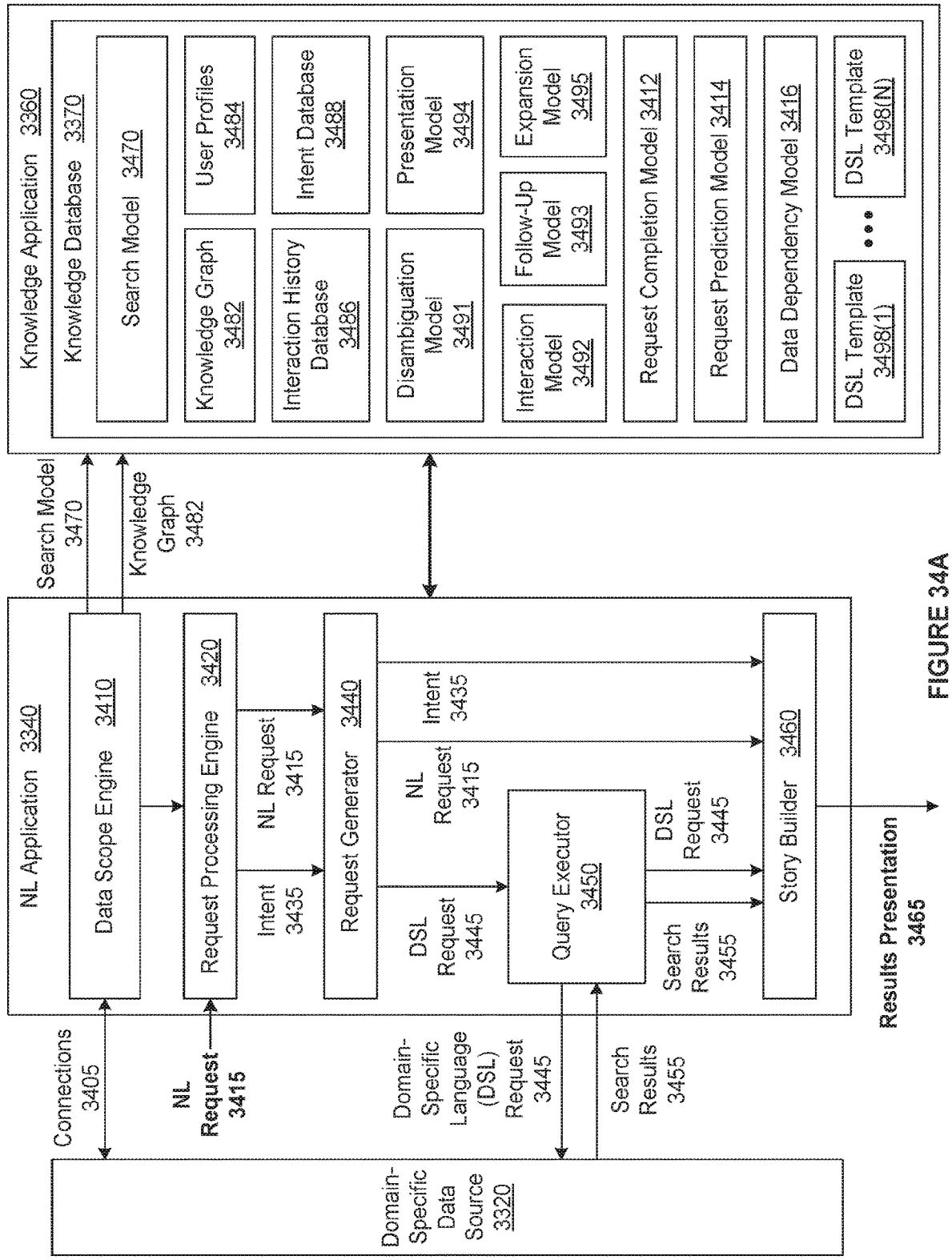
FIGS. 34A-34B are a more detailed illustration of the knowledge database and the NL application of FIG. 33, in accordance with example embodiments.
Figure 34B:
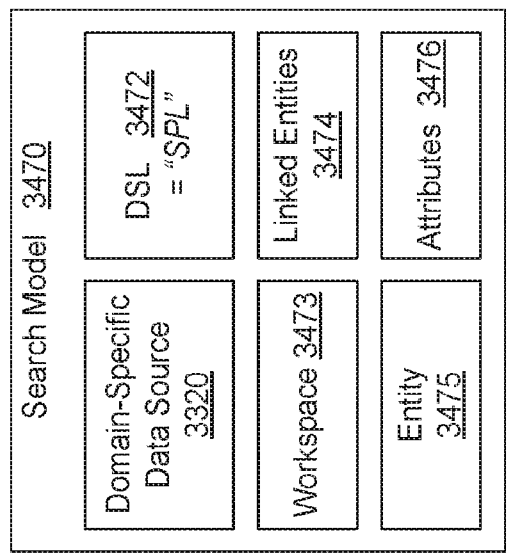

FIGS. 34A and 34B are a more detailed illustration of the knowledge database 3370 and the NL application 3340 of FIG. 33, in accordance with example embodiments. As shown, the knowledge database 3370 includes, without limitation, a search model 3470, a knowledge graph 3482, any number of user profiles 3484, an interaction history database 3486, an intent database 3488, any number of DSL templates 3498, a disambiguation model 3491, an interaction model 3492, a follow-up model 3493, an expansion model 3495, a presentation model 3494, a request completion model 3412, a request prediction model 3414, and a data dependency model 3416. In alternate embodiments, the knowledge database 3370 may include any number of search models 3470, any number of knowledge graphs 3482, and any number and type of ML models and data dependency models.

The search model 3470 specifies, without limitation, the domain-specific data source 3320, the DSL 3472, a workspace 3473, entities 3475, attributes 3476, and linked entities 3474. The search model 3470 governs the way in which the NL application 3340 performs a variety of processing operations involving NL requests 3415. Among other things, the search model 3470 facilities the validation of the NL requests 3415, the analysis of each word included in the NL requests 3415, and the mapping of each word to the corresponding domain-specific data source 3320 to obtain accurate search results.

The domain-specific data source 3320 represents the database for which the search model 3470 is created. Examples of domain-specific data sources 3320 include the data intake and query system 108, "Oracle/sales" which refers to an Oracle database table name "sales," and a REST (Representational State Transfer) endpoint "salesforce/sales" which refers to a Salesforce object named "sales." The workspace 3473 is a collection of multiple domain-specific data sources 3320. The entity 3475 represents a logical collection of data that is associated with a domain-specific data source 3320. For example, the entity 3475 could be "sales representatives," "sales," or "store."

The attributes 3476 are defined with respect to the entities 3475. For example, if the entity 3475 is "sales representatives," then the attributes 3476 could include, without limitation, full name, phone number, commission rate, and city. The linked entities 3474 specify relationships or links between multiple entities 3475 across the domain-specific data sources 820 or the workspaces 3473. For example, the entity 3475(1) "sales representative" can be linked to the entity 3475(2) "product" to establish a relationship between the sales representatives and the products that the sales representatives handle.

In general, the knowledge database 3370 includes a separate search model 3470 for each of the domain-specific data sources 3320 and each of the workspaces 3473. The entities 3475 and the attributes 3476 associated with a particular domain-specific data source 3320 and within the scope of a DSL request operation, are included in the search model 3470. For each of the entities 3475, the attributes 3476 related to the entity 3475 are specified. Each of the attributes 3476 is defined based on different parameters such as data type (e.g., string, number, or text), natural type (also known as "named entity"), which may be a real world name for an attribute that adds additional meaning to the attribute (e.g., a natural type of "location" could be used to display information on a map), variety (e.g., finite, infinite, or random), roles allowed, and whether the data is searchable or aggregable. The possible synonyms of the attributes 3476 are also included in the search model 3470. For example, the attribute 3476 "product" may have synonyms such as "commodity", "merchandise", "goods", or "cargo." Including the synonyms in the search model 3470 facilitates comprehensive analysis of the domain-specific data source 3320. Including context in the search model 3470 facilitates contextual questions and output for the results. This further helps to disambiguate between common attribute names and/or synonyms. For example, "address" may be used as an attribute name for a street address but it may also be used as a context to a question for a salutation "how is she addressed?"

The knowledge graph 3482 specifies semantics of the data as well as the concepts used to resolve ambiguities to improve comprehension. In various embodiments, the knowledge database 3370 may not include the knowledge graph 3482. The user profiles 3484 specify any number of characteristics associated with the users of the NL system 3300. The interaction history database 3486 includes any amount and type of information associated with the interactions of the users with the components of the NL system 3300. For example, for each user, the interaction history database 3486 could include information extracted from clickstreams, NL requests 3415 issued by the user, intents of the NL requests 2015 issued by the user, and DSL requests 3445 associated with the user. In some embodiments, the knowledge graph 3482 includes the data dependency model 3416.

The intent database 3488 includes any number of predefined intents 3435, where each intent 3435 is semantically similar to any number of NL requests 3415 and, consequently, correlates to the meanings of the NL requests 3415.

Importantly, the predefined intents 3435 are agnostic with respect to the DSLs 3472. Each of the DSL templates 3498 is associated with one or more intents 3435 and a particular DSL 3472. Although not shown in FIGS. 34A and 34B, in some embodiments and for each supported DSL, the knowledge database 3370 may include an intent mapping list that maps each of the predefined intents 3435 to a corresponding DSL template 3498 written in the DSL. The intent database 3488 and the DSL templates 3498 are similar to the intent database 2088 and DSL templates 2098, which are described in greater detail in conjunction with FIGS. 21 and 22. In various embodiments, the ML models may be generated and/or updated based on intents (e.g., intents of the requests in the interaction history database 3486). Using the intents to generate the ML models obfuscates information included in the requests, such that the ML models can be shared between different parties with a reduced or eliminated risk of sensitive or proprietary information being exposed.

The disambiguation model 3491, the interaction model 3492, the follow-up model 3493, the presentation model 3494, the expansion model 3495, the request completion model 3412, the request prediction model 3414, and the data dependency model 3416 are machine-learning models that increase the efficiency of the NL application 3340. The disambiguation model 3491 is similar to disambiguation model 2091, which is described in greater detail in conjunction with FIGS. 23 and 24. The interaction model 3492 is similar to interaction model 2092, which is described in greater detail in conjunction with FIGS. 25 and 26. The follow-up model 3493 is similar to follow-up model 2093, which is described in greater detail in conjunction with FIGS. 27 and 28. The presentation model 3494 is similar to presentation model 2094, which is described in greater detail in conjunction with FIGS. 29 and 30. The expansion model 3495 is similar to expansion model 2095, which is described in greater detail in conjunction with FIGS. 31 and 32. The request completion model 3412 is described in greater detail in conjunction with FIGS. 37A-37B and FIG. 38. The request prediction model 3414 is described in greater detail in conjunction with FIGS. 35A-35C and FIGS. 36A-36B. The data dependency model 3416 is described in greater detail in conjunction with FIGS. 35A-38.

As shown, the NL application 3340 includes, without limitation, a data scope engine 3410, a request processing engine 3420, a request generator 3440, a query executor 3450, and a story builder 3460. The data scope engine 3410 connects to the domain-specific data sources 3320 via connections 3405, determines the associated DSLs 3472, and generates the search models 3470 that expedite crawling of data included in the domain-specific data sources 3320. In some embodiments, the data scope engine 3410 also generates the knowledge graphs 3482.

The request processing engine 3420 receives the NL request 3415 and performs intent inference operations to map the NL request 3415 to one of the predefined intents 3435 stored in the intent database 3488. As part of mapping the NL request 3415, if the request processing engine 3420 determines that the NL request 3415 is ambiguous, incomplete, or partial, then the request processing engine 3420 may generate a disambiguated NL request 3415 based on the disambiguation model 3491, the interaction model 3492, request completion model 3412, request prediction model 3414, and/or data dependency model 3416. The disambiguation model 3491, the interaction model 3492, request completion model 3412, request prediction model 3414, and/or data dependency model 3416 facilitate disambiguation and/or completion operations.

In various embodiments, a complete NL request is a request that, as is, can be mapped to an intent and/or translated to a DSL request applicable to a domain-specific data source 3320. A partial NL request is an NL request that is incomplete (e.g., not enough information in the request) as is and accordingly cannot be mapped to an intent and/or translated to a DSL request applicable to a domain-specific data source 3320 without further information (e.g., one or more prior requests and/or the information from the prior requests). For example, the NL request "in London" from a user is, as is, a partial request—the request is not translatable to a DSL request that can be applied to a domain-specific data source. However, if the immediately preceding NL request from the user is "daily sales last week" (which is a complete NL request as is), then the NL request "in London" may be combined with the preceding NL request "daily sales last week" to form a complete NL request "daily sales last week in London." In various embodiments, when the user and the NL application 3340 exchange a sequence of requests and responses in a dialogue-like or conversation-like manner, the user may make partial NL requests as follow-ons (e.g., refinements) of preceding NL requests in the sequence, as well as additional complete requests.

The disambiguation model 3491 facilitates disambiguation based on a disambiguation recommendation associated with the NL request 3415. By contrast, the interaction model 3492 facilitates disambiguation based on an interaction recommendation associated with both the NL request 3415 and the user that issued the NL request 3415. In some embodiments, the request processing engine 3420 may perform disambiguation operations based on both the disambiguation model 3491 and the interaction model 3492.

The request generator 3440 selects one of the DSL templates 3498 based on the intent 3435 and the DSL 3472. The request generator 3440 then generates a DSL request 3445 based on the intent 3435, the DSL 3472, the knowledge database 3470, and any number of interactions (including zero) with the user. The query executor 3450 applies the DSL request 3454 to the associated domain-specific data source 820 to generate search results 3455. In alternate embodiments, the functionality associated with translating the NL request 3415 to the DSL request 3445 may be distributed in any fashion across any applications. For example, in some embodiments, the request processing engine 3420 could directly generate the DSL request 3445.

Subsequently, the story builder 3460 processes the search results 3455. More specifically, the story builder 3460 presents the search results 3455 as a results presentation 3465 based on a presentation format (e.g., a bar chart, a total number, a pie chart, etc.). The story builder 3460 determines the presentation format based on the NL request 3415, the search results 3455, the presentation model 3494, interaction history database 3486, and any amount (including none) of user input. The results presentation 3465 may be expressed via any medium. For example, the results presentation 3465 could be expressed textually, graphically, or verbally (e.g., synthesized voice, text-to-speech, etc.).

Further, the story builder 3460 may facilitate any number of user interactions with the results presentation 3465. In particular, in response to a selection of a hierarchical component displayed via the results presentation 3465 for a "drill down" operation, the story builder 3460 determines an expansion method based on the NL request 3415, the selected hierarchical component, the expansion model 3495, and any amount (including none) of user input. For example, if a user selects a sector of a pie chart associated with "sales," then the story builder 3460 could determine an expansion method of "product." The story builder 3460 would then expand the data includes in the selected sector based on products.

Note that the techniques described herein are illustrative rather than restrictive, and may be altered without departing from the broader spirit and scope of the invention. Many modifications and variations on the functionality provided by the NL application 3340, the ML model generators, the knowledge application 3360, and the data intake and query system 108 will be apparent to those of ordinary skill in the art without departing from the scope and spirit of the described embodiments. For instance, in some embodiments, the story builder 3460 could perform one or more operations based on the interaction model 3492.

In various embodiments, the NL application 3340 may operate on a single NL request 3415 to generate a single intent 3435 and a single DSL request 3445. Additionally, one or more of the techniques described herein may be used to operate on a single NL request 3415 to generate multiple intents 3435 and/or multiple DSL requests 3445. Examples of situations in which one or more of the techniques could operate on a single NL request 3415 to generate multiple DSL requests 3445 include when the intent 3435 is not expressible as a single DSL request 3445, such as if the NL request 3415 involves displaying two bar charts side-by-side. Other examples of situations in which one or more of the techniques could operate on a single NL request 3415 to generate multiple DSL requests 3445 include when the intent 3435 involves executing multiple requests to compare properties of the executions, such as runtime. Yet other examples of situations in which one or more of the techniques could operate on a single NL request 3415 to generate multiple DSL requests 3445 include when the intent 3435 may be optimally served by showing the results of executing multiple DSL requests 3445 that show data from multiple angles. For example, in some embodiments, if the NL request 3415 is "how are sales doing this quarter", then the NL application 3340 may display a time-chart of sales across the entire organization over time, a multi-bar chart of the sales of each department within the organization for the current and previous quarters, a scatter plot or bubble chart, etc.

Furthermore, the NL application 3340 may operate on multiple NL requests 3415 (, a sequence of NL requests) to generate a single intent 3435 and a single DSL request 3445. For example, a second NL request may be a derivative of a first NL request, and the NL application 3340 may generate an intent 3435 and a DSL request 3445 based on the first and second NL requests (e.g., a combination of the first and second NL requests).

In general, any number of the techniques may be implemented while other techniques may be omitted in any technically feasible fashion that enables the NL application 3340 to provide readily adaptable data interfacing services. For example, in some embodiments, the NL system 3300 does not include the follow-up model generator 3393 or the knowledge application 3360. Further, in some embodiments, the NL application 3340 may implement additional functionality. For example, in some embodiments, the NL application 3340 may include data intake and query functionality, and may operate independently of the data intake and query system 108.

In alternate embodiments, any number of the components included in the system 3300 may interact with any number of the other components included in the system 3300 in any technically feasible fashion. For example, in some embodiments, the data intake and query system 108 may optimize presentation operations based on the presentation model 3494 and/or the knowledge database 3370.

As a general matter, any of the units included in the system 3300 may receive input in any technically feasible fashion via any type of device. For instance, in some embodiments, the request processing engine 3420 may receive an audible NL request 3415 via an audio device, voice interface, or browser. In the same or other embodiments, the request processing engine 3420 may receive a textual NL request 3415 as a text string via a physical or virtual keyboard. Similarly, any of the units included in the system 3300 may transmit output in any technically feasible fashion via any type of device. This includes speech for any audio device, voice interface, or browser (, speech output in response to speech input).

In various embodiments, the request processing engine 3420 and the request generator 3440 translates an NL request to a DSL request in a similar manner as the request processing engine 2020 and the request generator 2020, which is described above in conjunction with FIG. 21. Furthermore, in various embodiments, an NL request is applied to a domain-specific data source in a similar flow as described above in conjunction with FIG. 22. For sake of brevity, the details of the above descriptions are not repeated here.

Generating Next NL Request Predictions

Figure 35A:
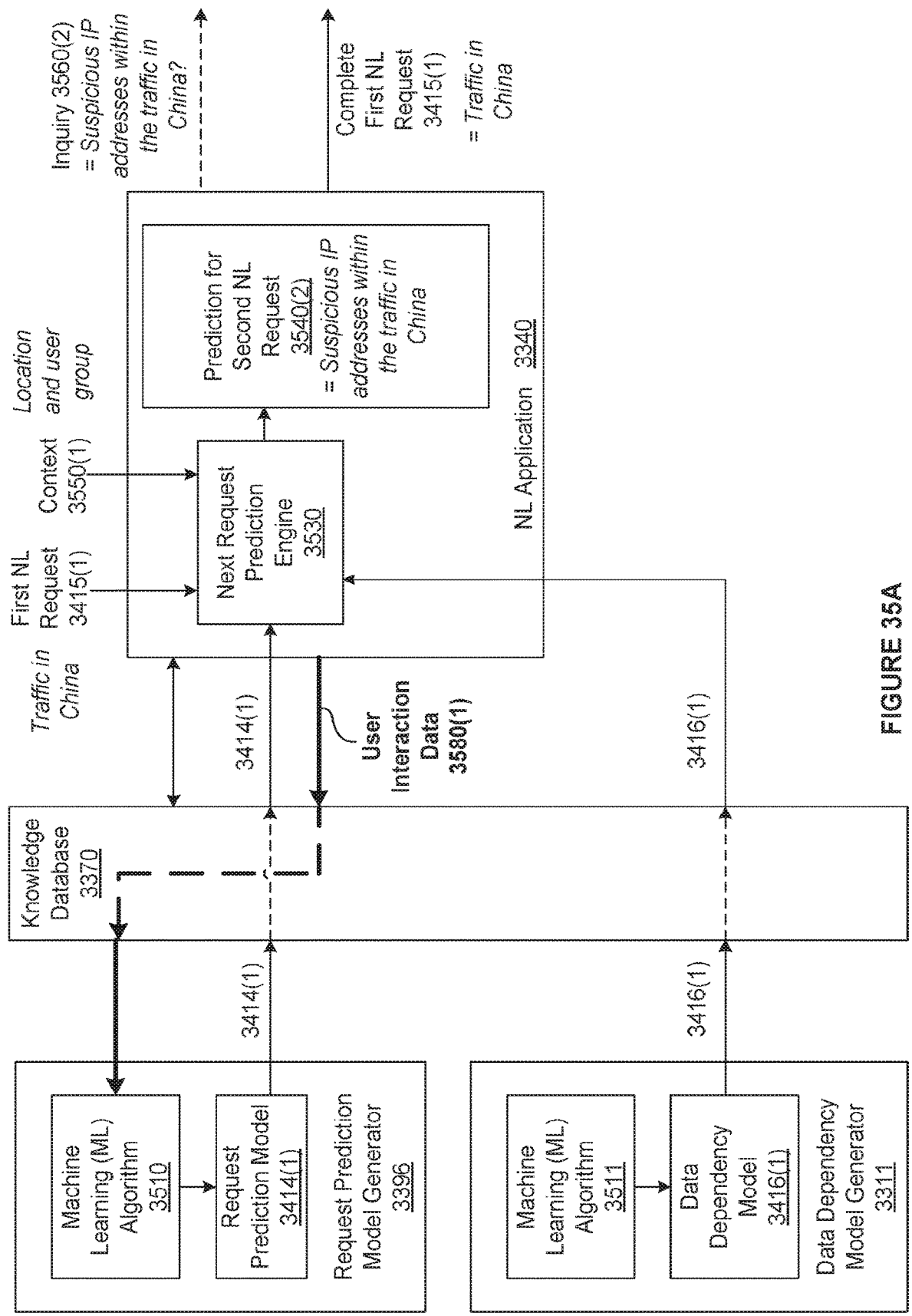
FIGS. 35A-35C illustrate examples of how the NL application of FIGS. 34A and 34B generates and executes one or more next NL request predictions based on a sequence of NL requests at different points in time, in accordance with example embodiments.
Figure 35B:
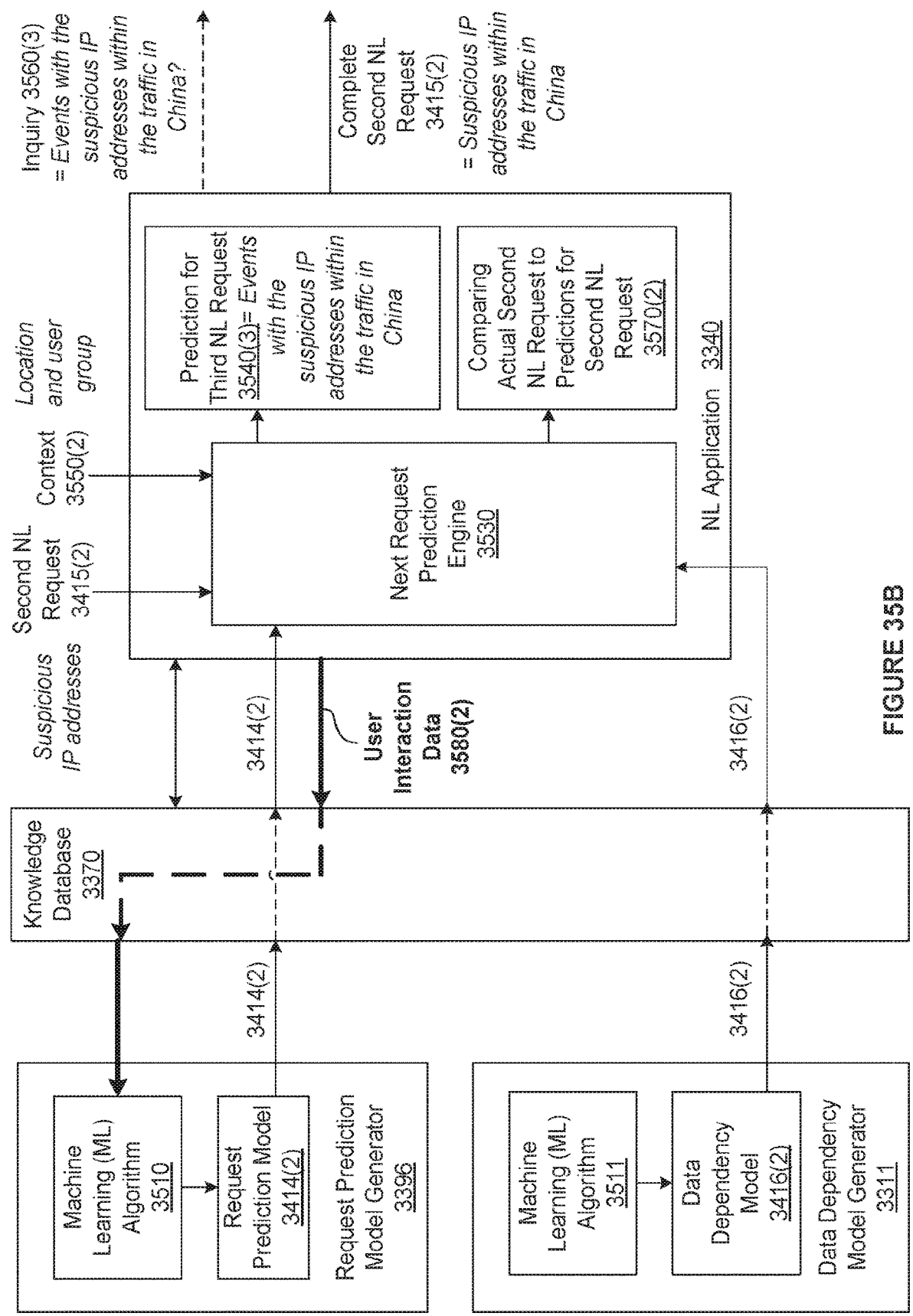
Figure 35C:
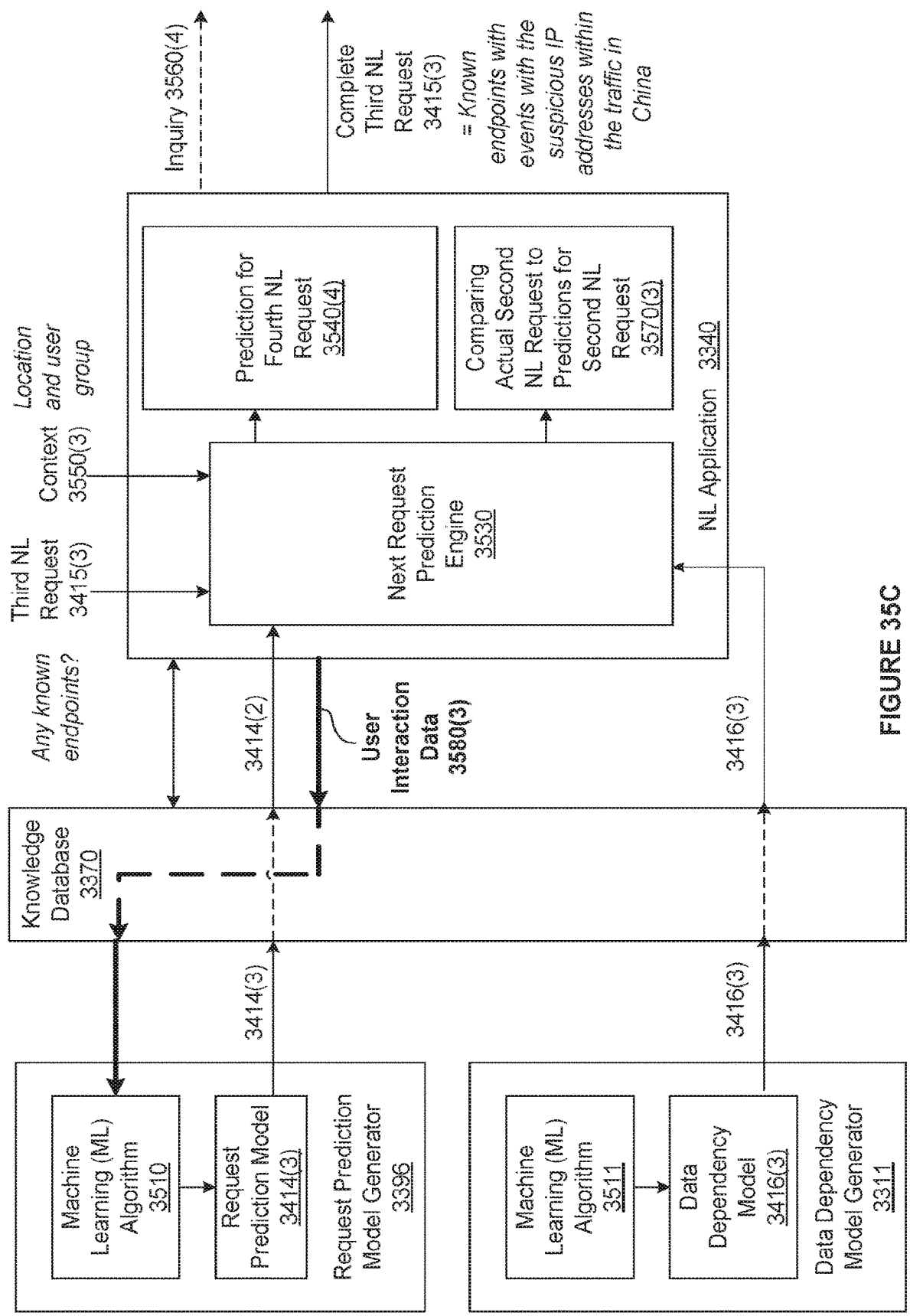

FIGS. 35A-35C illustrate examples of how the NL application 3340 of FIG. 34A generates and executes one or more next NL request predictions based on a sequence of NL requests at different points in time, in accordance with example embodiments. As shown in FIGS. 35A-35C, the request NL application 3340 includes, without limitation a next request prediction engine 3530.

The NL application 3340 receives a first NL request 3415($x$) in a possible sequence of NL requests. The NL application 3340 attempts to apply the first NL request 3415($x$) to an associated domain-specific data source 3320 according to the processes described above in conjunction with FIGS. 21-22 (e.g., by attempting to translate the first NL request 3415($x$) to a DSL request). If the attempt to translate the first NL request 3415($x$) is successful, then the first NL request 3415($x$) is a complete request, and the corresponding DSL request is applied to the associated domain-specific data source 3320. The NL application 3340 transmits the user interaction data 3580 to the knowledge application 3360 for storage as part of the interaction history database 3486.

Additionally, the next request prediction engine 3530 predicts one or more second NL requests 3415($x$+1) to follow the first NL request 3415($x$). To generate predictions for the next NL request 3415($x$+1), the next request prediction engine 3530 retrieves a most recent version of the request prediction model 3414, and optionally a most recent version of the data dependency model 3416, from the knowledge database 3370. The next request prediction engine 3530 then generates one or more next NL request predictions 3540($x$+1) for the second NL requests 3415($x$+1) based on the NL request 3415($x$), the intent 3435 of the first NL request 3415($x$), a context 3550, the request prediction model 3414, and optionally the data dependency model 3416. The next request prediction engine 3530 may optionally generate an inquiry 3560 or other presentation of the predictions 3540 based on the predictions 3540 and present the inquiry 3560 or other presentation to the user either as a follow-up question in response to the first NL request 3415(x) or as a question displayed with the results for the first NL request 3415(x). For example, if request(x) is "suspicious IP addresses" and request(x+1) is "in china", the NL system would process the request "suspicious IP addresses in china", as request(x+1) is a partial query. In another example, a follow-up question may be presented as an inquiry, or the follow-up question may be presented along with a result as a possible alternative suggestion. In this case of request(x) being "traffic in China" and request(x+1) being "suspicious IP addresses", both are complete queries, and the NL system would display "all suspicious IP addresses" when responding to request(x+1) because request(x+1) was fully resolved—the response to request(x+1) may include a suggestion "did you mean suspicious IP addresses in China?". More generally, a complete request may be a part of a larger request.

In various embodiments, the next request prediction engine 3530, additionally or alternatively, generates predictions 3540 for the next NL request 3415(x+1) based on the intent 3435 of the first NL request 3415(x) and optionally intents 3435 of previous NL requests (e.g., NL request(x-1)), as well as the sequences of characters or words or sentences of these NL requests. As described above, the request processing engine 3420 may map an NL request 3415 to an intent 3435 in the intent database 3488. The next request prediction engine 3530 may use the intent 3435 of NL request 3415(x) to generate predicted intents for the next request(x+1). The predicted intents for the next request build on the intent 3435 of NL request 3415(x).

For example, the NL request 3415(x) may be "daily sales in San Francisco last 10 days". The request processing engine 3420 processing the NL request 3415(x) may identify the attributes, artifacts, etc. of the request as "{aggregate: daily} {artifact: sales} {location: San Francisco} {time period: begin: 20th August 2018, end: 30th August 2018}", and map the NL request 3415(x) to the intent "SALES for LOCATION between DATE X and DATE Y, aggregated by DAY". Using this intent, the next request prediction engine 3530 may generate, based on the request prediction model 3414 and/or the data dependency model 3416, predictions of the next NL request 3415(x+1) by adding to the intent to make one or more predicted intents. For example, the next request prediction engine 3530 may determine that sales-by-department is a likely next request based on the request prediction model 3414 and/or the data dependency model 3416. Accordingly, the next request prediction engine 3530 may generate a predicted intent "SALES for LOCATION between DATE X and DATE Y, aggregated by DAY and by DEPARTMENT" (adding "and by DEPARTMENT" to the intent of the NL request 3415(x)), and generate NL requests for the predicted intent.

Upon receiving a response (not shown) to the inquiry 3560 corresponding to the selection of one of the predicted NL requests 3540, the NL application 3340 generates the second NL request 3415(x+1) based on the selected prediction and applies the second NL request 3415(x+1) to the associated domain-specific data source 3320. The NL application 3340 transmits the user interaction data 3580 to the knowledge application 3360 for storage as part of the interaction history database 3486. As a result, the information in the interaction history database 3486 reflects the effectiveness of the selected prediction 3540.

In addition to or instead of the inquiry 3560 or other presentation, the prediction(s) 3540 may be cached at a client device 102. For example, the predictions 3540 may be transmitted to a client device 102 (e.g., a desktop computer, a laptop computer, a smartphone, a tablet computer, etc.) being used by the user, and may be cached by a browser application or a native application at the client device 102. Furthermore, in some embodiments, versions of the request prediction model 3414 and the data dependency model 3416 may be cached by the browser application or the native application at the client device 102. An NL application 3340 at the client device 102 (e.g., a native application, a service, a plug-in or add-on at a browser application) may access the cached model(s) and prediction(s) to process NL requests and generate next request predictions at the client device 102.

The user may forego selecting one of the predictions 3540(x+1) and provide a second NL request 3415(x+1), which the NL application 3340 receives. Alternatively, the NL application 3340 does not make an inquiry 3560 for the predictions 3540(x+1), and receives a second NL request 3415(x+1) from the user. The NL application 3340 processes the received second NL request 3415(x+1) similarly to the processing of the first NL request 3415(x) described above—the NL application attempts to apply the second NL request 3415(x+1) to the associated domain-specific data source 3320 and generate predictions 3540(x+2) for a third NL request.

The NL application 3340 may be unsuccessful in applying the second NL request 3415(x+1) to the associated domain-specific data source 3320 because the second NL request 3415(x+1) is a partial request, i.e., the second NL request 3415(x+1) on its own does not include enough information to be applied to the associated domain-specific data source 3320 (e.g., the second NL request does not include enough information on its own to be mapped to an intent or to be translated to a DSL request). In these cases, the NL application 3340 determines whether the received second NL request 3415(x+1) corresponds to any of the predicted second NL requests 3540(x+1).

In various embodiments, the NL application 3340 determines whether the received second NL request 3415(x+1) corresponds to any of the predicted second NL requests 3540(x+1) by first combining the received second NL request 3415(x+1) with at least the first NL request 3415(x), and optionally further NL requests prior to the first NL request 3415(x), such as an NL request 3415(x-1). The combined request may be compared to each of the predicted NL requests 3540(x+1) to identify a match. In various embodiments, the combined request and the predicted second NL requests may be first mapped to respective intents, and then the intent of the combined request is compared to each of the intents of the predicted second NL requests 3540(x+1) to identify a match.

Alternatively or additionally, the combined request and the predicted second NL requests, and/or their corresponding intents, are scored based on the request prediction model 3414 and the data dependency model 3416 in any technically feasible manner, and ranked by the scores in any technically feasible manner(., from best score to worst score). In various embodiments, a score reflects the probability that the combined request or a predicted second NL request will be the NL request following the first NL request 3415(x) according to the request prediction model 3414 and the data dependency model 3416. In various embodiments, the score contribution from the request prediction model 3414 and the data dependency model 3416 may each be weighted to contribute to the overall score for a combined request or predicted request. If the combined request scores the best or scores above a predefined threshold, then the combined request is selected for application to the domain-specific data source 3320. If the combined request does not score the best or scores below a predefined threshold, then the best-scoring second prediction 3540(x) is selected for application to the domain-specific data source 3320. In various embodiments, in the inquiry 3560, the predicted requests may be presented in an order based on their score rankings to indicate to the user the relative probabilities of the predicted requests.

The context 3550 may include any amount and type of data associated with the NL request 3415 and/or the user that issued the NL request 3415. Notably, the context 3550 may include contextual data relating to situational awareness. As referred to herein, "situational awareness" is the perception of environmental elements and events with respect to contextual data, the comprehension of the meaning and significance of the situation, and the projection of future states and events. Examples of contextual data include, without limitation, a time associated with the NL request 3415, a device with which the user specified the NL request 3415, a job function of the user, a location of the user, the time of day, a user situation, a user context, a user preference, and a workspace within which the NL request 3415 was specified by the user.

In general, the request prediction model 3414 models probabilities of request sequences based on historical request data (e.g., previous requests) and historical intent data (e.g., intents of previous requests) obtained from interaction history database 3486, given the same or similar context (e.g., the same user and the workspace). For example, the request prediction model 3414 may model the historical request data and historical intent data, as a directed graph data structure in which the nodes correspond to requests (or more particularly, the intents of the requests) and the directed edges connect requests in sequences. The request prediction model 3414 may be used to determine probabilities of different request sequences given a common starting point (e.g., given a sequence of request "A" then request "C," determine the probabilities of the next request being "B," "D," "E," or As described above, the data dependency model 3416 models dependencies between artifacts of the data in the domain-specific data source 3320. The data dependency model represents reasonable paths of inquiry that a user may pursue to identify causes of an event or issue. The data dependency model may be used to determine the probability of a certain request given a prior request based on the artifacts included in the requests.

The request prediction engine 3530 may include any portion (including all) of the next request predictions 3540 in the inquiry 3560. Further, the request prediction engine 3530 may present the inquiry 3560 to the user in any technically feasible fashion that is consistent with the communication techniques associated with the user. For example, if the request prediction engine 3530 receives the first NL request 3415 verbally, then the request prediction engine 3530 could verbalize the next request predictions 3540. The request prediction engine 3530 may cause the user interaction data 3580 to be incorporated into the interaction history database 3486 in any technically feasible fashion. For example, the request processing engine 3420 could transmit the first NL request 3415(x), the context 3550, the next request prediction 3540, the actual second NL request 3415(x+1), and a clickstream to the knowledge application 3360.

As shown in FIGS. 35A-35C, the request prediction model generator 3396 generates the request prediction model 3414 and stores the request prediction model 3414 in the knowledge database 3370. The request prediction model generator 3396 includes, without limitation, a machine learning (ML) algorithm 3510. The ML algorithm 3510 trains the request prediction model 3414 based on information included in the knowledge database 3370. In various embodiments, the request prediction model 3414 may be generated and/or updated based on intents (e.g., intents of the requests in the interaction history database 3486). Using the intents to generate the request prediction model 3414 obfuscates information contained in the requests, such that the request prediction model 3414 can be shared between different parties with a reduced or eliminated risk of sensitive or proprietary information being exposed.

Also as shown in FIGS. 35A-35C, the data dependency model generator 3311 generates the data dependency model 3416 and stores the data dependency model 3416 in the knowledge database 3370. The data dependency model 3416 includes, without limitation, a machine learning (ML) algorithm 3511. The ML algorithm 3511 trains the data dependency model 3416 based on information included in the domain-specific data source 3320 and/or knowledge database 3370.

The ML algorithms 3510 and 3511 may include any number and type of technically feasible ML operations. The request prediction model 3414 and the data dependency model 3416 may comprise any type of machine learning model. For instance, in some embodiments, the ML algorithms 3510 and 3511 include multidimensional scaling (MS) operations. In the same or other embodiments, the ML algorithms 3510 and 3511 include support vector machine (SVM) training operations. In various embodiments, the request prediction model 3414 and the data dependency model 3416 comprise neural network models. In various embodiments, the request prediction model 3414 and the data dependency model 3416 comprise long short-term memory (LSTM) networks. In various embodiments, the request prediction model 3414 and the data dependency model 3416 comprise gated recurrent units (GRUs). In some embodiments, the request prediction model 3414 and the data dependency model 3416 comprises deep learning models. In various embodiments, the request prediction model 3414 and the data dependency model 3416 are trained according to sequence-to-sequence approaches (e.g., request-to-request sequences for the request prediction model 3414, and artifact-to-artifact dependency sequences for the data dependency model 3416). Further, the ML algorithms 3510 and 3511 may train the request prediction model 3414 and the data dependency model 3416, respectively, based on any amount and type of information included in the knowledge database 3370 and/or the domain-specific data source 3320. For example, the ML algorithm 3510 trains the request prediction model 3414 based on the interaction history database 3486 that reflects sequences of requests, contextual artifacts (such as time of day or job role), and the effectiveness of any previous next request predictions 3540.

Because the knowledge database 3370 and the domain-specific data source 3320 evolve over time, the request prediction model generator 3396 periodically generates a new version of the request prediction model 3414 and stores the new version of the request prediction model 3414 in the knowledge database 3370. Similarly, the data dependency model generator 3311 periodically generates a new version of the data dependency model 3416 and stores the new version of the data dependency model 3416 in the knowledge database 3370. In this fashion, the scope, breadth, depth, accuracy, and effectiveness of the next request predictions 3540 generated by the request prediction model 3414 and the data dependency model 3416 increases over time.

In various embodiments, an ML algorithm (not shown) similar to ML algorithms 3510 and 3511 may be applied to the request prediction model 3414 and the data dependency model 3416 to generate a sequence prediction model (not shown) for predicting next requests, and scoring the next request predictions, that accounts for both the historical request data and historical intent data, and data dependency data. The sequence prediction model thus combines the request prediction model 3414 and the data dependency model 3416, and applies predefined weightings to the contribution from each model to generate next request predictions. The sequence prediction model may be stored in knowledge base 3370 as well.

To illustrate a sequence of requests and associated next request predictions, and for explanatory purposes only, FIGS. 35A-35C depict how the NL application 3340 generates next request predictions based on a sequence of requests (e.g., a dialog of requests and responses between the user and the NL application 3340) that starts with first NL request 3415(1) "traffic in China." FIG. 35A depicts how the NL application 3340 applies the first NL request 3415(1) to the associated domain-specific data source 3320 and generates a prediction 3540(2) for the second NL request 3415(2) based on the first NL request 3415(1) "traffic in China."

Upon receiving the first NL request 3415(1) "traffic in China," the NL application 3340 attempts to apply the first NL request 3415(1) "traffic in China" to the associated domain-specific data source 3320. Because the first NL request 3415(1) "traffic in China" is a complete request, the NL application 3340 successfully applies the first NL request 3415(1) "traffic in China" to the associated domain-specific data source 3320 and presents results of the first NL request 3415(1) "traffic in China" to the user.

Additionally, the next request prediction engine 3530 retrieves a most recent version of the request prediction model 3414(1) and the data dependency model 3416(1) (or the sequence prediction model) from the knowledge database 3370. The next request prediction engine 3530 then generates one or more next request predictions 3540(2) for a second NL request 3415(2) following the first NL request 3415(1) based on the first NL request 3415(1), the context 3550(1) "location and user group," the request prediction model 3414(1), and optionally the data dependency model 3416(1) (or the sequence prediction model). For example, the prediction may be the request "suspicious IP addresses within the traffic in China." Optionally, the next request prediction engine 3530 generates an inquiry 3560(2) that presents the prediction "suspicious IP addresses within the traffic in China," and presents the inquiry 3560(2) to the user. If the user selects one of the predictions 3540(2) in the inquiry 3560(2), the NL application 3340 may receive the selected prediction as the second NL request 3415(2). The next request prediction engine 3530 also saves the predictions 3540(2) (e.g., caches the predictions) for future use. The NL application 3340 transmits the user interaction data 3580(1) to the knowledge application 3360 for storage as part of the interaction history database 3486.

Continuing in FIG. 35A, suppose that the NL application 3340 does not generate an inquiry 3560(2) or the user disregards the inquiry 3560(2), and the user proceeds to enter a second NL request 3415(2) "suspicious IP addresses", as shown in FIG. 35B. The NL application 3340 receives the second NL request 3415(2) and attempts to apply the request to the associated domain-specific data source 3320. Because the second NL request 3415(2) "suspicious IP addresses" is incomplete, the NL application 3340 determines that the second NL request 3415(2) "suspicious IP addresses" is a partial request and proceeds to generate a full or complete request by combining the second NL request 3415(2) "suspicious IP addresses" with the first NL request 3415(1) "traffic in China" to generate a proposed complete second NL request "suspicious IP address within the traffic in China."

The NL application 3340 may compare 3570(2) the proposed complete second NL request (corresponding to the received second NL request 3415(2)) with the predictions 3540(2) of the second NL request using the request prediction model 3414(2) and the data dependency model 3416(2) (or the most recent version of the sequence prediction model). The request prediction model 3414(2) and the data dependency model 3416(2) may be updated or most-recent versions of the request prediction model 3414 and the data dependency model 3416, respectively. In various embodiments, the NL application 3340 scores the proposed complete second NL request and the predictions 3540(2) based on the request prediction model 3414(2) and the data dependency model 3416(2) (or the most recent version of the sequence prediction model), and compares the scores. In various embodiments, the NL application 3340 maps the proposed complete second NL request and the predictions 3540(2) to respective intents, and determines the scores based on the intents. If the proposed complete second NL request has the best score, or alternatively, has a score equal to or above a predefined threshold, then the NL application 3340 selects the proposed complete second NL request as the complete second NL request. If the proposed complete second NL request does not have the best score, or alternatively, has a score below a predefined threshold, then the NL application 3340 selects the best-scoring prediction 3540(2) as the complete second NL request 3415(2).

In some embodiments, the NL application 3340 compares 3570(2) the proposed complete second NL request to each of the predictions 3540(2) of the second NL request by first mapping each of the proposed complete second request and the predictions 3540(2) to intents. The intent of the proposed complete second NL request is compared to each of the intents of the predictions 3540(2) to identify a closest match. The closest match may be identified in any technically feasible manner. The prediction 3540(2) corresponding to the intent that is the closest match to the intent of the proposed complete second NL request is selected by the NL application 3340 as the complete second NL request 3415(2).

As shown in FIG. 35B, the received second NL request 3415(2) matches the prediction 3540(2) "suspicious IP addresses within the traffic in China" (FIG. 35A). The prediction 3540(2) "suspicious IP addresses within the traffic in China" is selected as the complete second NL request 3415(2) and applied to the associated domain-specific data source 3320.

The next request prediction engine 3530 generates one or more next request predictions 3540(3) for a third NL request 3415(3) following the second NL request 3415(2) based on the second NL request 3415(2), optionally the first NL request 3415(1), the context 3550(2) "location and user group," and the of the request prediction model 3414(2) and the data dependency model 3416(2) (or the most recent version of the sequence prediction model). For example, the prediction may be the request "events within the suspicious IP addresses within the traffic in China." Optionally, the next request prediction engine 3530 generates an inquiry 3560(3) that presents the prediction 3540(3) "events within the suspicious IP addresses within the traffic in China," and presents the inquiry 3560(3) to the user. If the user selects one of the predictions 3540(3) in the inquiry 3560(3), the NL application 3340 may receive the selected prediction as the third NL request 3415(3). The next request prediction engine 3530 also saves the predictions 3540(3) (e.g., caches the predictions) for future use. The NL application 3340 transmits the user interaction data 3580(2) to the knowledge application 3360 for storage as part of the interaction history database 3486.

Continuing in FIG. 35B, suppose that the NL application 3340 does not generate an inquiry 3560(3) or the user disregards the inquiry 3560(3), and the user proceeds to enter a third NL request 3415(3) "any known endpoints?" The NL application 3340 receives the third NL request 3415(3) and attempts to apply the request to the associated domain-specific data source 3320. Because the third NL request 3415(3) "any known endpoints?" is incomplete, the NL application 3340 determines that the third NL request 3415(3) "any known endpoints?" is a partial request and proceeds to generate a full or complete request by combining the third NL request 3415(3) "any known endpoints?" with the complete second NL request 3415(2) "suspicious IP address within the traffic in China" to generate a proposed complete third NL request "known endpoints with events within the suspicious IP address within the traffic in China."

The NL application 3340 may compare 3570(3) the proposed complete third NL request (corresponding to the received third NL request 3415(3)) with the predictions 3540(3) of the third NL request using the request prediction model 3414(3) and the data dependency model 3416(3) (or the most recent version of the sequence prediction model). In various embodiments, the NL application 3340 scores the proposed complete third NL request and the predictions 3540(3) based on the request prediction model 3414(3) and the data dependency model 3416(3) (or the most recent version of the sequence prediction model), and compares the scores. In various embodiments, the NL application 3340 maps the proposed complete third NL request and the predictions 3540(3) to respective intents, and determines the scores based on the intents. If the proposed complete third NL request has the best score, or alternatively, has a score equal to or above a predefined threshold, then the NL application 3340 selects the proposed complete third NL request as the complete third NL request. If the proposed complete third NL request does not have the best score, or alternatively, has a score below a predefined threshold, then the NL application 3340 selects the best-scoring prediction 3540(3) as the complete third NL request 3415(3).

In some embodiments, the NL application 3340 compares 3570(3) the proposed complete third NL request to each of the predictions 3540(3) of the third NL request by first mapping each of the proposed complete third request and the predictions 3540(3) to intents. The intent of the proposed complete third NL request is compared to each of the intents of the predictions 3540(3) to identify a closest match. The closest match may be identified in any technically feasible manner. The prediction 3540(3) corresponding to the intent that is the closest match to the intent of the proposed complete third NL request is selected by the NL application 3340 as the complete third NL request 3415(3).

As shown in FIG. 35C, the received third NL request 3415(3) matches the prediction 3540(3) "events within the suspicious IP addresses within the traffic in China" (FIG. 35B). The prediction 3540(3) "events within the suspicious IP addresses within the traffic in China" is selected as the complete second NL request 3415(3) and applied to the associated domain-specific data source 3320.

The next request prediction engine 3530 generates one or more next request predictions 3540(4) for a fourth NL request 3415(4) following the third NL request 3415(3) based on the third NL request 3415(3), optionally at least one of the first and second NL requests 3415(1, 2), the context 3550(3) "location and user group," and the of the request prediction model 3414(3) and the data dependency model 3416(3) (or the most recent version of the sequence prediction model). Optionally, the next request prediction engine 3530 generates an inquiry 3560(4) that presents the predictions 3540(4) and presents the inquiry 3560(4) to the user. If the user selects one of the predictions 3540(4) in the inquiry 3560(4), the NL application 3340 may receive the selected prediction as the fourth NL request 3415(4). The next request prediction engine 3530 also saves the predictions 3540(4) (e.g., caches the predictions) for future use. The NL application 3340 transmits the user interaction data 3580(3) to the knowledge application 3360 for storage as part of the interaction history database 3486.

Figure 36A:
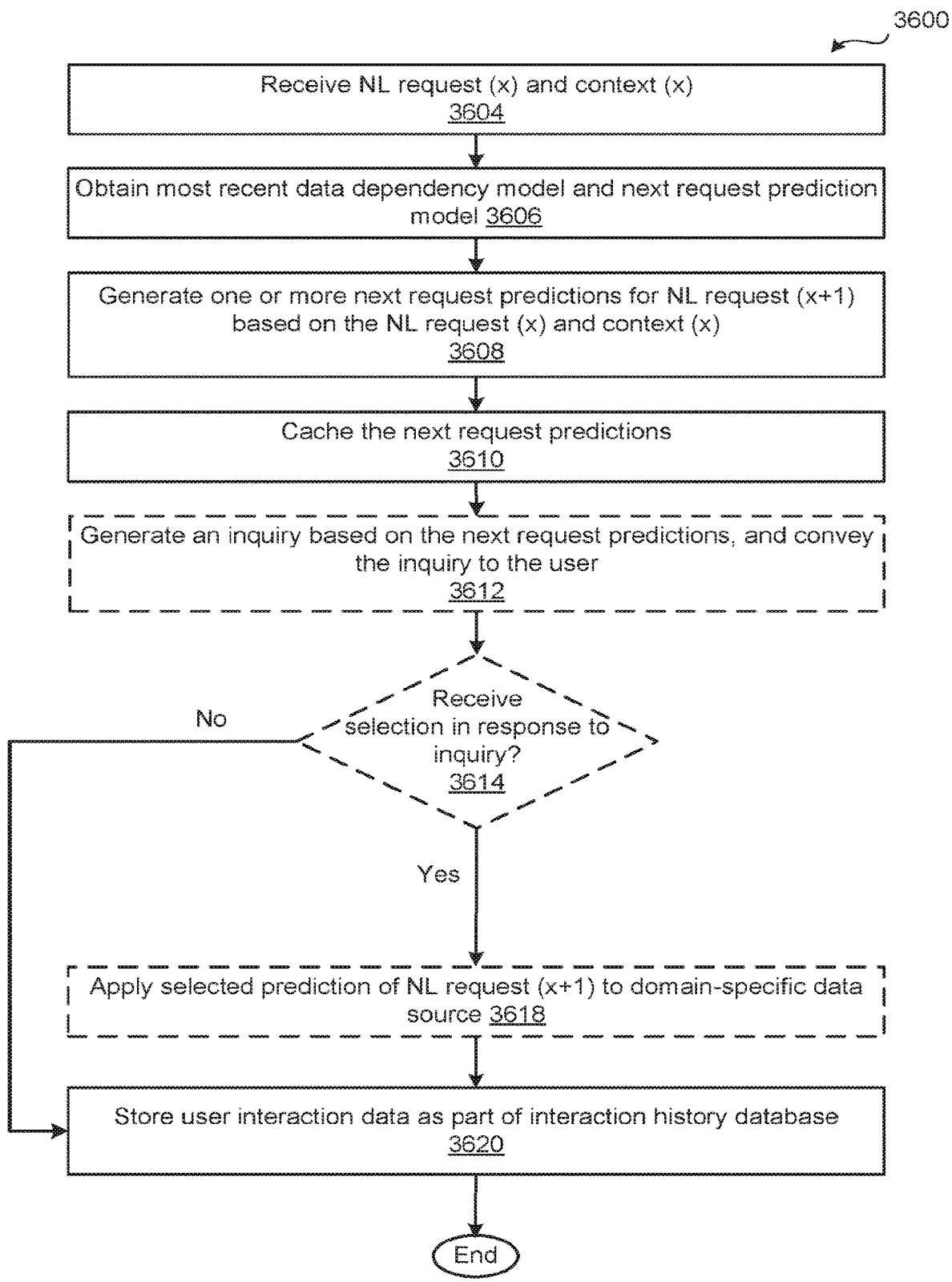
FIGS. 36A-36B are flow diagrams of method steps for generating and executing next NL request predictions based on a sequence of NL requests, in accordance with example embodiments.
Figure 36B:
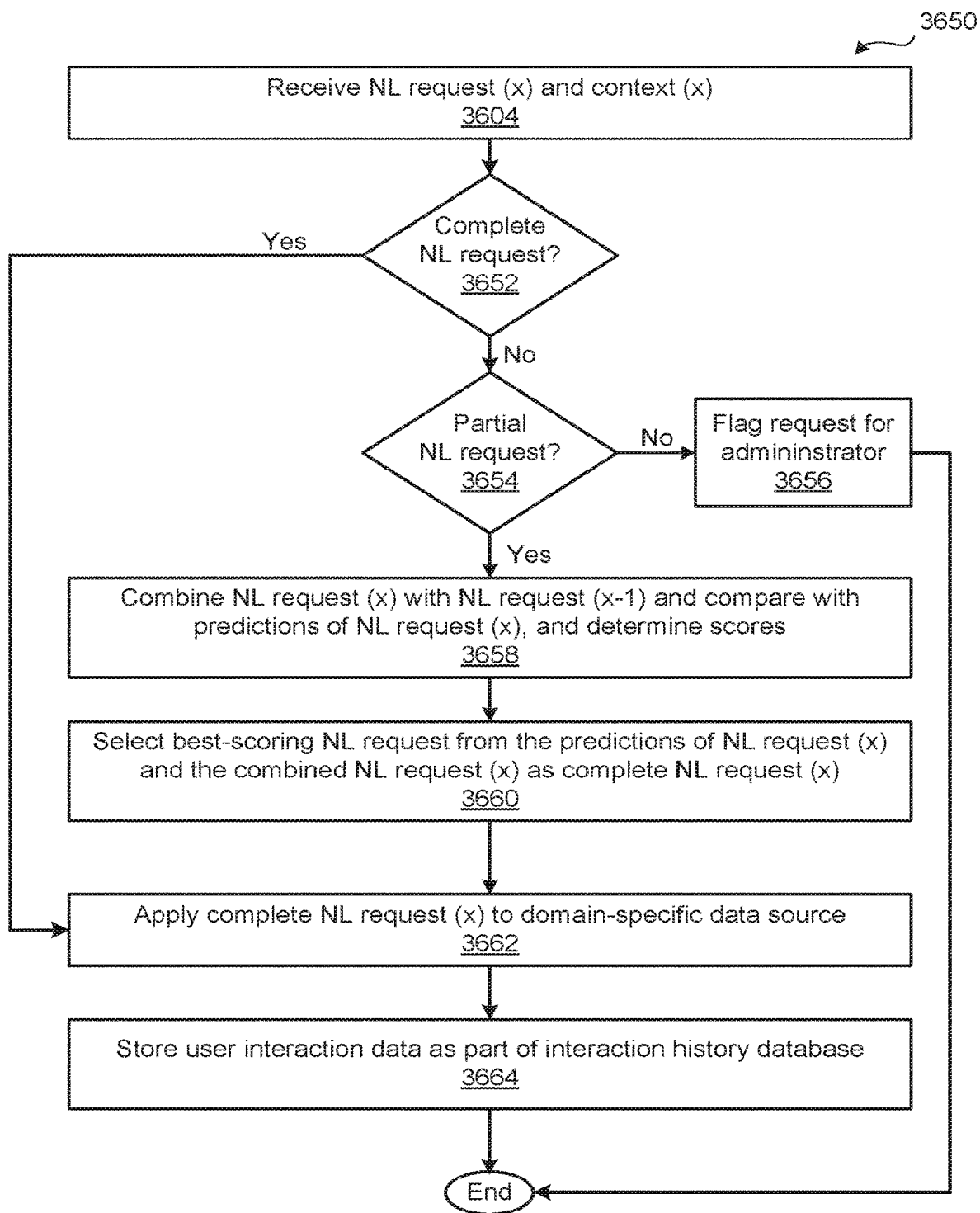

FIGS. 36A and 36B are flow diagrams of method steps for generating and executing next NL request predictions based on a sequence of NL requests, in accordance with example embodiments. Although the method steps are described with reference to the systems of FIGS. 33, 34, 35A, 35B, and 35C, persons skilled in the art will understand that any system configured to implement the method steps, in any order, falls within the scope of the present invention.

In FIG. 36A, as shown, a method 3600 begins at step 3604, where the NL application 3340 receives an NL request 3415($x$) from a user and a context 3550($x$) associated with the NL request 3415($x$). At step 3606, the NL application 3340 obtains the most recent versions of the data dependency model 3416 and the request prediction model 3414 from the knowledge database 3370. At step 3608, the next request prediction engine 3530 generates one or more next request predictions 3540($x$+1) for NL request 3415($x$+1) based on the NL request 3415($x$), context 3550($x$), and at least one of the data dependency model 3416 and the request prediction model 3414. At step 3610, the next request prediction engine 3530 caches the next request predictions for NL request 3415($x$+1).

At step 3612, the next request prediction engine 3530 may generate an inquiry 3560($x$+1) based on the next request predictions 3540($x$+1) of NL request 3415($x$+1), and convey the inquiry 3560($x$+1) to the user. If the NL application 3340 does not receive a selection (e.g., from the user) of one of the predictions 3540($x$+1) of NL request 3415($x$+1) in response to the inquiry 3560($x$+1), then at step 3614 (No) the method proceeds to step 3620 where the NL application 3340 stores user interaction data as part of the interaction history database 3486.

If the NL application 3340 receives a selection (e.g., from the user) of one of the predictions 3540($x$+1) of NL request 3415($x$+1) in response to the inquiry 3560($x$+1), then at step 3614 (Yes) the method proceeds to step 3618, where the NL application 3340 applies the selected prediction 3540($x$+1) of NL request 3415($x$+1) to the associated domain-specific data source 3320. Applying the selected prediction 3540($x$+1) may include converting or translating the selected prediction into a DSL request and applying the DSL request to the associated domain-specific data source 3320. At step 3620, the NL application 3340 stores user interaction data as part of the interaction history database 3486. The method 3600 then terminates.

In FIG. 36B, as shown, a method 3650 begins at step 3604, where the NL application 3320 receives an NL request 3415(x) from a user and a context 3550(x) associated with the NL request 3415(x). If the NL request 3415(x) is a complete NL request, then at step 3652 (Yes) the method proceeds to step 3662, where the NL application 3340 applies the complete NL request 3415(x) to the associated domain-specific data source 3320. Applying the complete NL request 3415(x) may include converting or translating the complete NL request into a DSL request and applying the DSL request to the associated domain-specific data source 3320. If the NL request 3415(x) is not a complete request, then at step 3652 (No) the method proceeds to step 3654.

If the NL request 3415(x) is not a complete or partial NL request (e.g., the request does not have enough information, the request is one that the associated domain-specific data source 3320 and/or search model 3470 is not configured to answer), then at step 3654(No) the method proceeds to step 3656, where the NL request 3415(x) is flagged for review by an administrator, who may re-configure the domain-specific data source 3320 and/or the search model 3470 in view of the NL request 3415(x). Additionally, the user may be presented with an explanation that the NL request could not be processed and a request for more information. The method 3650 then terminates If the NL request 3415(x) is a partial NL request, then at step 3654(Yes) the method proceeds to step 3658, where NL application 3340 combines the NL request 3415(x) with an NL request 3415(x−1), and compares the combined request with predictions 3540(x) of NL request 3415(x). The comparing may include the NL application 3340 determining scores for the combined request and the predictions 3540(x).

At step 3660, the NL application 3340 selects the best-scoring NL request from the predictions 3540(x) of NL request 3415(x) and the combined NL request 3415(x) as the complete NL request 3415(x). At step 3662, the NL application 3340 applies the complete NL request 3415(x) to the associated domain-specific data source 3320. At step 3664, the NL application 3340 stores user interaction data as part of the interaction history database 3486. The method 3650 then terminates.

Generating NL Request Completion Recommendations

Figure 37A:
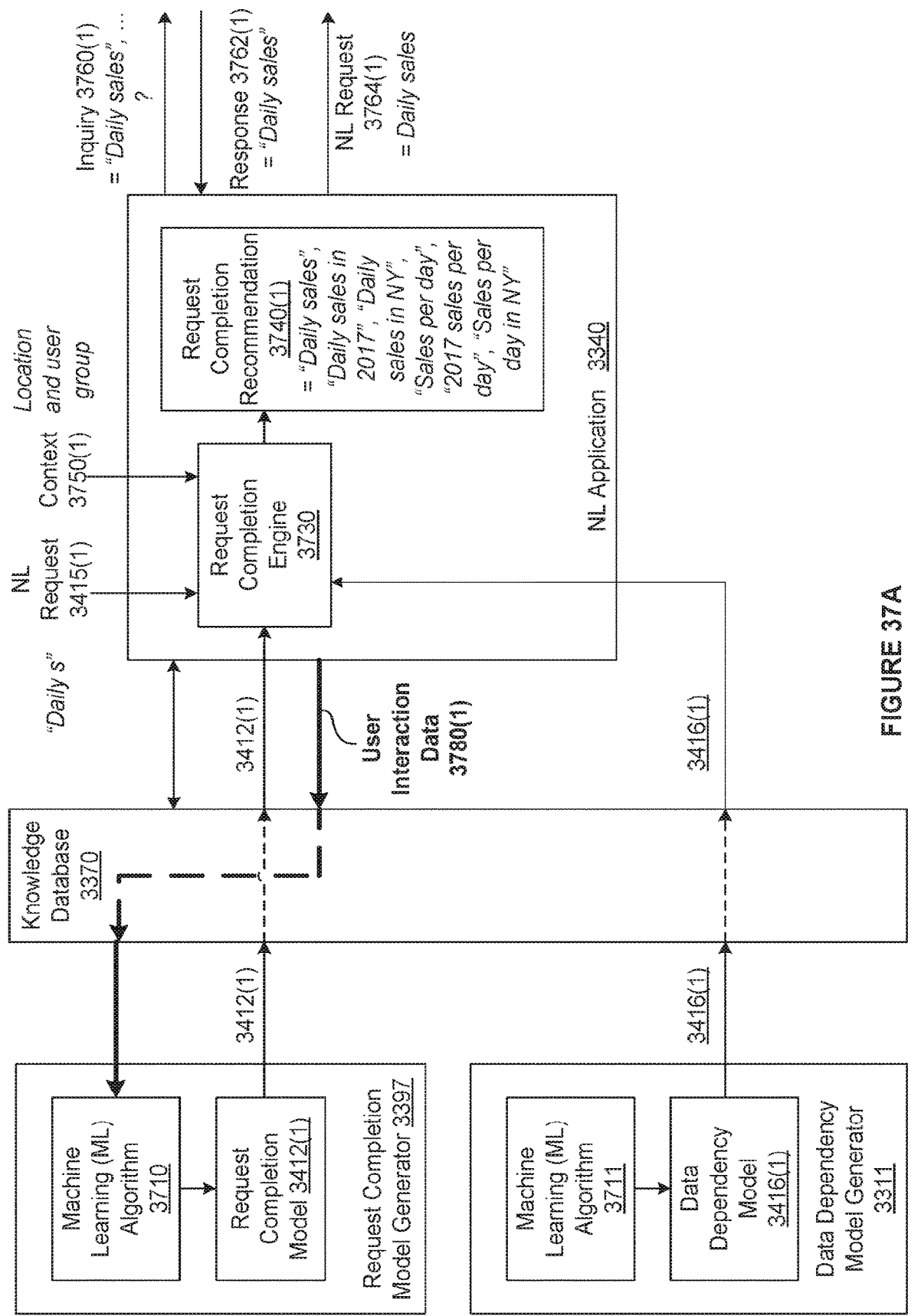
FIGS. 37A-37B illustrate examples of how the NL application of FIGS. 34A and 34B generates and executes one or more request completion recommendations based on an incomplete NL request, in accordance with example embodiments.
Figure 37B:
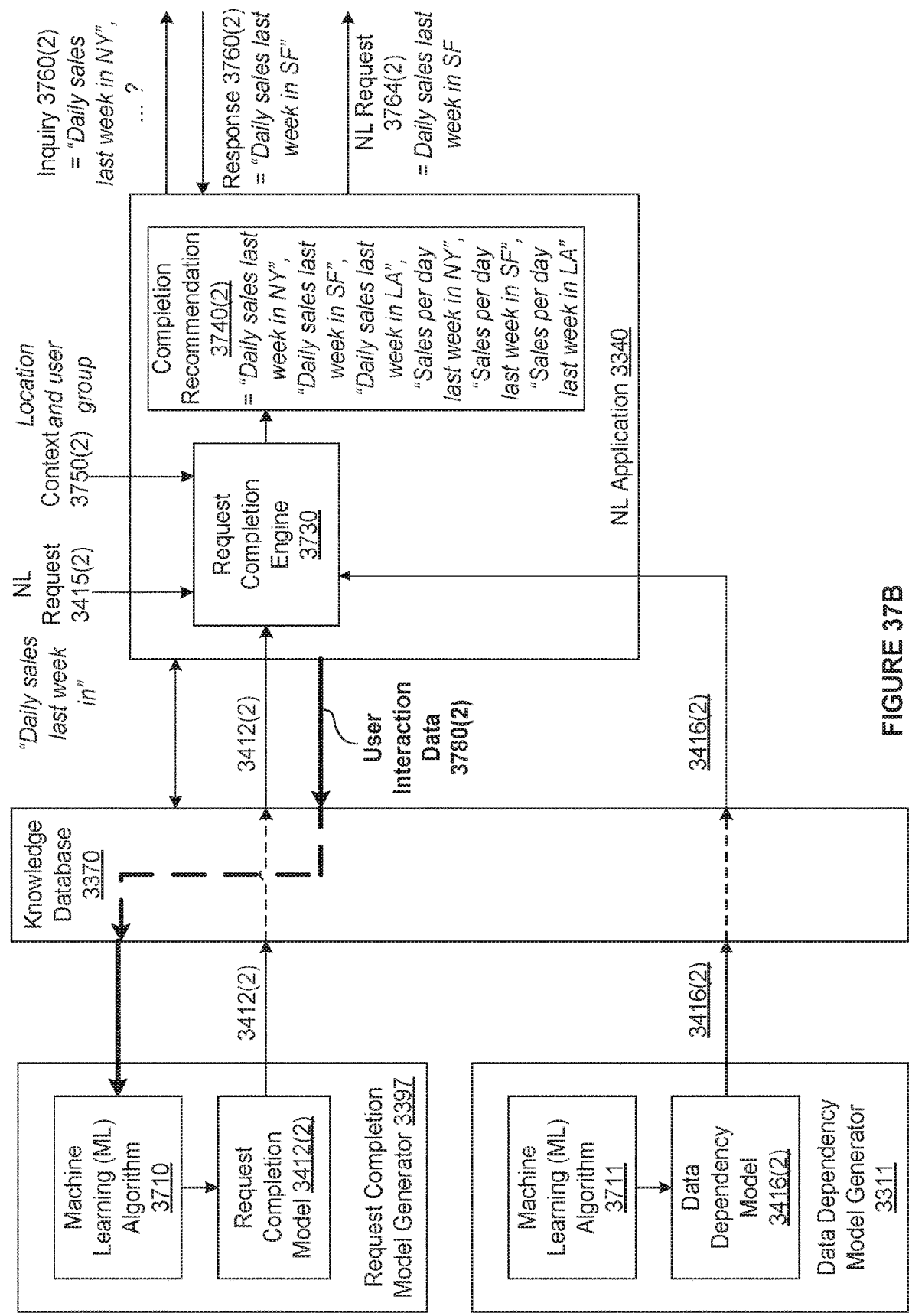

FIGS. 37A-37B illustrate examples of how the NL application 3340 of FIG. 34A generates and executes one or more next NL request predictions based on a sequence of NL requests at different points in time, in accordance with example embodiments. As shown in FIGS. 37A-37B, the request NL application 3340 includes, without limitation a request completion engine 3730.

The NL application 3340 receives a NL request 3415 input by a user (e.g., typed by a user via a physical or virtual keyboard or requested using voice via an audio-enabled device or browser). The NL request 3415 includes a text string, and is an incomplete NL request (e.g., because the text string includes an incompletely spelled word at the end) as the user continues inputting the request. As the user inputs the NL request 3415, the request completion engine 3730 generates one or more request completion recommendations 3740 (also referred to as "auto-complete suggestions" or "auto-complete recommendations") for the current NL request 3415 text string. In various embodiments, the completion recommendations are generated in real-time or near real-time.

Furthermore, in various embodiments, the request completion recommendations 3740, and/or their corresponding intents, are scored based on the request completion model 3412 and the data dependency model 3416 in any technically feasible manner, and ranked by the scores in any technically feasible manner (e.g., from best score to worst score). In various embodiments, the score reflects the probability that a given request completion recommendation will complete the current NL request 3415 according to the request completion model 3412 and the data dependency model 3416, based on an analysis of the intent 3435 of the current NL request as well as the sequence of characters or words being analyzed. In various embodiments, the score contribution from the request completion model 3412 and the data dependency model 3416 may each be weighted to contribute to the overall score for a completion recommendation.

The request completion engine 3730 generates the completion recommendations 3740 based on the current NL request 3415 text string, the intent 3435 of the current NL request 3415 (not shown in FIGS. 37A-37B), the context 3750 associated with the NL request string 3415, the request completion model 3412, and optionally the data dependency model 3416. In particular, the request completion engine 3730 generates each of the completion recommendations 3740 as respective text strings in which the current NL request 3415 text string is the prefix of each of the text strings of the recommendations 3740. To generate completion recommendations for the NL request 3415, the request completion engine 3730 retrieves a most recent version of the request completion model 3412, and optionally a most recent version of the data dependency model 3416, from the knowledge database 3370. The request completion engine 3730 may also use the intent of the predicted question to provide variants of or alternative suggestions for the NL request. The request completion engine 3730 generates an inquiry 3760 or other presentation of the completion recommendations 3740 based on the recommendations 3740 and presents the inquiry 3760 or other presentation to the user. In various embodiments, the completion recommendations 3740 may be presented in the inquiry 3760 in an order based on their score rankings and as completed text strings in which the text string of the current NL request 3415 is the prefix.

In various embodiments, the request completion engine 3730 generates completion recommendations 3740 based on the intent 3435 of the current NL request 3415(x), as well as the sequences of characters or words or sentences of the current NL request 3415(x). As described above, the request processing engine 3420 may map an NL request 3415 to an intent 3435 in the intent database 3488. The request completion engine 3730 may use the intent 3435 of the current NL request 3415(x) to generate completions of the intent of the current NL request 3415(x) and then the completion recommendations 3740 from the completions of the intent of the current NL request 3415(x).

For example, the NL request 3415(x) may be "daily s". The request processing engine 3420 processing the NL request 3415(x) may identify the attributes and artifacts of the request as follows: "{aggregate: daily}{artifact: "s" (unknown)}." The request processing engine 3420 may then map the NL request 3415(x) to the intent "S (unknown), aggregated by DAY". Using this intent, the next request prediction engine 3530 may generate, based on the request completion model 3412 and/or the data dependency model 3416, completion recommendations 3740 by determining one or more NL requests that would complete the NL request and complete the intent (e.g., fill in missing or incomplete content in the intent). For example, the request completion engine 3730 may determine that the requests "daily sales", "daily sales last week", etc., are likely completions based on the request completion model 3412 and the data dependency model 3416. These request completions identify the unknown artifact in the original request as "SALES." The request completion engine 3730 may generate completion recommendations based on these request completions and corresponding NL requests, and may further generate variations of these request completions based on the intents of the request completions.

Upon receiving a response 3762 to the inquiry 3760 selecting one of the completion recommendations 3740, the NL application 3340 generates complete NL request 3764 based on the selected recommendation prediction and applies the complete NL request 3764 to the associated domain-specific data source 3320. The NL application 3340 transmits the user interaction data 3780 to the knowledge application 3360 for storage as part of the interaction history database 3486. As a result, the information in the interaction history database 3486 reflects the effectiveness of the selected recommendation 3740.

In addition, the recommendation(s) 3740 may be cached at a client device 102. For example, the recommendations 3740 may be transmitted to a client device 102 (e.g., a desktop computer, a laptop computer, a smartphone, a tablet computer, etc.) being used by the user, and may be cached by a browser application or a native application at the client device 102. Furthermore, in some embodiments, versions of the request completion model 3412 and the data dependency model 3416 may be cached by the browser application or the native application at the client device 102. An NL application 3340 at the client device 102 (e.g., a native application, a service, a plug-in or add-on at a browser application) may access the cached model(s) and recommendations(s) to process NL requests and generate completion recommendations at the client device 102.

The user may forego selecting one of the recommendations 3740 and continue inputting the NL request 3415 text string, which the NL application 3340 receives. The request completion engine 3730 generates the recommendations for the current NL request 3415 text string and generates an inquiry in a similar manner as described above.

The context 3750 may include any amount and type of data associated with the NL request 3415 and/or the user that issued the NL request 3415. Notably, the context 3750 may include contextual data relating to situational awareness. As referred to herein, "situational awareness" is the perception of environmental elements and events with respect to contextual data, the comprehension of the meaning and significance of the situation, and the projection of future states and events. Examples of contextual data include, without limitation, a time associated with the NL request 34015, a device with which the user specified the NL request 3415, a job function of the user, a location of the user, the time of day, a user situation, a user context, a user preference, and a workspace within which the NL request 3415 was specified by the user.

In general, the request completion model 3412 models probabilities of character sequences corresponding to text strings of NL requests, and the intents represented by the requests, based on historical request and historical intent data obtained from interaction history database 3486 and intent database 3488, given the same or similar context (e.g., the same user and the workspace). For example, the request completion model 3412 may model the historical request data and historical intent data, as a directed graph data structure in which the nodes correspond to individual characters or words or sentences in text strings of NL requests and the directed edges connect characters or words or sentences in sequences. The request completion model 3412 may be used to determine probabilities of subsequent characters or words or sentences given a text string (e.g., given string "daily s," determine the probabilities of the next character in the string being "a", "b", "c", or "d", and so forth). By converting the sequence to an intent, an alternative representation for the request may be provided, where sequence-to-sequence prediction alone may be insufficient for the generation of alternative representations. For example, if the user is entering the request "daily gross", the NL system can display "daily gross sales" in addition to "daily sales" and "sales per day" as alternative representations of the request by using the intent of the question to make suggestions.

As described above, the data dependency model 3416 models dependencies between artifacts of the data in the domain-specific data source 3320. The data dependency model represents reasonable paths of inquiry a user may pursue to identify causes of an event or issue. The data dependency model may be used to determine the probability of a certain completion of a string for a request given a current string of the request based on the artifacts included in the text string of the request and the intent 3435 of the NL request.

The request completion engine 3730 may include any portion (including all) of the request completion recommendations 3740 in the inquiry 3760. Further, the request completion engine 3730 may present the inquiry 3760 to the user in any technically feasible fashion that is consistent with the communication techniques associated with the user. For example, the request completion engine 3730 may cause the recommendations 3540 to be displayed in a list below the search field in which the user entered the text string of the NL request 3415. The request completion engine 3730 may cause the user interaction data 3780 to be incorporated into the interaction history database 3486 in any technically feasible fashion. For example, the request processing engine 3420 could transmit the NL request 3415, the intent 3435 (not shown in FIGS. 37A-37B), the context 3750, the recommendations 3740, and a clickstream to the knowledge application 3360.

As shown in FIGS. 37A-37B, the request completion model generator 3397 generates the request completion model 3412 and stores the request completion model 3412 in the knowledge database 3370. The request completion model generator 3397 includes, without limitation, a machine learning (ML) algorithm 3710. The ML algorithm 3710 trains the request completion model 3412 based on information included in the knowledge database 3370. In various embodiments, the request completion model 3412 may be generated and/or updated based on intents (e.g., intents of the requests in the interaction history database 3486). Using the intents to generate the request completion model 3412 obfuscates information contained in the requests, such that the request completion model 3412 can be shared between different parties with a reduced or eliminated risk of sensitive or proprietary information being exposed.

Also as shown in FIGS. 37A-37B, the data dependency model generator 3311 generates the data dependency model 3416 and stores the data dependency model 3416 in the knowledge database 3370. The data dependency model 3416 includes, without limitation, a machine learning (ML) algorithm 3711. The ML algorithm 3711 trains the data dependency model 3416 based on information included in the domain-specific data source 3320 and/or knowledge database 3370.

The ML algorithms 3710 and 3711 may include any number and type of technically feasible ML operations. The request completion model 3412 and the data dependency model 3416 may comprise any type of machine learning model. For instance, in some embodiments, the ML algorithms 3710 and 3711 include multidimensional scaling (MS) operations. In the same or other embodiments, the ML algorithms 3710 and 3711 include support vector machine (SVM) training operations. In various embodiments, the request completion model 3412 and the data dependency model 3416 comprise neural network models. In various embodiments, the request completion model 3412 and the data dependency model 3416 comprise long short-term memory (LSTM) networks. In various embodiments, the request completion model 3412 and the data dependency model 3416 comprise gated recurrent units (GRUs). In some embodiments, the request completion model 3412 and the data dependency model 3416 comprises deep learning models. In various embodiments, the request completion model 3412 and the data dependency model 3416 are trained according to sequence-to-sequence approaches (e.g., character-to-character sequences for the request completion model 3412, and artifact-to-artifact dependency sequences for the data dependency model 3416). Further the ML algorithms 3710 and 3711 may train the request completion model 3412 and the data dependency model 3416, respectively, based on any amount and type of information included in the knowledge database 3370 and/or the domain-specific data source 3320. For example, the ML algorithm 3710 trains the request completion model 3412 based on the interaction history database 3486 that reflects text strings of NL requests and the effectiveness of any previous request completion recommendations 3740.

Because the knowledge database 3370 and the domain-specific data source 3320 evolve over time, the request completion model generator 3397 periodically generates a new version of the request completion model 3412 and stores the new version of the request completion model 3412 in the knowledge database 3370. Similarly, the data dependency model generator 3311 periodically generates a new version of the data dependency model 3416 and stores the new version of the data dependency model 3416 in the knowledge database 3370. In this fashion, the effectiveness of the completion recommendations 3740 generated by the request completion model 3412 and the data dependency model 3416 increase over time.

In various embodiments, an ML algorithm (not shown) similar to ML algorithms 3710 and 3711 may be applied to the request completion model 3412 and the data dependency model 3416 to generate a recommendation model (not shown) for recommending completions of the NL request text string, and scoring the completion recommendations, that accounts for both the historical request data and historical intent data, and data dependency data. The recommendation model thus combines the request completion model 3412 and the data dependency model 3416, and applies predefined weightings to the contribution from each model to generate completion recommendations. The recommendation model may be stored in knowledge base 3370 as well.

In various embodiments, the request completion engine 3730 generates, in addition to the recommendations in which the text string of the NL request 3415 is the prefix, one or more textual variations of the recommendations in which the text string of the NL request 3415 is the prefix. The variations are different wordings of the recommendations, but have the same intent 3435 as the corresponding recommendations. To generate the variations, the request completion engine 3730 maps the NL request corresponding to each of the recommendations to an intent 3435. The request completion engine 3730 then generates a text string for each of the intents so that the generated text string is worded differently than the original recommendation from which the intent is mapped. For example, for the recommendation NL request "daily sales," a variation may be the request "sales per day." Thus, the original recommendation and the corresponding variation have the same intent but different text strings. In some embodiments, the request completion engine 3730 may identify variations by looking for NL requests with the same intent in knowledge database 3370.

To illustrate the auto-complete suggestions for a text string of an NL request, and for explanatory purposes only, FIGS. 37A-37B depict how the NL application 3340 generates completion recommendations for a current text string "daily s" of an NL request 3415(1). FIG. 37A depicts how the NL application 3340 generates completion recommendations 3740(1) for the current text string of the NL request 3415(1).

Upon receiving the NL request 3415(1) "daily s," the request completion engine 3730 retrieves a most recent version of the request completion model 3412(1) and the data dependency model 3416(1) (or the sequence prediction model) from the knowledge database 3370. The request completion engine 3730 then generates one or more completion recommendations and corresponding variations 3740(1) for the NL request 3415(1) based on the NL request 3415(1), the context 3750(1) "location and user group," the request completion model 3412(1), and optionally the data dependency model 3416(1) (or the sequence prediction model). For example, the recommendations and variations 3740(1) for the NL request "daily s" may include "daily sales," "daily sales in 2017," "daily sales in NY," "sales per day," "2017 sales per day," and "sales per day in NY." The request completion engine 3730 generates an inquiry 3760(1) that presents the completion recommendations and variations 3740(1) and presents the inquiry 3760(1) to the user. If the user, in a response 3762(1) to the inquiry 3760(1), selects, by way of an autocomplete action (such as hitting the TAB key on a keyboard) or a mouse click, one of the recommendations 3740(1) (e.g., "daily sales") included in the inquiry 3760(1), the NL application 3340 receives the selected recommendation as the complete NL request 3764(1) and applies the complete NL request 3764(1) to the associated domain-specific data source 3320. The NL application 3340 then awaits the next NL request. The completion recommendation engine 3730 also saves the recommendations 3740(1) (e.g., caches the recommendations and corresponding DSL requests) at the client device 102 of the user for client-side processing of NL requests. An NL application 3340 at the client device 102 may use the cached recommendations and DSL requests to process NL requests at the client device 102. The NL application 3340 transmits the user interaction data 3780(1) to the knowledge application 3360 for storage as part of the interaction history database 3486.

Proceeding to FIG. 37B, suppose the user does not select one of the recommendations 3740(1) and continues entering the NL request 3415, so that the current text string of the NL request 3415(2) is "daily sales last week in." Upon receiving the NL request 3415(2) "daily sales last week in," the request completion engine 3730 retrieves a most recent version of the request completion model 3412(2) and the data dependency model 3416(2) (or the sequence prediction model) from the knowledge database 3370. The request completion model 3412(2) and the data dependency model 3416(2) may be updated or most-recent versions of the request completion model 3412 and the data dependency model 3416, respectively. The request completion engine 3730 then generates one or more completion recommendations and corresponding variations 3740(2) for the NL request 3415(2) based on the NL request 3415(2), the context 3750(2) "location and user group," the request completion model 3412(2), and optionally the data dependency model 3416(2) (or the sequence prediction model). For example, the recommendations and variations 3740(2) for the NL request "daily sales last week in" may include "daily sales last week in NY", "daily sales last week in SF", "daily sales last week in LA", "sales per day last week in NY", "sales per day last week in SF", "sales per day last week in LA", "sales per day last week in cities in the USA", "sales per day last week in Western region", and "sales per day last week in our flagship stores." The request completion engine 3730 generates an inquiry 3760(2) that presents the completion recommendations and variations 3740(2) and presents the inquiry 3760(2) to the user. If the user, in a response 3762(2) to the inquiry 3760(2), selects one of the recommendations 3740(2) (e.g., "daily sales in SF") included in the inquiry 3760(2), the NL application 3340 receives the selected recommendation as the complete NL request 3764(2) and applies the complete NL request 3764(2) to the associated domain-specific data source 3320. The NL application 3340 then awaits the next NL request. The completion recommendation engine 3730 also saves the recommendations 3740(2) (e.g., caches the recommendations and corresponding DSL requests) at the client device 102 of the user for client-side processing of NL requests. The NL application 3340 transmits the user interaction data 3780(2) to the knowledge application 3360 for storage as part of the interaction history database 3486.

It should be appreciated that the user may submit the current string of the NL request 3415, as is, as the NL request, ignoring the inquiries 3760. The NL application 3340 receives the as-is string of the NL request 3415 and attempts to apply the as-is NL request 3415 to the associated domain-specific data source 3320. Because the as-is NL request 3415 may still be incomplete, the attempt to apply the as-is NL request 3415 may fail, in which case the request is checked to determine if it is a partial query and if not, the user may be alerted of the failed attempt and may be prompted to try entering the NL request again, or provide more information for context or a suggestion of alternative requests is provided.

Figure 38:
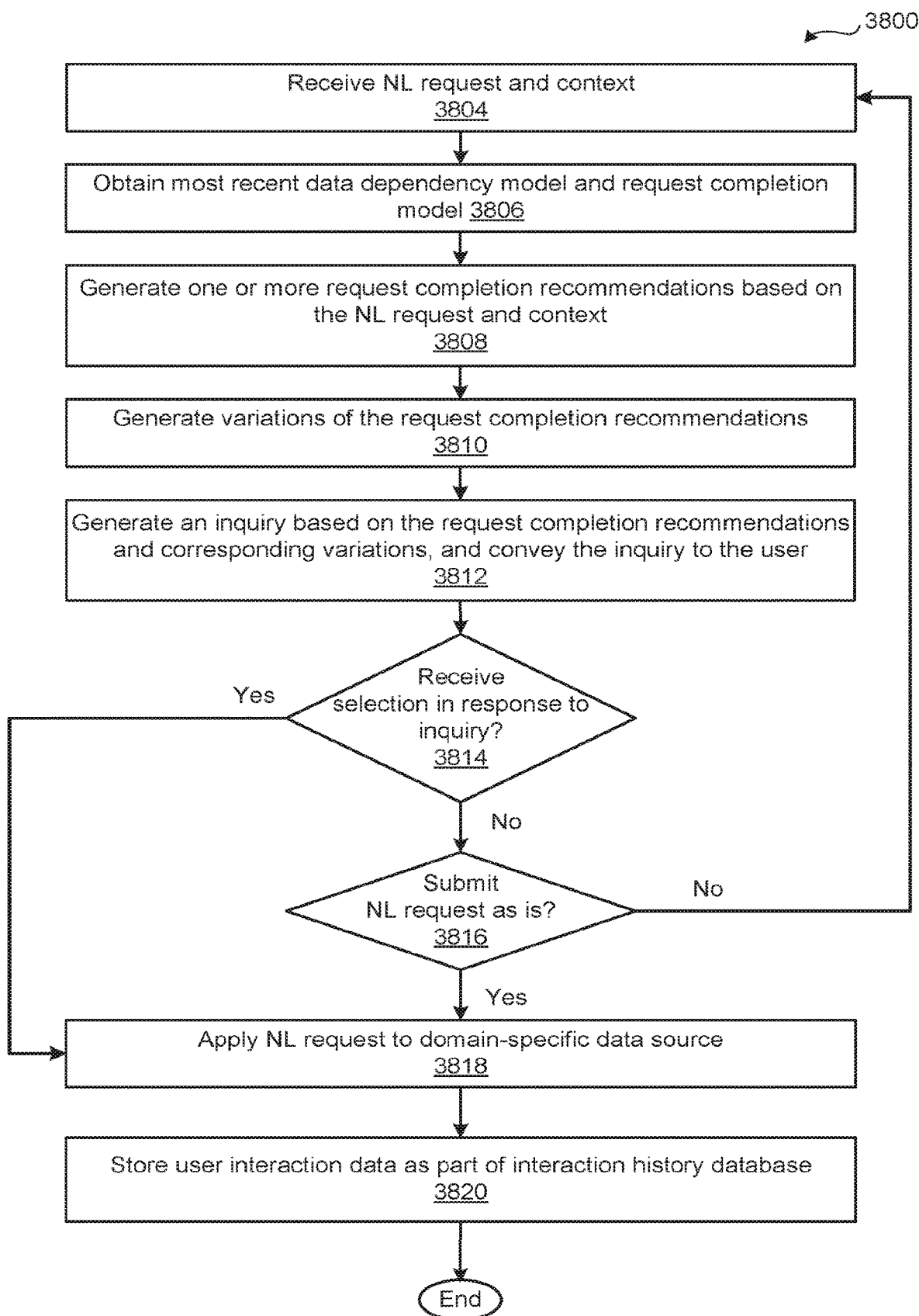
FIG. 38 is a flow diagram of method steps for generating and executing a request completion recommendation based on an incomplete NL request, in accordance with example embodiments.

FIG. 38 is a flow diagram of method steps for generating and executing a request completion recommendation based on an incomplete NL request, in accordance with example embodiments. Although the method steps are described with reference to the systems of FIGS. 33, 34, 37A, and 37B, persons skilled in the art will understand that any system configured to implement the method steps, in any order, falls within the scope of the present invention.

As shown, a method 3800 begins at step 3804, where the NL application 3340 receives an NL request 3415 from a user and a context 3750 associated with the NL request 3415. At step 3806, the NL application 3340 obtains the most recent versions of the data dependency model 3416 and the request completion model 3412 from the knowledge database 3370. At step 3808, the request completion engine 3730 generates one or more request completion recommendations 3740 for NL request 3415 based on the NL request 3415, intent 3435, context 3750, and at least one of the data dependency model 3416 and the request completion model 3412. At step 3810, the request completion engine 3730 optionally generates a variation of each of the one or more request completion recommendations 3740, and includes the variations in the recommendations 3740.

At step 3812, the request completion engine 3730 generates an inquiry 3760 based on the completion recommendations and corresponding variations 3740 for NL request 3415, and convey the inquiry 3760 to the user. If the NL application 3340 receives a selection of one of the recommendations/variations 3740 from the user in a response 3762 to the inquiry 3560, then at step 3814 (Yes) the method proceeds to step 3818, where the NL application 3340 applies the selected recommendation/variation as NL request 3764 to the associated domain-specific data source 3320. Applying the NL request 3764 may include converting or translating the NL request 3764 into a DSL request and applying the DSL request to the associated domain-specific data source 3320. The method then proceeds to step 3820.

If the NL application 3340 does not receive a response 3762 from the user selecting one of the recommendations/variations 3740 of NL request 3415 in response to the inquiry 3560, then at step 3814 (No) the method proceeds to step 3816.

If the user submits the current NL request 3415 as is, then at step 3816 (Yes) the method proceeds to step 3818, where the NL application 3340 applies the current NL request 3415 as is to the associated domain-specific data source 3320. Applying the current NL request 3415 may include converting or translating the current NL request 3415 into a DSL request and applying the DSL request to the associated domain-specific data source 3320. The method then proceeds to step 3820.

If the user does not submit the current NL request 3415 as is, then at step 3816 (No) the method returns to step 3804, where the NL application 3340 awaits for and receives an updated NL request 3415 from the user (e.g., the user types more characters into the text string of the NL request 3415).

At step 3820, the NL application 3340 stores user interaction data as part of the interaction history database 3486. The method 3800 then terminates.

In sum, the disclosed techniques may be implemented to increase, on an on-going basis, the efficiency and accuracy of retrieving and analyzing data stored in data sources. A natural language (NL) system includes, without limitation, any number of domain-specific data sources, a knowledge database, an NL application, and any number of model generators. The knowledge database includes a variety of information that enables the NL application to execute NL requests involving the domain-specific data sources. Over time, the information included in the knowledge database evolves.

In particular, the NL system requests completions for incomplete requests that are incomplete and predicts next requests. In one aspect, the NL system provides auto-complete suggestions to complete incomplete NL requests as users inputs the requests. While the user is inputting an NL request, the NL system determines a number of complete NL requests that include the as-input NL request as a prefix. The NL system may optionally determine additional variations of the complete NL requests using the intent of the original request. The complete NL requests may be determined based on machine learning models that are trained using historical request data and historical intent data and data dependency data. In another aspect, the NL system predicts second requests to follow a first request. When a user enters a second request that is a partial request, the NL system processes the second request in context of the first request by comparing the second request to the predicted second request. If the predicted second request and the actual second request match, or otherwise the predicted second request score well, then the NL system proceeds to process the predicted second request. The predicted second requests may also be provided to the user as suggestions before the user begins entry of the second request. The predicted second requests may also be determined based on machine learning models that are trained using historical request data, historical intent data, and data dependency data.

An advantage and technological improvement of the disclosed techniques is that a one or more models for recommending request completions and for predicting next natural language requests are generated for a NL system, enabling the NL system to recommend request completions and follow-on requests. Another advantage and technological improvement of the disclosed techniques is that the models are generated based on historical request data, historical intent data, and data dependency data. Accordingly, the amount of time and user effort associated with processing NL requests decreases and the overall accuracy of NL application implementations increases. Furthermore, the use of data dependency data, as well as historical request data and historical intent data, to generate the models both effect constraints on completion recommendations and predicted next requests to those that are valid and logical in view of the data being requested and to expand the space of completion recommendations and predicted next requests to include possible views of the data that may have been neglected previously or may not have been considered previously.

1. In some embodiments, a computer-implemented method comprises receiving a first incomplete natural language (NL) request and a first context associated with the first incomplete NL request; generating one or more request completion recommendations based on the first incomplete NL request, the first context, and a first recommendation model, wherein the first recommendation model is generated via a machine learning algorithm applied to a first data dependency model and a first request completion model; receiving a selection of a first request completion recommendation included in the one or more request completion recommendations; generating a complete request based on the first incomplete NL request and the first request completion recommendation; and causing the complete request to be applied to the data storage system.

2. The method of clause 1, further comprising causing the one or more request completion recommendations to be provided to a user.

3. The method of clauses 1 or 2, further comprising ranking the one or more request completion recommendations based on the first recommendation model.

4. The method of any of clauses 1-3, wherein the first request completion model is generated based on at least historical data associated with a plurality of NL requests previously applied to the data storage system.

5. The method of any of clauses 1-4, further comprising mapping each of the one or more request completion recommendations to an intent; generating, for each of the intents, an NL request recommendation based on the intent, wherein the NL request recommendation comprises a variation of the request completion recommendation from which the intent is mapped; and causing the NL request recommendations to be provided to a user.

6. The method of any of clauses 1-5, wherein the first incomplete NL request comprises a first text string, and generating the one or more request completion recommendations comprises generating one or more second text strings based on the first NL request, the first context, and the first recommendation model; and generating a third text string by appending one of the second text strings to the first text string, wherein the first text string is a prefix in the third text string.

7. The method of any of clauses 1-6, wherein the first data dependency model comprises a data dependency graph, the data dependency graph capturing dependencies between a first artifact associated with the first incomplete NL request and one or more additional artifacts within the data storage system.

8. The method of any of clauses 1-7, wherein the first data dependency model and a first request completion model are cached by an application at a client device, wherein the first recommendation model is generated via the machine learning algorithm in the application at the client device, and generating the one or more request completion recommendations comprises generating the one or more request completion recommendations in the application at the client device.

9. The method of any of clauses 1-8, wherein the first context includes at least one of a time associated with the first incomplete NL request, a device with which a user specified the first incomplete NL request, a job function of the user, a location of the user, a time of day, a user situation, a user context, and a user preference.

10. The method of any of clauses 1-9, wherein the complete request is composed in a domain-specific language (DSL) associated with a data storage system.

11. In some embodiments, one or more non-transitory computer-readable storage media includes instructions that, when executed by one or more processors, cause the one or more processors to perform the steps of receiving a first incomplete natural language (NL) request and a first context associated with the first incomplete NL request; generating one or more request completion recommendations based on the first incomplete NL request, the first context, and a first recommendation model, wherein the first recommendation model is generated via a machine learning algorithm applied to a first data dependency model and a first request completion model; receiving a selection of a first request completion recommendation included in the one or more request completion recommendations; generating a complete request based on the first incomplete NL request and the first request completion recommendation; and causing the complete request to be applied to the data storage system.

12. The one or more computer-readable storage media of clause 11, further comprising instructions that, when executed by the one or more processors, further cause the one or more processors to perform the step of causing the one or more request completion recommendations to be provided to a user.

13. The one or more computer-readable storage media of clauses 11 or 12, further comprising instructions that, when executed by the one or more processors, further cause the one or more processors to perform the step of ranking the one or more request completion recommendations based on the first recommendation model.

14. The one or more computer-readable storage media of any of clauses 11-13, wherein the first request completion model is generated based on at least historical data associated with a plurality of NL requests previously applied to the data storage system.

15. The one or more computer-readable storage media of any of clauses 11-14, further comprising instructions that, when executed by the one or more processors, further cause the one or more processors to perform the steps of mapping each of the one or more request completion recommendations to an intent; generating, for each of the intents, an NL request recommendation based on the intent, wherein the NL request recommendation comprises a variation of the request completion recommendation from which the intent is mapped; and causing the NL request recommendations to be provided to a user.

16. The one or more computer-readable storage media of any of clauses 11-15, wherein the first incomplete NL request comprises a first text string, and generating the one or more request completion recommendations comprises generating one or more second text strings based on the first NL request, the first context, and the first recommendation model; and generating a third text string by appending one of the second text strings to the first text string, wherein the first text string is a prefix in the third text string.

17. The one or more computer-readable storage media of any of clauses 11-16, wherein the first data dependency model comprises a data dependency graph, the data dependency graph capturing dependencies between a first artifact associated with the first incomplete NL request and one or more additional artifacts within the data storage system.

18. The one or more computer-readable storage media of any of clauses 11-17, wherein the first data dependency model and a first request completion model are cached by an application at a client device, wherein the first recommendation model is generated via the machine learning algorithm in the application at the client device, and generating the one or more request completion recommendations comprises generating the one or more request completion recommendations in the application at the client device.

19. The one or more computer-readable storage media of any of clauses 11-18, wherein the first context includes at least one of a time associated with the first incomplete NL request, a device with which a user specified the first incomplete NL request, a job function of the user, a location of the user, a time of day, a user situation, a user context, and a user preference.

20. The one or more computer-readable storage media of any of clauses 11-19, wherein the complete request is composed in a domain-specific language (DSL) associated with a data storage system.

21. In some embodiments, a computing device comprises a memory that includes instructions, and a processor that is coupled to the memory and, when executing the instructions, is configured to receive a first incomplete natural language (NL) request and a first context associated with the first incomplete NL request; generate one or more request completion recommendations based on the first incomplete NL request, the first context, and a first recommendation model, wherein the first recommendation model is generated via a machine learning algorithm applied to a first data dependency model and a first request completion model; receive a selection of a first request completion recommendation included in the one or more request completion recommendations; generate a complete request based on the first incomplete NL request and the first request completion recommendation; and cause the complete request to be applied to the data storage system.

22. The device of clause 21, wherein the processor is further configured to cause the one or more request completion recommendations to be provided to a user.

23. The device of clauses 21 or 22, wherein the processor is further configured to rank the one or more request completion recommendations based on the first recommendation model.

24. The device of any of clauses 21-23, wherein the first request completion model is generated based on at least historical data associated with a plurality of NL requests previously applied to the data storage system.

25. The device of any of clauses 21-24, wherein the processor is further configured to map each of the one or more request completion recommendations to an intent; generate, for each of the intents, an NL request recommendation based on the intent, wherein the NL request recommendation comprises a variation of the request completion recommendation from which the intent is mapped; and cause the NL request recommendations to be provided to a user.

26. The device of any of clauses 21-25, wherein the first incomplete NL request comprises a first text string, and generating the one or more request completion recommendations comprises generating one or more second text strings based on the first NL request, the first context, and the first recommendation model; and generating a third text string by appending one of the second text strings to the first text string, wherein the first text string is a prefix in the third text string.

27. The device of any of clauses 21-26, wherein the first data dependency model comprises a data dependency graph, the data dependency graph capturing dependencies between a first artifact associated with the first incomplete NL request and one or more additional artifacts within the data storage system.

28. The device of any of clauses 21-27, wherein the first data dependency model and a first request completion model are cached by an application at a client device, wherein the first recommendation model is generated via the machine learning algorithm in the application at the client device, and generating the one or more request completion recommendations comprises generating the one or more request completion recommendations in the application at the client device.

29. The device of any of clauses 21-28, wherein the first context includes at least one of a time associated with the first incomplete NL request, a device with which a user specified the first incomplete NL request, a job function of the user, a location of the user, a time of day, a user situation, a user context, and a user preference.

30. The device of any of clauses 21-29, wherein the complete request is composed in a domain-specific language (DSL) associated with a data storage system.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
  receiving a first incomplete natural language (NL) request and a first context associated with the first incomplete NL request;
  generating a first set of completion recommendations based on the first incomplete NL request, the first context, and a first request completion model, wherein the first request completion model determines, for a given character sequence, a likelihood that the given character sequence follows one or more text strings included in the first incomplete NL request;
  mapping a first request completion recommendation, included in the first set of request completion recommendations, to an intent;
  generating, based on the intent, a second set of request completion recommendations, wherein each request completion recommendation included in the second set of request completion recommendations is generated by creating a variation in the wording of the first request completion recommendation;
  receiving a selection of a first completion recommendation included in the first set of request completion recommendations or the second set of request completion recommendations as a selected completion recommendation;
  generating a complete request based on the first incomplete NL request and the selected completion recommendation;
  causing the complete request to be applied to a data storage system to generate a search result; and
  presenting the search result based on a presentation recommendation, the presentation recommendation indicating a presentation format selected from a plurality of presentation formats in which the search result can be presented.

2. The computer-implemented method of claim 1, wherein:
  the first request completion recommendation includes a portion of the first incomplete NL as a prefix; and
  the variation of the first request completion recommendation includes at least a portion of the first incomplete NL request as a suffix.

3. The computer-implemented method of claim 1, wherein the first set of completion recommendations is further based on a first data dependency model.

4. The computer-implemented method of claim 1, further comprising:
  generating a presentation recommendation based on the complete request, the search result, and a presentation model that has been trained via a machine learning algorithm; and
  causing the search result to be presented based on a response to the presentation recommendation.

5. The method of claim 1, further comprising ranking at least one of the first set or second set of the completion recommendations based on a first recommendation model associated with the first request completion model.

6. The method of claim 1, wherein the first request completion model is generated based on at least historical data associated with a plurality of NL requests previously applied to the data storage system.

7. The method of claim 1, wherein the first request completion model is cached by an application at a client device, and generating the first set or second set of completion recommendations comprises generating the first set or second set of completion recommendations in the application at the client device.

8. The method of claim 1, wherein the first context includes at least one of: a time associated with the first incomplete NL request, a device with which a user specified the first incomplete NL request, a job function of the user, a location of the user, a time of day, a user situation, a user context, or a user preference.

9. The method of claim 1, wherein the complete request is composed in a domain-specific language (DSL) associated with the data storage system.

10. One or more non-transitory computer-readable storage media including instructions that, when executed by one or more processors, cause the one or more processors to perform steps of:
receiving a first incomplete natural language (NL) request and a first context associated with the first incomplete NL request;
generating a first set of completion recommendations based on the first incomplete NL request, the first context, and a first request completion model, wherein the first request completion model determines, for a given character sequence, a likelihood that the given character sequence follows one or more text strings included in the first incomplete NL request;
mapping a first request completion recommendation, included in the first set of request completion recommendations, to an intent;
generating, based on the intent, a second set of request completion recommendations, wherein each request completion recommendation included in the second set of request completion recommendations is generated by creating a variation in the wording of the first request completion recommendation;
receiving a selection of a first completion recommendation included in the first set of request completion recommendations or the second set of request completion recommendations as a selected completion recommendation;
generating a complete request based on the first incomplete NL request and the selected completion recommendation;
causing the complete request to be applied to a data storage system to generate a search result; and
presenting the search result based on a presentation recommendation, the presentation recommendation indicating a presentation format selected from a plurality of presentation formats in which the search result can be presented.

11. The one or more non-transitory computer-readable storage media of claim 10, further comprising instructions that, when executed by the one or more processors, further cause the one or more processors to perform the step of ranking at least one of the first set or second set of the completion recommendations based on a first recommendation model associated with the first request completion model.

12. The one or more non-transitory computer-readable storage media of claim 10, wherein the complete request is composed in a domain-specific language (DSL) associated with the data storage system.

13. The one or more non-transitory computer-readable storage media of claim 10, wherein:
the first request completion recommendation includes a portion of the first incomplete NL as a prefix; and
the variation of the first request completion recommendation includes at least a portion of the first incomplete NL request as a suffix.

14. A computing device, comprising:
a memory that includes instructions; and
a processor that is coupled to the memory and, when executing the instructions, is configured to:
receive a first incomplete natural language (NL) request and a first context associated with the first incomplete NL request;
generate a first set of completion recommendations based on the first incomplete NL request, the first context, and a first request completion model, wherein the first request completion model determines, for a given character sequence, a likelihood that the given character sequence follows one or more text strings included in the first incomplete NL request;
map a first request completion recommendation, included in the first set of request completion recommendations, to an intent;
generate, based on the intent, a second set of request completion recommendations, wherein each request completion recommendation included in the second set of request completion recommendations is generated by creating a variation in the wording of the first request completion recommendation;
receive a selection of a completion recommendation included in the first set of request completion recommendations or the second set of request completion recommendations as a selected completion recommendation;
generate a complete request based on the first incomplete NL request and the selected completion recommendation; and
cause the complete request to be applied to a data storage system to generate a search result; and
present the search result based on a presentation recommendation, the presentation recommendation indicating a presentation format selected from a plurality of presentation formats in which the search result can be presented.

15. The computing device of claim 14, wherein the processor is further configured to rank at least one of the first set or second set of the completion recommendations based on a first recommendation model associated with the first request completion model.

16. The computing device of claim 14, wherein the complete request is composed in a domain-specific language (DSL) associated with the data storage system.

17. The computing device of claim 14, wherein:
the first request completion recommendation includes a portion of the first incomplete NL as a prefix; and
the variation of the first request completion recommendation includes at least a portion of the first incomplete NL request as a suffix.

* * * * *